(12) United States Patent
Kashihara

(10) Patent No.: US 6,571,147 B1
(45) Date of Patent: May 27, 2003

(54) SYSTEM FOR AND METHOD OF MANAGING JOBS

(75) Inventor: Hideaki Kashihara, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 09/154,081

(22) Filed: Sep. 16, 1998

(30) Foreign Application Priority Data

| Sep. 22, 1997 | (JP) | ............................................. | 9-257211 |
| Sep. 22, 1997 | (JP) | ............................................. | 9-257212 |
| Sep. 22, 1997 | (JP) | ............................................. | 9-257213 |
| Sep. 22, 1997 | (JP) | ............................................. | 9-257214 |
| May 13, 1998 | (JP) | ............................................. | 10-130547 |

(51) Int. Cl.$^7$ ............................................. G06F 15/46
(52) U.S. Cl. ......................................... 700/100; 700/99
(58) Field of Search ........................ 700/100, 99, 103, 700/104

(56) References Cited

U.S. PATENT DOCUMENTS 5,093,794 A * 3/1992 Howie et al. ............... 700/100
5,216,593 A * 6/1993 Dietrich et al. ............. 345/467
5,442,561 A * 8/1995 Yoshizawa et al. ......... 700/100
5,463,555 A * 10/1995 Ward et al. ................. 700/100
5,560,194 A * 10/1996 Shofner et al. ............... 57/264

\* cited by examiner

Primary Examiner—Leo Picard
Assistant Examiner—Michael D. Masinick
(74) Attorney, Agent, or Firm—McDermott, Will & Emery

(57) ABSTRACT

An input agent system and a plurality of job-handling agent systems are connected using a network. One external apparatus is connected to each of the job-handling agent systems. Pieces of job information indicative of the processing contents of the external apparatuses are inputted to the input agent system, and each of the job-handling agent systems captures and evaluates a piece of job information from the input agent system, and then registers the piece of job information if the piece of job information is judged as being suitable for an associated external apparatus. This eliminates the need for the input agent system to judge which external apparatus is to process the inputted pieces of job information, reducing the burdens on the input agent system. Consequently, pieces of job information may be efficiently handled in the plurality of external apparatuses connected respectively to the plurality of job-handling agent systems.

35 Claims, 125 Drawing Sheets

FIG. 13

EXAMPLE OF CONTENTS OF JOB DATABASE

| JOB ID | JOB NAME | GENERAL PROCESSING CONTENTS | MACHINING REQUIREMENT | SUPPLIED MATERIAL & PART FORMAT | INSPECTION & QUALITY STANDARD | DELIVERY DATE & TIME | DESIRED PROCESSING COST |
|---|---|---|---|---|---|---|---|
| 0001 | Job-456 | BOLT CUTTING TYPE NO.:22 COUNT:1000 METRIC SCREW | FIRST-ORDER FINISHING | SUS304, STEEL BAR 10 m 50 PIECES | TOLERANCE ±200μ | 1 Jul 1996 11:12 pm | ¥2,870 APIECE |
| 0002 | Job-213 | PLATE POLISHING TYPE NO.:45 COUNT:125 | SECOND-ORDER FINISHING SINGLE-SIDED | CAST-IRON PLATE 50 m 5 PIECES | TOLERANCE ±750μ | 2 Jul 1996 7:12 am | ¥420 APIECE |
| 0003 | Job-354 | PLATE MILLING TYPE NO.:490 COUNT:5 | ROUGH FINISHING DOUBLE-SIDED | ALUMINUM PLATE 50 m² | TOLERANCE ±1mm | 6 Jul 1996 5:55 am | ¥540 APIECE |
| 0004 | Job-457 | BOLT CUTTING TYPE NO.:67 COUNT:450 BALL SCREW | THIRD-ORDER FINISHING | SUS315, STEEL BAR 20 m 104 PIECES | TOLERANCE ±50μ | 3 Jul 1996 11:12 pm | ¥7,600 APIECE |
| 0005 | Job-563 | BOLT CUTTING TYPE NO.:87 COUNT:450 BALL SCREW | SECOND-ORDER FINISHING | SUS315, STEEL BAR 20 m 84 PIECES | TOLERANCE ±750μ | 8 Jul 1996 8:12 pm | ¥13,866 APIECE |

FIG. 14    EXAMPLE OF CONTENTS OF JOB LIST TABLE

| JOB ID | JOB NAME | GENERAL PROCESSING CONTENTS | MACHINING REQUIREMENT | SUPPLIED MATERIAL & PART FORMAT | INSPECTION & QUALITY STANDARD | DELIVERY DATE & TIME | DESIRED PROCESSING COST |
|---|---|---|---|---|---|---|---|
| 0001 | Job-456 | BOLT CUTTING TYPE NO.:22 COUNT:1000 METRIC SCREW | FIRST-ORDER FINISHING | SUS304,STEEL BAR 10 m 50 PIECES | TOLERANCE ±200μ | 1 Jul 1996 11:12 pm | ¥2,870 APIECE |
| 0002 | UNREGISTERED | | | | | | |
| 0003 | Job-354 | PLATE MILLING TYPE NO.:490 COUNT:5 | ROUGH FINISHING DOUBLE-SIDED | ALUMINUM PLATE 50 m² | TOLERANCE ±1mm | 6 Jul 1996 5:55 am | ¥540 APIECE |
| 0004 | Job-457 | BOLT CUTTING TYPE NO.:67 COUNT:450 BALL SCREW | THIRD-ORDER FINISHING | SUS315,STEEL BAR 20 m 104 PIECES | TOLERANCE ±50μ | 3 Jul 1996 11:12 pm | ¥7,600 APIECE |
| 0005 | Job-563 | BOLT CUTING TYPE NO.:87 COUNT:450 BALL SCREW | SECOND-ORDER FINISHING | SUS315,STEEL BAR 20 m 84 PIECES | TOLERANCE ±750μ | 8 Jul 1996 8:12 pm | ¥13,866 APIECE |

EXAMPLE OF CONTENTS OF JOB LIST TABLE

| JOB ID | JOB NAME | RESERVATION STATUS INFORMATION | PROCESSING REJECTION STATUS INFORMATION | PROCESSING ACCEPTANCE STATUS INFORMATION | PROCESSING RESULT INFORMATION | |
|---|---|---|---|---|---|---|
| | | | | | TIME | TERMINATION RESULT |
| 0001 | Job-456 | 1 | 0 | 1 | 1 Jul 1996 9:15 am | 1 |
| 0002 | | UNREGISTERED | | | | |
| 0003 | Job-354 | 2 | 1 No.1, No.5 | 0 | | 0 |
| 0004 | Job-457 | 9 | 1 | 0 | | 0 |
| 0005 | Job-563 | 1 | 0 | 1 | 8 Jul 1996 0:15 am | 1 |
| | | CODE OF STATUS #0: NO ONE HAS RESERVED #1: TO RESERVE #2: NOT TO RESERVE #9: RESERVATION INHIBITED | CODE OF STATUS #0: NO ACTION #1: PROCESSING REJECTED (NO.: PROCESSING-REJECTED APPARATUS NUMBER) | CODE OF STATUS #0: NO ACTION #1: PROCESSING ACCEPTED | | CODE OF STATUS #0: NO ACTION #1: NORMAL COMPLETION #2: TROUBLE #3: STOP |

EXAMPLE OF CHOICE CONDITIONS

FROM JOB-HANDLING AGENT SYSTEM

| MATERIAL SPEC | NUMBER OF REVOLUTIONS | CUTTING RATE | FEED RATE | SET-UP TIME | REPLACEMENT TIME | MACHINING ACCURACY | MATERIAL PREPARATION TIME |
|---|---|---|---|---|---|---|---|
| Type-A: FOR SOFT STEEL<br>Type-B: FOR STEEL<br>Type-C: CAST IRON | Max. 8000rpm | Max. 22m/sec | Max. 50cm/min | Min. 5min | Min. 2min | Min. 15μ | Min. 25sec |

FIG. 21

EXAMPLE OF CONTENTS OF ABILITY DATABASE

| POWER SPEC | NUMBER OF REVOLUTIONS | CUTTING RATE | CUTTER TYPE | FEED RATE | SET-UP TIME | REPLACEMENT TIME | MACHINING ACCURACY | MATERIAL PREPARATION TIME |
|---|---|---|---|---|---|---|---|---|
| THREE-PHASE AC 220V | 1800rpm<br>2400rpm<br>3600rpm<br>7200rpm | 2m/sec<br>5m/sec<br>10m/sec<br>13m/sec<br>15m/sec<br>20m/sec | Type-A: FOR SOFT STEEL<br>Type-B: FOR STEEL<br>Type-C: CAST IRON | 20cm/min<br>15cm/min<br>30cm/min | 10min<br>15min<br>8min | 5min<br>4min<br>3min | 20-100 $\mu$<br>100-300 $\mu$<br>300-500 $\mu$<br>500-1000 $\mu$ | 30sec<br>40sec<br>70sec |
| RESTRICTIVE CONDITIONS | Max.<br>8000rpm | Max.<br>22m/sec | | Max.<br>50cm/min | Min.<br>5min | Min.<br>2min | Min. 15 $\mu$ | Min. 25sec |

FIG. 22

EXAMPLE OF CONTENTS OF PROFIT DATABASE

| TYPE | TIME CUTTING COST | PRE-SETUP COST | POST-SETUP COST | TOOL COST | CUTTING OIL COST | COOLING COST | POWER COST | APPARATUS OPERATION LABOR COST | MAINTENANCE GUARANTEE COST | APPARATUS INITIAL COST |
|---|---|---|---|---|---|---|---|---|---|---|
| UNIT | 1 HOUR | 1 TIME | 1 TIME | 1 PIECE | 1 TIME | 1 TIME | 1 DAY | 1 DAY | 1 DAY | 1 DAY |
| A COST CLAIMED | @50,000 @20,000 | @5,000 @2,000 | @3,000 @1,200 | @2,300 @920 | @250 @100 | @340 @136 | @1,000 @400 | ACTOMATIC OPERATION | @400 @400 | @750 @750 |
| B COST CLAIMED | @50,250 ...... | @5,100 ...... | @3,050 ...... | @2,400 ...... | @550 ...... | @640 ...... | @1,200 ...... | @20,000 ...... | @450 ...... | @750 ...... |
| C COST CLAIMED | @54,000 ...... | @6,000 ...... | @3,100 ...... | @2,900 ...... | @800 ...... | @900 ...... | @2,000 ...... | @25,000 ...... | @800 ...... | @750 ...... |
| D COST CLAIMED | @60,000 ...... | @7,000 ...... | @3,400 ...... | @3,300 ...... | @950 ...... | @980 ...... | @2,500 ...... | @33,000 ...... | @900 ...... | @750 ...... |

FIG. 24

EXAMPLE OF CONTENTS OF SCHEDULE TABLE

PROCESSING SCHEDULE INFORMATION

| JOB ID | JOB NAME | |
|---|---|---|
| 0001 | Job-456 | 29 Jun 1996 – 1 Jul 1996<br>2:15 am    10:15 am<br>AMOUNT TO BE CLAIMED ¥2,870 APIECE<br>PROFIT PER PIECE ¥1,720 APIECE<br>GROSS PROFIT ¥1,720,134 |
| 0005 | Job-563 | 3 Jul 1996 – 8 Jul 1996<br>1:15 am    3:15 am<br>AMOUNT TO BE CLAIMED ¥13,866 APIECE<br>PROFIT PER PIECE ¥8,310 APIECE<br>GROSS PROFIT ¥3,739,734 |

▨ UNFIXED SCHEDULE PARTS

FIG. 25

EXAMPLE OF CALCULATION OF ESTIMATE

- ID#: 0001　JOB NAME: Job-456

- TOTAL APPARATUS USE AND OPERATION TIME: ABOUT 56 HOURS

- TOTAL AMOUNT CLAIMED: ¥2,870,340　　(¥2,870,340/1,000PIECES=¥2,870)
  BREAKDOWN: @50,000*56HOURS+@5,000+@3,000+@2,300+@250+@340+@1,000*56HOURS+@400*3DAYS+@750*3DAYS

- TOTAL GROSS COST: ¥1,150,206
  BREAKDOWN: @20,000*56HOURS+@2,000+@1,200+@920+@100+@136+@400*56HOURS+@400*3DAYS+@750*3DAYS
  ASSUMPTION: GROSS COST IS 40% OF TOTAL AMOUNT CLAIMED

- GROSS PROFIT: ¥1,720,134　　(¥1,720,134/1,000PIECES=¥1,720)

- ID#: 0005　JOB NAME: Job-563

- TOTAL APPARATUS USE AND OPERATION TIME: ABOUT 122 HOURS

- TOTAL AMOUNT CLAIMED: ¥6,239,790　　(¥6,239,790/450PIECES=¥13,866)
  BREAKDOWN: @50,000*122HOURS+@5,000+@3,000+@2,300+@250+@340+@1,000*122HOURS+@400*6DAYS+@750*6DAYS

- TOTAL GROSS COST: ¥2,500,056
  BREAKDOWN: @20,000*122HOURS+@2,000+@1,200+@920+@100+@136+@400*122HOURS+@400*6DAYS+@750*6DAYS
  ASSUMPTION: GROSS COST IS 40% OF TOTAL AMOUNT CLAIMED

- GROSS PROFIT: ¥3,739,734　　(¥3,739,734/450PIECES=¥8,310)

FIG. 29  EXAMPLE OF CONTENTS OF MONITORING TABLE (DETAILED)

| JOB ID | JOB NAME | OPERATOR | PROCESSING STEP INTERNAL CODE | PROCESSING TIME | PROCESSING STATE CODE | REMARK |
|---|---|---|---|---|---|---|
| 0001 | Job-456 | auto. | #0 WAIT | 29 Jun 1996 2:20 am | #1 WAIT | ●PROCESSING STEP INTERNAL CODE |
| 0001 | Job-456 | auto. | #1 TRANSPORT IN | 29 Jun 1996 2:35 am | #2 START | |
| 0001 | Job-456 | auto. | #1 TRANSPORT IN | 29 Jun 1996 2:39 am | #3 SUSPEND | #0 WAIT |
| 0001 | Job-456 | auto. | #1 TRANSPORT IN | 29 Jun 1996 2:40 am | #4 RESTART | #1 TRANSPORT IN |
| 0001 | Job-456 | auto. | #1 TRANSPORT IN | 29 Jun 1996 2:50 am | #7 COMPLETE | #2 LOAD |
| 0001 | Job-456 | auto. | #0 WAIT | 29 Jun 1996 2:50 am | #1 WAIT | #3 CUT |
| 0001 | Job-456 | auto. | #2 LOAD | 29 Jun 1996 2:50 am | #2 START | #4 TRANSPORT OUT |
| 0001 | Job-456 | auto. | #2 LOAD | 29 Jun 1996 2:55 am | #7 COMPLETE | |
| 0001 | Job-456 | auto. | #0 WAIT | 29 Jun 1996 2:55 am | #1 WAIT | |
| 0001 | Job-456 | auto. | #3 CUT | 29 Jun 1996 2:56 am | #2 START | ●OPERATOR |
| 0001 | Job-456 | auto. | #3 CUT | 1 Jul 1996 9:00 am | #7 COMPLETE | auto.:Automatic |
| 0001 | Job-456 | auto. | #0 WAIT | 1 Jul 1996 9:00 am | #1 WAIT | manu.:Manual |
| 0001 | Job-456 | auto. | #4 TRANSPORT OUT | 1 Jul 1996 9:00 am | #2 START | |
| 0001 | Job-456 | auto. | #4 TRANSPORT OUT | 1 Jul 1996 9:15 am | #7 COMPLETE | ●PROCESSING STATE CODE |
| 0005 | Job-563 | auto. | #0 WAIT | 1 Jul 1996 9:15 am | #1 WAIT | |
| 0005 | Job-563 | auto. | #1 TRANSPORT IN | 3 Jul 1996 8:15 am | #2 START | #1 WAIT |
| 0005 | Job-563 | auto. | #1 TRANSPORT IN | 3 Jul 1996 10:25 am | #7 COMPLETE | #2 START |
| 0005 | Job-563 | manu. | #0 WAIT | 3 Jul 1996 10:25 am | #1 WAIT | #3 SUSPEND |
| 0005 | Job-563 | manu. | #2 LOAD | 3 Jul 1996 10:27 am | #2 START | #4 RESTART |
| 0005 | Job-563 | auto. | #2 LOAD | 4 Jul 1996 2:15 pm | #7 COMPLETE | #5 STOP |
| 0005 | Job-563 | auto. | #0 WAIT | 4 Jul 1996 2:15 pm | #1 WAIT | #6 TROUBLE |
| 0005 | Job-563 | auto. | #3 CUT | 4 Jul 1996 11:08 am | #2 START | #7 COMPLETE |
| 0005 | Job-563 | auto. | #3 CUT | 6 Jul 1996 10:01 pm | #7 COMPLETE | |
| 0005 | Job-563 | auto. | #0 WAIT | 6 Jul 1996 10:01 pm | #1 WAIT | |
| 0005 | Job-563 | auto. | #4 TRANSPORT OUT | 6 Jul 1996 10:05 pm | #2 START | |
| 0005 | Job-563 | auto. | #4 TRANSPORT OUT | 8 Jul 1996 0:15 am | #7 COMPLETE | |

FIG. 30

EXAMPLE OF CONTENTS OF MONITORING TABLE (GENERAL)

| JOB ID | JOB NAME | OPERATOR | PROCESSING STEP INTERNAL CODE | ESTIMATED SCHEDULE START TIME | ESTIMATED SCHEDULE END TIME | ACTUAL START TIME | ACTUAL END TIME | STATE CODE |
|---|---|---|---|---|---|---|---|---|
| 0001 | Job-456 | auto. | 1:TRANSPORT IN | 29 Jun 1996 2:15 am | 29 Jun 1996 2:30 am | 29 Jun 1996 2:35 am | 29 Jun 1996 2:50 am | 1:NORMAL |
| 0001 | Job-456 | auto. | 2:LOAD | 29 Jun 1996 2:30 am | 29 Jun 1996 2:35 am | 29 Jun 1996 2:50 am | 29 Jun 1996 2:55 am | 1:NORMAL |
| 0001 | Job-456 | auto. | 3:CUT | 29 Jun 1996 2:36 am | 1 Jul 1996 10:00 am | 29 Jun 1996 2:56 am | 1 Jul 1996 9:00 am | 1:NORMAL |
| 0001 | Job-456 | auto. | 4:TRANSPORT OUT | 1 Jul 1996 10:00 am | 1 Jul 1996 10:15 am | 1 Jul 1996 9:00 am | 1 Jul 1996 9:15 am | 1:NORMAL |

FIG. 33

EXAMPLE OF CALCULATION OF TRACK RECORD

---

ID#:0001　JOB NAME: Job-456

- TOTAL APPARATUS USE AND OPERATION TIME : ABOUT 55 HOURS

- TOTAL AMOUNT CLAIMED : ￥2,819,340　　　　(￥2,819,340/1,000PIECES=￥2,819)
  BREAKDOWN : @50,000*55HOURS+@5,000+@3,000+@2,300+@250+@340+@1,000*55HOURS+@400*3DAYS+@750*3DAYS

- TOTAL GROSS COST : ￥1,129,806
  BREAKDOWN : @20,000*55HOURS+@2,000+@1,200+@920+@100+@136+@400*55HOURS+@400*3DAYS+@750*3DAYS
  ASSUMPTION :GROSS COST IS 40% OF TOTAL AMOUNT CLAIMED

- GROSS PROFIT : ￥1,689,534　　　　　　　　　　(￥1,689,534/1,000PIECES=￥1,690)

---

ID#:0005　JOB NAME : Job-563

- TOTAL APPARATUS USE AND OPERATION TIME : ABOUT 112 HOURS

- TOTAL AMOUNT CLAIMED : ￥5,728,640　　　　(￥5,728,640/450PIECES=￥12,730)
  BREAKDOWN : @50,000*112HOURS+@5,000+@3,000+@2,300+@250+@340+@1,000*112HOURS+@400*5DAYS+@750*5DAYS

- TOTAL GROSS COST : ￥2,294,906
  BREAKDOWN : @20,000*112HOURS+@2,000+@1,200+@920+@100+@136+@400*112HOURS+@400*5DAYS+@750*5DAYS
  ASSUMPTION :GROSS COST IS 40% OF TOTAL AMOUNT CLAIMED

- GROSS PROFIT : ￥3,433,734　　　　　　　　　　(￥3,433,734/450PIECES=￥7,630)

EXAMPLE OF CONTENTS OF TRACK RECORD TABLE

| JOB ID | JOB NAME<br>OK / NO | PROCESSING TRACK RECORD INFORMATION |
|---|---|---|
| 0001 OK | Job-456 | 29 Jun 1996 – 1 Jul 1996<br>2:35 am      9:15 am<br>ACTUAL AMOUNT CLAIMED      ¥2,819 APIECE<br>ACTUAL PROFIT PER PIECE      ¥1,690 APIECE<br>GROSS PROFIT      ¥1,689,534 |
| 0005 OK | Job-563 | 3 Jul 1996 – 8 Jul 1996<br>8:15 am      0:15 am<br>ACTUAL AMOUNT CLAIMED      ¥12,730 APIECE<br>ACTUAL PROFIT PER PIECE      ¥7,630 APIECE<br>GROSS PROFIT      ¥3,433,734 |

- 12
  - 111 FIXED DISK DEVICE
    - 12a JOB INFORMATION DATABASE
    - 12b INPUT DATABASE
    - 12c OUTPUT DATABASE
  - 112 FIXED DISK DEVICE
    - 11 JOB MANAGEMENT AGENT

- 10
  - 101 CPU
  - 102 RAM
    - 13 JOB LIST TABLE
  - 103 CRT
  - 104 KEYBOARD
  - 105 COMMUNICATION DEVICE
  - 106 READER
  - 121 (bus)
  - 9

FIG.65 EXAMPLE OF CONTENTS OF JOB INFORMATION DATABASE (12a)

| JOB ID | JOB NAME | PRODUCTION SPEC CONTENTS | PROCESSING REQUIREMENT | SUPPLIED MATERIAL | TOTAL CAPACITY | FILE FORMAT | DELIVERY DATE&TIME | DESIRED PROCESSING COST |
|---|---|---|---|---|---|---|---|---|
| 0001 | Job-456 | A5, 8-PAGE IMAGE, 120pages, 4COLORS | IMAGE EDITING CHARACTER EDITING LAYOUT | IMAGE DATA CHARACTER DATA | 3600MB 20MB | TIFF SGML | 1 July 1996 11:12pm | ¥185,000 |
| 0002 | Job-213 | A4, 4-PAGE IMAGE, 20pages, 2COLORS | IMAGE EDITING CHARACTER EDITING LAYOUT | IMAGE DATA CHARACTER DATA | 600MB 12MB | TIFF SGML | 2 July 1996 7:12am | ¥ 52,500 |
| 0003 | Job-354 | A2, 2-PAGE IMAGE, 1page, 4COLORS | IMAGE EDITING CHARACTER EDITING LAYOUT | IMAGE DATA CHARACTER DATA | 60MB 8MB | UNIQUE FORMAT SGML | 6 July 1996 17:55am | ¥2,700 |
| 0004 | Job-457 | A4, 8-PAGE IMAGE, 80pages, 6COLORS | IMAGE EDITING CHARACTER EDITING LAYOUT | IMAGE DATA CHARACTER DATA | 4800MB 18MB | UNIQUE FORMAT SGML | 3 July 1996 11:12pm | ¥150,000 |
| 0005 | Job-563 | A3, 4-PAGE IMAGE, 250pages, 4COLORS | IMAGE EDITING CHARACTER EDITING LAYOUT | IMAGE DATA CHARACTER DATA | 30,000MB 15MB | UNIQUE FORMAT SGML | 8 July 1996 8:12pm | ¥435,000 |

FIG.66

EXAMPLE OF CONTENTS OF INPUT DATABASE (12b)

| JOB ID | JOB NAME | PART ID | PART NAME | ATTRIBUTE | TOTAL CAPACITY | SIZE-X (Pixel) | SIZE-Y (Pixel) | FORMAT | FILE FORMAT |
|---|---|---|---|---|---|---|---|---|---|
| 0001 | Job-456 | PI-1001 | Window | Image | 50.47MB | 4200 | 4200 | RGB | TIFF |
| 0001 | Job-456 | PI-1002 | Speed | Image | 77.25MB | 4500 | 4500 | YMCK | TIFF |
| 0001 | Job-456 | PT-1001 | Writer | TEXT | 0.3 MB | --- | --- | --- | SGML |
| 0002 | Job-213 | PI-2001 | Tree | Image | 38.45MB | 3200 | 4200 | RGB | TIFF |
| 0002 | Job-213 | PI-2002 | Car | Image | 53.22MB | 6200 | 3000 | RGB | TIFF |
| 0002 | Job-213 | PT-2001 | Cold | TEXT | 1.1 MB | --- | --- | --- | SGML |
| 0003 | Job-354 | PI-3001 | Apple | Image | 20.98MB | 2500 | 2200 | YMCK | TIFF |
| 0003 | Job-354 | PI-3002 | Fire | Image | 6.87MB | 1200 | 1500 | YMCK | TIFF |
| 0003 | Job-354 | PT-3001 | Writer | TEXT | 0.4 MB | --- | --- | --- | SGML |
| 0004 | Job-457 | PI-4001 | Corn | Image | 5.66MB | 1800 | 1100 | RGB | TIFF |
| 0004 | Job-457 | PI-4002 | Cow | Image | 34.33MB | 5000 | 1800 | YMCK | TIFF |
| 0004 | Job-457 | PT-4001 | Letter | TEXT | 0.50MB | --- | --- | --- | SGML |
| 0005 | Job-563 | PI-5001 | Young | Image | 5.84MB | 1700 | 900 | YMCK | TIFF |
| 0005 | Job-563 | PI-5002 | Old | Image | 12.50MB | 2300 | 1900 | RGB | TIFF |
| 0005 | Job-563 | PT-5001 | Air Mail | TEXT | 0.7 MB | --- | --- | --- | SGML |

FIG. 67

EXAMPLE OF CONTENTS OF OUTPUT DATABASE (12c)

| JOB ID | JOB NAME | OUTPUT PART ID | PART NAME | ATTRIBUTE | TOTAL CAPACITY | SIZE-X (Pixel) | SIZE-Y (Pixel) | FORMAT | FILE FORMAT |
|---|---|---|---|---|---|---|---|---|---|
| 0001 | Job-456 | Layout-1001 | "VALLEY" OUTPUT FILE | Layout | 40,000MB | | | | PS-file |
| 0001 | Job-456 | Pro-1001 | "VALLEY" PROCEDURE FILE | Procedure | 41MB | | | | UNIQUE FORMAT |
| 0002 | Job-213 | Layout-2001 | "RIVER" OUTPUT FILE | Layout | Not calc. | | | | |
| 0002 | Job-213 | Pro-2001 | "RIVER" PROCEDURE FILE | Procedure | Not def. | | | | |
| 0003 | Job-354 | Layout-3001 | "MOUNTAIN" OUTPUT FILE | Layout | Not calc. | | | | |
| 0003 | Job-354 | Pro-3001 | "MOUNTAIN" PROCEDURE FILE | Procedure | Not def. | | | | |
| 0004 | Job-457 | Layout-4001 | "NIGHT" OUTPUT FILE | Layout | Not calc. | | | | |
| 0004 | Job-457 | Pro-4001 | "NIGHT" PROCEDURE FILE | Procedure | Not def. | | | | |
| 0005 | Job-563 | Layout-5001 | "DAYTIME" OUTPUT FILE | Layout | Not calc. | | | | |
| 0005 | Job-563 | Pro-5001 | "DAYTIME" PROCEDURE FILE | Procedure | Not def. | | | | |

FIG.68  EXAMPLE OF CONTENTS OF SECTION OF JOB LIST TABLE

| JOB ID | JOB NAME | PRODUCTION SPEC CONTENTS | PROCESSING REQUIREMENT | SUPPLIED MATERIAL | TOTAL CAPACITY | FILE FORMAT | DELIVERY DATE&TIME | DESIRED PROCESSING COST |
|---|---|---|---|---|---|---|---|---|
| 0001 | Job-456 | A5, 8-PAGE IMAGE, 120pages, 4COLORS | IMAGE EDITING CHARACTER EDITING LAYOUT | IMAGE DATA CHARACTER DATA | 3600MB 20MB | TIFF SGML | 1 July 1996 11:12pm | ¥185,000 |
| 0002 | | | UNREGISTERED | | | | | |
| 0003 | Job-354 | A2, 2-PAGE IMAGE, 1page, 4COLORS | IMAGE EDITING CHARACTER EDITING LAYOUT | IMAGE DATA CHARACTER DATA | 60MB 8MB | UNIQUE FORMAT SGML | 3 July 1996 17:55am | ¥2,700 |
| 0004 | Job-457 | A4, 8-PAGE IMAGE, 80pages, 6COLORS | IMAGE EDITING CHARACTER EDITING LAYOUT | IMAGE DATA CHARACTER DATA | 4800MB 18MB | UNIQUE FORMAT SGML | 3 July 1996 11:12pm | ¥150,000 |
| 0005 | Job-563 | A3, 4-PAGE IMAGE, 250pages, 4COLORS | IMAGE EDITING CHARACTER EDITING LAYOUT | IMAGE DATA CHARACTER DATA | 30,000MB 15MB | UNIQUE FORMAT SGML | 8 July 1996 8:12pm | ¥435,000 |

FIG.69

EXAMPLE OF CONTENTS OF SECTION OF JOB LIST TABLE

| JOB ID | JOB NAME | RESERVATION STATUS INFORMATION | PROCESSING REJECTION STATUS INFORMATION | PROCESSING ACCEPTANCE STATUS INFORMATION | PROCESSING RESULT ||||
|---|---|---|---|---|---|---|---|---|
| | | | | | APPLICATION || APPARATUS ||
| | | | | | TIME | TERMINATION RESULT | TIME | TERMINATION RESULT |
| 0001 | Job-456 | 1 | 0 | 1 | | | 1 Jul 1996 10:00pm | 1 |
| 0002 | | UNREGISTERED ||||||||
| 0003 | Job-354 | 2 | 1 NO. 1, NO. 5 | 0 | | 0 | | 0 |
| 0004 | Job-457 | 2 | 1 | 0 | | 0 | | 0 |
| 0005 | Job-563 | 1 | 0 | 1 | 2July1996 10:50pm | 1 | 8July1996 8:00pm | 1 |
| | | CODE OF STATUS #0: NO ONE HAS RESERVED #1: TO RESERVE #2: NOT TO RESERVE #9: RESERVATION INHIBITED | CODE OF STATUS #0: NO ACTION #1: PROCESSING REJECTED (No. PROCESSING-REJECTED AGENT SYSTEM NUMBER) | CODE OF STATUS #0: NO ACTION #1: PROCESSING ACCEPTED | CODE OF STATUS #0: NO ACTION #1: NORMAL COMPLETION #2: TROUBLE #3: STOP ||||

FIG.70

EXAMPLE OF CHOICE CONDITIONS RELATED TO APPARATUS

FROM JOB-HANDLING AGENT SYSTEM

| NUMBER OF REVOLUTIONS | EXPOSURE RATE | LATERAL FEED RATE | SET-UP TIME | PLATE REPLACEMENT TIME | PROCESSING ACCURACY | MATERIAL PREPARATION TIME |
|---|---|---|---|---|---|---|
| Max. 4800rpm | Max. 13m/sec | Max. 20cm/min | Min. 1min | Min. 1min | Max. 6000DPI | Min. 25sec |

FIG.71

EXAMPLE OF CHOICE CONDITIONS RELATED TO APPLICATION

FROM JOB-HANDLING AGENT SYSTEM

| PROCESSING FILE FORMAT | PROCESSING FILE CAPACITY | AVAILABLE CALCULATION TIME FORECAST SOFTWARE | AVAILABLE ACTUAL DATA DETAILED COMPUTATION SOFTWARE |
|---|---|---|---|
| PS-file | Max. 100GB | Estimator-1 | Executor-1 |
| pdf-file | | Estimator-2 | Executor-2 |
| | | | Executor-3 |

FIG. 74

EXAMPLE OF CONTENTS OF JOB INFORMATION DATABASE (54a)

| JOB ID | JOB NAME | PRODUCTION SPEC CONTENTS | PROCESSING REQUIREMENT | SUPPLIED MATERIAL | TOTAL CAPACITY | FILE FORMAT | DELIVERY DATE&TIME | DESIRED PROCESSING COST |
|---|---|---|---|---|---|---|---|---|
| 0003 | Job-354 | A2, 2-PAGE IMAGE, 1page, 4COLORS | IMAGE EDITING CHARACTER EDITING LAYOUT | IMAGE DATA CHARACTER DATA | 60MB 8MB | UNIQUE FORMAT SGML | 6 July 1996 17:55am | ¥2,700 |
| 0004 | Job-457 | A4, 8-PAGE IMAGE, 80pages, 6COLORS | IMAGE EDITING CHARACTER EDITING LAYOUT | IMAGE DATA CHARACTER DATA | 4800MB 18MB | UNIQUE FORMAT SGML | 3 July 1996 11:12pm | ¥150,000 |
| 0005 | Job-563 | A3, 4-PAGE IMAGE, 250pages, 4COLORS | IMAGE EDITING CHARACTER EDITING LAYOUT | IMAGE DATA CHARACTER DATA | 30,000MB 15MB | UNIQUE FORMAT SGML | 8 July 1996 8:12pm | ¥435,000 |

FIG.75 EXAMPLE OF CONTENTS OF INPUT DATABASE (54b)

| JOB ID | JOB NAME | PART ID | PART NAME | ATTRIBUTE | TOTAL CAPACITY | SIZE-X (Pixel) | SIZE-Y (Pixel) | FORMAT | FILE FORMAT |
|---|---|---|---|---|---|---|---|---|---|
| 0003 | Job-354 | PI-3001 | Apple | Image | 20.98MB | 2500 | 2200 | YMCK | TIFF |
| 0003 | Job-354 | PI-3002 | Fire | Image | 6.87MB | 1200 | 1500 | YMCK | TIFF |
| 0003 | Job-354 | PT-3001 | Writer | TEXT | 0.4 MB | --- | --- | --- | SGML |
| 0004 | Job-457 | PI-4001 | Corn | Image | 5.66MB | 1800 | 1100 | RGB | TIFF |
| 0004 | Job-457 | PI-4002 | Cow | Image | 34.33MB | 5000 | 1800 | YMCK | TIFF |
| 0004 | Job-457 | PT-4001 | Letter | TEXT | 0.50MB | --- | --- | --- | SGML |
| 0005 | Job-563 | PI-5001 | Young | Image | 5.84MB | 1700 | 900 | YMCK | TIFF |
| 0005 | Job-563 | PI-5002 | Old | Image | 12.50MB | 2300 | 1900 | RGB | TIFF |
| 0005 | Job-563 | PT-5001 | Air Mail | TEXT | 0.7 MB | --- | --- | --- | SGML |

FIG. 76

EXAMPLE OF CONTENTS OF OUTPUT DATABASE (54c)

| JOB ID | JOB NAME | PART ID | PART NAME | ATTRIBUTE | TOTAL CAPACITY | SIZE-X (Pixel) | SIZE-Y (Pixel) | FORMAT | FILE FORMAT |
|---|---|---|---|---|---|---|---|---|---|
| 0003 | Job-354 | Layout-3001 | "MOUNTAIN" OUTPUT FILE | Layout | Not calc. | | | | |
| 0003 | Job-354 | Pro-3001 | "MOUNTAIN" PROCEDURE FILE | Procedure | 12MB | | | | UNIQUE FORMAT |
| 0004 | Job-457 | Layout-4001 | "NIGHT" OUTPUT FILE | Layout | Not calc. | | | | |
| 0004 | Job-457 | Pro-4001 | "NIGHT" PROCEDURE FILE | Procedure | 5MB | | | | UNIQUE FORMAT |
| 0005 | Job-563 | Layout-5001 | "DAYTIME" OUTPUT FILE | Layout | Not calc. | | | | |
| 0005 | Job-563 | Pro-5001 | "DAYTIME" PROCEDURE FILE | Procedure | 23MB | | | | UNIQUE FORMAT |

FIG. 81

EXAMPLE OF CONTENTS OF JOB INFORMATION DATABASE (27a)

| JOB ID | JOB NAME | PRODUCTION SPEC CONTENTS | PROCESSING REQUIREMENT | SUPPLIED MATERIAL | TOTAL CAPACITY | FILE FORMAT | DELIVERY DATE&TIME | DESIRED PROCESSING COST |
|---|---|---|---|---|---|---|---|---|
| 0001 | Job-456 | A5, 8-PAGE IMAGE, 120pages, 4COLORS | IMAGE EDITING CHARACTER EDITING LAYOUT | IMAGE DATA CHARACTER DATA | 3600MB 20MB | TIFF SGML | 1 July 1996 11:12pm | ¥185,000 |
| 0003 | Job-354 | A2, 2-PAGE IMAGE, 1page, 4COLORS | IMAGE EDITING CHARACTER EDITING LAYOUT | IMAGE DATA CHARACTER DATA | 60MB 8MB | UNIQUE FORMAT SGML | 6 July 1996 17:55am | ¥2,700 |
| 0004 | Job-457 | A4, 8-PAGE IMAGE, 80pages, 6COLORS | IMAGE EDITING CHARACTER EDITING LAYOUT | IMAGE DATA CHARACTER DATA | 4800MB 18MB | UNIQUE FORMAT SGML | 3 July 1996 11:12pm | ¥150,000 |
| 0005 | Job-563 | A3, 4-PAGE IMAGE, 250pages, 4COLORS | IMAGE EDITING CHARACTER EDITING LAYOUT | IMAGE DATA CHARACTER DATA | 30,000MB 15MB | UNIQUE FORMAT SGML | 8 July 1996 8:12pm | ¥435,000 |

FIG.82

EXAMPLE OF CONTENTS OF INPUT DATABASE (27b)

| JOB ID | JOB NAME | PART ID | PART NAME | ATTRIBUTE | TOTAL CAPACITY | SIZE-X (Pixel) | SIZE-Y (Pixel) | FORMAT | FILE FORMAT |
|---|---|---|---|---|---|---|---|---|---|
| 0001 | Job-456 | PI-1001 | Window | Image | 50.47MB | 4200 | 4200 | RGB | TIFF |
| 0001 | Job-456 | PI-1002 | Speed | Image | 77.25MB | 4500 | 4500 | YMCK | TIFF |
| 0001 | Job-456 | PT-1001 | Writer | TEXT | 0.3 MB | ---- | ---- | | SGML |
| 0003 | Job-354 | PI-3001 | Apple | Image | 20.98MB | 2500 | 2200 | YMCK | TIFF |
| 0003 | Job-354 | PI-3002 | Fire | Image | 6.87MB | 1200 | 1500 | YMCK | TIFF |
| 0003 | Job-354 | PT-3001 | Writer | TEXT | 0.4 MB | ---- | ---- | | SGML |
| 0004 | Job-457 | PI-4001 | Corn | Image | 5.66MB | 1800 | 1100 | RGB | TIFF |
| 0004 | Job-457 | PI-4002 | Cow | Image | 34.33MB | 5000 | 1800 | YMCK | TIFF |
| 0004 | Job-457 | PT-4001 | Letter | TEXT | 0.50MB | ---- | ---- | | SGML |
| 0005 | Job-563 | PI-5001 | Young | Image | 5.84MB | 1700 | 900 | YMCK | TIFF |
| 0005 | Job-563 | PI-5002 | Old | Image | 12.50MB | 2300 | 1900 | RGB | TIFF |
| 0005 | Job-563 | PT-5001 | Air Mail | TEXT | 0.7 MB | ---- | ---- | | SGML |

FIG.83

EXAMPLE OF CONTENTS OF OUTPUT DATABASE (27c)

| JOB ID | JOB NAME | PART ID | PART NAME | ATTRIBUTE | TOTAL CAPACITY | SIZE-X (Pixel) | SIZE-Y (Pixel) | FORMAT | FILE FORMAT |
|---|---|---|---|---|---|---|---|---|---|
| 0001 | Job-456 | Layout-1001 | "VALLEY" OUTPUT FILE | Layout | 40,000MB | | | | PS-file |
| 0001 | Job-456 | Pro-1001 | "VALLEY" PROCEDURE FILE | Procedure | 41MB | | | | UNIQUE FORMAT |
| 0003 | Job-354 | Layout-3001 | "MOUNTAIN" OUTPUT FILE | Layout | 70MB | | | | pdf-file |
| 0003 | Job-354 | Pro-3001 | "MOUNTAIN" PROCEDURE FILE | Procedure | 12MB | | | | UNIQUE FORMAT |
| 0004 | Job-457 | Layout-4001 | "NIGHT" OUTPUT FILE | Layout | 5000MB | | | | PS-file |
| 0004 | Job-457 | Pro-4001 | "NIGHT" PROCEDURE FILE | Procedure | 5MB | | | | UNIQUE FORMAT |
| 0005 | Job-563 | Layout-5001 | "DAYTIME" OUTPUT FILE | Layout | 30,200MB | | | | PS-file |
| 0005 | Job-563 | Pro-5001 | "DAYTIME" PROCEDURE FILE | Procedure | 23MB | | | | UNIQUE FORMAT |

FIG.86

EXAMPLE OF CONTENTS OF ABILITY DATABASE RELATED TO APPLICATION

| EXECUTED SOFTWARE NAME | SPEC | OBJECTIVE FILE | RESTRICTIVE CONDITIONS |
|---|---|---|---|
| PROCESSING TIME FORECAST CALCULATION SOFTWARE USING PART AND PROCEDURE DATA | PROCESSING TIME PER PAGE AND TOTAL FORECAST CALCULATION | UNIQUE FORMAT FILE | BASIC PERFORMANCE DATA OF HARDWARE TO BE USED IS REQUIRED |
| PROCESSING TIME FORECAST CALCULATION SOFTWARE USING SCRIPT FILE | PROCESSING TIME PER PAGE AND TOTAL FORECAST CALCULATION | PS-file, pdf-file | BASIC PERFORMANCE DATA OF HARDWARE TO BE USED IS REQUIRED |
| OUTPUT COMPUTATION SOFTWARE USING PART AND PROCEDURE DATA | OUTPUT COMPUTATION USING PART AND PROCEDURE DATA | UNIQUE FORMAT FILE | SCRIPT FILE IS NOT PROCESSABLE |
| OUTPUT COMPUTATION SOFTWARE USING SCRIPT FILE | OUTPUT COMPUTATION USING SCRIPT FILE | PS-file, pdf-file | IMAGE AND CHARACTER DATA ONLY IN BURIED FORMAT IS PROCESSABLE UNIQUE FORMAT FILE IS NOT PROCESSABLE |

FIG. 87

EXAMPLE OF CONTENTS OF ABILITY DATABASE RELATED TO APPARATUS

| POWER SPEC | NUMBER OF REVOLUTIONS | EXPOSURE RATE | LASER TYPE | LATERAL FEED RATE | SET-UP TIME | PLATE REPLACEMENT TIME | PROCESSING ACCURACY | MATERIAL PREPARATION TIME |
|---|---|---|---|---|---|---|---|---|
| THREE-PHASE AC 220V | 1800rpm 2400rpm 3600rpm | 2m/Sec 5m/Sec 10m/Sec | TYPE-A: ARGON LASER TYPE-B: LASER DIODE TYPE-C: MULTI-BEAM LASER | 5cm/min 10cm/min 15cm/min | 2min 3min 4min | 2min 3min 4min | 1200DPI 2000DPI 4000DPI DPI; Dot Per Inch | 30sec 40sec 70sec |
| RESTRICTIVE CONDITIONS | Max. 4800rpm | Max. 13/sec | | Max. 30cm/min | Min. 1min | Min. 1min | Max. 6000DPI | Min. 25sec |

FIG.88

EXAMPLE OF CONTENTS OF PROFIT DATABASE RELATED TO APPLICATION

| TYPE | CALCULATION PROCESSING COST | PRE-SETUP COST | POST-SETUP COST | MAINTENANCE GUARANTEE COST | APPARATUS INITIAL COST |
|---|---|---|---|---|---|
| COST<br>CLAIMED | (APPLICATION PROCESSING)<br>@5,000/MIN.<br>@2,000/MIN. | @500/TIME<br>@200/TIME | @300/TIME<br>@120/TIME | @400/DAY<br>@160/DAY | @750/DAY<br>@300/DAY |
| COST<br>CLAIMED | (TRANSMISSION TO FIXED DISK)<br>@5,025/HOUR<br>@2,025/HOUR | @510/TIME<br>@210/TIME | | @450/DAY<br>@200/DAY | @750/DAY<br>@250/DAY |
| COST<br>CLAIMED | (TRANSMISSION TO APPARATUS)<br>@5,400/HOUR<br>@2,100/HOUR | | @300/TIME<br>@160/TIME | @800/DAY<br>@250/DAY | @750/DAY<br>@250/DAY |

FIG. 89

EXAMPLE OF CONTENTS OF PROFIT DATABASE RELATED TO APPARATUS

| TYPE | CALCULATION PROCESSING COST | PRE-SETUP COST | POST-SETUP COST | LIGT SOURCE CONSUMPTION COST | EXPOSURE COST | COOLING COST | POWER COST | APPARATUS OPERATION LABOR COST | MAINTENANCE GUARANTEE COST | APPARATUS INITIAL COST |
|---|---|---|---|---|---|---|---|---|---|---|
| UNIT | 1HOUR | 1TIME | 1TIME | 1TIME | 1TIME | 1TIME | 1HOUR | 1DAY | 1DAY | 1DAY |
| A COST CLAIMED | @50,000 ------ @20,000 ------ | @5,000 ------ @2,000 ------ | @3,000 ------ @1,200 ------ | @2,300 ------ @ 920 ------ | @250 ------ @100 ------ | @340 ------ @136 ------ | @1,000 ------ @ 400 ------ | AUTOMATIC OPERATION | @400 ------ @160 ------ | @750 ------ @300 ------ |
| B COST CLAIMED | @50,250 ------ ------ | @5,100 ------ ------ | @3,050 ------ ------ | @2,400 ------ ------ | @550 ------ ------ | @640 ------ ------ | @1,200 ------ ------ | @20,000 ------ ------ | @450 ------ ------ | @750 ------ ------ |
| C COST CLAIMED | @54,000 ------ ------ | @6,000 ------ ------ | @3,100 ------ ------ | @2,900 ------ ------ | @800 ------ ------ | @900 ------ ------ | @2,000 ------ ------ | @25,000 ------ ------ | @800 ------ ------ | @750 ------ ------ |
| D COST CLAIMED | @60,000 ------ ------ | @7,000 ------ ------ | @3,400 ------ ------ | @3,300 ------ ------ | @950 ------ ------ | @980 ------ ------ | @2,500 ------ ------ | @33,000 ------ ------ | @900 ------ ------ | @750 ------ ------ |

EXAMPLE OF CONTENTS OF SCHEDULE TABLE

| JOB ID | JOB NAME | PROCESSING SCHEDULE INFORMATION RELATED TO APPLICATION |
|--------|----------|--------------------------------------------------------|
| 0005 | Job-563 | 2 Jul 1996 – 2 Jul 1996<br>10:00 pm   11:00 pm<br>AMOUNT TO BE CLAIMED  ¥308,685<br>GROSS PROFIT  ¥185,220 |

UNFIXED SCHEDULE PARTS

FIG.93

EXAMPLE OF CALCULATION OF ESTIMATE RELATED TO APPLICATION

| ID#:0001 JOB NAME:Job-456 | |
|---|---|
| ·TOTAL APPLICATION PROCESSING TIME : ABOUT 0 MINUTE | ·TOTAL APPARATUS USE AND OPERATION TIME : ABOUT 3 HOURS |
| ·TOTAL AMOUNT CLAIMED:¥0 BREAKDOWN: | ·TOTAL AMOUNT CLAIMED:¥18,060 BREAKDOWN:@5,400*3HOURS+@310+@800*1DAY+@750*1DAY |
| ·TOTAL GROSS COST:¥0 BREAKDOWN: | ·TOTAL GROSS COST:¥6,960 BREAKDOWN:@2,100*3HOURS+@160+@250*1DAY+@250*1DAY |
| ·GROSS PROFIT:¥0 | ·GROSS PROFIT:¥11,100 |

| ID#:0005 JOB NAME:Job-563 | |
|---|---|
| ·TOTAL APPLICATION PROCESSING TIME : ABOUT 60 MINUTES | ·TOTAL APPARATUS USE AND OPERATION TIME : ABOUT 2 HOURS |
| ·TOTAL AMOUNT CLAIMED:¥308,685 BREAKDOWN:@5,000*60MINS.+@500+@300+@400*1DAY +@750*1DAY+@5,025*1HOURS+@510+@450*1DAY+@750*1DAY | ·TOTAL AMOUNT CLAIMED:¥12,660 BREAKDOWN:@5,400*2HOURS+@310+@800*1DAY+@750*1DAY |
| ·TOTAL GROSS COST:¥123,465 BREAKDOWN:@2,000*60MINS.+@200+@120+@160*1DAY +@300*1DAY+@2,025*1HOUR+@210+@200*1DAY+@250*1DAY | ·TOTAL GROSS COST:¥259,360 BREAKDOWN:@2,100*2HOURS+@160+@250*1DAY+@250*1DAY |
| ·GROSS PROFIT:¥185,220 | ·GROSS PROFIT:¥4,860 |

FIG.94

EXAMPLE OF CALCULATION OF ESTIMATE RELATED TO APPARATUS

| ID#:0001 JOB NAME: Job-456 |
|---|

· TOTAL APPARATUS USE AND OPERATION TIME : ABOUT 3 HOURS

· TOTAL AMOUNT CLAIMED:¥165,040
BREAKDOWN:@50,000*3HOURS+@5,000+@3,000+@2,300+@250+@340+@1,000*3HOURS+@400*1DAY+@750*1DAY

· TOTAL GROSS COST:¥66,016
BREAKDOWN:@20,000*3HOURS+@2,000+@1,200+@920+@100+@136+@400*3HOURS+@160*1DAY+@300*1DAY

ASSUMPTION:GROSS COST IS 40% OF TOTAL AMOUNT CLAIMED

· GROSS PROFIT:¥99,024

| ID#:0005 JOB NAME: Job-563 |
|---|

· TOTAL APPARATUS USE AND OPERATION TIME : ABOUT 2 HOURS

· TOTAL AMOUNT CLAIMED:¥114,040
BREAKDOWN:50,000*2HOURS+@5,000+@3,000+@2,300+@250+@340+@1,000*2HOURS+@400*1DAY+@750*1DAY

· TOTAL GROSS COST:¥45,616
BREAKDOWN:20,000*2HOURS+@2,000+@1,200+@920+@100+@136+@400*2HOURS+@160*1DAY+@300*1DAY

ASSUMPTION:GROSS COST IS 40% OF TOTAL AMOUNT CLAIMED

· GROSS PROFIT:¥68,424

FIG.97  EXAMPLE OF CALCULATION OF TRACK RECORD RELATED TO APPLICATION

| ID#:0001 JOB NAME:Job-456 | |
|---|---|
| · TOTAL APPLICATION PROCESSING TIME : ABOUT 0 MINUTE<br><br>· TOTAL AMOUNT CLAIMED:¥0<br>BREAKDOWN:<br><br>· TOTAL GROSS COST:¥0<br>BREAKDOWN:<br><br>· GROSS PROFIT:¥0 | · TOTAL APPARATUS USE AND OPERATION TIME : ABOUT 2 HOURS<br><br>· TOTAL AMOUNT CLAIMED:¥12,660<br>BREAKDOWN: @5,400*2HOURS+@310+@800*1DAY+@750*1DAY<br><br>· TOTAL GROSS COST:¥4,860<br>BREAKDOWN: @2,100*2HOURS+@160+@250*1DAY+@250*1DAY<br><br>· GROSS PROFIT:¥7,800 |

| ID#:0005 JOB NAME:Job-563 | |
|---|---|
| · TOTAL APPLICATION PROCESSING TIME : ABOUT 50 MINUTES<br><br>· TOTAL AMOUNT CLAIMED:¥258,685<br>BREAKDOWN: @5,000*50MINS.+@500+@300+@400*1DAY<br>+@750*1DAY+@5,025*1HOUR+@510+@450*1DAY+@750*1DAY<br><br>· TOTAL GROSS COST:¥103,465<br>BREAKDOWN: @2,000*50MINS.+@200+@120+@160*1DAY<br>+@300*1DAY+@2,025*1HOUR+@210+@200*1DAY+@250*1DAY<br><br>· GROSS PROFIT:¥155,220 | · TOTAL APPARATUS USE AND OPERATION TIME : ABOUT 2 HOURS<br><br>· TOTAL AMOUNT CLAIMED:¥12,660<br>BREAKDOWN: @5,400*2HOURS+@310+@800*1DAY+@750*1DAY<br><br>· TOTAL GROSS COST:¥4,860<br>BREAKDOWN: @2,100*2HOURS+@160+@250*1DAY+@250*1DAY<br><br>· GROSS PROFIT:¥7,800 |

EXAMPLE OF CONTENTS OF TRACK RECORD TABLE

UNFIXED SCHEDULE PARTS

| JOB ID | JOB NAME | TRACK RECORD INFORMATION RELATED TO APPLICATION |
|---|---|---|
| 0005 | Job-563 | 2 Jul 1996 – 2 Jul 1996<br>10:00 pm – 10:50 pm<br>ACTUAL AMOUNT ¥258,685<br>CLAIMED<br>GROSS PROFIT ¥155,220 |

FIG.103

EXAMPLE OF CONTENTS OF MONITORING TABLE (DETAILED)

| JOB ID | JOB NAME | OPERATOR | PROCESSING STEP INTERNAL CODE | PROCESSING TIME | PROCESSING STATE CODE | REMARK |
|---|---|---|---|---|---|---|
| 001 | Job-456 | auto. | #0 WAIT | 8:00pm 1 Jul 1996 | #1 WAIT | ●PROCESSING STEP INTERNAL CODE |
| 001 | Job-456 | auto. | #1 TRANSPORT IN | 8:01pm 1 Jul 1996 | #2 START | |
| 001 | Job-456 | auto. | #1 TRANSPORT IN | 8:03pm 1 Jul 1996 | #3 SUSPEND | #0 WAIT |
| 001 | Job-456 | auto. | #1 TRANSPORT IN | 8:05pm 1 Jul 1996 | #4 RESTART | #1 TRANSPORT IN |
| 001 | Job-456 | auto. | #1 TRANSPORT IN | 8:06pm 1 Jul 1996 | #7 COMPLETE | #2 LOAD |
| 001 | Job-456 | auto. | #0 WAIT | 8:06pm 1 Jul 1996 | #1 WAIT | #3 EXPOSE |
| 001 | Job-456 | auto. | #2 LOAD | 8:07pm 1 Jul 1996 | #2 START | #4 TRANSPORT OUT |
| 001 | Job-456 | auto. | #2 LOAD | 8:09pm 1 Jul 1996 | #7 COMPLETE | |
| 001 | Job-456 | auto. | #0 WAIT | 8:09pm 1 Jul 1996 | #1 WAIT | ●OPERATOR |
| 001 | Job-456 | auto. | #3 EXPOSE | 8:10pm 1 Jul 1996 | #2 START | |
| 001 | Job-456 | auto. | #3 EXPOSE | 9:55pm 1 Jul 1996 | #7 COMPLETE | auto.:Automatic |
| 001 | Job-456 | auto. | #0 WAIT | 9:56pm 1 Jul 1996 | #1 WAIT | manu.:Manual |
| 001 | Job-456 | auto. | #4 TRANSPORT OUT | 9:55pm 1 Jul 1996 | #2 START | |
| 001 | Job-456 | auto. | #4 TRANSPORT OUT | 10:00pm 1 Jul 1996 | #7 COMPLETE | ●PROCESSING STATE CODE |
| 005 | Job-563 | auto. | #1 TRANSPORT IN | 6:00pm 8 Jul 1996 | #1 WAIT | |
| 005 | Job-563 | auto. | #1 TRANSPORT IN | 6:01pm 8 Jul 1996 | #2 START | #1 WAIT |
| 005 | Job-563 | auto. | #0 WAIT | 6:03pm 8 Jul 1996 | #7 COMPLETE | #2 START |
| 005 | Job-563 | maun. | #2 LOAD | 6:04pm 8 Jul 1996 | #1 WAIT | #3 SUSPEND |
| 005 | Job-563 | maun. | #2 LOAD | 6:06pm 8 Jul 1996 | #2 START | #4 RESTART |
| 005 | Job-563 | auto. | #0 WAIT | 6:06pm 8 Jul 1996 | #7 COMPLETE | #5 STOP |
| 005 | Job-563 | auto. | #3 EXPOSE | 6:07pm 8 Jul 1996 | #1 WAIT | #6 TROUBLE |
| 005 | Job-563 | auto. | #3 EXPOSE | 7:55pm 8 Jul 1996 | #2 START | #7 COMPLETE |
| 005 | Job-563 | auto. | #0 WAIT | 7:56pm 8 Jul 1996 | #7 COMPLETE | |
| 005 | Job-563 | auto. | #4 TRANSPORT OUT | 7:57pm 8 Jul 1996 | #1 WAIT | |
| 005 | Job-563 | auto. | #4 TRANSPORT OUT | 8:00pm 8 Jul 1996 | #2 START | |
| 005 | Job-563 | auto. | | | #7 COMPLETE | |

FIG.104

EXAMPLE OF CONTENTS OF MONITORING TABLE (GENERAL)

| JOB ID | JOB NAME | OPERATOR | PROCESSING STEP INTERNAL CODE | ESTIMATED SCHEDULE START TIME | ESTIMATED SCHEDULE END TIME | ACTUAL START TIME | ACTUAL END TIME | STATE CODE |
|---|---|---|---|---|---|---|---|---|
| 0001 | Job-456 | auto. | 1:TRANSPORT IN | 8:12 pm 1 Jul 1996 | 8:17 pm 1 Jul 1996 | 8:01 pm 1 Jul 1996 | 8:06 pm 1 Jul 1996 | 1:NORMAL |
| 0001 | Job-456 | auto. | 2:LOAD | 8:20 pm 1 Jul 1996 | 8:28 pm 1 Jul 1996 | 8:07 pm 1 Jul 1996 | 8:09 pm 1 Jul 1996 | 1:NORMAL |
| 0001 | Job-456 | auto. | 3:EXPOSE | 8:29 pm 1 Jul 1996 | 11:07 pm 1 Jul 1996 | 8:10 pm 1 Jul 1996 | 9:55 pm 1 Jul 1996 | 1:NORMAL |
| 0001 | Job-456 | auto. | 4:TRANSPORT OUT | 11:08 pm 1 Jul 1996 | 11:12 pm 1 Jul 1996 | 9:56 pm 1 Jul 1996 | 10:00 pm 1 Jul 1996 | 1:NORMAL |

FIG.107

EXAMPLE OF CALCULATION OF TRACK RECORD RELATED TO APPARATUS

| ID#:0001 JOB NAME:Job-456 |
|---|
| ・TOTAL APPARATUS USE AND OPERATION TIME : ABOUT 2 HOURS |
| ・TOTAL AMOUNT CLAIMED:¥114,040<br>BREAKDOWN:@50,000*2HOURS+@5,000+@3,000+@2,300+@250+@340+@1,000*2HOURS+@400*1DAY+@750*1DAY |
| ・TOTAL GROSS COST:¥45,616<br>BREAKDOWN:@20,000*2HOURS+@2,000+@1,200+@920+@100+@136+@400*2HOURS+@160*1DAY+@300*1DAY |
| ASSUMPTION:GROSS COST IS 40% OF TOTAL AMOUNT CLAIMED |
| ・GROSS PROFIT:¥68,424 |

| ID#:0005 JOB NAME:Job-563 |
|---|
| ・TOTAL APPARATUS USE AND OPERATION TIME : ABOUT 2 HOURS |
| ・TOTAL AMOUNT CLAIMED:¥114,040<br>BREAKDOWN:@50,000*2HOURS+@5,000+@3,000+@2,300+@250+@340+@1,000*2HOURS+@400*1DAY+@750*1DAY |
| ・TOTAL GROSS COST:¥45,616<br>BREAKDOWN:@20,000*2HOURS+@2,000+@1,200+@920+@100+@136+@400*2HOURS+@160*1DAY+@300*1DAY |
| ASSUMPTION:GROSS COST IS 40% OF TOTAL AMOUNT CLAIMED |
| ・GROSS PROFIT:¥68,424 |

FIG. 108

EXAMPLE OF CONTENTS OF TRACK RECORD TABLE

| JOB ID | JOB NAME<br>OK / NO | PROCESSING TRACK RECORD INFORMATION RELATED TO APPARATUS |
|---|---|---|
| 0001 OK | Job-456 | 1 Jul 1996 – 1 Jul 1996<br>8:00 pm     10:00 pm<br><u>ACTUAL AMOUNT</u>   ¥114,040<br>CLAIMED              ¥ 12,660<br>GROSS PROFIT         ¥ 68,424<br>                     ¥  7,800 |
| 0005 OK | Job-563 | 8 Jul 1996 – 8 Jul 1996<br>6:00 pm     8:00 pm<br><u>ACTUAL AMOUNT</u>   ¥114,040<br>CLAIMED              ¥ 12,660<br>GROSS PROFIT         ¥ 68,424<br>                     ¥  7,800 |

SYSTEM FOR AND METHOD OF MANAGING JOBS

BACKGROUND OF THE INVENTION

1. Field of the Invention

The present invention relates to a system for and method of managing jobs for operation of an external apparatus and/or the processing of digital information.

2. Description of the Background Art

For efficiency of given operations (manufacture and processing, assembly, transport, and the like, which are referred to hereinafter as "jobs") of a variety of apparatuses (manufacturing apparatuses, (e.g., automatic lathes, milling machines, NC machine tools, printing machines, post-printing machines, various plate making equipment, various semiconductor fabricating apparatuses), robots, transport equipment, and the like) for use in various industries (printing and plate making, machine, electric, chemical and metal industries and the like), it has been customary to use a technique for managing jobs to be provided to the apparatuses in a centralized manner.

In the technique, all pieces of information on a job (referred to hereinafter as "job information") to be given to at least one apparatus are previously inputted to a predetermined management part (referred to hereinafter as a "job management part"). Alternatively, an operator that has collected pieces of job information assigns jobs and seizes job handling states in respective apparatuses.

FIG. 1 shows a conventional system for managing jobs to be processed by apparatuses. Referring to FIG. 1, a plurality of apparatuses 903 are connected to a job management part 901 which in turn is connected to a LAN 902. With such an arrangement, the single job management part 901 is adapted to manage the operations and states of the plurality of apparatuses 903 arranged, for example, in a particular area within a factory in a centralized manner. Specifically, pieces of job information to be processed by the apparatuses 903 are provided from the LAN 902 to the job management part 901, and the job management part 901 then provides the pieces of job information to the apparatuses 903 after performing computations about which pieces of job information are to be provided to which apparatuses.

There may often be cases where the operations and processing of these apparatuses are not directly controlled by the pieces of job information. For example, a CAD (computer aided design) system, a simulation system, a design system in the printing industry, a digital computation system, and the like are connected in between in many cases to previously process digital information based on the pieces of job information prior to the processing of external apparatuses.

In a plate making system, for example, digital information including image data and character data handled by the design system is sometimes converted into digital information such as raster data that a plate making apparatus is capable of directly handling, before the plate making apparatus makes printing plates. In a processing system, digital information including processing configuration data handled by the CAD system is sometimes converted into processing procedure data that a processing apparatus is capable of handling, before the processing apparatus initiates the processing.

In this manner, the information represented by the pieces of job information are often not only information about physical or chemical processing handled by the apparatuses but also a mixture of such physical or chemical processing information and information about digital processing. Additionally, the materials to be handled are only digital materials in some cases.

FIG. 2 is shows another conventional system for managing jobs to be processed by apparatuses. Referring to FIG. 2, a plurality of combinations of digital information processing parts 904 and apparatuses 903 are connected to the job management part 901 which in turn is connected to the LAN 902. Digital information processed by the digital information processing parts 904 in accordance with the pieces of job information provided from the job management part 901 is used for processing operations in the apparatuses 903. With such an arrangement, the single job management part 901 is adapted to manage the operations and states of the plurality of digital information processing parts 903 and the plurality of apparatuses 904 in a centralized manner.

The centralized management of the apparatuses 903 and the digital information processing parts 904 is originally intended for efficient processing of the jobs. Thus, the job management part 901 must judge for which processing part and apparatus the processing of a job provided from the LAN 902 is suitable, how long it takes to process a job, and whether or not processing is planned to be completed by a delivery date. For strict productivity improvement, the job management part 901 also must seize the costs required for an apparatus to process a job currently awaiting processing.

In such cases, with recent technological enhancement and the increase in complexity of digital information and devices, it has become difficult for the job management part 901 to individually manage a huge amount of complicated job information. Specifically, it takes much time to make all of the judgements through the calculations of the job management part 901 which is a computer system, or the calculations themselves become impossible. This results in the increase in time required for the job management part 901 to notify the apparatuses 903 and the processing parts 904 about job processing and to manage the processing states of the jobs, causing the job management part 901 to become incapable of providing directions about suitable job processing at times conforming to the job processing speeds in the apparatuses 903 and the processing parts 904. In other cases, the job management part 901 must omit parts of the contents to be originally calculated to determine the directions and judgements on the job processing for the purpose of providing directions about the job processing in accordance with the job processing speeds in the apparatuses 903. Suitable job management is impossible, particularly if the jobs are managed by a human operator in place of the job management part which is a computer.

Thus, the centralized job management, which is originally intended for productivity improvement, produces wasted time for which a job processing side waits for directions from the job management part or the operator in practice, resulting in the decrease in production efficiency.

SUMMARY OF THE INVENTION

The present invention is intended for a system for managing pieces of job information. According to the present invention, the system comprises: a first sub-system comprising an input management part for inputting and storing a first group of pieces of job information; and a second sub-system coupled to the first sub-system through a network connection and comprising a job-handling management part for handling a second group of pieces of job information, wherein the job-handling management part comprises select means for selecting the second group of pieces of job information among the first group of pieces of job information.

The present invention may reduce the burdens on the input management part and efficiently handle pieces of job information.

Further, according to one aspect of the present invention, the second sub-system comprises a plurality of job-handling management parts. According to another aspect of the present invention, the first sub-system comprises a plurality of input management parts.

Additionally, according to still another aspect of the present invention, the job-handling management part further comprises a controller for controlling an external apparatus in accordance with the second group of pieces of job information, the external apparatus being provided out of the second sub-system; and the select means comprises: capturing means for capturing an objective piece of job information representing an objective job which has not been handled among the first group of pieces of job information; and evaluation means for checking whether the external apparatus is operable in accordance with the objective piece of job information or not. This allows the external apparatus to efficiently operate.

Further, according to another aspect of the present invention, the job-handling management part further comprises: scheduling table memory means on which an operation schedule of the external apparatus is stored in the form of a scheduling table; and registering means for registering the objective piece of job information on the scheduling table when it is concluded that the external apparatus is operable in accordance with the objective piece of job information, to thereby obtain the second group of pieces of job information on the schedule table. This provides the schedule management of the external apparatus.

Additionally, according to another aspect of the present invention, the job-handling management part further comprises an application controller for controlling execution of application processing, to thereby process digital data in accordance with the second group of pieces of job information; and the select means comprises: capturing means for capturing an objective piece of job information representing an objective job which has not been handled among the first group of pieces of job information; and evaluation means for checking whether the application processing can be executed in accordance with the objective piece of job information or not. This achieves the efficient processing of digital information.

Further, according to another aspect of the present invention, the job-handling management part further comprises: scheduling table memory means on which a schedule of the application processing is stored in the form of a scheduling table; and registering means for registering the objective piece of job information on the scheduling table if the application processing can be executed in accordance with the objective piece of job information, to thereby obtain the second group of pieces of job information. This provides the schedule management of the processing of digital information.

The present invention may be applied to the processing of digital information and the management of pieces of job information for the use of the processed digital information in the external apparatus.

Furthermore, according to another aspect of the present invention, a system for managing pieces of job information comprises: scheduling table memory means for storing a scheduling table defining a schedule for handling pieces of job information; capturing means for capturing a piece of job information among the pieces of job information to determine a captured piece of job information; evaluation means for evaluating whether or not the captured piece of job information can be handled by available job-handling resources; and registering means for registering the captured piece of job information on the scheduling table when it is concluded that the captured piece of job information can be handled by the available job-handling resources. This eliminates the need to judge the properness of the pieces of job information when inputted.

The present invention is also intended for a method of efficiently managing pieces of job information and for recording medium(s) on which programs achieving the efficient management of pieces of job information are recorded.

It is therefore an object of the present invention to provide a system and the like which reduces a burden of judgment processing upon a job management part and an operator to ensure well-planned job processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows an example of the contents of a job database;

FIGS. 14 and 15 show examples of the contents of a job list table;

FIG. 16 shows an example of selection conditions from the job-handling agent system;

FIG. 21 shows an example of the contents of an ability database;

FIG. 22 shows an example of the contents of a profit database;

FIG. 24 shows an example of the contents of a schedule table;

FIG. 25 shows an example of calculations of estimates;

FIG. 29 shows an example of the contents of a monitoring table (detailed);

FIG. 30 shows an example of the contents of a monitoring table (general);

FIG. 33 shows an example of calculations of track records;

FIG. 34 shows an example of the contents of a track record table;

FIG. 52 shows a hardware configuration of the input agent system;

FIG. 65 shows an example of the contents of a job information database 12$a$;

FIG. 66 shows an example of the contents of an input database 12$b$;

FIG. 67 shows an example of the contents of an output database 12$c$;

FIGS. 68 and 69 show examples of the contents of the job list table;

FIGS. 70 and 71 show examples of the selection conditions from the job-handling agent system;

FIG. 74 shows an example of the contents of a job information database 54$a$;

FIG. 75 shows an example of the contents of an input database 54$b$;

FIG. 76 shows an example of the contents of an output database 54$c$;

FIG. 81 shows an example of the contents of a job information database 27$a$;

FIG. 82 shows an example of the contents of an input database 27$b$;

FIG. 83 shows an example of the contents of an output database 27$c$;

FIG. 86 shows an example of the contents of the ability database related to an application;

FIG. 87 shows an example of the contents of the ability database related to an apparatus;

FIG. 88 shows an example of the contents of the profit database related to the application;

FIG. 89 shows an example of the contents of the profit database related to the apparatus;

FIG. 93 shows an example of calculations of estimates related to the application;

FIG. 94 shows an example of calculations of estimates related to the apparatus;

FIG. 97 shows an example of calculations of track records related to the application;

FIG. 103 shows an example of the contents of the monitoring table (detailed);

FIG. 104 shows an example of the contents of the monitoring table (general);

FIG. 107 shows an example of calculations of track records related to the apparatus;

FIG. 108 shows an example of the contents of the track record table related to the apparatus;

DESCRIPTION OF THE PREFERRED EMBODIMENTS

1. First Preferred Embodiment

<1.1 Outline of System for Managing Jobs>

Figure 1:
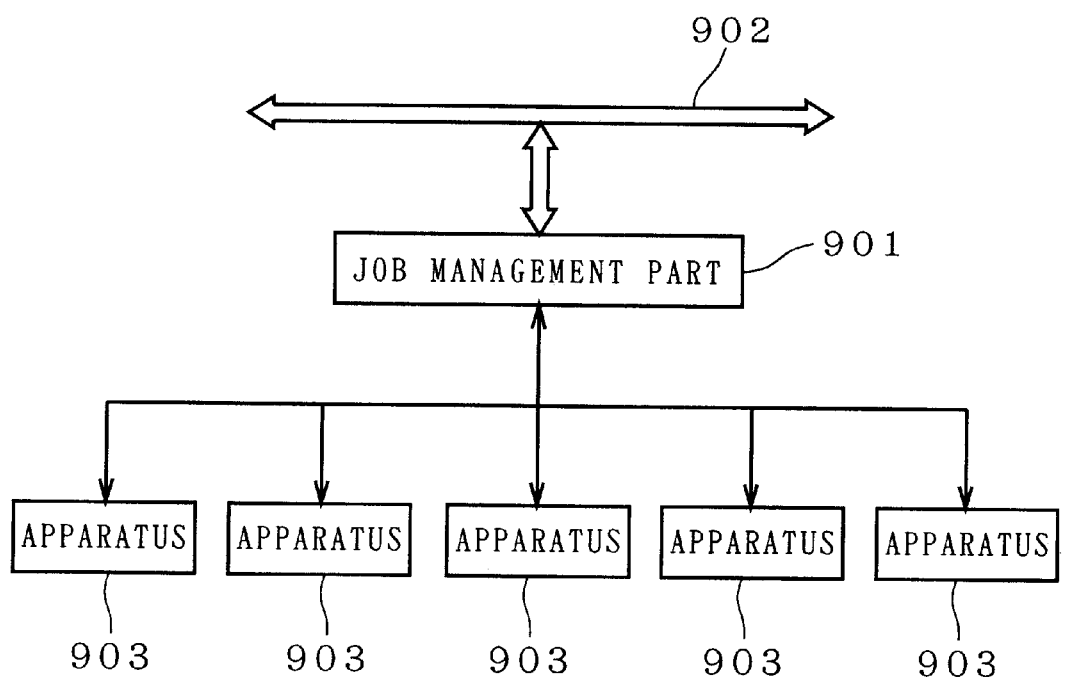
FIG. 1 shows a conventional system for managing jobs.
Figure 2:
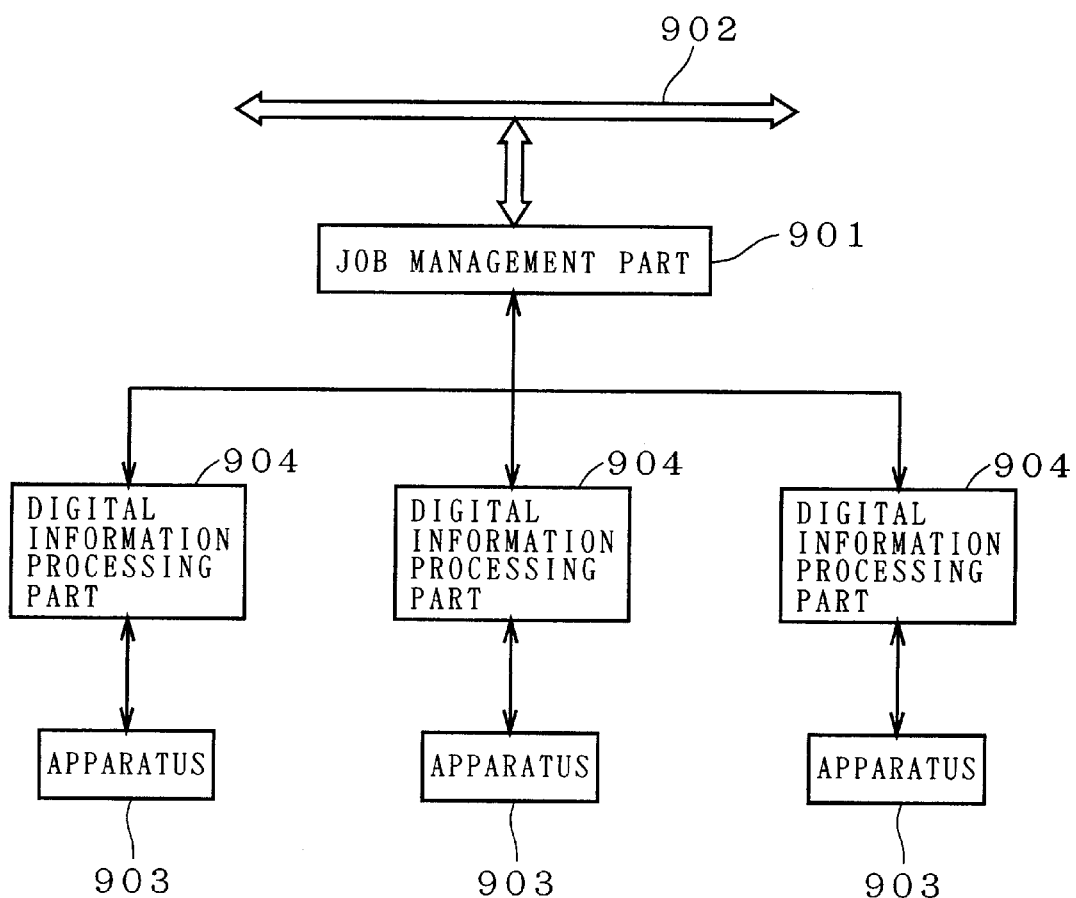
FIG. 2 shows another conventional system for managing jobs.
Figure 3:
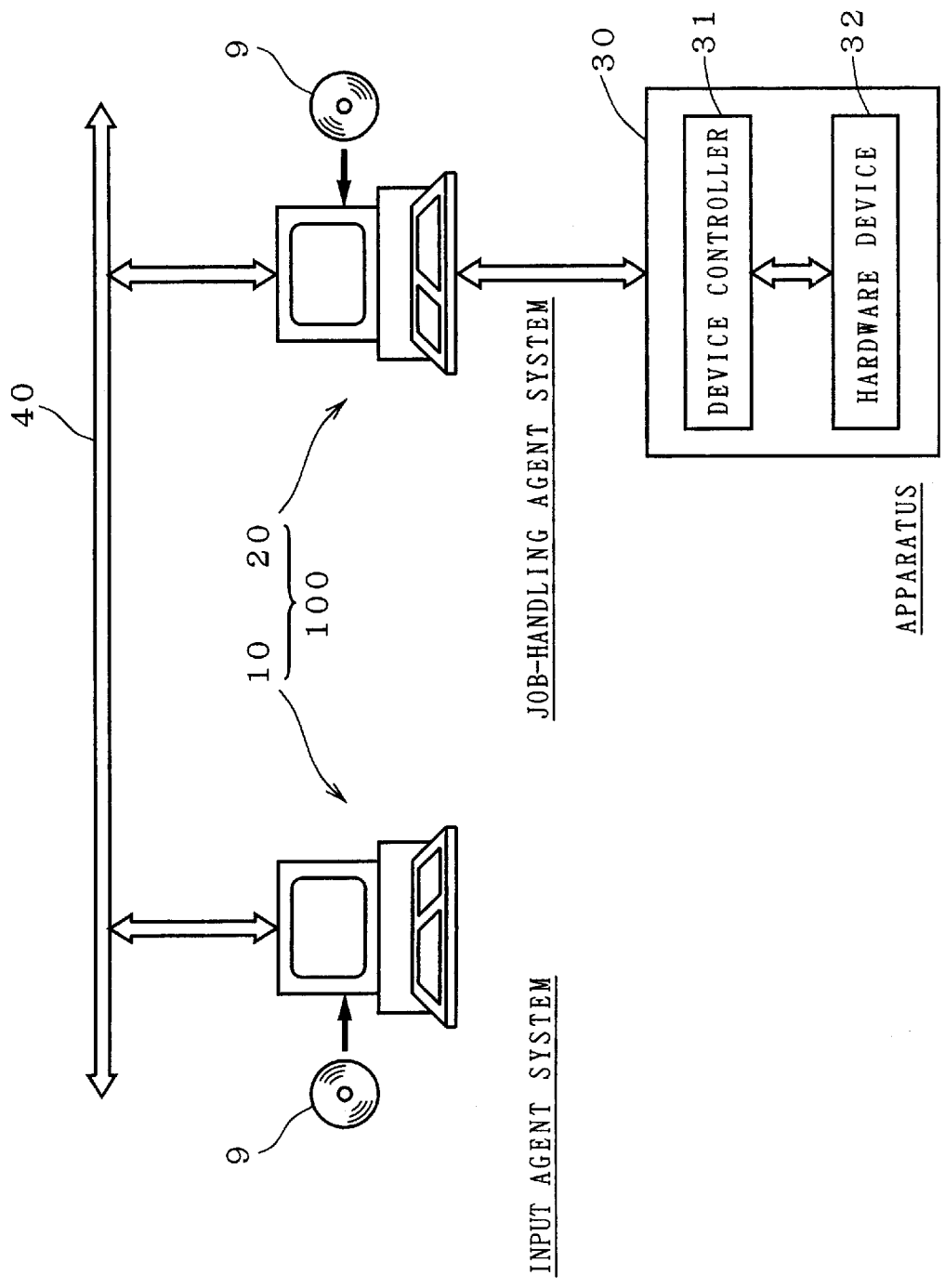
FIG. 3 schematically shows the configuration of a system for managing job information according to a first preferred embodiment of the present invention.

FIG. 3 shows the configuration of a system 100 for managing jobs according to a first preferred embodiment of the present invention. An apparatus 30 for actually processing the jobs is also shown in FIG. 3.

The system 100 generally comprises an agent system 10 for managing pieces of job information which are inputted (referred to hereinafter as an "input agent system 10"), and an agent system 20 for managing the handling of pieces of job information (referred to hereinafter as a "job-handling agent system 20"). The input agent system 10 and the job-handling agent system 20 are connected to each other through a LAN 40 for communication of information. Although the single job-handling agent system 20 is shown in FIG. 3 as connected to the LAN 40, a plurality of job-handling agent systems 20 the number of which equals the number of external apparatuses 30 managed by the input agent system 10 are actually connected to the LAN 40 so that the apparatuses 30 and the job-handling agent systems 20 are connected in a one-to-one relationship.

Each of the input agent system 10 and the job-handling agent system 20 has an internal configuration wherein agents which are programs that execute autonomous judgement and processing are used as main elements. The input agent system 10 and the job-handling agent system 20 themselves, each of which functions as a set of agents, also have the function as agents that execute autonomous judgement and processing. In other words, the agent systems themselves as well as the agents that are programs constituting each agent system have autonomous properties.

The input agent system 10 functions to store therein pieces of job information transmitted thereto through the LAN 40, or is adapted to comprehensively hold information on jobs to be processed in an area of a factory in which the apparatus 30 is installed and information on jobs being processed. It should be noted that the input agent system 10 is adapted to previously simply choose some pieces of job information to be handled among the pieces of job information inputted thereto so as to efficiently manage the job information by the reduction of the number of pieces of job information to be handled.

The job-handling agent system 20 controls the entire operations of the apparatus 30 based on the pieces of job information and also functions to select and capture information on a job to be processed among the pieces of job information stored in the input agent system 10. Thus, in the system 100, the job-handling agent system 20, not the input agent system 10, determines which apparatuses 30 are to process which jobs. As a result, the input agent system 10 need not perform a huge amount of complicated information processing including seizing the characteristics and processing states of all apparatuses and judging which apparatuses 30 are to process which jobs. This achieves the reduction in burdens upon the input agent system 10.

The job-handling agent system 20 also functions to control the actual operations of the apparatus 30 as above described. More specifically, the job-handling agent system 20 sends the job information and the like to a device controller 31 in the apparatus 30, and the device controller 31 then sends a control signal to a hardware device 32 such as a motor and a robot in the apparatus 30 based on the job information. Although a pair of device controller 31 and hardware device 32 are shown in FIG. 3, the apparatus 30 typically comprises a plurality of device controllers 31 and a plurality of hardware devices 32 in practice. In some cases, one device controller 31 cooperates with a plurality of hardware devices 32. With such an arrangement, the plurality of hardware devices 32 are connected to the single device controller 31.

In FIG. 3, computer systems (referred to simply as "computers" hereinafter) are shown as used as the input agent system 10 and the job-handling agent system 20. In this case, programs for causing these computers to perform a job management operation to be described later are previously read into these computers via recording media 9 such as a magnetic disk, an optical disk, a magneto-optical disk, and a magnetic tape, or LAN 40. The input agent system 10 and the job-handling agent systems 20 are not always required to use computers, but may be constructed as dedicated information processing devices. In particular, the job-handling agent system 20 which is provided in association with each apparatus 30 may be incorporated together with the device controller 31 and the like on a single board as an electric circuit. This allows the job-handling agent systems 20 to be located within the apparatuses 30 to provide an aesthetically pleasant and orderly arrangement of the apparatuses 30 in the factory and to render compact and protect the job-handling agent systems 20. The input agent system 10 and the job-handling agent systems 20 need not transmit information through the LAN 40 but may be connected directly to each other.

The configuration of the system 100 according to the present invention has been briefly described above. The configuration and operation of the system 100 will be described in detail hereinafter.

<1.2 System Configuration>

Figure 4:
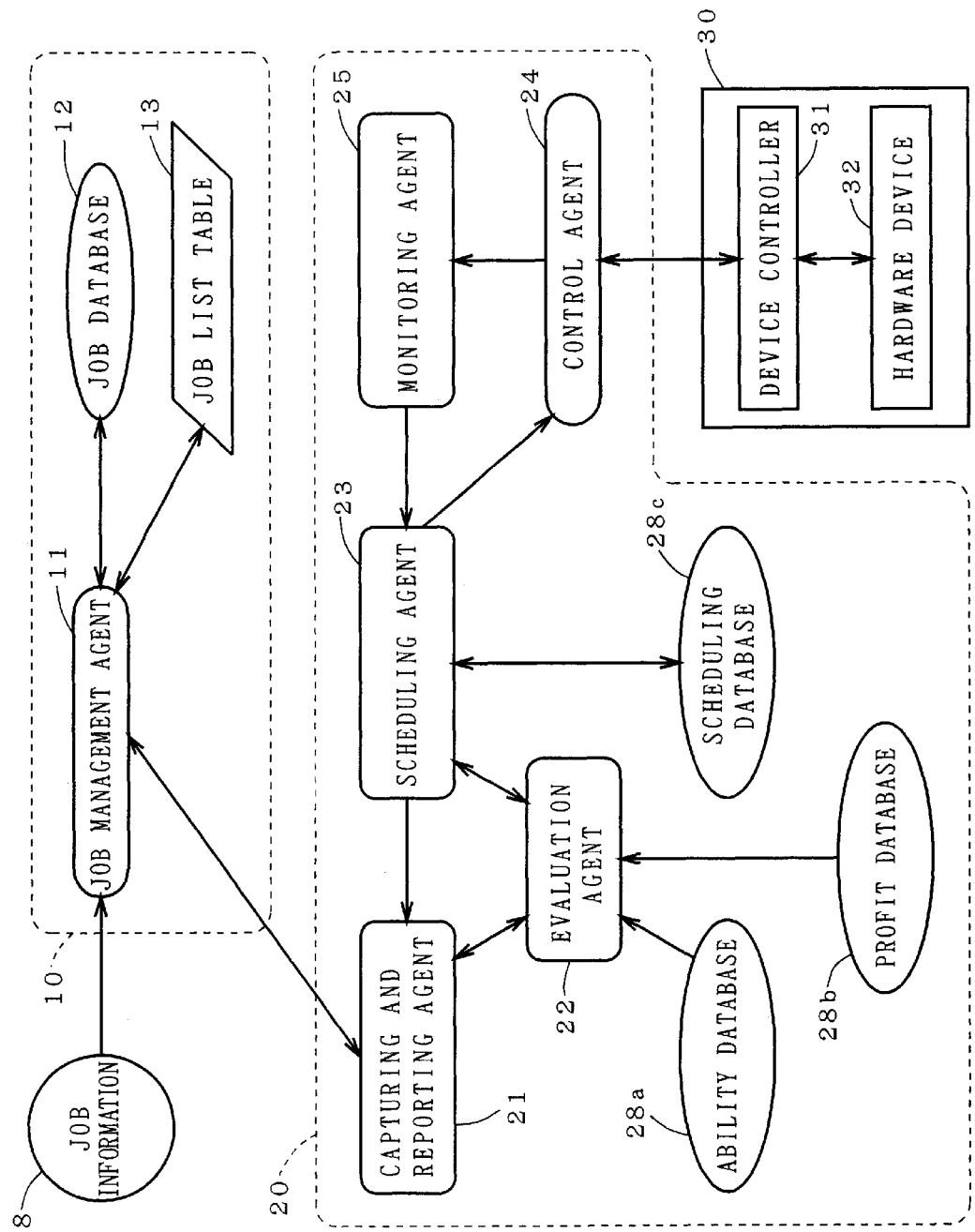
FIG. 4 shows the configuration of the system of the first preferred embodiment.

FIG. 4 shows a configuration of the system 100 (using the agents as main elements) and flows of information in the system 100, with attention focused on the operations of the input agent system 10 and the job-handling agent system 20. The first preferred embodiment employs the computers as the input agent system 10 and the job-handling agent system 20 as shown in FIG. 3. With such hardware arrangement, the components whose operations are a focus of attention as shown in FIG. 4 correspond in practice to programs and storage means which operate on the computers.

<1.2(a) Configuration of Input Agent System>

The input agent system 10 stores and chooses pieces of job information 8 inputted thereto, and comprises a job management agent 11, a job database 12, and a job list table 13.

The job management agent 11 is a program that operates on a computer, and functions to handle the pieces of job information 8 and the like inputted to the input agent system 10. As described above, the agent is an autonomous program which itself makes a judgement to execute processing, and is adapted to autonomously operate while making contact with other agents in response to requests from an operator and other agents.

The job database 12 is storage means, such as a fixed disk device, for storing through the job management agent 11 therein the pieces of job information 8 inputted via the LAN 40 to the input agent system 10. In other words, all of the pieces of job information 8 inputted to the input agent system 10 are once stored in the job database 12.

The job list table 13 is storage means, such as a RAM, for temporarily copying and storing some pieces of job information 8 which satisfy predetermined conditions among the pieces of job information 8 stored in the job database 12. The copying of the pieces of job information 8 from the job database 12 to the job list table 13 is executed by the operation of the job management agent 11. The pieces of job information 8 stored in the job list table 13 are capturable by the job-handling agent system 20 through the LAN 40.

<1.2(b) Configuration of Job-Handling Agent System>

The job-handling agent system 20 functions to select and capture pieces of job information 8 stored in the job list table 13 and to control the operation of the apparatus 30, and comprises agents including a capturing and reporting agent 21, an evaluation agent 22, a scheduling agent 23, a control agent 24, and a monitoring agent 25. The job-handling agent system 20 further comprises an ability database 28a, a profit database 28b, and a scheduling database 28c which are included in a fixed disk device and the like for storing information used by the agents. The ability database 28a stores ability information indicative of types of jobs handleable by the apparatus 30. The profit database 28b stores profit information for use in cost accounting for job processing. The scheduling database 28c stores scheduling information indicative of the schedules of the jobs to be processed by the apparatus 30.

The capturing and reporting agent 21, which serves as a contact of the job-handling agent system 20 in communicating with the exterior, requests the job management agent 11 to capture pieces of job information 8 stored in the job list table 13 and reports a job processing state in the apparatus 30 to the job management agent 11. The contact between the capturing and reporting agent 21 and the job management agent 11 is made via the LAN 40. Although the capturing and reporting agent 21 is illustrated in the description below as making a request to the job management agent 11 to thereby capture pieces of job information stored in the job list table 13 and to enter pieces of information into the job list table 13, the capturing and reporting agent 21 may capture the pieces of job information directly from the job list table 13 and enter the pieces of job information directly on the job list table 13, not through the job management agent 11, for the purpose of more rapid processing.

The evaluation agent 22 functions to evaluate whether or not a piece of job information 8 captured by the capturing and reporting agent 21 is actually handleable by the apparatus 30. More specifically, the evaluation agent 22 evaluates whether or not the captured piece of job information 8 is the information on a job that the apparatus 30 can process based on the ability information and profit information, and whether or not the captured piece of job information 8 is the information on a job that is expected to produce an economic profit. The evaluation agent 22 requests the scheduling agent 23 to be described below to evaluate whether or not an objective job to be evaluated is registerable on a processing schedule of the apparatus 30.

The scheduling agent 23 is an agent for managing the processing schedule and the like of the jobs to be processed by the apparatus 30. The scheduling agent 23 evaluates whether or not a new piece of job information captured by the capturing and reporting agent 21 is processable by a delivery date, registers an objective piece of job information on the processing schedule which is part of the scheduling information, and provides the information on a job to be processed to the control agent 24 to be described below.

The control agent 24 is an agent for actually controlling the operation of the apparatus 30, and provides a piece of job information 8 and the like to the device controller 31 of the apparatus 30.

The monitoring agent 25 receives processing state information on the processing of a job in the apparatus 30 through the control agent 24 to request the scheduling agent 23 to record the processing state information.

<1.2(c) Others>

The configurations of the input agent system 10 and the job-handling agent system 20 using the agents as the main elements have been described. Then, the relationship with the apparatus 30 will be described below.

The apparatus 30 is shown in FIG. 4 as comprising the hardware device 32 such as a motor and a robot. Although the single device controller 31 is shown in FIG. 4, the apparatus 30 may comprise a plurality of device controllers 31. In this case, the hardware device 32 is connected to a device controller 31 which sends a control signal to the hardware device 32. Although the device controllers 31 and hardware devices 32 are in a one-to-one relationship as a general rule, one device controller 31 may control a plurality of hardware devices 32.

As described hereinabove, the input agent system 10 and the job-handling agent system(s) 20 are connected through the LAN 40 in a one-to-one or one-to-plural relationship, and the job-handling agent systems 20 and the apparatuses 30 are in a one-to-one relationship. The job-handling agent systems 20 and the device controllers 31 are in a one-to-one or one-to-plural relationship, and the device controllers 31 and the hardware devices 32 are in a one-to-one or one-to-plural relationship.

<1.2(d) Hardware Configuration of System>

Figure 5:
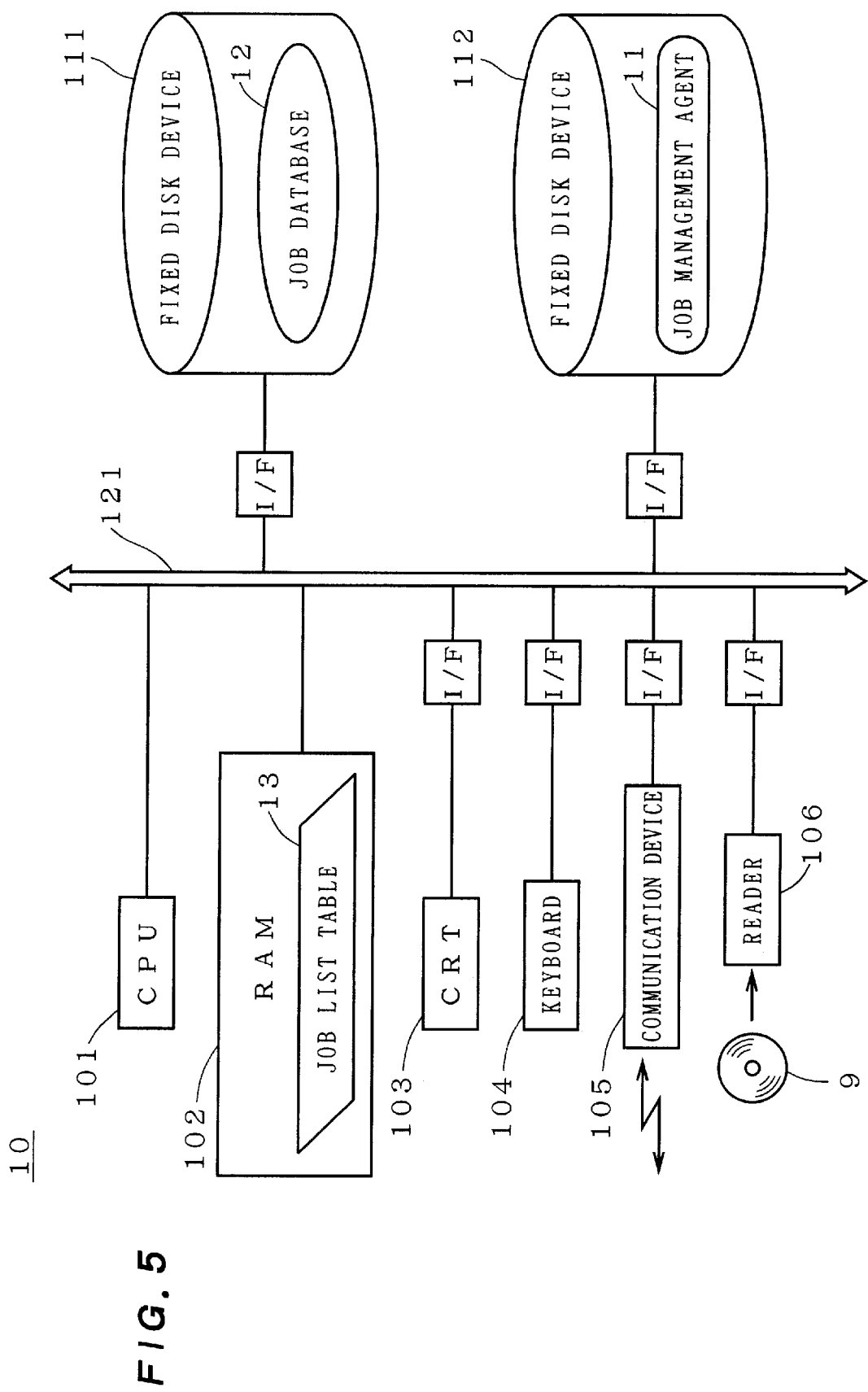
FIG. 5 shows a hardware configuration of an input agent system.
Figure 6:
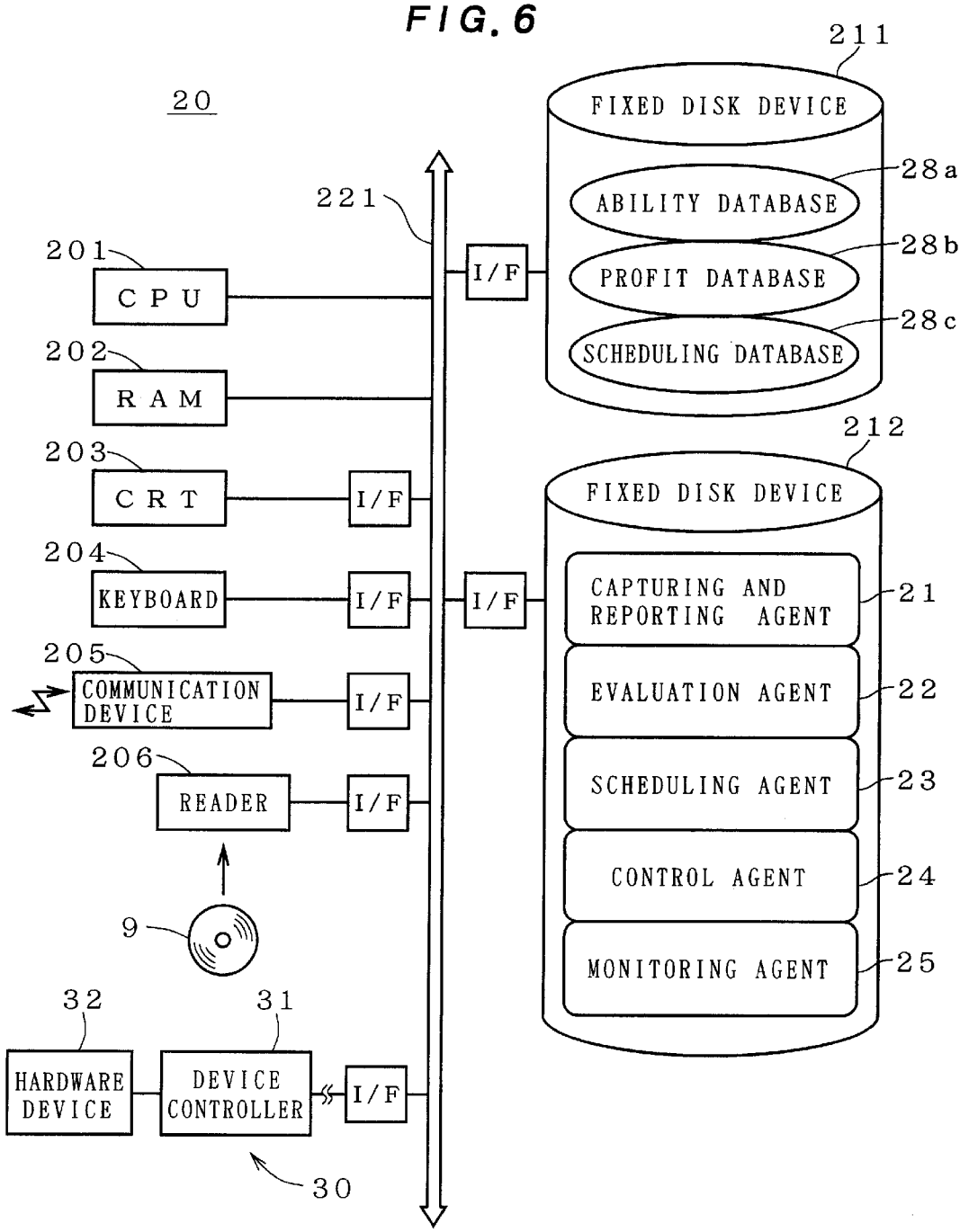
FIG. 6 shows a hardware configuration of a job-handling agent system.

While the configuration of the system 100 using the agents as the main elements is shown in FIG. 4 with attention focused on the operation of the system 100, the hardware configuration of the system 100 shown in FIG. 3 which employs the computers connected to the LAN 40 is shown in FIGS. 5 and 6.

FIG. 5 shows an internal configuration of the computer for the input agent system 10 wherein a CPU 101 for executing the processing of the computer, a RAM 102 serving as a work area of the processing, a CRT 103 and a keyboard 104 for input and output operations for the operator, a communication device 105 for communicating with the LAN 40, a reader 106 for reading the recording medium 9, and two fixed disk devices 111 and 112 for storing the job management agent 11 and the job database 12 are connected to a bus line 121, for example, through interfaces (I/F) as required. Part of the RAM 102 serving as the work area is the job list table 13.

When the computer is used as the input agent system 10, the agents which are programs are previously read from the recording medium 9 through the reader 106, and the pieces of job information 8 to be stored in the job database 12 are received from the LAN 40 through the communication device 105.

It should be noted that the job management agent 11, the job database 12 and the job list table 13 may be stored in any storage device which is freely readable and writable, and need not be stored in separate storage devices.

FIG. 6 shows an internal configuration of the computer for the job-handling agent system 20 wherein a CPU 201 for executing the processing of the computer, a RAM 202 serving as a work area of the processing, a CRT 203 and a keyboard 204 for input and output operations for the operator, a communication device 205 for communicating with the LAN 40, a reader 206 for reading the recording medium 9, and two fixed disk devices 211 and 212 for storing various agents and various databases are connected to a bus line 221, for example, through interfaces (I/F) as required. The device controller 31 of the apparatus 30 is also shown in FIG. 6 as connected through an interface to the bus line 221.

When the computer is used as the job-handling agent system 20, the various agents which are programs are previously read from the recording medium 9 through the reader 206, and the contents of the various databases are read from the reader 206 or inputted from the LAN 40 through the communication device 205.

It should be noted that the various agents and various databases may be stored in any storage device which is freely readable and writable, and need not be stored in separate storage devices.

<1.3 Operation of System>

The configuration of the system 100 has been described above. Description will be given in detail on the operation of the system 100 in accordance with the configuration using the agents as the main elements shown in FIG. 4 by means of an example where the apparatus 30 is an apparatus for machining metallic material.

Figure 7:
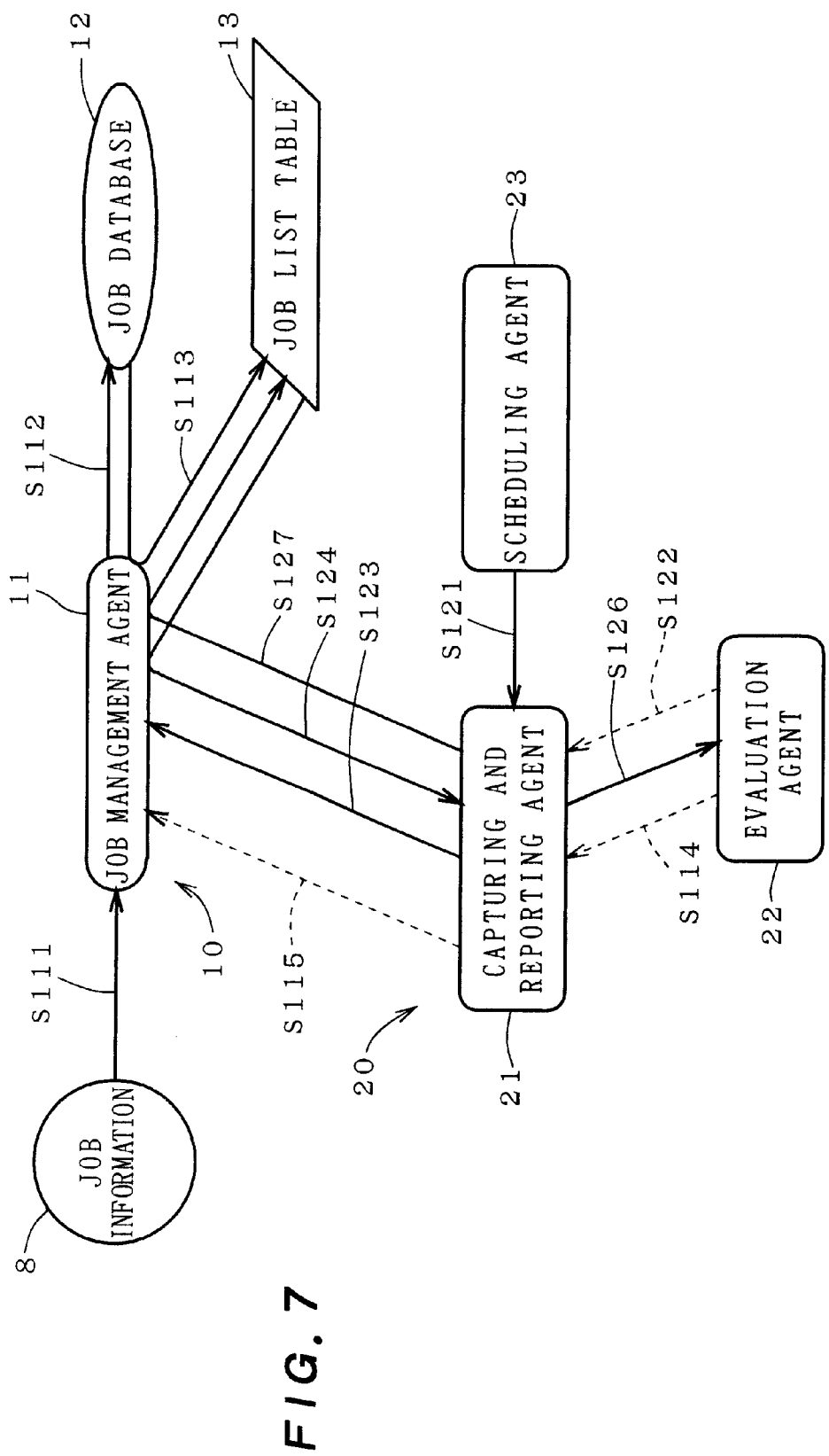
FIG. 7 shows the operation of storing the job information inputted to a job management system into a job list table and a job information capturing operation of an evaluation agent.
Figure 8:
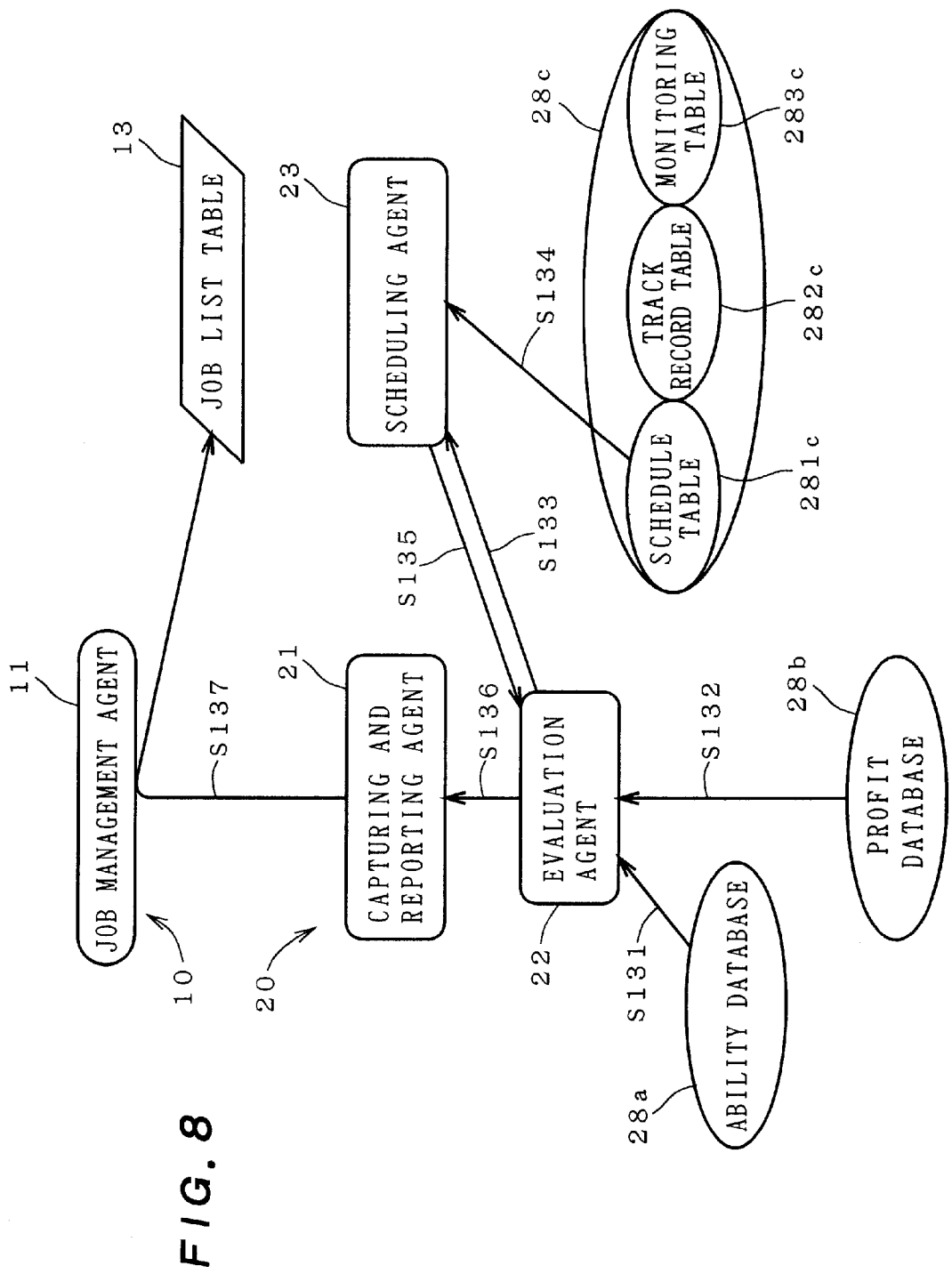
FIG. 8 shows a job information evaluating operation of the evaluation agent.
Figure 9:
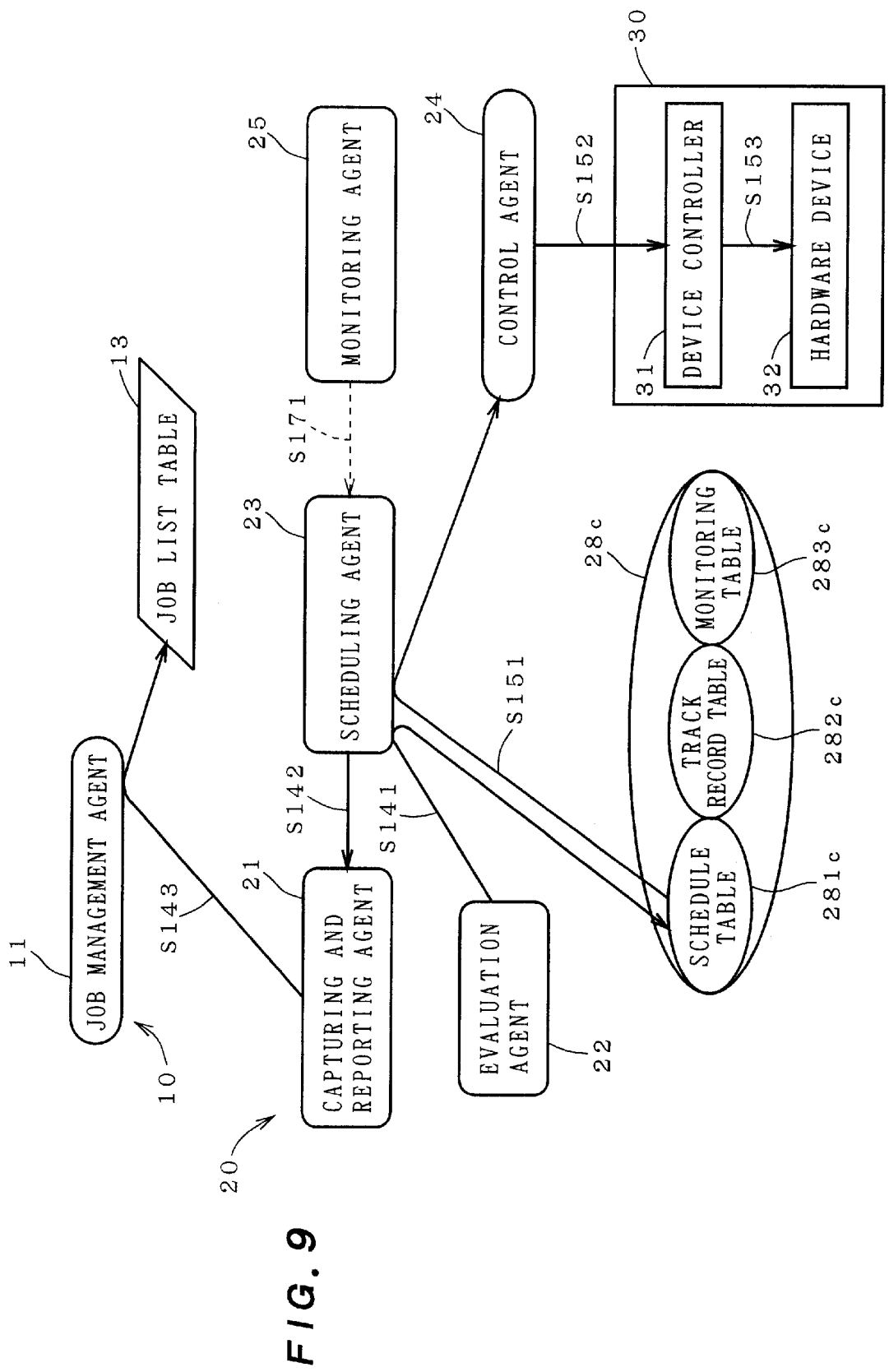
FIG. 9 shows the operation of registering job information on a processing schedule and an apparatus controlling operation of a control agent.
Figure 10:
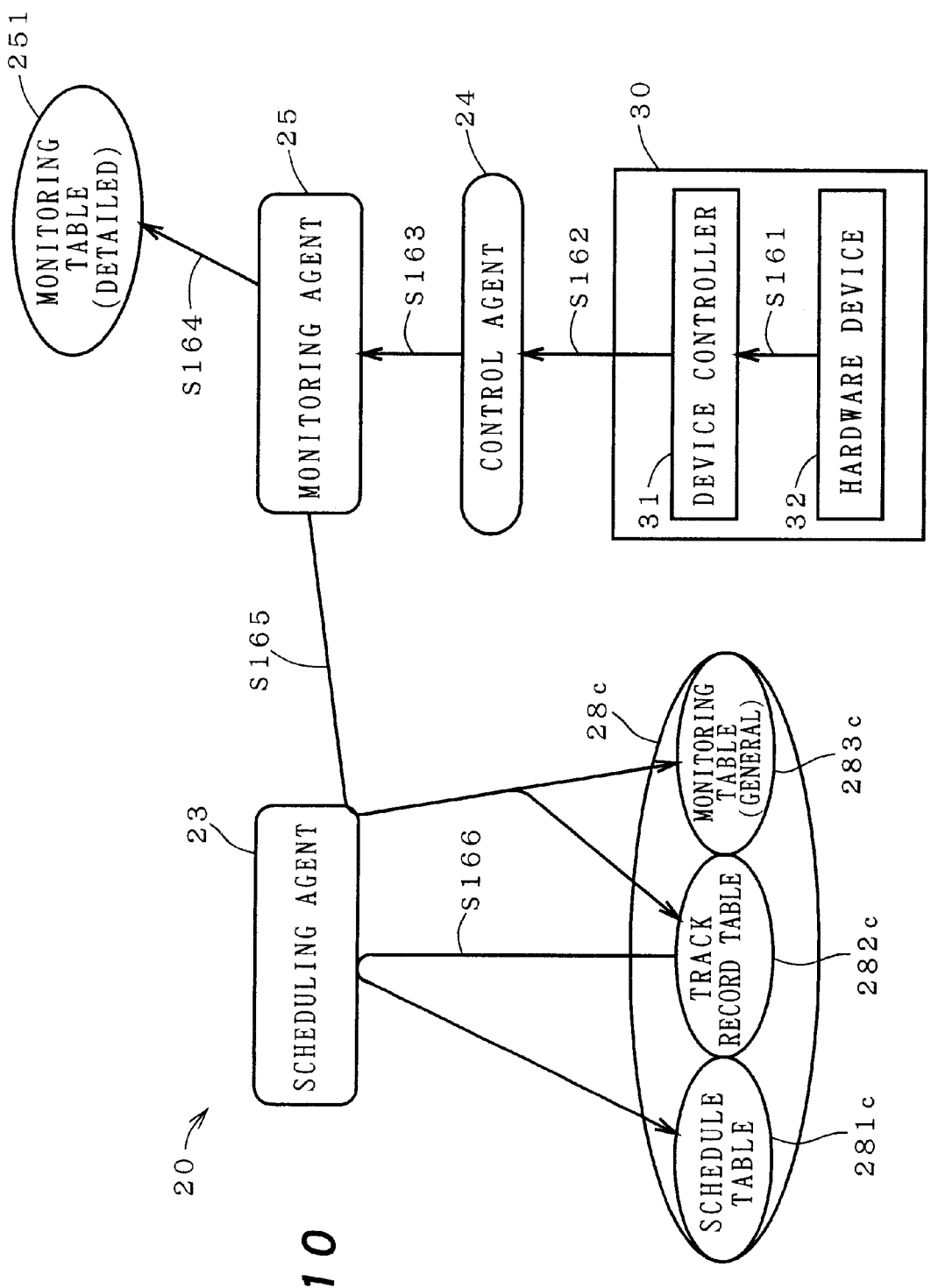
FIG. 10 shows the operation of monitoring the processing state of an apparatus.
Figure 11:
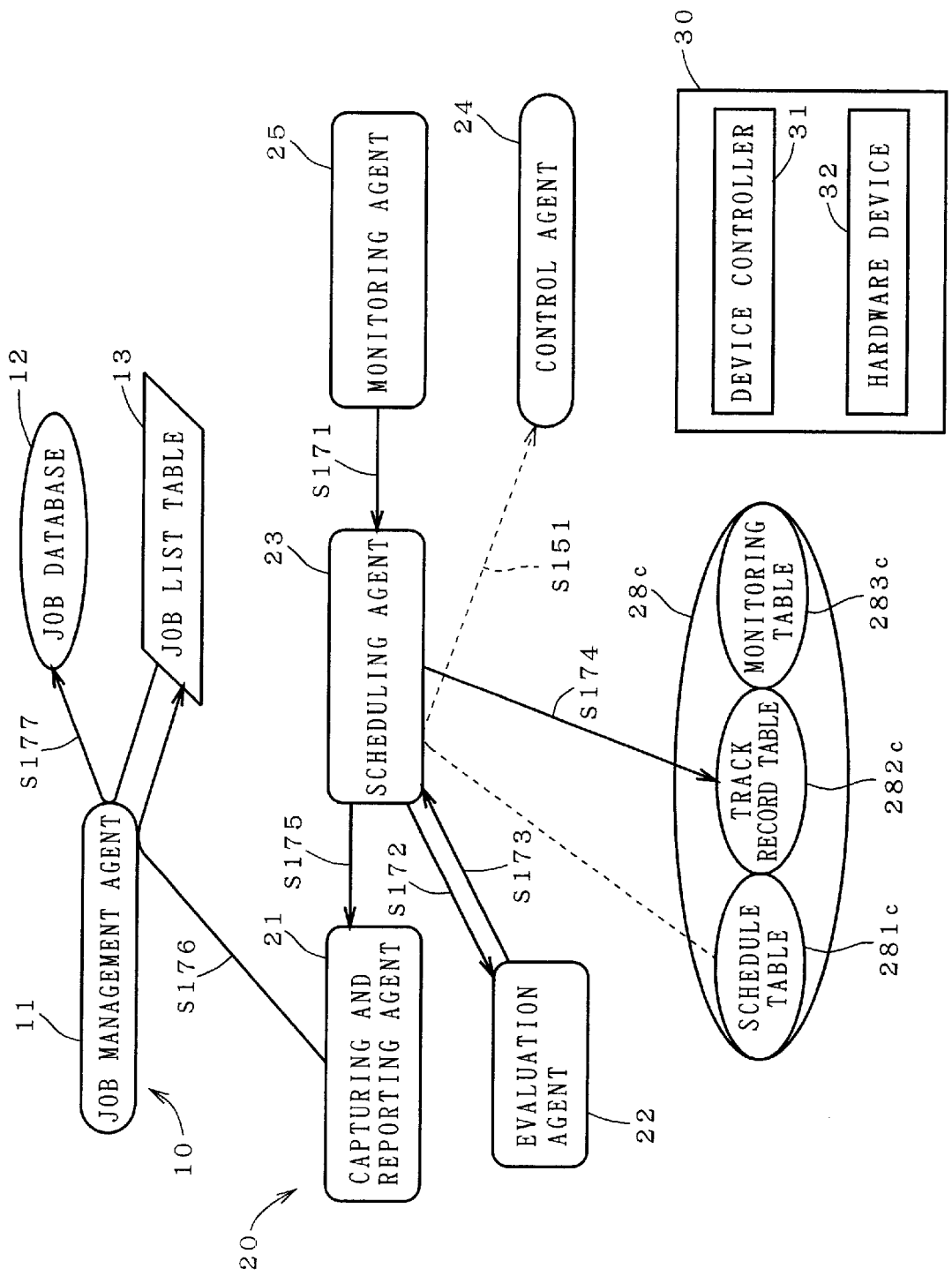
FIG. 11 shows the operation of the system when job processing in the apparatus is completed.

FIGS. 7 through 11 illustrate the transfer of information between the respective components (agents, databases and the like). In FIGS. 7 through 11, only parts of the configuration shown in FIG. 4 which are required for description are illustrated. FIG. 7 shows the operation performed between the instant when the pieces of job information 8 are inputted to the input agent system 10 and the instant when the evaluation agent 22 captures the new piece of job information 8. FIG. 8 shows the operation wherein the evaluation agent 22 evaluates whether or not the captured piece of job information 8 is handleable by the apparatus 30. FIG. 9 shows the operation performed between the instant when the positively evaluated piece of job information 8 is registered on the scheduling database 28c and the instant when the processing of a job is actually executed. FIG. 10 shows the operation of monitoring the operation of the apparatus 30. FIG. 11 shows the operation when the processing of the job in the apparatus 30 is completed.

<1.3(a) Input of Job Information to Input Agent System>

Figure 12:
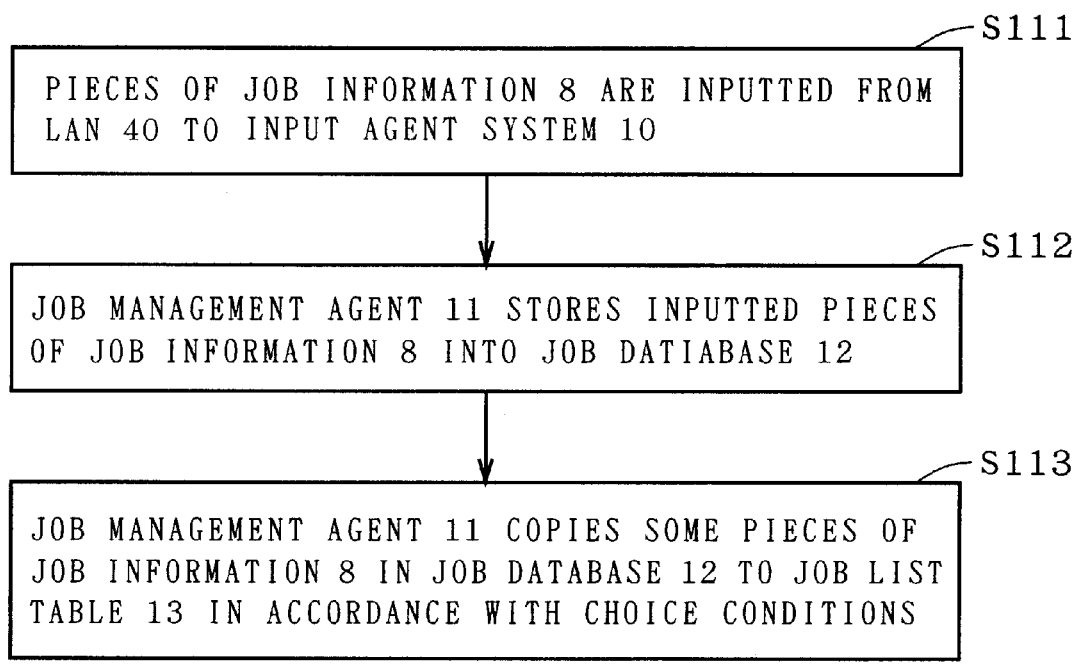
FIG. 12 is a flowchart showing the contents of the steps S111 to S113 of FIG. 7.

The steps S111 to S113 of FIG. 7 are the steps performed between the instant when pieces of job information 8 are inputted to the input agent system 10 and the instant when some pieces of job information 8 are stored in the job list table 13. FIG. 12 is a flowchart showing the contents of the steps S111 to S113.

The pieces of job information 8 from the LAN 40 are stored in the job database 12 through the job management agent 11. Specifically, all pieces of job information 8 inputted to the input agent system 10 are once stored in the job database 12 (steps S111 and S112). In the steps S111 and S112, the job management agent 11 may simply check the inputted pieces of job information 8 for formats. FIG. 13 shows an example of lists of the pieces of job information 8 stored in the job database 12.

Next, the job management agent 11 copies and stores some pieces of job information 8 which satisfy the predetermined conditions among the pieces of job information 8 stored in the job database 12 into the job list table 13 (step S113). This allows the job-handling agent system 20 to capture a piece of job information 8 stored in the job list table 13 and to add information to the pieces of job information 8 stored in the job list table 13. The choice and copying of the pieces of job information 8 by the job management agent 11 previously reduce the number of pieces of job information 8 to be handled to provide more rapid management of the job information 8 in the input agent system 10 and more rapid capture of the job information 8 in the job-handling agent system 20, achieving efficient management of the job information.

FIGS. 14 and 15 show examples of the lists of the pieces of job information 8 stored in the job list table 13. A piece of job information with a job ID 0002 among the pieces of job information 8 stored in the job database 12 is shown in FIG. 14 as not copied to the job list table 13. FIG. 15 shows parts of the job list table 13 which contain management information transmitted from the job-handling agent system 20. By referring to the management information, the input agent system 10 may seize the reservation and completion of job processing. The details are described later.

The conditions under which the job management agent 11 chooses the pieces of job information 8 to be entered in the job list table 13 are previously provided from the LAN 40 through the evaluation agent 22 and the capturing and reporting agent 21 of the job-handling agent system 20 to the job management agent 11 (steps S114 and S115). For example, when the apparatus 30 is a machining apparatus, the above described choice conditions mainly include conditions regarding the abilities of the apparatus 30 such as a maximum cutting rate and a maximum machining accuracy (minimum as a value) which the apparatus 30 is capable of exhibiting, but may include other conditions such as cost accounting and machining time unless the conditions become an excessive burden on the job management agent 11. Since such choice conditions are provided from all job-handling agent systems 20 connected to the LAN 40 to the job management agent 11, the job management agent 11 may readily choose the pieces of job information 8 handleable by any apparatus 30 managed by the input agent system 10. An example of the choice conditions is shown in FIG. 16.

<1.3(b) Capture of Job Information in Evaluation Agent>

Figure 17:
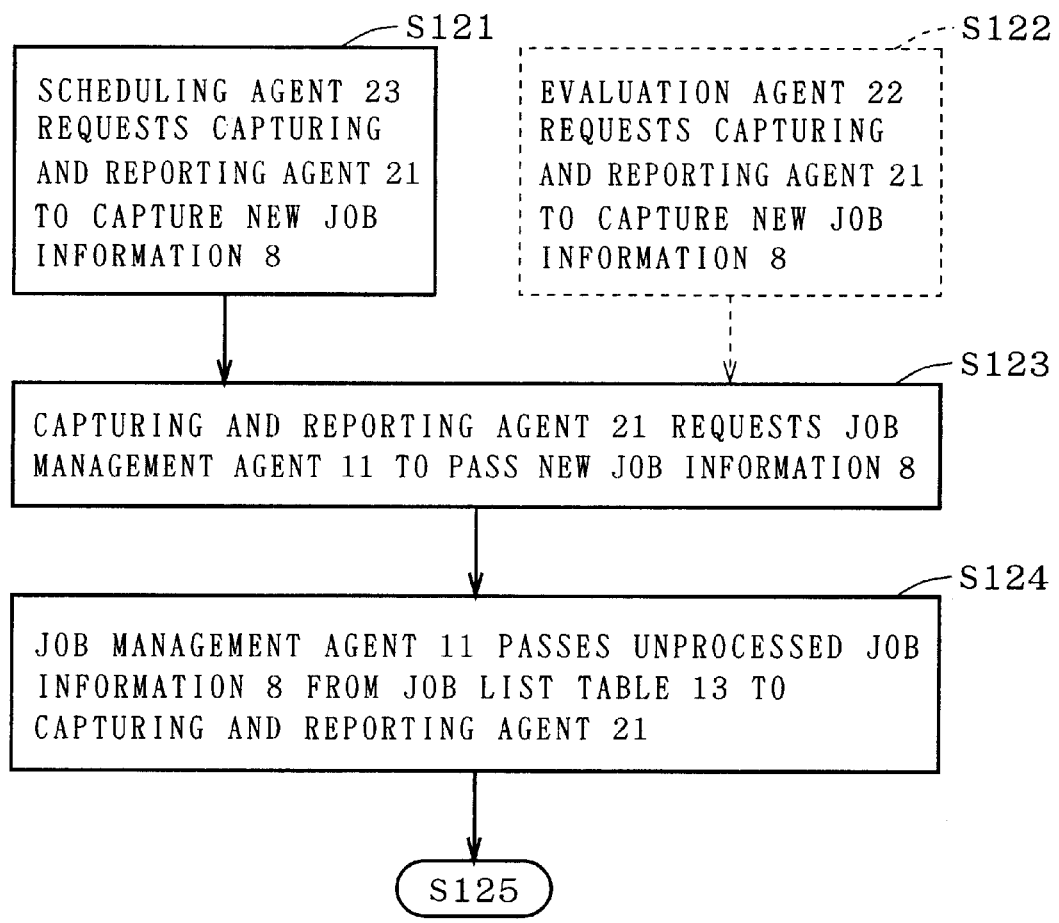
FIG. 17 is a flowchart showing the contents of the steps S121 to S124 of FIG. 7.
Figure 18:
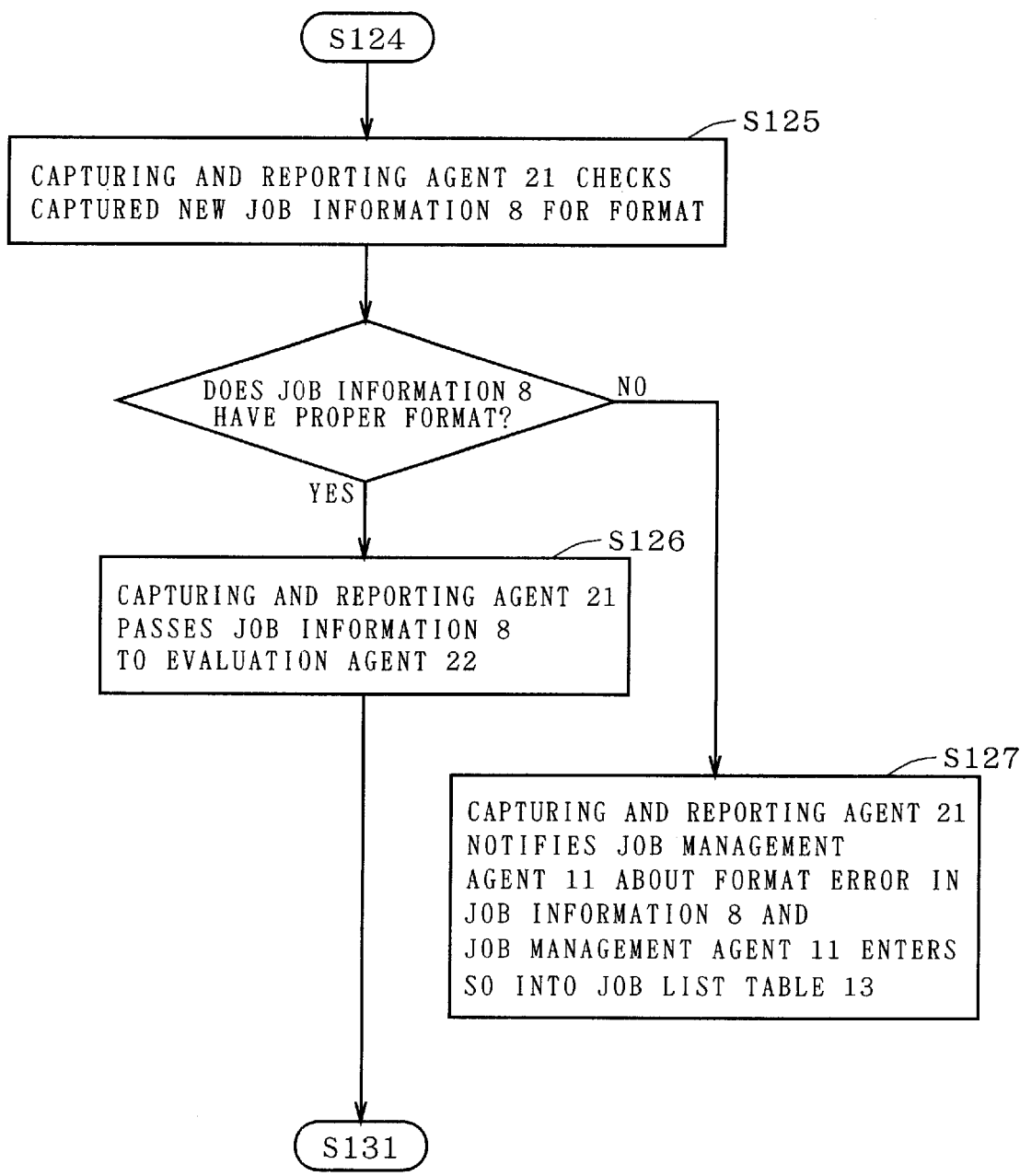
FIG. 18 is a flowchart showing the contents of the steps S125 to S127 of FIG. 7.

The steps S121 to S127 of FIG. 7 show the operation wherein the evaluation agent 22 captures a new piece of job information 8 through the capturing and reporting agent 21. FIGS. 17 and 18 are flowcharts showing the contents of the steps S121 to S127.

As a precondition that the job-handling agent system 20 captures the new piece of job information 8 from the input agent system 10, the scheduling agent 23 initially judges that a new piece of job information 8 is to be registered on the processing schedule while referring to the scheduling information to request the capturing and reporting agent 21 to capture a piece of job information 8 (step S121). In response to the request, the capturing and reporting agent 21 requests the job management agent 11 via the LAN 40 to pass an unprocessed one of the pieces of job information 8 stored in the job list table 13 (step S123).

The agent which makes a first request for the capturing of the new piece of job information 8 is not limited to the scheduling agent 23. For example, if the function of providing operating directions to other agents is desired to be concentrated possibly on the evaluation agent 22, the evaluation agent 22 may send a simple inquiry about the vacancy of the schedule to the scheduling agent 23 and thereafter request the capturing and reporting agent 12 to capture the new piece of job information 8 (step S122).

The job management agent 11 passes any one of the unprocessed pieces of job information 8 stored in the job list table 13 (more properly, a piece of job information which has not yet been captured by the capturing and reporting agent 21) to the capturing and reporting agent 21 in response to the request from the capturing and reporting agent 21 (step S124). Then, the capturing and reporting agent 21 checks the captured piece of job information 8 for formats (e.g., checks for a data format error, excess and deficiency of data contents and the like) (step S125). If there are no anomalies in the captured piece of job information 8, the capturing and reporting agent 21 passes the captured piece of job information 8 to the evaluation agent 22 (step S126).

If there is a format error in the captured piece of job information 8, the capturing and reporting agent 21 so notifies the job management agent 11. Upon receipt of the notification, the job management agent 11 adds the contents of the notification to the job list table 13 (step S127). More specifically, "9" (indicative of "reservation inhibited") is entered into reservation status information of the job list table 13 shown in FIG. 15, and "1" (indicative of "processing rejected") is entered into processing rejection status information thereof. This inhibits any job-handling agent system 20 from subsequently capturing this piece of job information 8. Of course, the job management agent 11 may make such format check of the piece of job information 8.

<1.3(c) Evaluation of Job Information>

Figure 19:
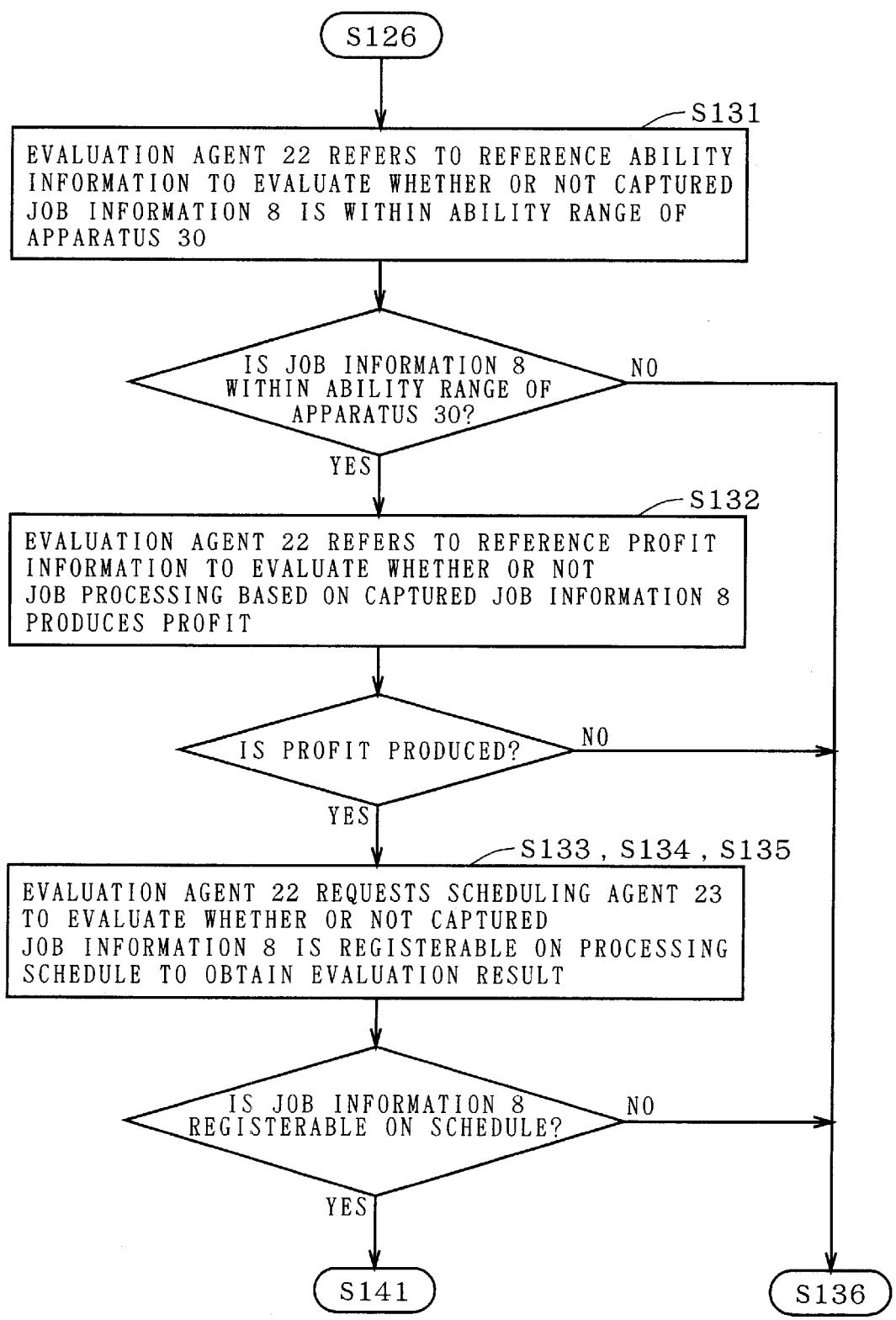
FIG. 19 is a flowchart showing the contents of the steps S131 to S135 of FIG. 8.
Figure 20:
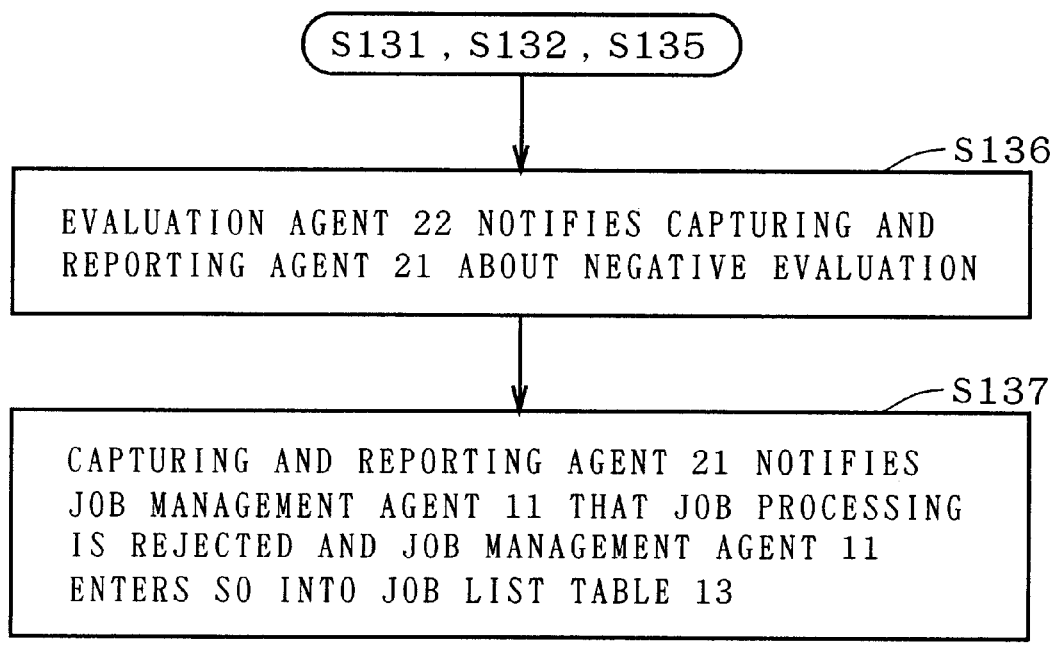
FIG. 20 is a flowchart showing the contents of the steps S136 and S137 of FIG. 8.

In the steps S131 to S137 of FIG. 8, the job-handling agent system 20 evaluates whether or not the captured new piece of job information 8 is processable by the apparatus 30. As the result of this operation, the job-handling agent system 20 selects and captures a piece of job information 8 stored in the job list table 13. FIGS. 19 and 20 are flowcharts showing the contents of the steps S131 to S137.

The evaluation of the new piece of job information 8 is divided into three sequential stages: the evaluation of whether or not the new piece of job information 8 is within the ability range of the apparatus 30, the evaluation of whether or not the new piece of job information 8 produces a profit, and the evaluation of whether or not the new piece of job information 8 is processable by the delivery date.

For the evaluation of whether or not the new piece of job information 8 is within the ability range of the apparatus 30, the evaluation agent 22 initially takes out machining specification information in the piece of job information 8, and then reads reference ability information from the ability database 28a (step S131). FIG. 21 shows an example of the contents of the ability database 28a. Items corresponding to the machining specification information among the items including the number of revolutions and a cutting rate shown in FIG. 21 are read as the reference ability information.

Then, the evaluation agent 22 judges whether or not the machining specification information is within the range of the allowable values of the respective items determined by the reference ability information. If the machining specification information is within the range of the allowable values, a positive evaluation such that the job is processable by the apparatus 30 is made. If the machining specification information is out of the range of the allowable values, a negative evaluation that rejects the processing is made.

The restrictive conditions shown in FIG. 21 represent the limits of the ability of the apparatus 30, and correspond to the conditions (FIG. 16) under which the job management agent 11 chooses the pieces of job information 8.

If it is evaluated that the piece of job information 8 is within the ability range of the apparatus 30, the evaluation agent 22 then evaluates whether or not the processing of the job in accordance with the piece of job information 8 produces a profit. For this evaluation, the evaluation agent 22 takes out cost specification information from the piece of job information 8 and then reads reference profit information related to costs required for the job processing from the profit database 28b (step S132). FIG. 22 shows an example of the contents of the profit database 28b. Required ones of the pieces of information shown in FIG. 22 are read as the reference profit information.

Then, the evaluation agent 22 judges whether or not the cost specification information is within the range of the allowable values of the respective items determined by the reference profit information. If the cost specification information is within the range of the allowable values, a positive evaluation such that the job is to be processed by the apparatus 30 is made. If the cost specification information is out of the range of the allowable values, a negative evaluation that rejects the processing is made.

If it is judged in the step S132 that the piece of job information 8 produces a profit, then the evaluation agent 22 requests the scheduling agent 23 to evaluate whether or not the piece of job information 8 is registerable on the processing schedule (step S133). At this time, the evaluation agent 22 passes only predetermined pieces of information required for the evaluation (the delivery date, time required for job processing, and the like) to the scheduling agent 23.

The scheduling agent 23 refers to the processing schedule stored in a schedule table 281c in the scheduling database 28c to evaluate whether or not the piece of information received from the evaluation agent 22 is registerable on the processing schedule (step S134), that is, to judge whether or not the job is processable in open or unfixed parts of the processing schedule. The scheduling agent 23 passes the result of evaluation to the evaluation agent 22 (step S135).

If the results of the above described three stages of evaluation are all positive, the piece of job information 8 is sent from the evaluation agent 22 to the scheduling agent 23 and then registered on the processing schedule (step S141 and the like), as will be described later. If at least one of the results of the three stages of evaluation is negative, the evaluation agent 22 notifies the capturing and reporting agent 21 that the processing is to be rejected in the apparatus 30 (step S136). The capturing and reporting agent 21 notifies the job management agent 11 about the rejection of the processing, and the job management agent 11 enters the rejection of the processing into the job list table 13 (step S137). This allows the input agent system 10 to seize the results of evaluation in the respective job-handling agent systems 20. More specifically, "1" (indicative of "processing rejected") is entered into processing rejection status information of the job list table 13 shown in FIG. 15, and the number (identification number previously given to each apparatus) of the apparatus 30 corresponding the job-handling agent system 20 which has rejected the processing is additionally entered. Thereafter, the rejected piece of job information 8 is not passed to the job-handling agent system 20 corresponding to the additionally entered apparatus number so that one job-handling agent system 20 is prevented from evaluating the single piece of job information 8 twice or more.

<1.3(d) Registration of Job Information>

Figure 23:
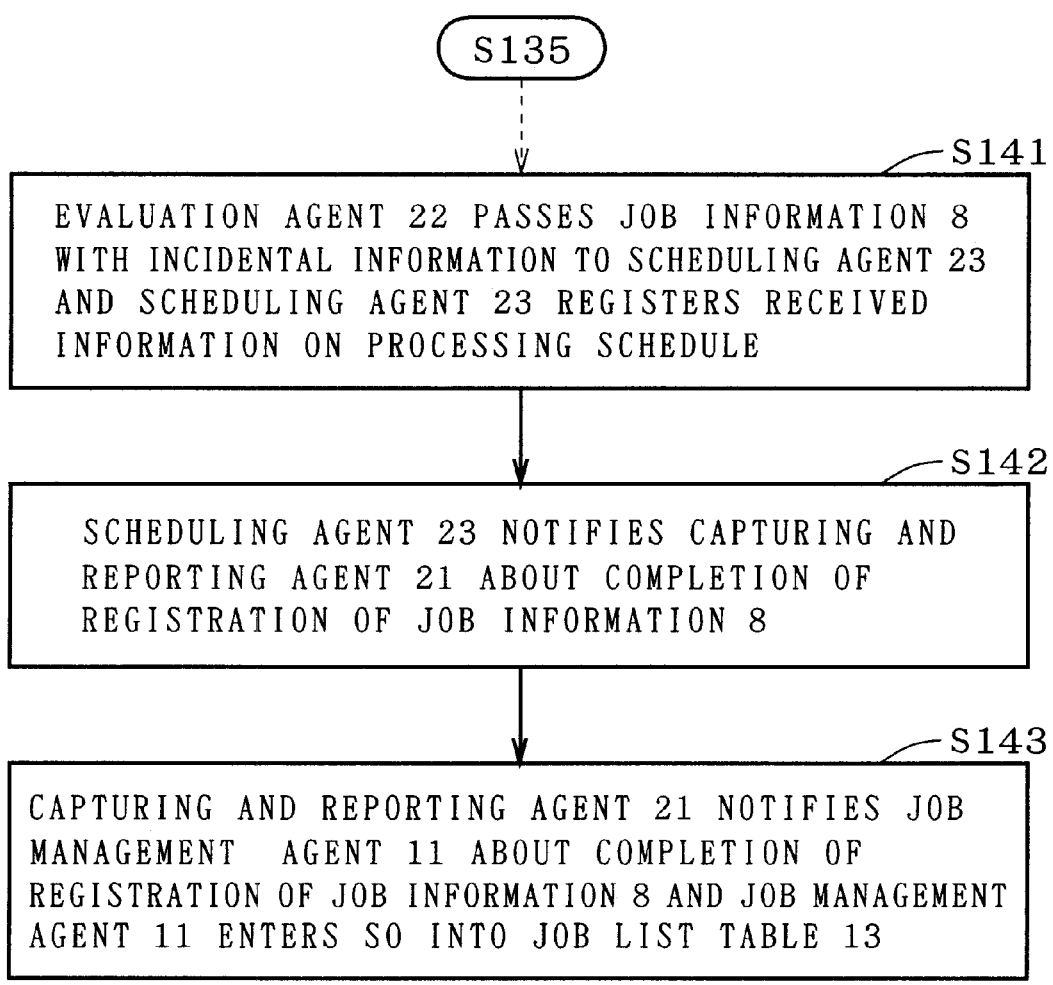
FIG. 23 is a flowchart showing the contents of the steps S141 to S143 of FIG. 9.

In the steps S141 to S143 of FIG. 9, the positively evaluated piece of job information 8 is registered on the processing schedule. FIG. 23 is a flowchart showing the contents of the steps S141 to S143.

The positively evaluated piece of job information 8 is initially passed from the evaluation agent 22 to the scheduling agent 23 (step S141). At this time, incidental information produced in the evaluation agent 22 is also passed to the scheduling agent 23.

The incidental information includes information required for job processing such as what is to be used among the contents of the ability database 28a shown in FIG. 21, for example, which type of cutter is to be used, and an estimate of cost required for job processing.

Upon receipt of the piece of job information 8 and the incidental information, the scheduling agent 23 registers the contents thereof on the processing schedule of the schedule table 281c (step S141). FIG. 24 shows the piece of job information 8 registered as the information on the processing schedule. FIG. 25 shows the method of calculating the amount to be claimed and a gross profit of FIG. 24, for example, in the case where the type A (the cost in the upper row for use in calculation of the amount claimed and the cost in the lower row for use in calculation of the gross profit) of the contents of the profit database 28b shown in FIG. 22 is selected.

Upon completion of the registration, the scheduling agent 23 notifies the capturing and reporting agent 21 about the completion of the registration (step S142), and the capturing and reporting agent 21 then so notifies the job management agent 11. The job management agent 11 enters "1" (indicative of "to reserve") into the reservation status information of the job list table 13 shown in FIG. 15 (step S143). This completes the registration of the piece of job information 8 on the processing schedule and allows the input agent system 10 to seize the registration situation of the piece of job information 8. Other job-handling agent systems 20 are inhibited from capturing the piece of job information 8 which has been registered.

<1.3(e) Processing of Job>

Figure 26:
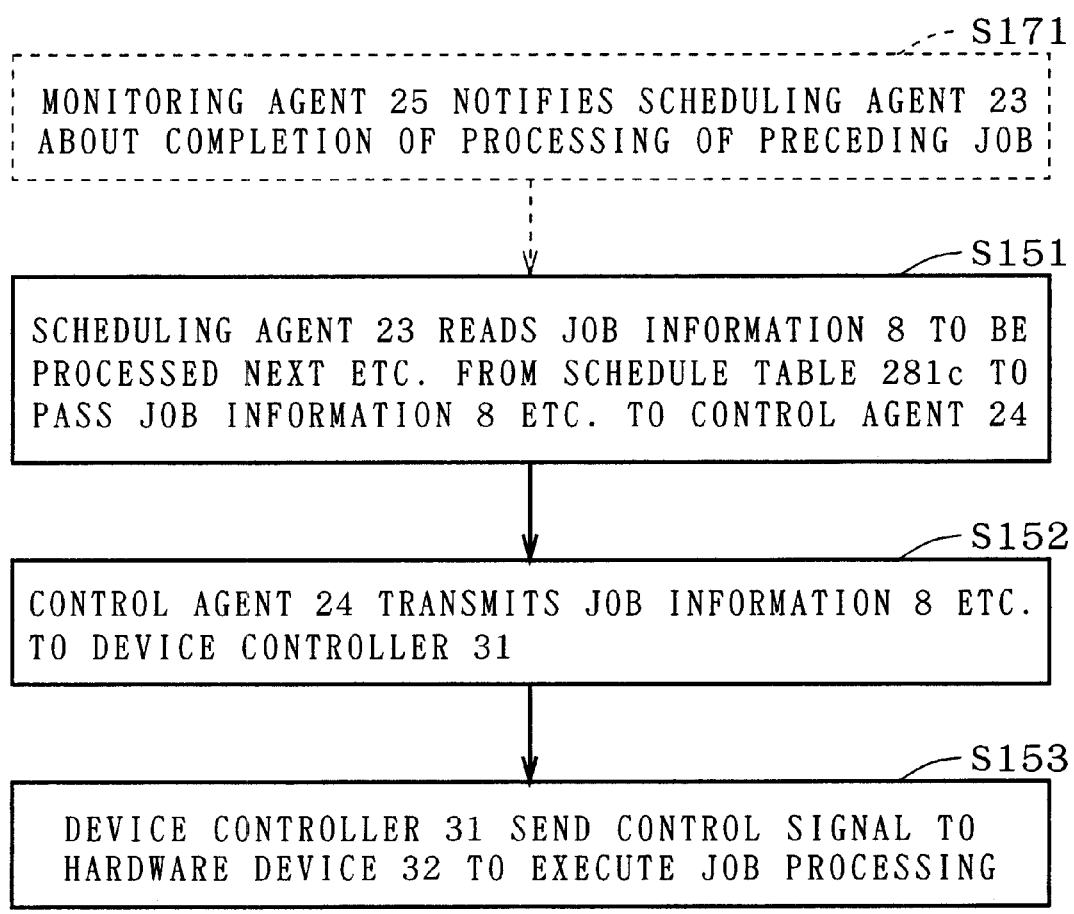
FIG. 26 is a flowchart showing the contents of the steps S151 to S153 of FIG. 9.

The steps S151 through S153 of FIG. 9 are steps executed until the apparatus 30 is placed in operation based on the piece of job information 8. FIG. 26 is a flowchart showing the contents of the steps S151 to S153.

As a precondition for the start of the processing of a new job, when the processing of the preceding job is completed, the monitoring agent 25 notifies the scheduling agent 23 about the completion of the job processing (step S171).

Upon receipt of the notification about the completion of the processing of the preceding job, the scheduling agent 23 reads a piece of information on the job to be processed next from the processing schedule of the schedule table 281c to provide the read piece of job information 8 and its incidental information to the control agent 24 (step S151). The control agent 24 further sends the received information to the apparatus 30 to cause the apparatus 30 to execute the processing of the job (step S152).

In the apparatus 30, the device controller 31 receives the information from the control agent 24 (step S152) to send a control signal to the hardware device 32 in response to the piece of job information 8 and the incidental information, whereby the processing of the job is executed (step S153).

<1.3(f) Monitoring of Job Processing>

Figure 27:
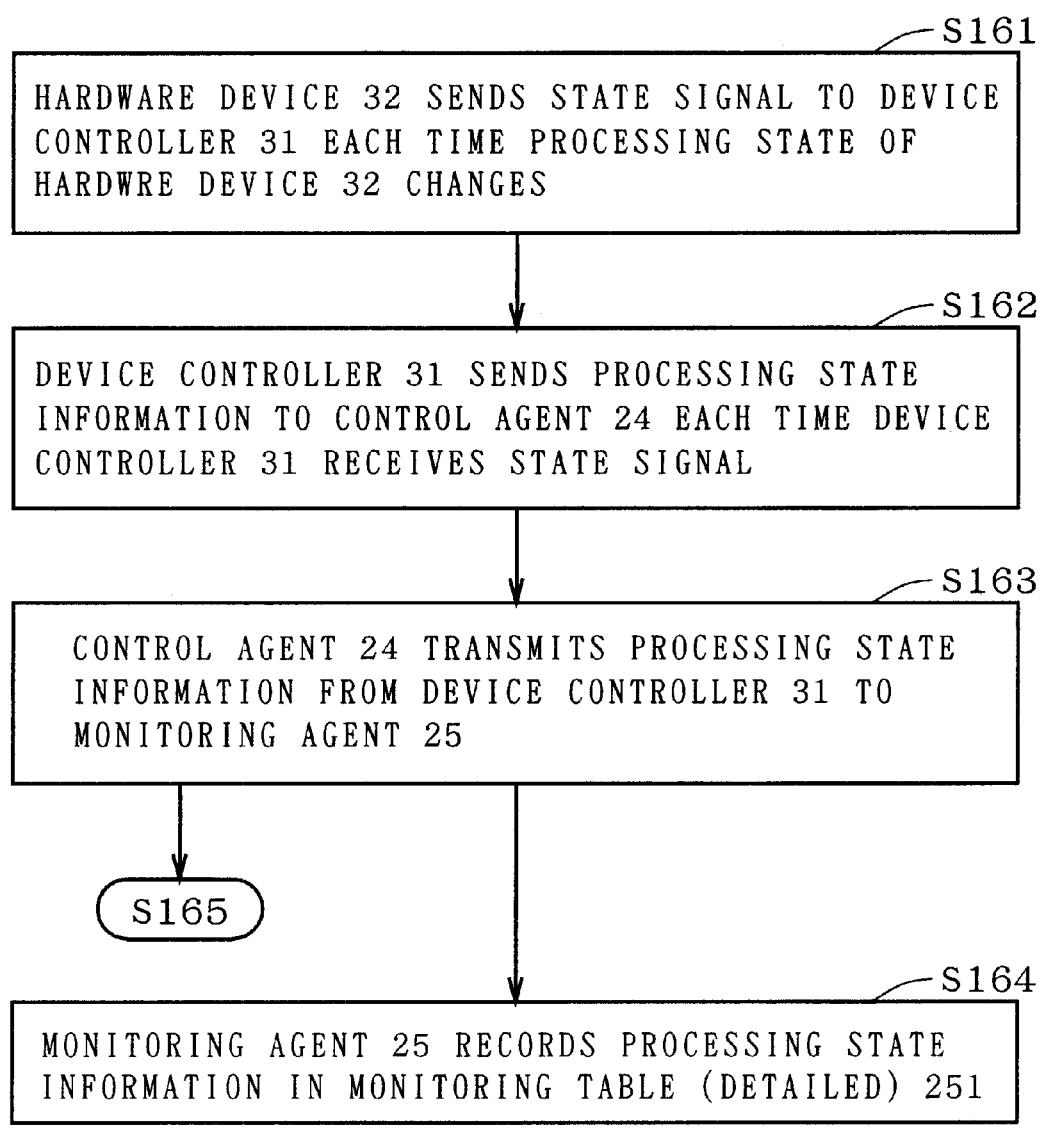
FIG. 27 is a flowchart showing the contents of the steps 161 to S164 of FIG. 10.
Figure 28:
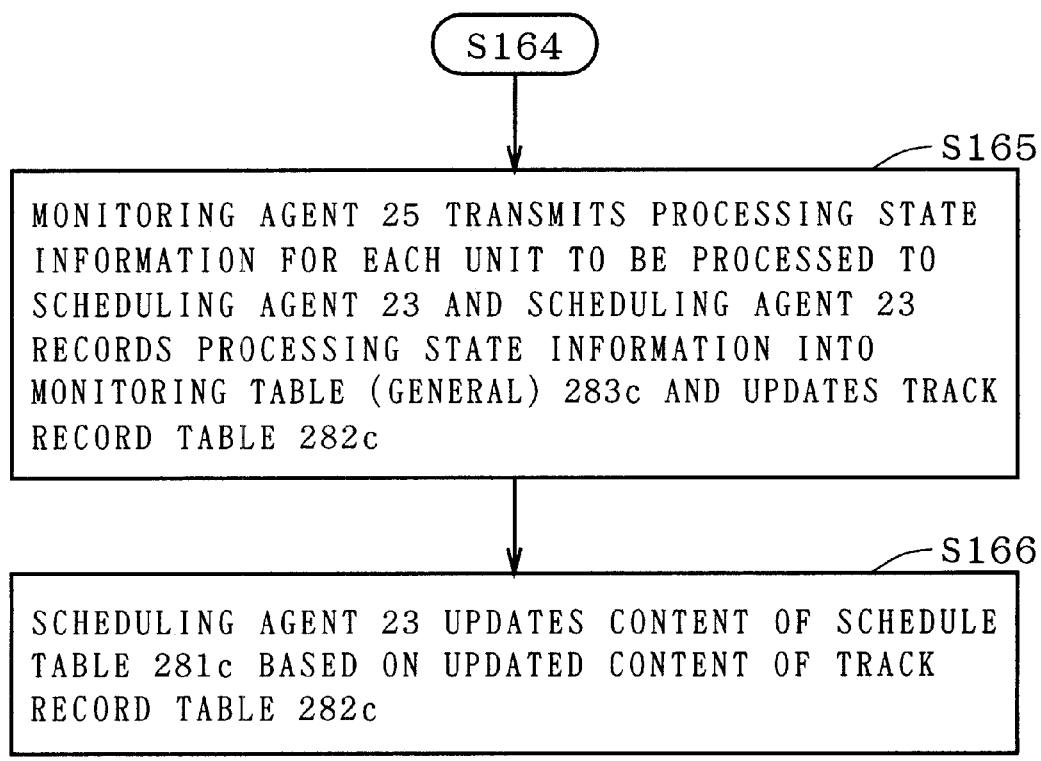
FIG. 28 is a flowchart showing the contents of the steps S165 and S166 of FIG. 10.

The job-handling agent system 20 monitors the job processing during the time the apparatus 30 executes the job processing. The steps S161 to S166 of FIG. 10 are the steps of the monitoring. FIGS. 27 and 28 are flowcharts showing the contents of the steps S161 to S166.

Information for monitoring is initially sent from the hardware device 32 to the device controller 31 in the apparatus 30. This information is sent as a state signal each time the processing state of the hardware device 32 is changed (step S161).

Each time the device controller 31 receives the state signal, the device controller 31 sends information on the processing state of the apparatus 30 to the control agent 24 of the job-handling agent system 20 (step S162). The control agent 24 transmits the received processing state information to the monitoring agent 25 (step S163).

The monitoring agent 25 has a dedicated monitoring table 251 in which all detailed pieces of processing state information received by the monitoring agent 25 are recorded (step S164). FIG. 29 shows an example of the contents recorded in the monitoring table (detailed) 251.

The monitoring agent 25 separates the received processing state information into units to be processed each having a predetermined amount of information to sends the separated processing state information to the scheduling agent 23. The scheduling agent 23 records the processing state in a monitoring table (general) 283c provided in the scheduling database 28c and then updates the contents of a track record table 282c in the scheduling database 28c (step S165). The separation of the processing state information into the units to be processed for recording in the monitoring table (general) 283c is intended to allow the operator and the like to refer to the monitoring table 283c as required to readily seize the processing state. FIG. 30 shows an example of the contents of the monitoring table 283c.

The scheduling agent 23 also updates the contents of the schedule table 281c in accordance with the updated contents of the track record table 282c (step S166). The operating time of the apparatus 30 is updated and recorded moment by moment into the track record table 282c since the estimated time at which the processing of the next job starts and the like must be corrected if the operating time has already exceeds a predetermined operating time. This eliminates the need for the input agent system 10 to correct the schedule and the need for the input agent system 10 to take into consideration the correction of the processing schedule when an unprocessed piece of job information 8 is passed to the job-handling agent system 20.

<1.3(g) Operation after Completion of Job Processing>

Figure 31:
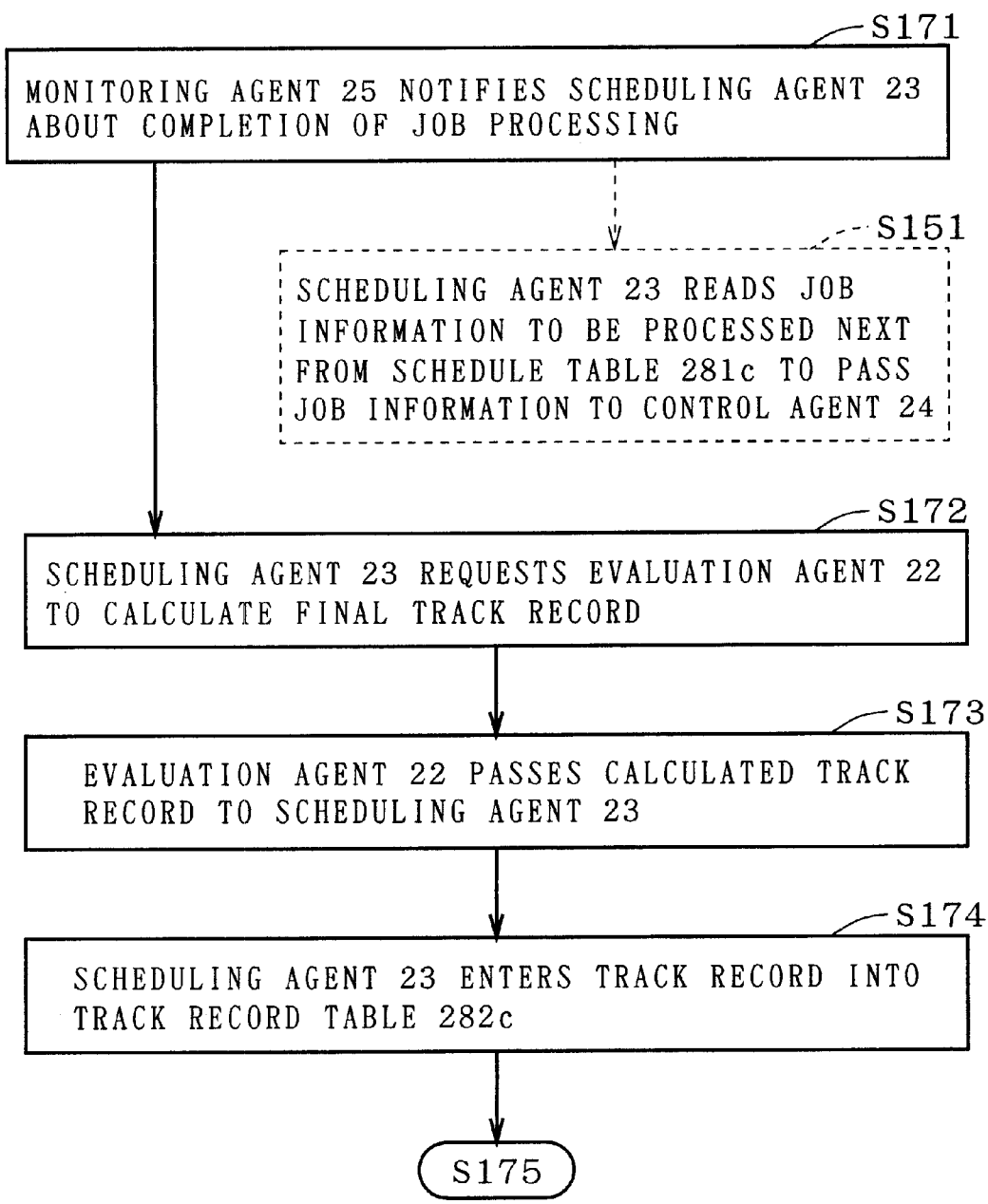
FIG. 31 is a flowchart showing the contents of the steps S171 to S174 of FIG. 11.
Figure 32:
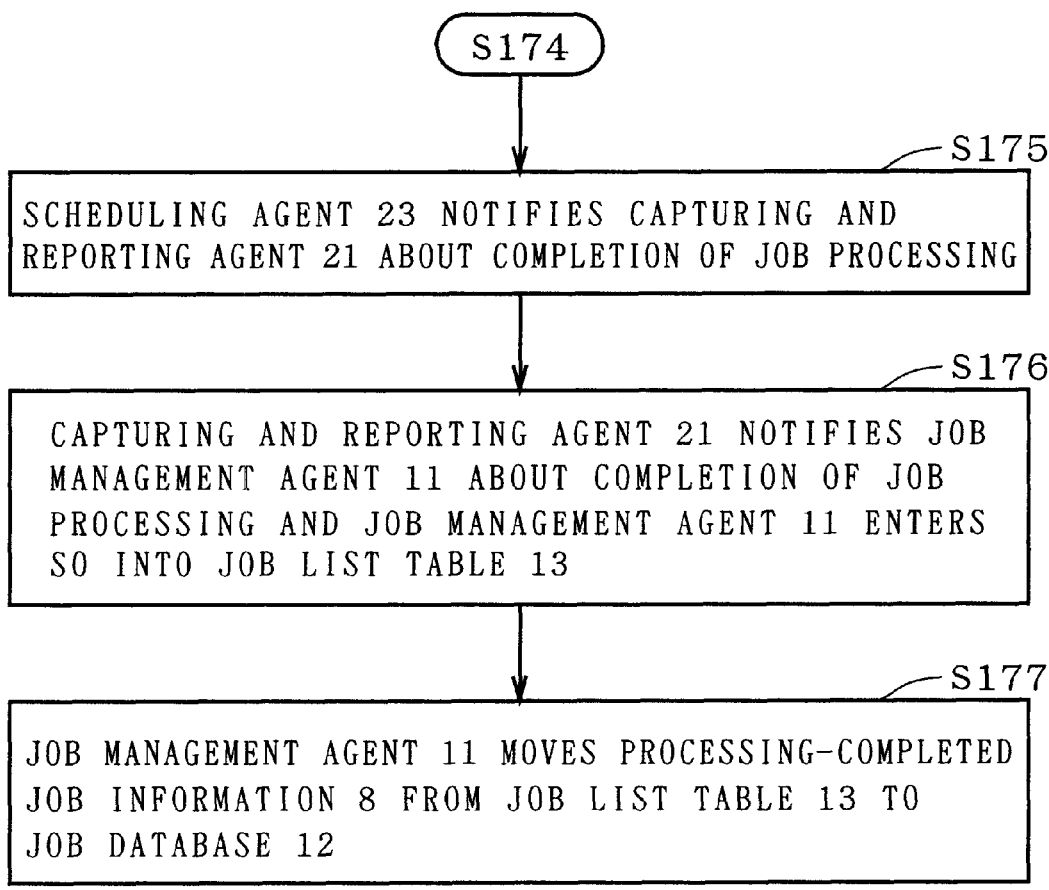
FIG. 32 is a flowchart showing the contents of the steps S175 to S177 of FIG. 11.

The steps S171 to S177 of FIG. 11 are the steps of the operation of the system 100 after the completion of the job processing in the apparatus 30. FIGS. 31 and 32 are flowcharts showing the contents of the steps S171 to S177.

When the job processing in the apparatus 30 is completed, the processing state information indicative of the completion of the processing is inputted from the apparatus 30 through the control agent 24 to the monitoring agent 25. This processing completion report is transmitted from the monitoring agent 25 to the scheduling agent 23 (step S171). In response to the processing completion report, the scheduling agent 23 directs the control agent 24 to process the next job (step S151) as described above.

The scheduling agent 23 requests the evaluation agent 22 to calculate the final track record which is the cost required until the completion of the job processing (step S172). The track record calculation is similar in contents to the above described calculation of the amount to be claimed (FIG. 25) and the like. A particular example of the track record calculation is shown in FIG. 33.

When the calculation of the track record is completed, the evaluation agent 22 passes the result of calculation to the scheduling agent 23 (step S173), and the scheduling agent 23 then enters the actual amount claimed, actual processing time and the like as the final track record into the track record table 282c (step S174). This eliminates the need for the input agent system 10 to calculate the track record and allows the job-handling agent system 20 to refer to the track record table 282c to readily seize the track record. FIG. 34 shows an example of the contents of the track record table 282c.

The scheduling agent 23 also transmits the processing completion report to the capturing and reporting agent 21 (step S175), and the capturing and reporting agent 21 then notifies the job management agent 11 about the processing completion report. Upon receipt of the processing completion report, the job management agent 11 so enters into the job list table 13 (step S176). More specifically, the time and termination result of the processing result information among the contents of the job list table 13 shown in FIG. 15 are entered. This allows the input agent system 10 to seize which piece of job information 8 is processing-completed.

The job management agent 11 moves the processing-completed piece of job information 8 from the job list table 13 to the job database 12 and deletes the processing-completed piece of job information 8 in the job list table 13 (step S177).

The above described operation completes the operation of the system 100 after the completion of the job processing in the apparatus 30.

<1.4 Operation Flow in Agents>

The entire operation of the system 100 has been described hereinabove. The system 100 operates, with the agents that are autonomous programs making contact with each other. An operation flow will be described with attention focused on the individual agents. Like reference characters are used to designate some of the steps shown in FIGS. 35 through 44 which are similar to those shown in FIGS. 7 through 11. In addition, some steps designated by the reference characters in FIGS. 7 through 11 as the single steps for purposes of simplicity are shown in FIGS. 35 through 44 as separated into sub-steps designated by the identical reference characters.

<1.4(a) Operation Flow in Job Management Agent>

Figure 35:
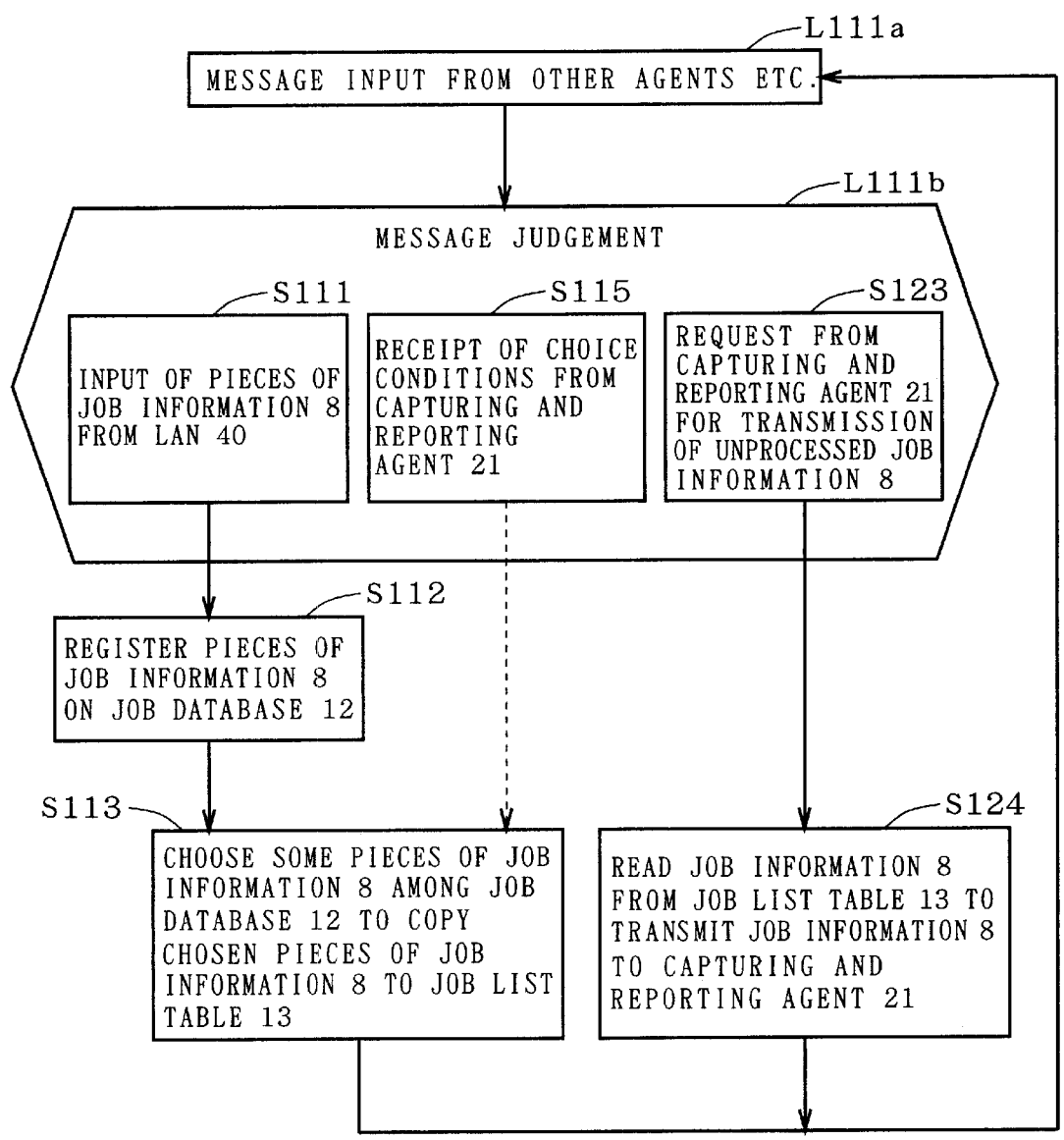
FIGS. 35 and 36 are flowcharts showing the operation of a job management agent.
Figure 36:
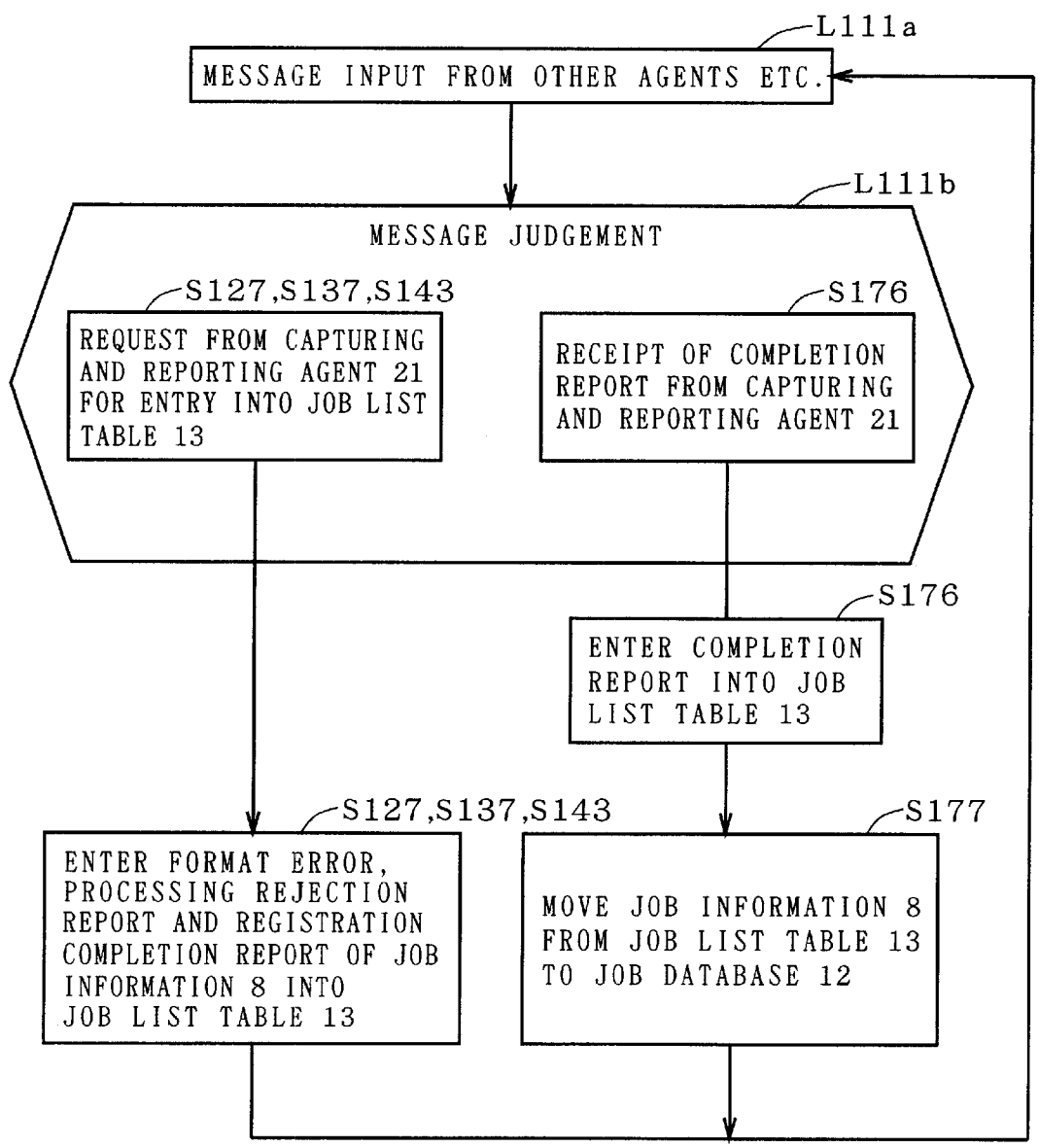

FIGS. 35 and 36 are flowcharts showing the operation of the job management agent 11.

Each of the agents is in principle adapted to operate in response to a message input (step L111a) from other agents and the like, and judges the message (step L111b) if there is a message input.

It should be noted that the steps L111a and L111b of FIG. 35 and those of FIG. 36 are the same, but are illustrated in separate figures only for purposes of convenience of representation. In the following figures, the same step related to the input and judgement of messages is illustrated as required in different figures using the same reference character.

Brief description about the messages inputted to the job management agent 11 and the responses of the job management agent 11 thereto in sequential order is as follows:

When pieces of job information 8 are inputted from the LAN 40 (step S111), the job management agent 11 registers the pieces of job information 8 onto the job database 12 (step S112). Thereafter, the job management agent 11 chooses some pieces of job information 8 among the job database 12 in accordance with the choice conditions to copy the chosen pieces of job information 8 to the job list table 13 (step S113).

Upon receipt of the choice conditions from the capturing and reporting agent 21 (step S115), the job management agent 11 uses the choice conditions to choose the pieces of job information 8 among the job database 12 (step S113).

When the capturing and reporting agent 21 requests the job management agent 11 to transmit an unprocessed piece of job information 8 (step S123), the job management agent 11 reads an unprocessed piece of job information 8 from the job list table 13 to transmit the unprocessed piece of job information 8 to the capturing and reporting agent 21 (step S124).

When the capturing and reporting agent 21 requests the job management agent 11 to enter additional information into the job list table 13 (steps S127, S137 and S143), the job management agent 11 adds the format error (step S127), the processing rejection report (step S137), and the registration completion report (step S143) of the piece of job information 8 to the job list table 13.

Upon receipt of the job processing completion report from the capturing and reporting agent 21 (step S176), the job management agent 11 enters the completion report into the job list table 13 (step S176), and moves the piece of job information 8 for the completed job from the job list table 13 to the job database 12 (step S177).

The input of the message from other agents (step L111a), the judgement of the message (step L111b), and the response to the message are performed in a cyclic manner in the job management agent 11.

<1.4(b) Operation Flow in Capturing and Reporting Agent>

Figure 37:
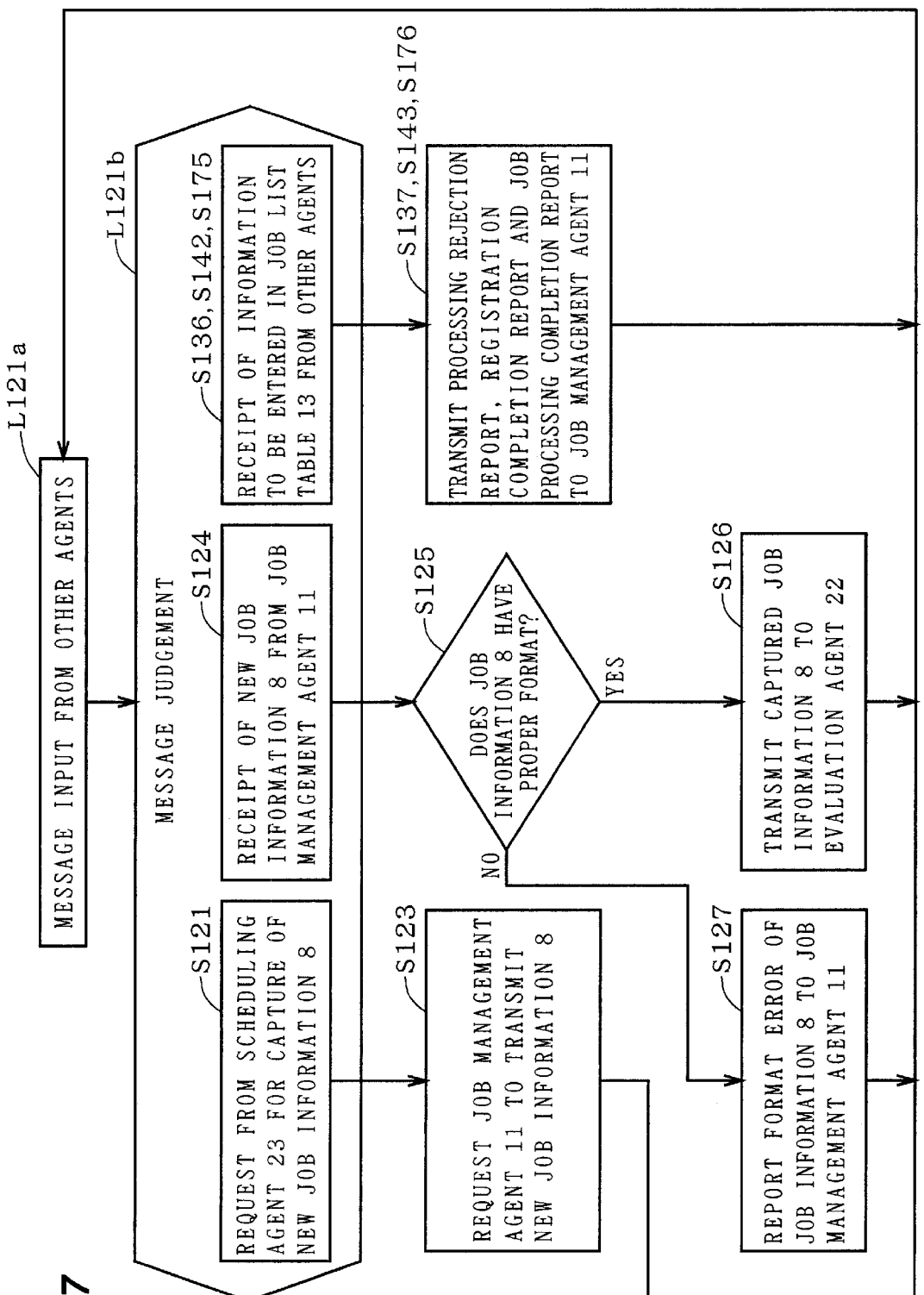
FIG. 37 is a flowchart showing the operation of a capturing and reporting agent.

FIG. 37 is a flowchart showing the operation of the capturing and reporting agent 21. In the capturing and reporting agent 21, the judgement of the message (step L121b) in response to the message input from other agents (step L121a) and the response to the message are performed in a cyclic manner, as will be described below.

When the scheduling agent 23 directs the capturing and reporting agent 21 to capture a new piece of job information 8 (step S121), the capturing and reporting agent 21 requests the job management agent 11 to transmit a new piece of job information 8 (step S123).

Upon receipt of the new piece of job information 8 from the job management agent 11 (step S124), the capturing and reporting agent 21 judges whether or not the captured piece of job information 8 has a proper format (step S125). If no format error is detected, the capturing and reporting agent 21 transmits the captured piece of job information 8 to the evaluation agent 22 (step S126). If a format error is detected, the capturing and reporting agent 21 reports so to the job management agent 11 (step S127).

Upon receipt of the processing rejection report from the evaluation agent 22 (step S136), the registration completion report from the scheduling agent 23 (step S142), or the job processing completion report (step S175), the capturing and reporting agent 21 transmits these reports to the job management agent 11 (steps S137, S143 and S176).

In other operations, upon receipt of the choice conditions from the evaluation agent 22 (step S114), the capturing and reporting agent 21 transmits the choice conditions to the job management agent 11 (step S115).

<1.4(c) Operation Flow in Evaluation Agent>

Figure 38:
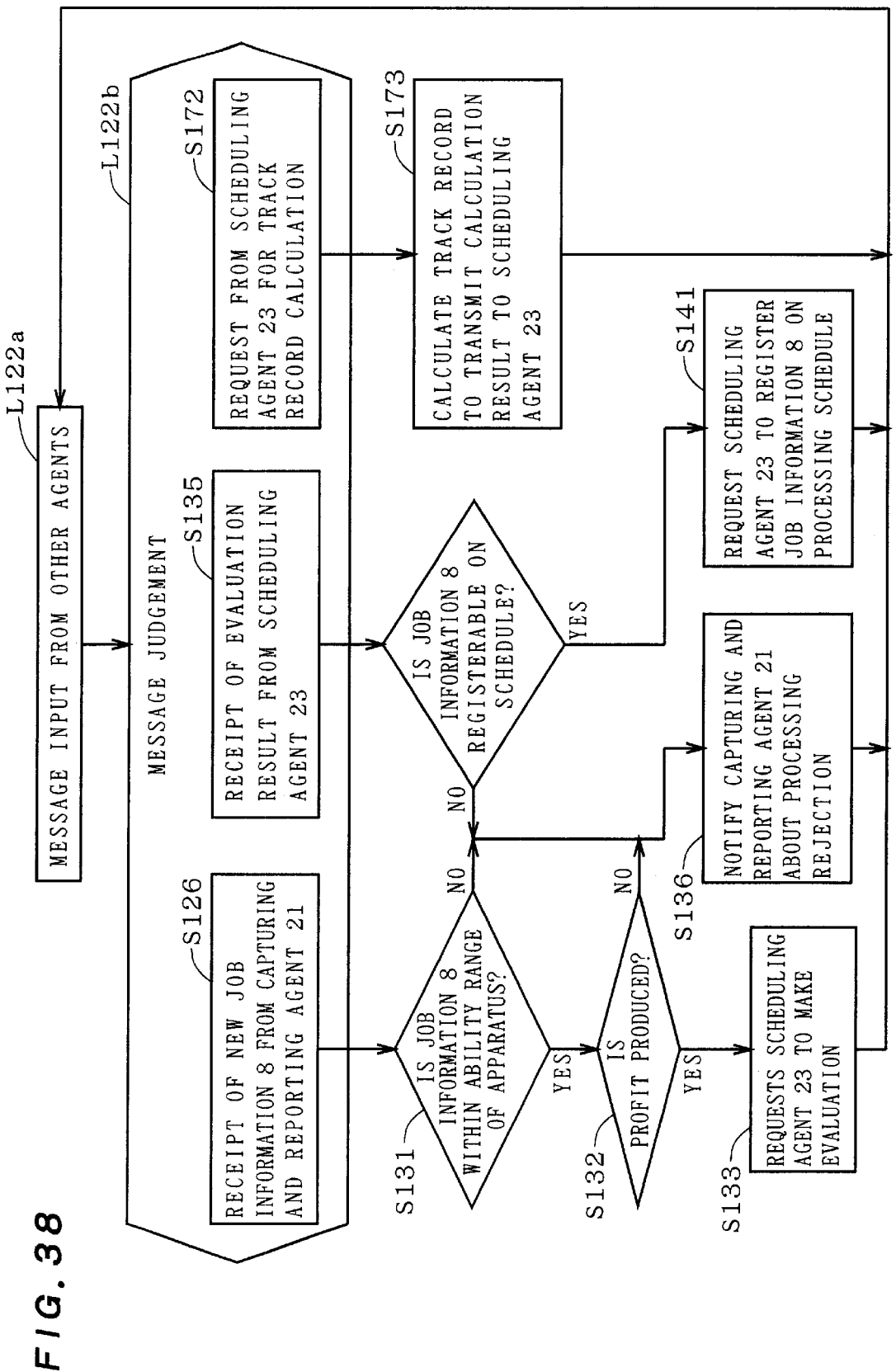
FIG. 38 is a flowchart showing the operation of the evaluation agent.

FIG. 38 is a flowchart showing the operation of the evaluation agent 22. In the evaluation agent 22, the judgement of the message (step L122b) in response to the message input from other agents (step L122a) and the response to the message are performed in a cyclic manner, as will be described below.

Upon receipt of the new piece of job information 8 from the capturing and reporting agent 21 (step S126), the evaluation agent 22 evaluates whether or not the contents of the piece of job information 8 are within the ability range of the apparatus 30 (step S131). If the contents of the piece of job information 8 are within the ability range of the apparatus 30, the evaluation agent 22 then evaluates whether or not the processing of the job produces a profit (step S132). If the piece of job information 8 is to produce a profit, the evaluation agent 22 requests the scheduling agent 23 to evaluate whether or not the piece of job information 8 is registerable on the schedule (step S133). If at least one of the first- and second-stage evaluations in the steps S131 and S132 provides a negative result, the evaluation agent 22 notifies the capturing and reporting agent 21 about the processing rejection report (step S136).

Upon receipt of the third-stage evaluation about the registrability on the processing schedule from the scheduling agent 23 (step S135), the evaluation agent 22 requests the scheduling agent 23 to register the piece of job information 8 on the processing schedule (step S141) if the third-stage evaluation provides a positive result, and notifies the capturing and reporting agent 21 about the processing rejection report (step S136) if the third-stage evaluation provides a negative result.

When the scheduling agent 23 requests the evaluation agent 22 to calculate the track record of the processing-completed job (step S172), the evaluation agent 22 calculates the track record to transmit the result of calculation to the scheduling agent 23 (step S173).

In other operations, the evaluation agent 22 transmits the choice conditions used by the job management agent 11 to the capturing and reporting agent 21 (step S114).

The evaluating operations of the evaluation agent 22 are described in detail hereinafter.

Figure 39:
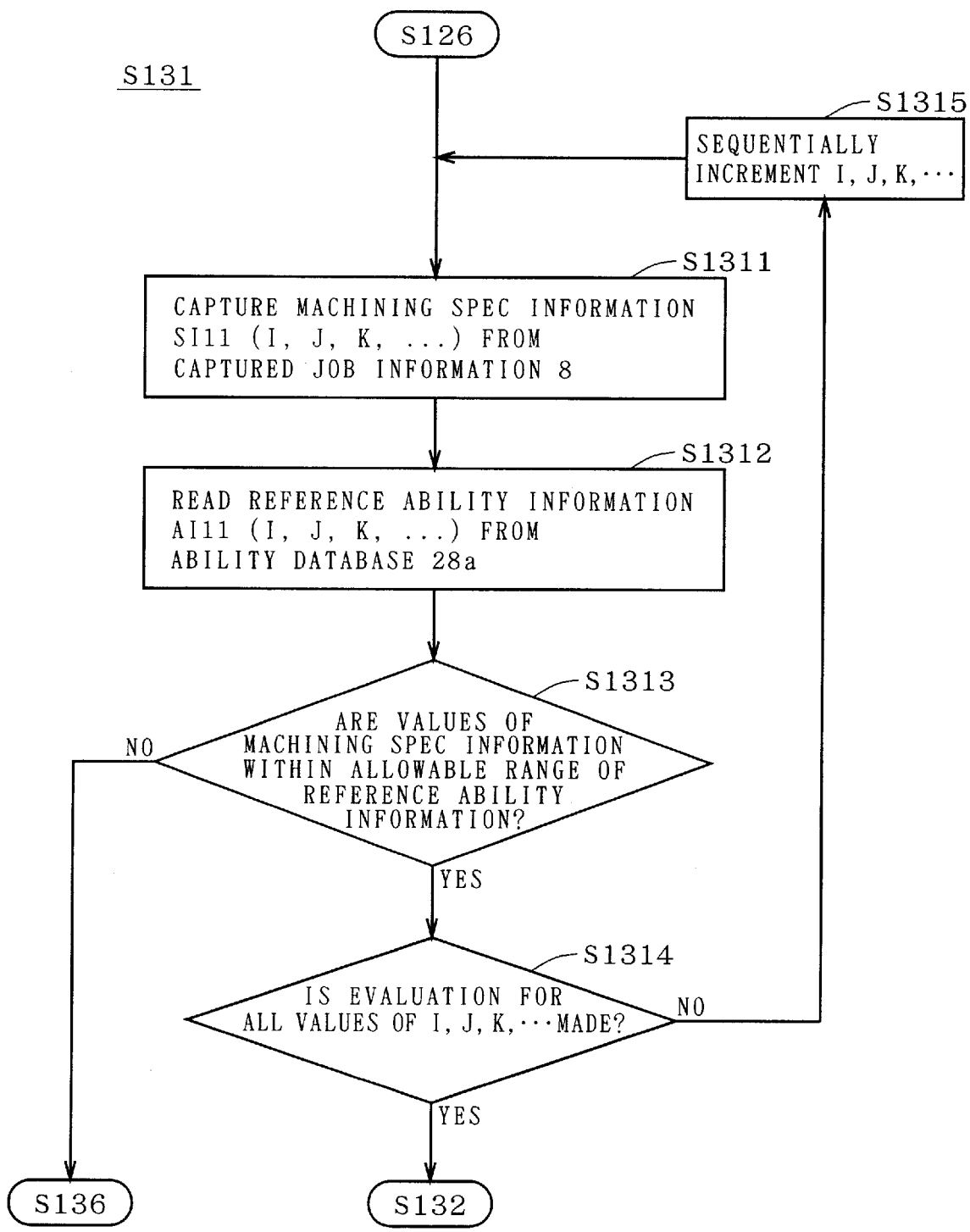
FIG. 39 is a flowchart showing the operation of the evaluation agent in the step S131.
Figure 40:
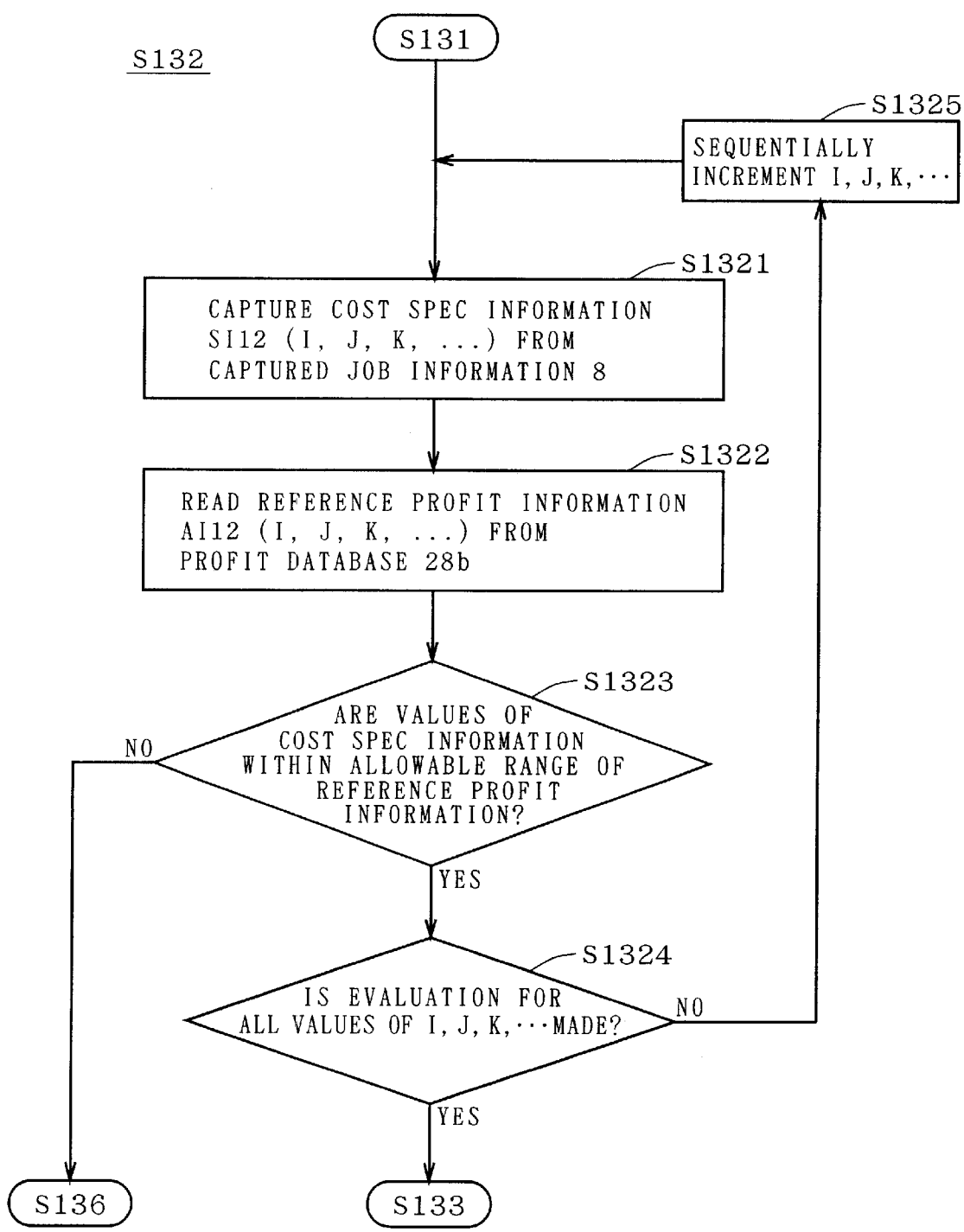
FIG. 40 is a flowchart showing the operation of the evaluation agent in the step S132.

FIGS. 39 and 40 show an operation flow in the evaluation agent 22 in the step (step S131) of evaluating whether or not the contents of the piece of job information 8 are within the ability range of the apparatus 30 and in the step (step S132) of evaluating whether or not the processing of the job in accordance with the piece of job information 8 produces a profit.

In the step (step S131) of whether or not the contents of the piece of job information 8 are within the ability range of the apparatus 30, the evaluation agent 22 initially captures the machining specification information S111 (I, J, K, . . .) from the captured piece of job information 8 where I, J, K . . . are parameters of the machining specification information 5111 (step S1311). The values of the machining specification information S111 of a particular type are specified for each combination of the values of the parameters I, J, K, . . .

Next, the evaluation agent 22 reads the reference ability information AI11 (I, J, K, . . .) corresponding to the machining specification information S111 from the ability database 28a (step S1312). If all values of the machining specification information S111 I, J, K, . . .) in respective combinations of the values of the parameters I, J, K, . . . are within the allowable range of the corresponding reference ability information AI11 (I, J, K, . . .), a positive evaluation is made. If any value of the machining specification information S111 is out of the allowable range of the corresponding reference ability information AI11, a negative evaluation is made (steps S1313, S1314 and S1315).

The operation of the evaluation agent 22 in the step (step S132) of evaluating whether or not the processing of the job in accordance with the piece of job information 8 produces a profit is generally similar to that in the step (step S131) of evaluating the ability of the apparatus. Specifically, a comparison is made between the cost specification information S112 (I, J, K, . . .) (step S1321) captured from the piece of job information 8 and the reference profit information AI12 (I, J, K, . . .) (step S1322) read from the profit database 28b. If all values of the cost specification information S112 are within the allowable range of the reference profit information AI12, a positive evaluation is made. If any value of the cost specification information SI12 is out of the allowable range of the reference profit information AI12, a negative evaluation is made (steps S1323, S1324 and S1325).

<1.4(d) Operation Flow in Scheduling Agent>

Figure 41:
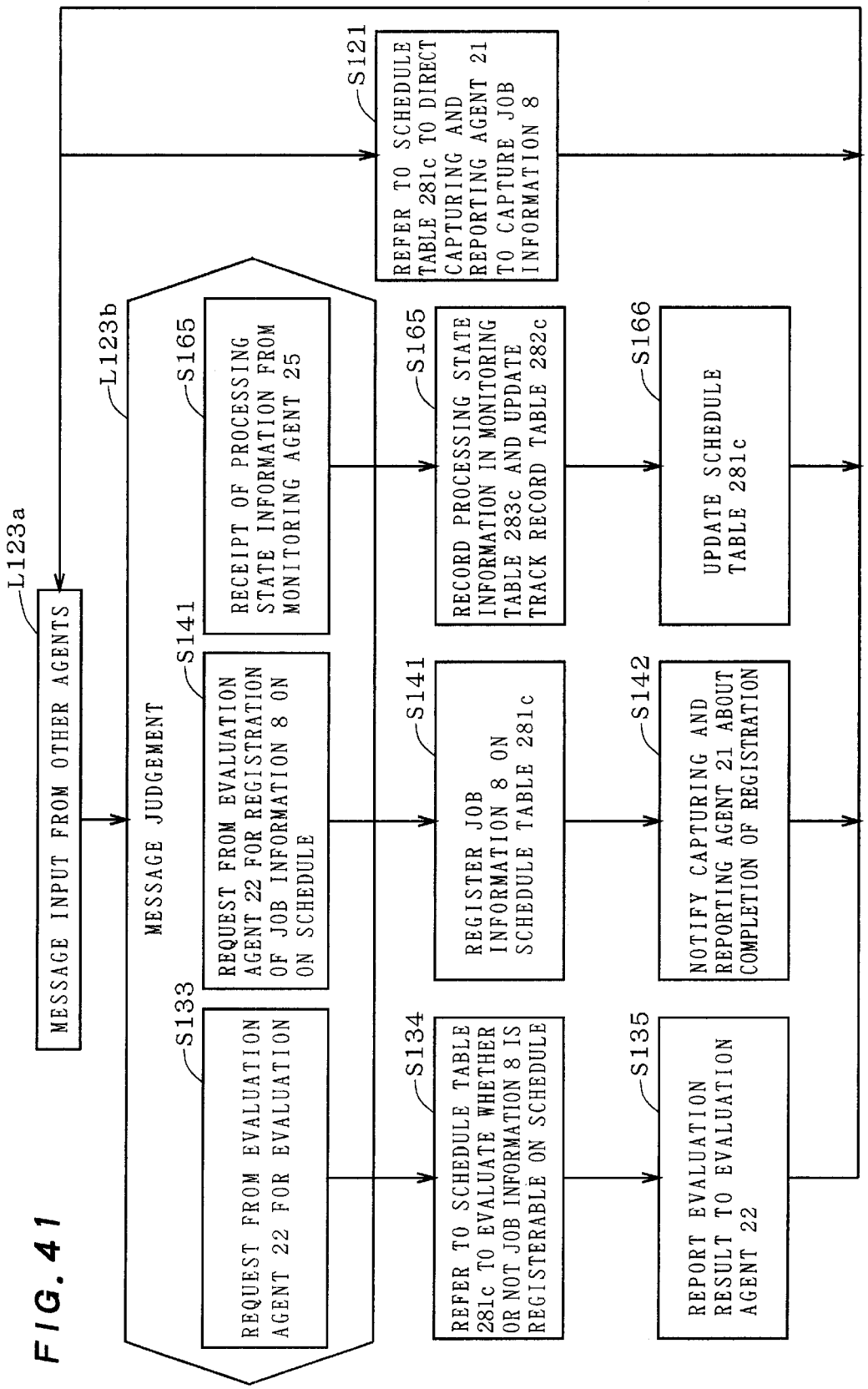
FIGS. 41 and 42 are flowcharts showing the operation of a scheduling agent.
Figure 42:
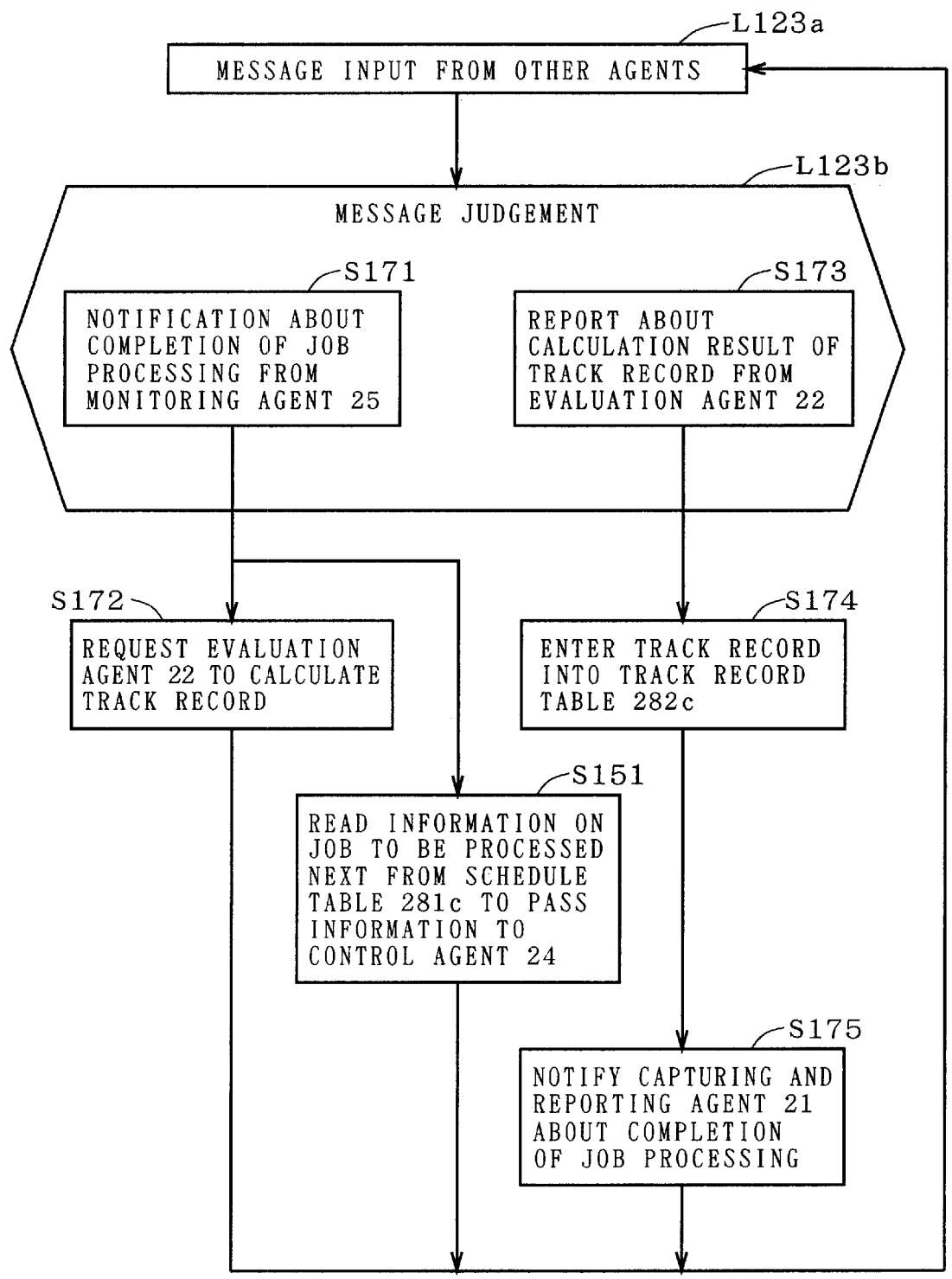

FIGS. 41 and 42 are flowcharts showing the operation of the scheduling agent 23. In the scheduling agent 23, the judgement of the message (step L123b) in response to the message input from other agents (step L123a) and the response to the message are performed in a cyclic manner, as will be described below. In this preferred embodiment, the scheduling agent 23 is adapted to direct the capturing and reporting agent 21 to capture a new piece of job information 8 while referring to the schedule table 281c (step S121). Thus, the scheduling agent 23 is adapted to provide this direction also while no message is inputted from other agents.

When the evaluation agent 22 requests the scheduling agent 23 to evaluate whether or not the piece of job information 8 is registerable on the processing schedule (step S133), the scheduling agent 23 refers to the schedule table 281c to conduct the evaluation (step S134), and then reports the result of evaluation to the evaluation agent 22 (step S135).

When the evaluation agent 22 requests the scheduling agent 23 to register the piece of job information 8 on the processing schedule, the scheduling agent 23 registers the piece of job information 8 on the schedule table 281c (step S141), and notifies the capturing and reporting agent 21 about the completion of the registration (step S142).

Upon receipt of the processing state information from the monitoring agent 25, the scheduling agent 23 records the processing state information in the monitoring table 283c to update the track record table 282c (step S165). The scheduling agent 23 also updates the contents of the schedule table 281c in accordance with the contents of the track record table 282c (step S166).

Upon receipt of the notification about the completion of the job processing from the monitoring agent 25 (step S171), the scheduling agent 23 requests the evaluation agent 22 to calculate the track record (step S172), and also reads the information on the job to be processed next from the schedule table 281c to pass the information to the control agent 24 (step S151).

Upon receipt of the calculation results of the track record from the evaluation agent 22 (step S173), the scheduling agent 23 enters the track record into the track record table 282c (step S174), and notifies the capturing and reporting agent 21 about the completion of the job processing (step S175).

<1.4(e) Operation Flow in Control Agent>

Figure 43:
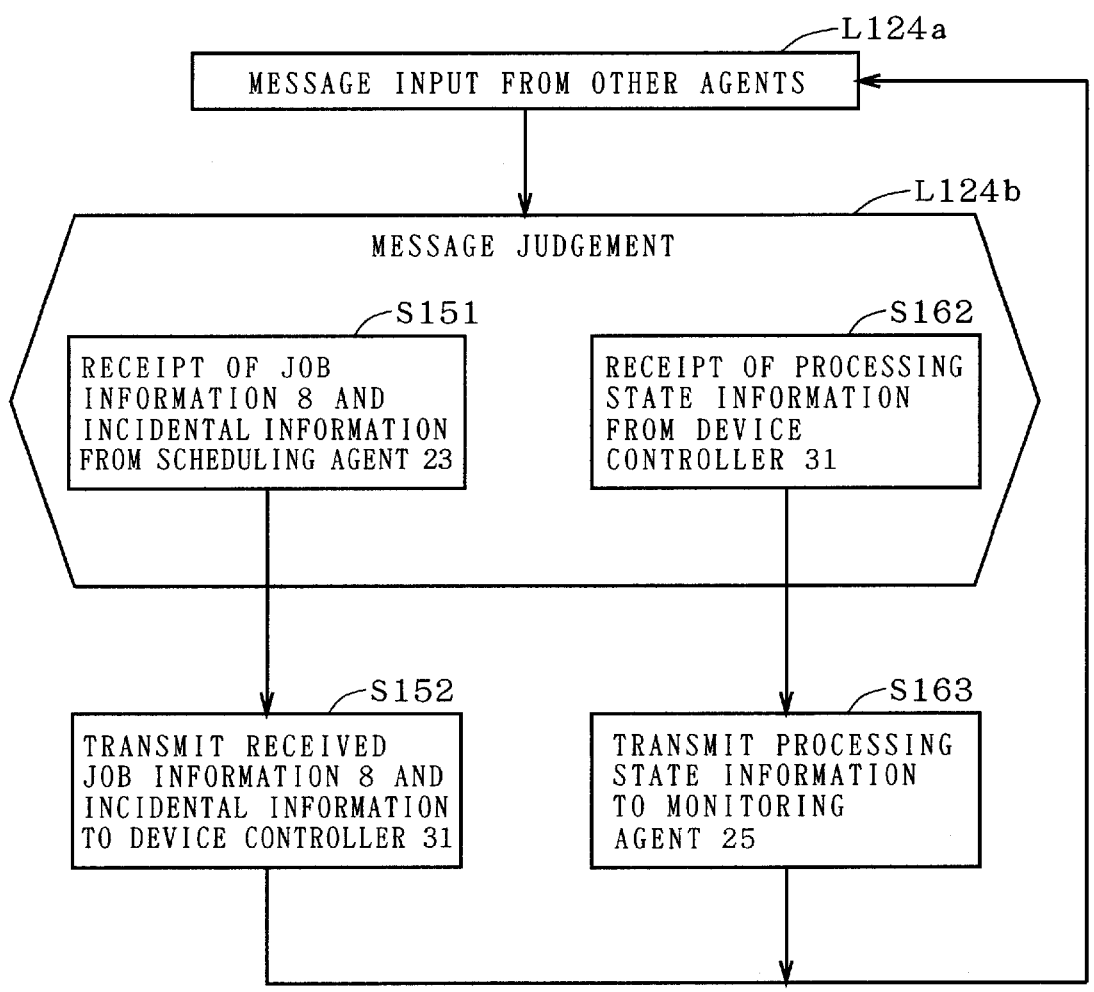
FIG. 43 is a flowchart showing the operation of the control agent.

FIG. 43 is a flowchart showing the operation of the control agent 24. In the control agent 24, the judgement of the message (step L124b) in response to the message input from other agents (step L124a) and the response to the message are performed in a cyclic manner, as will be described below.

Upon receipt of the piece of job information 8 and the incidental information from the scheduling agent 23 (step S151), the control agent 24 transmits the piece of job information 8 and the incidental information to the device controller 31 (step S152).

Upon receipt of the processing state information from the device controller 31 (step S162), the control agent 24 transmits the processing state information to the monitoring agent 25 (step S163).

<1.4(f) Operation Flow in Monitoring Agent>

Figure 44:
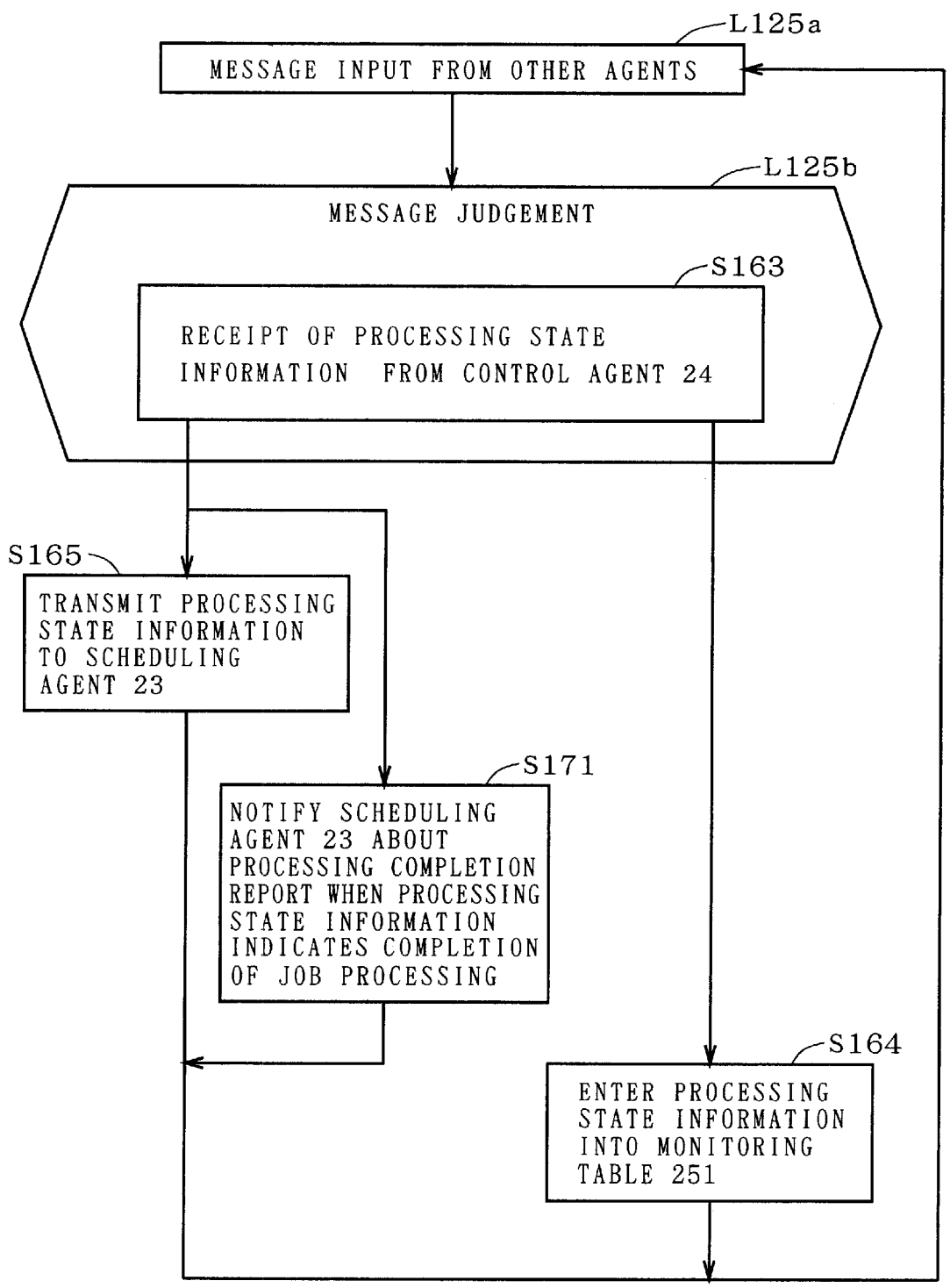
FIG. 44 is a flowchart showing the operation of a monitoring agent.

FIG. 44 is a flowchart showing the operation of the monitoring agent 25. In the monitoring agent 25, the judgement of the message (step L125b) in response to the message input from other agents (step L125a) and the response to the message are performed in a cyclic manner, as will be described below.

Upon receipt of the processing state information from the control agent 24 (step S163), the monitoring agent 25 separates the processing state information into units to be processed each having a predetermined amount of information to transmit the separated processing state information to the scheduling agent 23 (step S165). If the processing state information indicates the completion of the job processing, the monitoring agent 25 notifies the scheduling agent 23 about the processing completion report (step S171).

The monitoring agent 25 sequentially enters the processing state information from the control agent 24 into the monitoring table (detailed) 251 (step S164).

<1.5 Summary>

The system 100 according to the first preferred embodiment of the present invention has been described hereinabove. The system 100 is constructed such that at least one job-handling agent system 20 is connected through the LAN 40 to the single input agent system 10, with the or each job-handling agent system 20 corresponding to the single apparatus 30.

The input agent system 10 and the job-handling agent system 20 operate using the agents which are autonomous programs as main elements. The input agent system 10 and the job-handling agent system 20 themselves also autonomously operate.

In this system 100, the input agent system 10 does not bear the burden of all operations for managing the apparatus 30, but the job-handling agent system 20 is adapted to execute many parts of the operations. Specifically, the or each individual job-handling agent system 20 connected to the associated apparatus 30 autonomously judges on which piece of job information 8 the processing of the apparatus 30 may be based, which piece of job information 8 is payable, and whether or not the piece of job information 8 is registerable on the subsequent processing schedule.

Therefore, the input agent system 10 is required neither to seize the characteristics and schedules of the apparatuses 30 nor to execute a huge amount of complicated computation.

This prevents the input agent system 10 from becoming incapable of calculation and incapable of best distributing jobs if more apparatuses 30 are to be managed. As a result, production efficiency is enhanced.

For making the most of the autonomous properties of the job-handling agent system 20, if trouble occurs in the input agent system 10, the job-handling agent system 20 may only stop providing communication with the input agent system 10 but autonomously continue directing the apparatus 30 to process the jobs. Such operations enable the construction of the system 100 which is less susceptible to the influences of the stop of the input agent system 10.

In the system 100, only some pieces of job information 8 which satisfy the predetermined choice conditions among the pieces of job information 8 inputted to the input agent system 10 are stored in the job list table 13. This provides the previous reduction in the number of pieces of job information 8 to be handled, to reduce the burdens on the input agent system 10 and the job-handling agent system 20, thereby achieving efficient management of the job information 8. Further, since the choice conditions are previously transmitted from the job-handling agent systems 20 to the input agent system 10, the input agent system 10 may appropriately choose the pieces of job information 8 suitable for any one of the apparatuses 30.

The system 100 has been described hereinabove according to the first preferred embodiment of the present invention. The apparatus 30 to be managed by the system 100 is not limited to the machining apparatus. Additionally, various modifications, addition and elimination may be made to the detailed parts of the functions of the agents and the contents of the databases in accordance with the operating modes of the apparatus 30 and the formats of the job information 8. The same is true for subsequent preferred embodiments.

2. Second Preferred Embodiment

Figure 45:
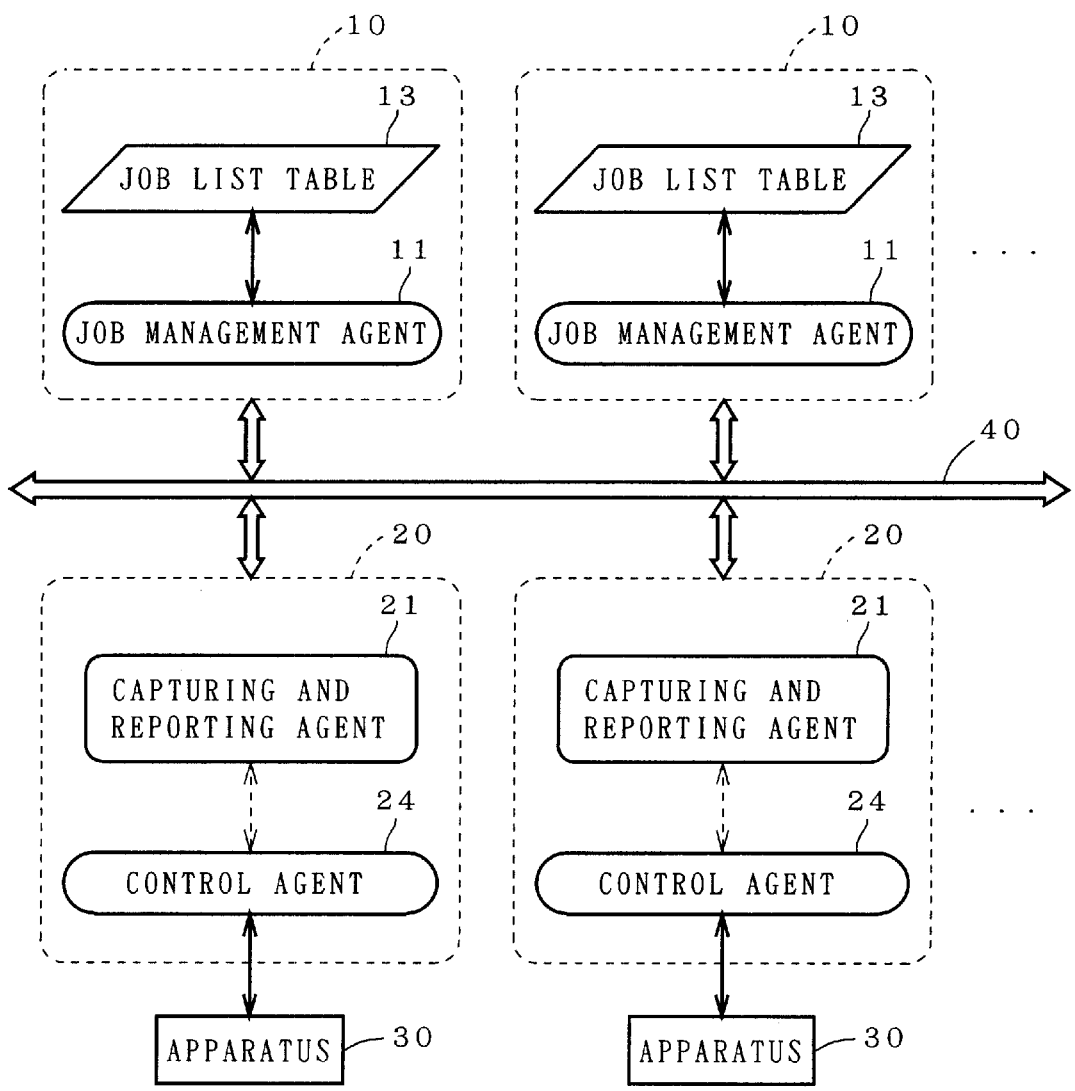
FIG. 45 shows the configuration of the system for managing the job information according to second and fifth preferred embodiments of the present invention.

FIG. 45 schematically shows the configuration of a system 200 for managing jobs according to a second preferred embodiment of the present invention. The system 200 differs from the system 100 of the first preferred embodiment in that a plurality of input agent systems 10 are connected to the LAN 40. The input agent systems 10 and job-handling agent systems 20 of the second preferred embodiment are generally similar in operation to those of the first preferred embodiment.

As described in the first preferred embodiment, the input agent systems 10 and the job-handling agent systems 20 have autonomous properties. Thus, the combination of the input agent systems 10 and the job-handling agent systems 20 is not limited to a one-to-one or one-to-plural relationship but may be in a plural-to-plural relationship.

When a plurality of input agent systems 10 and a plurality of job-handling agent systems 20 are provided, the capturing and reporting agent 21 of each of the job-handling agent systems 20 captures an unprocessed piece of job information 8 from the job list table 13 of any one of the input agent systems 10. For capture of the piece of job information 8, the capturing and reporting agent 21 is not always required to make a request to a particular input agent system 10 for the piece of job information 8, but an input agent system 10 (the job management agent 11) that responds first to the request for the piece of job information 8 may transmit the piece of job information 8.

The subsequent operations of the capturing and reporting agent 21 having received the piece of job information 8 are completely identical with those of the first preferred embodiment.

Thus, the system 200 of the second preferred embodiment may comprise a plurality of input agent systems 10 and a plurality of job-handling agent systems 20 since the input agent systems 10 and the job-handling agent systems 20 have the autonomous properties. The plurality of input agent systems 10 can efficiently manage a great amount of job information 8, and each of the job-handling agent systems 20 autonomously evaluates and selects a piece of job information 8 to register the piece of job information 8 on the processing schedule, significantly reducing the burdens on the input agent systems 10. Consequently, the efficiency of the job processing may be sufficiently enhanced.

Further, since the system 200 comprises the plurality of input agent systems 10, trouble, if any, in any input agent system 10 has little effect on the operations of the job-handling agent systems 20 having the autonomous properties. That is, the job-handling agent systems 20 may communicate with a normally functioning input agent system 10 to continue their operations.

3. Third Preferred Embodiment

Figure 46:
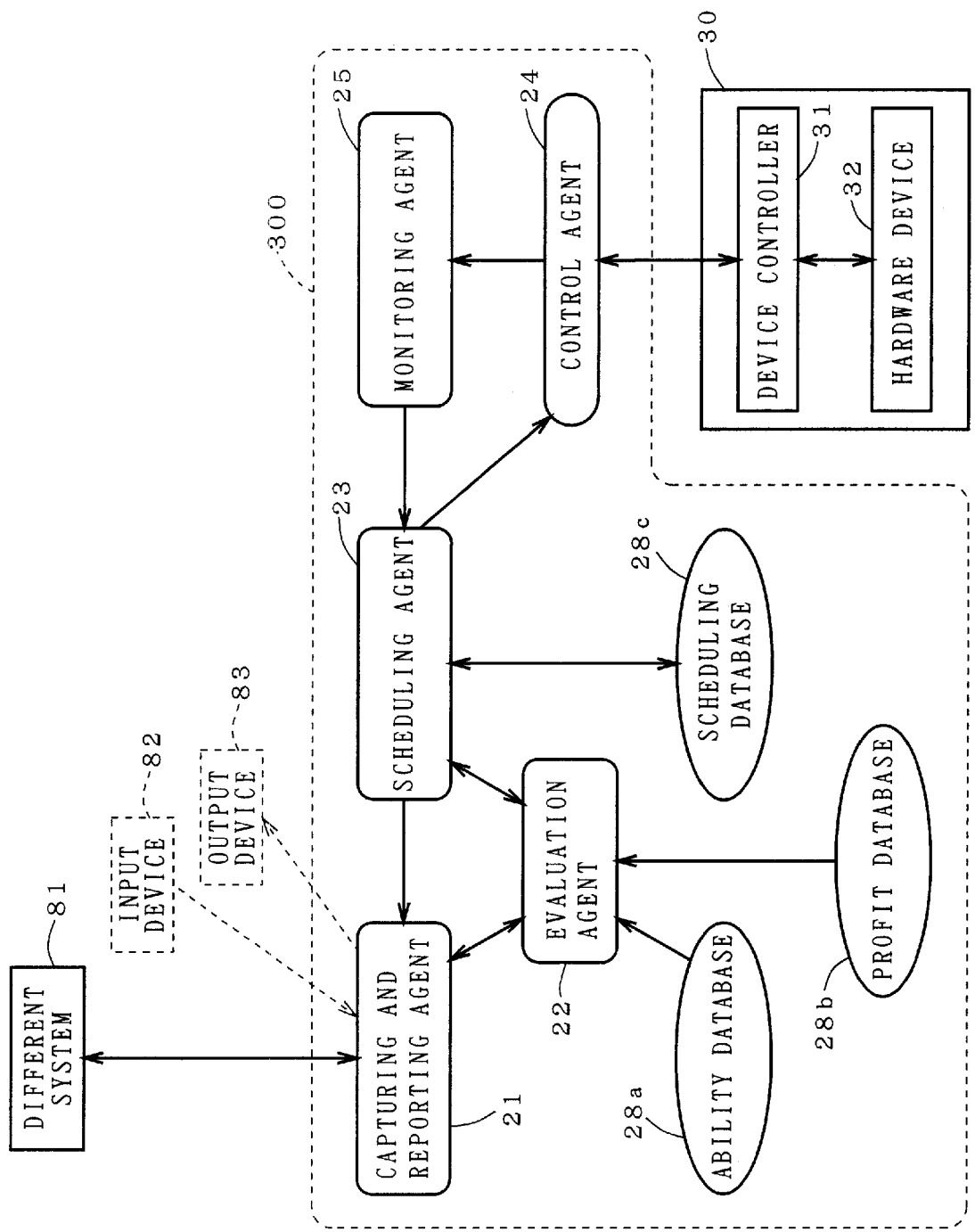
FIG. 46 shows the configuration of the system for managing the job information according to a third preferred embodiment of the present invention.

FIG. 46 shows the configuration of a system 300 for managing jobs according to a third preferred embodiment of the present invention. As shown in FIG. 46, the system 300 is intended to use the autonomous job-handling agent system 20 of the first preferred embodiment by itself for management of the jobs, and is generally similar in configuration to the job-handling agent system 20 of the first preferred embodiment. Like reference characters and names are used to designate agents and the like which are generally similar in function to those of the first preferred embodiment.

The system 300 autonomously evaluates a piece of job information 8 inputted from the exterior to register the piece of job information 8 onto the processing schedule. Of course, a different system 81 or an operator who manages job information 8 may input the piece of job information 8 to the system 300.

For the input of the piece of job information 8 from the different system 81 to the system 300, the capturing and reporting agent 21 requests the different system 81 to capture the job and reports the processing state to the different system 81 as in the first preferred embodiment. Therefore, the operations of the system 300 are completely identical with those of the job-handling agent system 20 of the first preferred embodiment.

For the input of the piece of job information 8 to the system 300 by the operator using an input device 82 such as a keyboard, the capturing and reporting agent 21 outputs the processing state of a job to an output device 83 such as a display to report the processing state to the operator. Although the capturing and reporting agent 21 of the first preferred embodiment requests the job management agent 11 to enter various reports into the job list table 13, the system 300 of the third preferred embodiment outputs these reports to the output device 83.

The system 300 conducts the above described three-stage evaluation upon the piece of job information 8 inputted thereto. If the evaluation provides a positive result, the system 300 autonomously registers the piece of job information 8 on the processing schedule. If the evaluation provides a negative result, the system 300 notifies the different system 81 or the output device 83 about the rejection of the processing. Therefore, the different system 81 and the operator need not seize the ability of the apparatus, the costs required for the job processing, and the processing schedule, but can rapidly input the piece of job information 8 to the system 300 and also cause suitable job processing.

Furthermore, the registration of the piece of job information 8 on the processing schedule, the update of the processing schedule based on the job processing state, the monitoring of the job processing, and the calculation of the track record of the job processing are executed autonomously and hence are not required to be carried out in a centralized manner. Consequently, the different system 81 and the operator need not consider the correction of the processing schedule during the input of the piece of job information. The burdens of the monitoring of the job processing are also reduced.

As described hereinabove, the sole use of the autonomous job-handling agent system 20 of the first preferred embodiment by itself as the system 300 for managing jobs reduces the burdens on the different system 81 and the operator, achieving the enhancement of the productivity of the apparatus 30.

4. Fourth Preferred Embodiment

<4.1 Outline of System>

Figure 47:
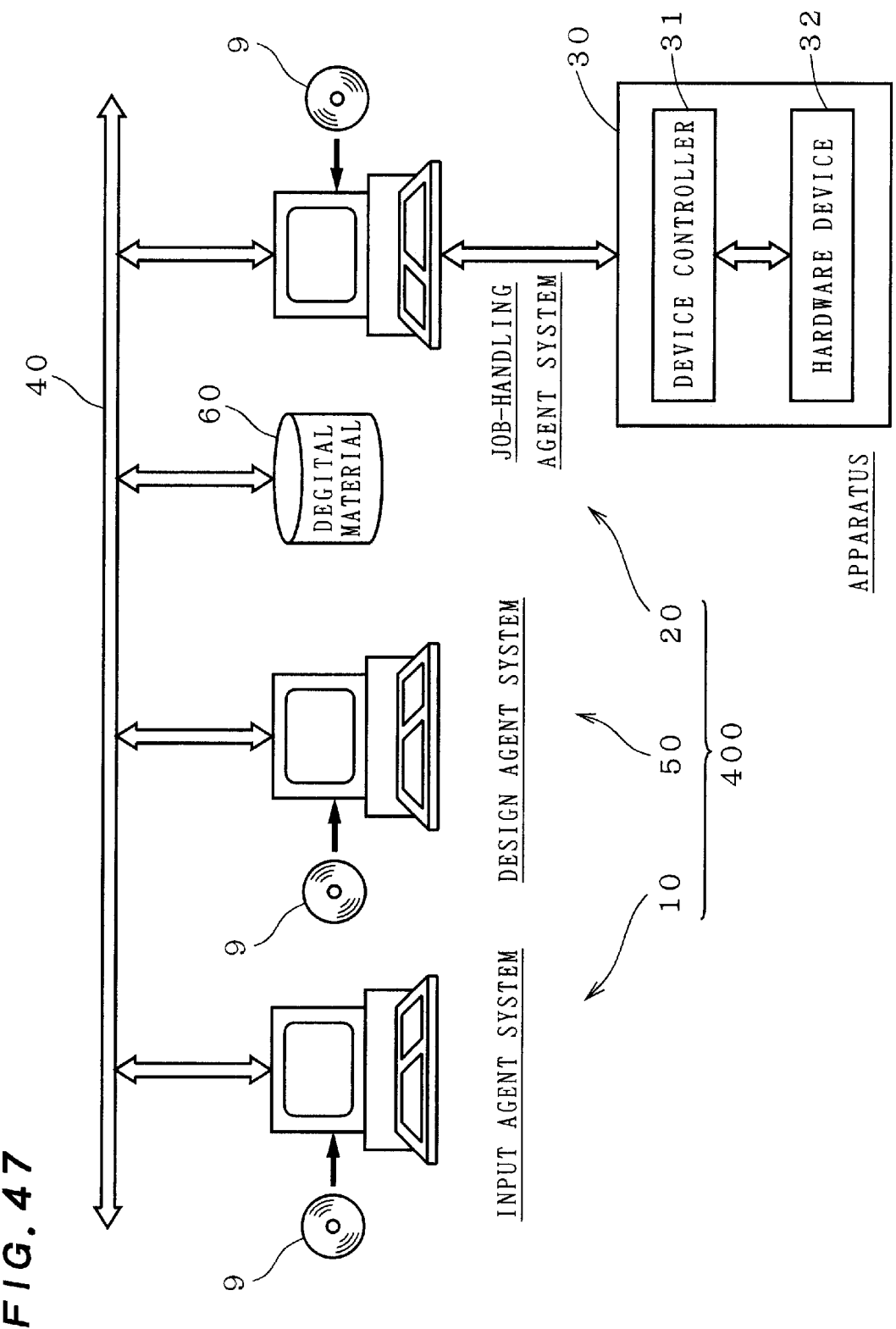
FIG. 47 shows the configuration of the system for managing the job information according to a fourth preferred embodiment of the present invention.

FIG. 47 shows the configuration of a system 400 for managing jobs according to a fourth preferred embodiment of the present invention. The system 400 is a system for processing digital information such as image data and character data based on a job information input and for managing the operation of the apparatus 30 for making printing plates. Like reference characters are used to designate components which are similar in function to those of the first preferred embodiment.

In this system 400, the input agent system 10 comprehensively transfers the job information to the job-handling agent system 20. The apparatus 30 for actually processing the plate making is also shown in FIG. 47.

The system 400 generally comprises the input agent system 10, and the job-handling agent system 20. The input agent system 10 and the job-handling agent system 20 are connected to each other through the LAN 40 for communication of information. Although the single job-handling agent system 20 is shown in FIG. 47 as connected to the LAN 40, a plurality of job-handling agent systems 20 the number of which equals the number of external apparatuses 30 managed by the input agent system 10 are actually connected to the LAN 40 so that the apparatuses 30 and the job-handling agent systems 20 are connected in a one-to-one relationship.

To the LAN 40 are also connected a design agent system 50 for previously determining a print layout of image data, character data, and the like, and a dedicated fixed disk device 60 for storing therein digital information (referred to hereinafter as "digital materials") such as practical image data and character data.

Each of the input agent system 10, the design agent system 50 and the job-handling agent system 20 has an internal configuration wherein agents which are programs that execute autonomous judgement and processing are used as main elements. The input agent system 10, the design agent system 50 and the job-handling agent system 20 themselves, each of which functions as a set of agents, also have the function as agents that execute autonomous judgement and processing. In other words, the agent systems themselves as well as the agents that are programs constituting each agent system have autonomous properties.

The input agent system 10 functions to store therein pieces of job information transmitted thereto through the LAN 40, or is adapted to comprehensively hold information on jobs to be processed in an area of a factory in which the apparatus 30 is installed and information on jobs being processed. It should be noted that the input agent system 10 is adapted to previously simply choose some pieces of job information to be handled among the pieces of job information inputted thereto so as to efficiently manage the job information by the reduction of the number of pieces of job information to be handled.

The job-handling agent system 20 processes digital materials based on the job information as well as controls the entire operations of the apparatus 30, and also functions to select and capture information on a job to be processed among the pieces of job information stored in the input agent system 10. Thus, in the system 400, the job-handling agent system 20, not the input agent system 10, determines which job-handling agent systems 20 and apparatuses 30 are to process which jobs. As a result, the input agent system 10 need not perform a huge amount of complicated information processing including seizing the characteristics and processing states of all apparatuses and judging which job-handling agent systems 20 and apparatuses 30 are to process which jobs. This achieves the reduction in burdens upon the input agent system 10.

The job-handling agent system 20 also functions to control the actual operations of the apparatus 30 as above described after converting the digital materials into raster data which the apparatus 30 is capable of handling. More specifically, the job-handling agent system 20 sends the job information indicative of processing contents and the processed digital materials to the device controller 31 in the apparatus 30, and the device controller 31 then sends a control signal to the hardware device 32 such as a motor and a laser in the apparatus 30 based on the received information. Although a pair of device controller 31 and hardware device 32 are shown in FIG. 47, the apparatus 30 typically comprises a plurality of device controllers 31 and a plurality of hardware devices 32 in practice. In some cases, one device controller 31 cooperates with a plurality of hardware devices 32. With such an arrangement, the plurality of hardware devices 32 are connected to the single device controller 31.

In FIG. 47, computer systems (referred to simply as "computers" hereinafter) are shown as used as the input agent system 10 and the job-handling agent system 20. In this case, programs for causing these computers to perform job processing and management operations to be described later are previously read into these computers via recording media 9 such as a magnetic disk, an optical disk, a magneto-optical disk, and a magnetic tape, or LAN 40. The input agent system 10 and the job-handling agent system 20 are not always required to use computers, but may be constructed as dedicated information processing devices. In particular, the job-handling agent system 20 which is provided in association with each apparatus 30 may be incorporated together with the device controller 31 and the like on a single board as an electric circuit. This allows the job-handling agent systems 20 to be located within the apparatuses 30 to provide an aesthetically pleasant and orderly arrangement of the apparatuses 30 in the factory and to render compact and protect the job-handling agent systems 20. The input agent system 10 and the job-handling agent systems 20 need not transmit information through the LAN 40 but may be connected directly to each other.

The configuration of the system 400 according to the present invention has been briefly described above. The configuration and operation of the system 400 will be described in detail hereinafter.

<4.2 System Configuration>

Figure 48:
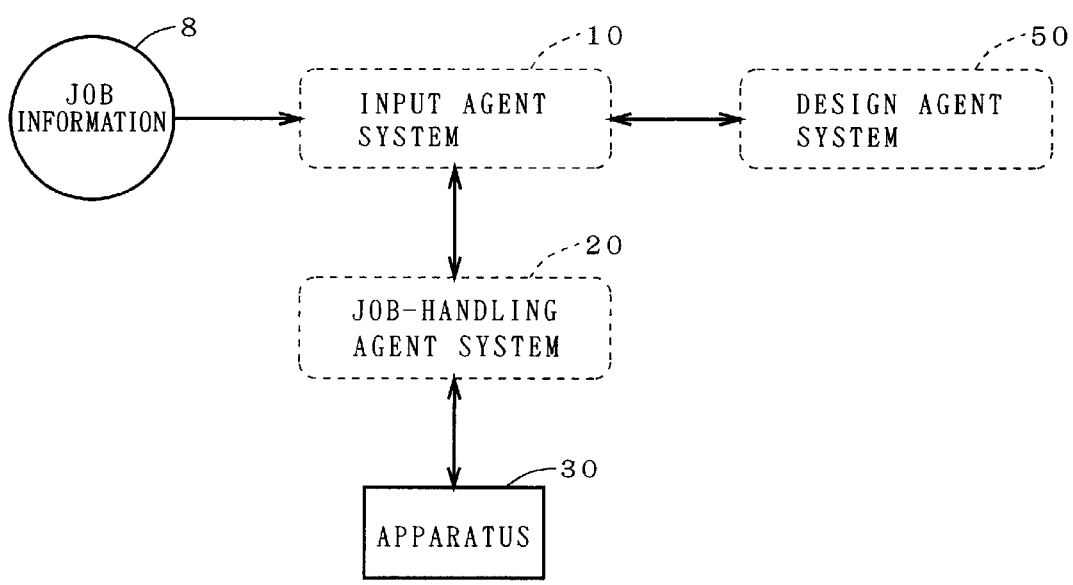
FIG. 48 schematically shows the relation of the configuration of the system of the fourth preferred embodiment.
Figure 49:
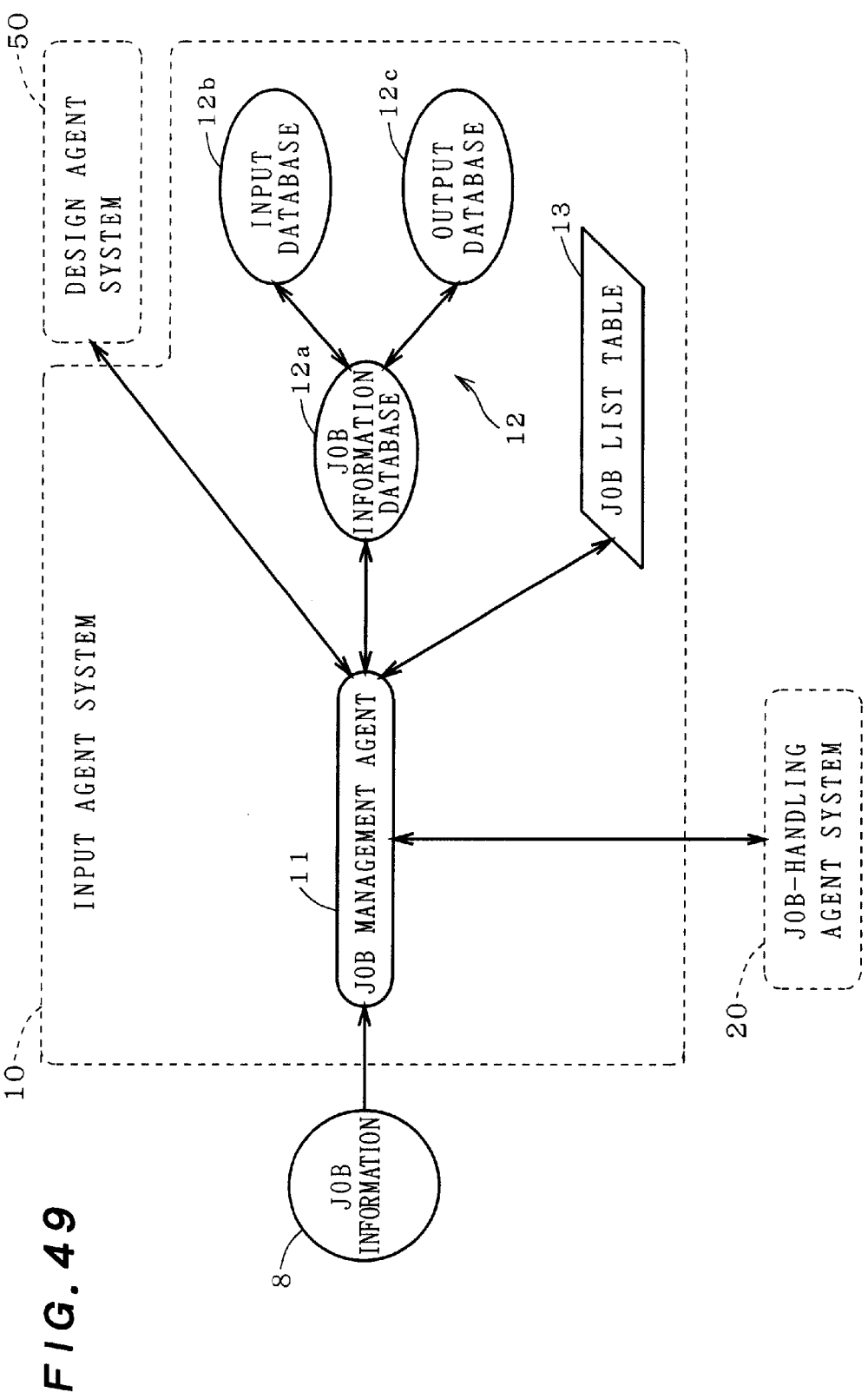
FIG. 49 shows the configuration of the input agent system.
Figure 50:
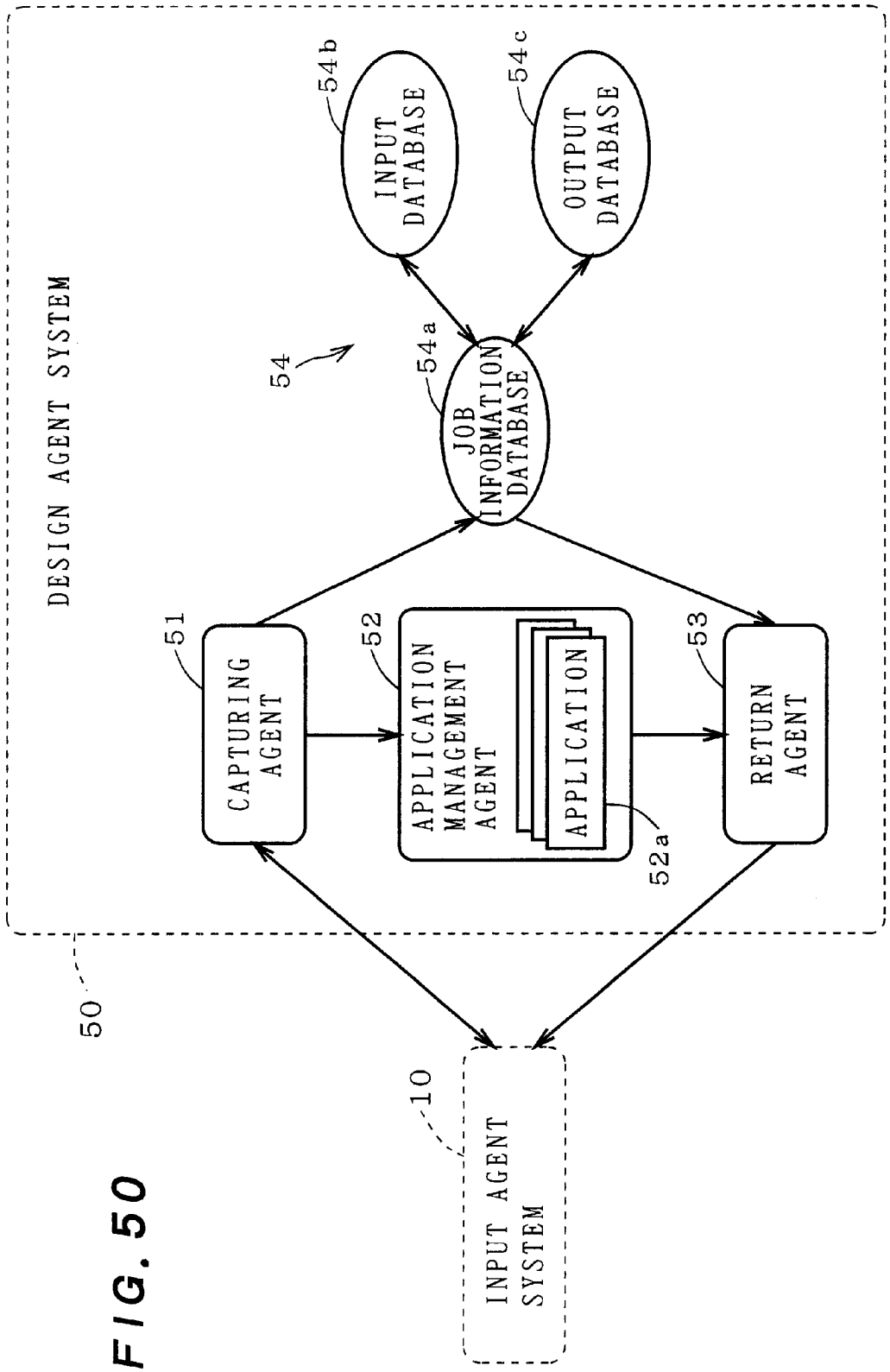
FIG. 50 shows the configuration of a design agent system.
Figure 51:
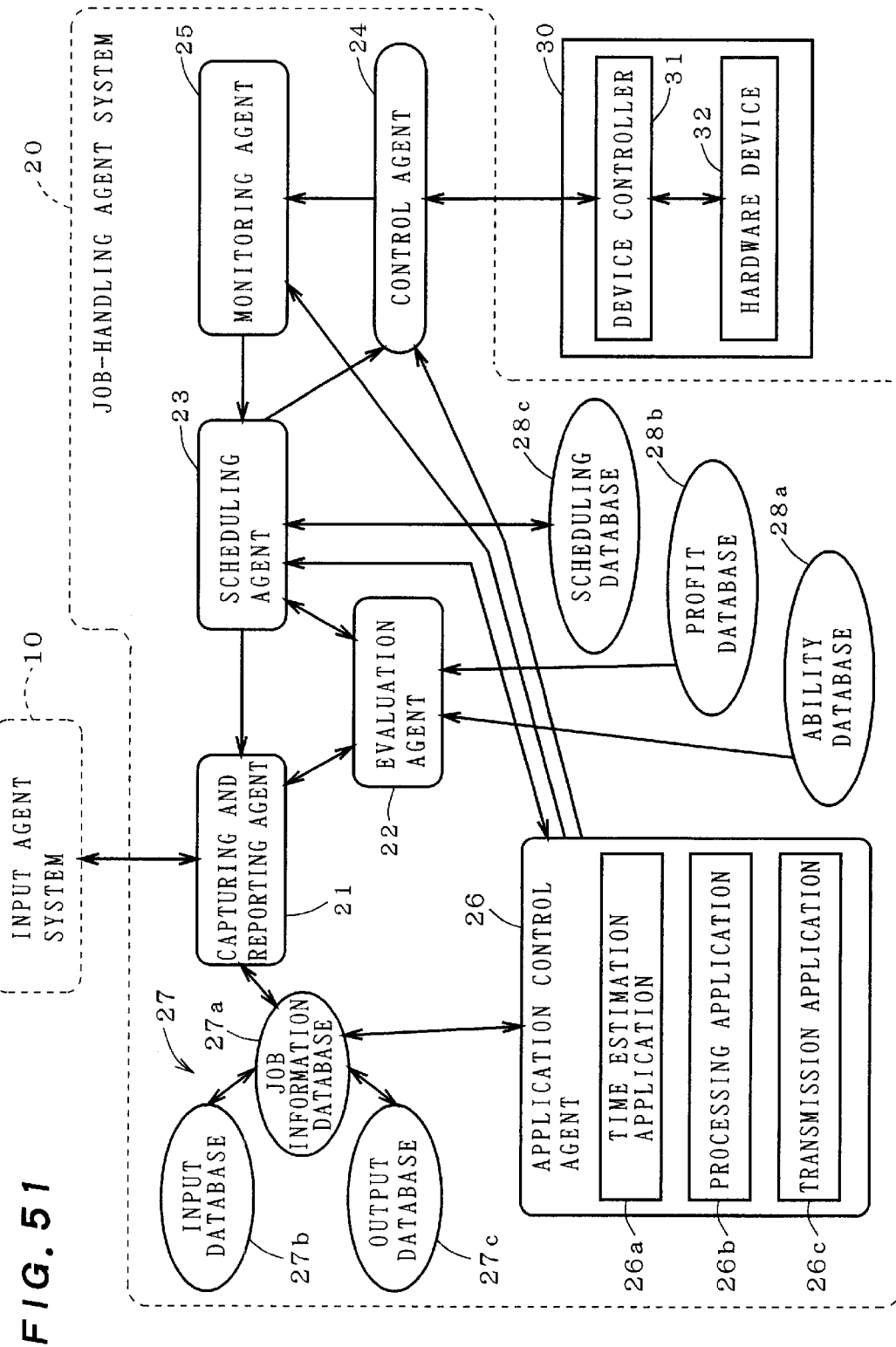
FIG. 51 shows the configuration of the job-handling agent system.

FIG. 48 shows the relationship between the input agent system 10, the design agent system 50 and the job-handling agent system 20 in the system 400, with attention focused on flows of information. FIGS. 49, 50 and 51 show the configurations (using the agents as main elements) of the input agent system 10, the design agent system 50, and the job-handling agent system 20 respectively, and flows of information. The fourth preferred embodiment employs the computers as the input agent system 10, the design agent system 50 and the job-handling agent system 20 as shown in FIG. 47. With such hardware arrangement, the components whose operations are a focus of attention as shown in FIGS. 49 through 51 correspond in practice to programs and storage means which operate on the computers.

<4.2(a) Configuration of Input Agent System>

Referring to FIG. 49, the input agent system 10 stores and chooses pieces of job information 8 inputted thereto, and comprises a job management agent 11, a job database 12, and a job list table 13.

The job management agent 11 is a program that operates on a computer, and functions to handle the pieces of job information 8 and the like inputted to the input agent system 10. As described above, the agent is an autonomous program which itself makes a judgement to execute processing, and is adapted to autonomously operate while making contact with other agents in response to requests from an operator and other agents.

The job database 12 is storage means, such as a fixed disk device, for storing through the job management agent 11 therein the pieces of job information 8 inputted via the LAN 40 to the input agent system 10. In other words, all of the pieces of job information 8 inputted to the input agent system 10 are once stored in the job database 12.

The job database 12 includes a job information database 12a for storing the attributes of the job information, an input database 12b for storing the information on the digital materials which have not yet been subjected to pre-processing to be described later, and an output database 12c for storing the information on the digital materials which have been subjected to the pre-processing. These databases 12a to 12c are linked to each other for each piece of job information 8. These databases 12a to 12c may be stored in individual storage devices or in a single storage device, or stored in the same storage device that stores other job databases 54 and 27 to be described later. The databases may be stored in any type and form of storage device.

The job list table 13 is storage means, such as a RAM, for temporarily copying and storing some pieces of job information 8 which satisfy predetermined conditions among the pieces of job information 8 stored in the job database 12. The copying of the pieces of job information 8 from the job database 12 to the job list table 13 is executed by the operation of the job management agent 11. The pieces of job information 8 stored in the job list table 13 are capturable by the design agent system 50 and the job-handling agent system 20 through the LAN 40.

<4.2(b) Configuration of Design Agent System>

The design agent system 50 performs pre-processing on the digital materials, such as image data, character data, and line drawing data, which are stored in the fixed disk device 60. More specifically, an operator determines the layout and tints of the respective digital materials through applications for various design simulations, and the design agent system 50 functions to determine the procedure of the processing of the digital materials which are to be digitally processed during the actual plate making. The processing of the digital materials in digital form is referred to hereinafter as "digital processing."

With reference to FIG. 50, the design agent system 50 comprises a capturing agent 51, an application management agent 52, a return agent 53, and a job database 54.

The capturing agent 51 autonomously captures a piece of job information 8 from the job list table 13 of the input agent system 10. In other words, the design agent system 50 captures the piece of job information 8 without the intervention of the judgement of the input agent system 10. The captured piece of job information 8 is stored in the job database 54.

The application management agent 52 manages the operations of applications 52a for determining the procedure of the digital processing of the digital materials. An example of the applications 52a includes an application for determining the layout and tints of the digital materials during the plate making (printing) by way of an operator. The determined digital processing procedure is added to the piece of job information 8 stored in the job database 54.

The return agent 53 reads the piece of job information 8 including the digital processing procedure determined by the application management agent 52 from the job database 54 to return the piece of job information 8 to the input agent system 10.

The job database 54 includes a job information database 54a for storing the attributes of the job information, an input database 54b for storing the information on the digital materials which have not yet been subjected to the pre-processing, and an output database 54c for storing the information on the digital materials which have been subjected to the pre-processing. These databases 54a to 54c are linked to each other for each piece of job information 8.

The system 400 is adapted such that the procedure of the digital processing of the digital materials is determined in the design agent system 50 and is stored in the output database 54c, and such that the job-handling agent system 20 to be described later executes the digital processing on the digital materials based on the digital processing procedure immediately before controlling the plate making apparatus. However, depending on the processing contents, the digital processing may be completed in the design agent system 50. In this case, the job-handling agent system 20 transmits the digital materials having been digitally processed as they are to the apparatus 30, and the output database 54c stores the file names of the digital materials having been digitally processed and the like.

<4.2(c) Configuration of Job-Handling Agent System>

The job-handling agent system 20 functions to select and capture pieces of job information 8 stored in the job list table 13 and to digitally process the digital materials based on the pieces of job information 8 and thereafter control the operation of the apparatus 30. With reference to FIG. 51, the job-handling agent system 20 comprises agents including a capturing and reporting agent 21, an evaluation agent 22, a scheduling agent 23, a control agent 24, a monitoring agent 25, and an application control agent 26. The job-handling agent system 20 further comprises a job database 27 for storing a piece of job information 8, and an ability database 28a, a profit database 28b and a scheduling database 28c which are included in a fixed disk device and the like for storing information used by the agents.

The job database 27 includes a job information database 27a for storing the attributes of the job information, an input database 27b for storing the information on the digital materials which have not yet been subjected to the pre-processing, and an output database 27c for storing the information on the digital materials which have been subjected to the pre-processing. The job database 27 is similar in construction to the job databases 12 and 54. The ability database 28a stores ability information indicative of types of jobs handleable by the apparatus 30. The profit database 28b stores profit information for use in cost accounting for the job processing. The scheduling database 28c stores scheduling information indicative of the schedules of the jobs to be processed.

The capturing and reporting agent 21, which serves as a contact of the job-handling agent system 20 in communicating with the exterior, requests the job management agent 11 to capture pieces of job information 8 stored in the job list table 13 and reports a job processing state in the apparatus 30 to the job management agent 11. The contact between the capturing and reporting agent 21 and the job management agent 11 is made via the LAN 40. Although the capturing and reporting agent 21 is illustrated in the description below as making a request to the job management agent 11 to thereby capture pieces of information stored in the job list table 13 and to enter pieces of information into the job list table 13, the capturing and reporting agent 21 may capture the pieces of information directly from the job list table 13 and enter the pieces of information directly on the job list table 13, not through the job management agent 11, for the purpose of more rapid processing.

The evaluation agent 22 functions to evaluate whether or not a piece of job information 8 captured by the capturing and reporting agent 21 is actually processable. More specifically, the evaluation agent 22 evaluates whether or not the captured piece of job information 8 is the information on a job that the application control agent 26 and the apparatus 30 can process based on the ability information and profit information, and whether or not the captured piece of job information 8 is the information on a job that is expected to produce an economic profit. The evaluation agent 22 requests the scheduling agent 23 to be described below to evaluate whether or not an objective job to be evaluated is registerable on a processing schedule of the apparatus 30.

The scheduling agent 23 is an agent for managing the processing schedule and the like of the jobs to be processed by the application control agent 26 and the apparatus 30. The scheduling agent 23 evaluates whether or not a new piece of job information captured by the capturing and reporting agent 21 is processable by a delivery date, registers an objective piece of job information on the processing schedule which is part of the scheduling information, and provides the information on a job to be processed to the control agent 24 to be described below.

The control agent 24 is an agent for actually controlling the operation of the apparatus 30, and provides the digital materials having been digitally processed (referred to hereinafter as "output data") and the like to the device controller 31 of the apparatus 30.

The monitoring agent 25 receives processing state information on the processing of a job in the apparatus 30 through the control agent 24 to request the scheduling agent 23 to record the processing state information.

The application control agent 26 controls the operations of various applications. More specifically, the application control agent 26 uses a time estimation application 26a to estimate the time required to process the digital materials and the like, uses a processing application 26b to process the digital materials in accordance with the digital processing procedure of the job information 8, and uses a transmission application 26c to transmit the processed digital materials which are output data to the control agent 24.

Although the various applications are shown in FIG. 51 as included in the application control agent 26, only the applications may be executed by another computer. In this case, the applications are not included in the job-handling agent system 20. In other words, the applications for processing the digital materials may be provided anywhere so far as the application control agent 26 controls its associated applications.

<4.2(d) Others>

The configurations of the input agent system 10, the job-handling agent system 20 and the design agent system 50 using the agents as the main elements have been described. Then, the relationship with the apparatus 30 will be described below.

The apparatus 30 shown in FIG. 51 is assumed to be a plate making apparatus for making printing plates using a laser directed onto a photoconductive drum. FIG. 51 conceptually illustrates the configuration which uses the device controller 31 to operate the hardware device 32 such as a motor. Although the single device controller 31 is shown in FIG. 51, the apparatus 30 may comprise a plurality of device controllers 31. In this case, the hardware device 32 is connected to a device controller 31 which sends a control signal to the hardware device 32. Although the device controllers 31 and hardware devices 32 are in a one-to-one relationship as a general rule, one device controller 31 may control a plurality of hardware devices 32.

As described hereinabove, the input agent system 10 and the job-handling agent system(s) 20 are connected through the LAN 40 in a one-to-one or one-to-plural relationship, and the job-handling agent systems 20 and the apparatuses 30 are in a one-to-one relationship. The job-handling agent systems 20 and the device controllers 31 are in a one-to-one or one-to-plural relationship, and the device controllers 31 and the hardware devices 32 are in a one-to-one or one-to-plural relationship. Further, the system 400 may comprise a plurality of design agent systems 50 associated with respective processing contents. The input agent system 10 and the design agent systems 50 may be in a one-to-plural relationship.

These relationships are assumed for purposes of illustration of this preferred embodiment, and all may be plural-to-plural relationships in practice.

<4.2(e) Hardware Configuration of System>

Figure 53:
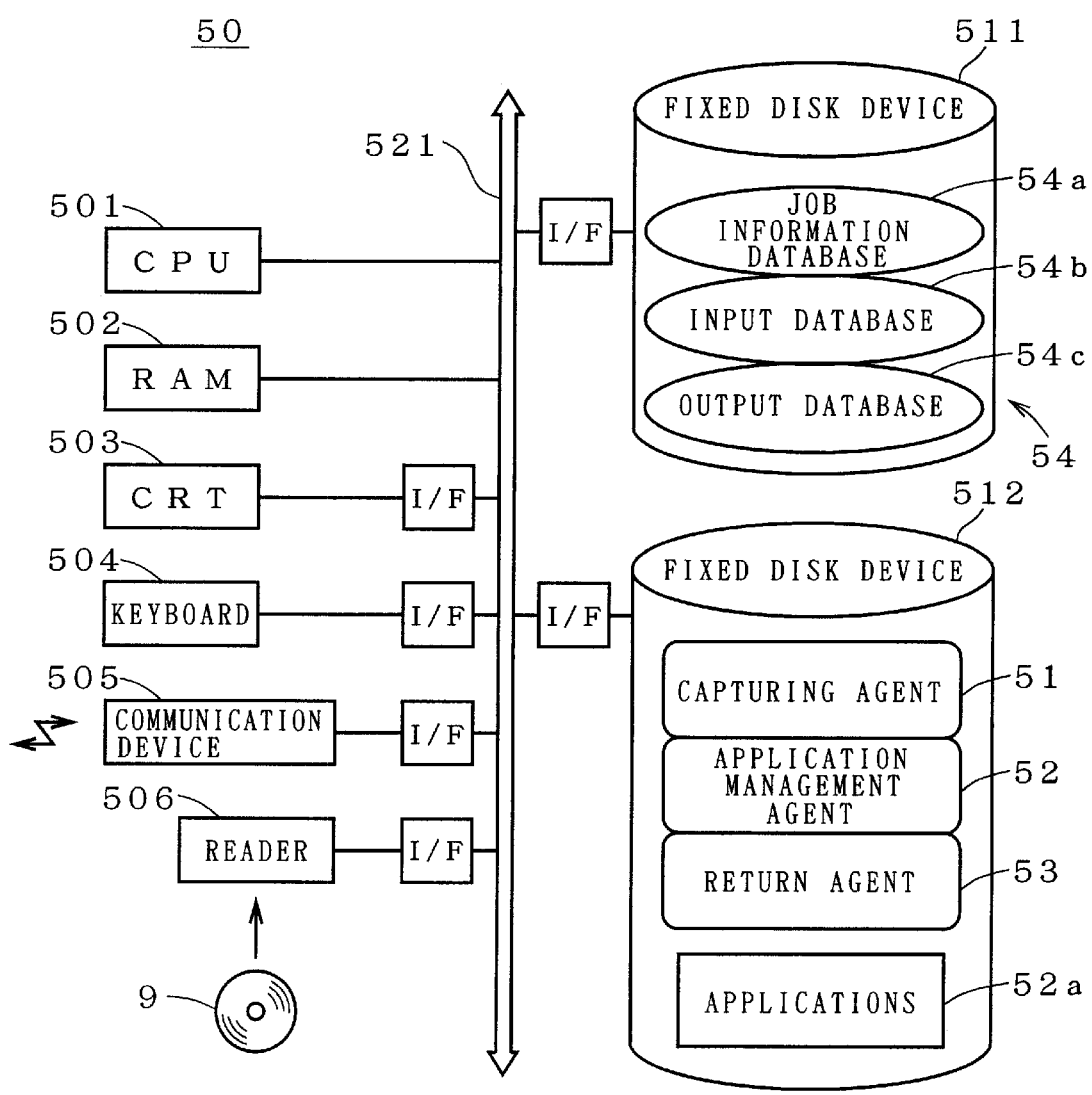
FIG. 53 shows a hardware configuration of the design agent system.
Figure 54:
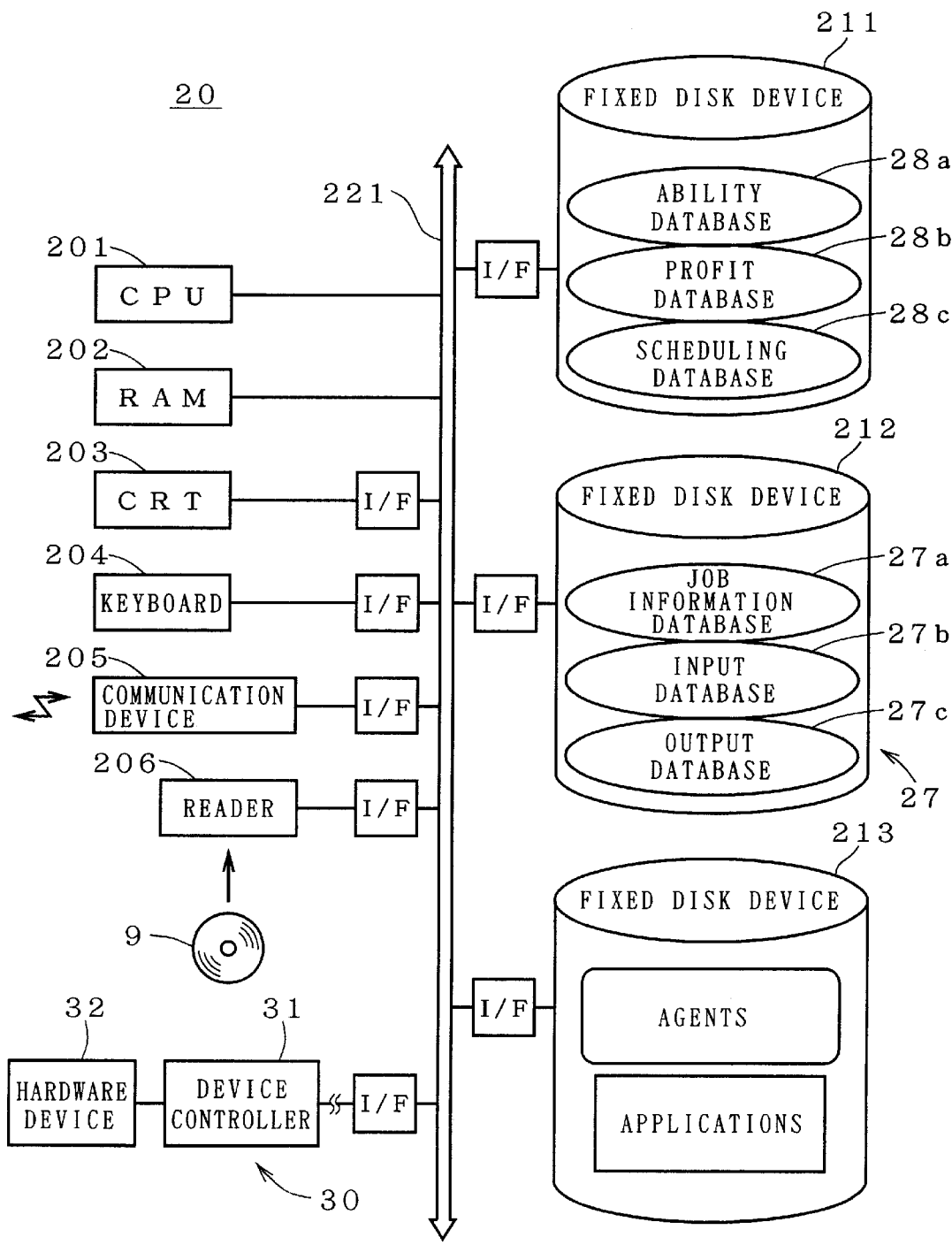
FIG. 54 shows a hardware configuration of the job-handling agent system.

While the configuration of the system 400 using the agents as the main elements is shown in FIGS. 49 through 51 with attention focused on the operation of the system 400, the hardware configuration of the system 400 shown in FIG. 47 which employs the computers connected to the LAN 40 is shown in FIGS. 52 through 54.

FIG. 52 shows an internal configuration of the computer for the input agent system 10 wherein a CPU 101 for executing the processing of the computer, a RAM 102 serving as a work area of the processing, a CRT 103 and a keyboard 104 for input and output operations for the operator, a communication device 105 for communicating with the LAN 40, a reader 106 for reading the recording medium 9, and two fixed disk devices 111 and 112 for storing the job management agent 11 and the job database 12 are connected to a bus line 121, for example, through interfaces (I/F) as required. Part of the RAM 102 serving as the work area is the job list table 13.

When the computer is used as the input agent system 10, the agents which are programs are previously read from the recording medium 9 through the reader 106, and the pieces of job information 8 to be stored in the job database 12 are received from the LAN 40 through the communication device 105.

It should be noted that the job management agent 11, the job database 12 and the job list table 13 may be stored in any storage device which is freely readable and writable, and need not be stored in separate storage devices.

FIG. 53 shows an internal configuration of the computer for the design agent system 50 wherein a CPU 501 for executing the processing of the computer, a RAM 502 serving as a work area of the processing, a CRT 503 and a keyboard 504 for input and output operations for the operator, a communication device 505 for communicating with the LAN 40, a reader 506 for reading the recording medium 9, and two fixed disk devices 511 and 512 for storing various agents and various databases are connected to a bus line 521, for example, through interfaces (I/F) as required.

When the operator performs the pre-processing using the computer of the design agent system 50, the application management agent 52 executes various applications, and the operator operates using the keyboard 504 and the like while viewing the CRT 503.

When the computer is used as the design agent system 50, the agents which are programs are previously read from the recording medium 9 through the reader 506, and the pieces of job information 8 to be stored in the job database 54 are received from the LAN 40 through the communication device 505.

It should be noted that the various agents and various databases may be stored in any storage device which is freely readable and writable, and need not be stored in separate storage devices.

FIG. 54 shows an internal configuration of the computer for the job-handling agent system 20, similar to that for other agent systems, wherein a CPU 201, a RAM 202, a CRT 203 and a keyboard 204, a communication device 205, a reader 206 for reading the recording medium 9, and three fixed disk devices 211, 212 and 213 for storing various agents and various databases are connected to a bus line 221. The device controller 31 of the apparatus 30 is also shown in FIG. 54 as connected through an interface to the bus line 221.

When the computer is used as the job-handling agent system 20, various agents which are programs are previously read from the recording medium 9 through the reader 206, and the contents of various databases are read from the reader 206 or received from the LAN 40 through the communication device 205 as in other agent systems.

It should be noted that the various agents and various databases may be stored in any storage device which is freely readable and writable, and need not be stored in separate storage devices.

<4.3 Operation of System>

The configuration of the system 400 has been described above. Description will be given in detail on the operations of the system 400 and the apparatus 30 in accordance with the configuration using the agents as the main elements shown in FIGS. 49 though 51.

Figure 55:
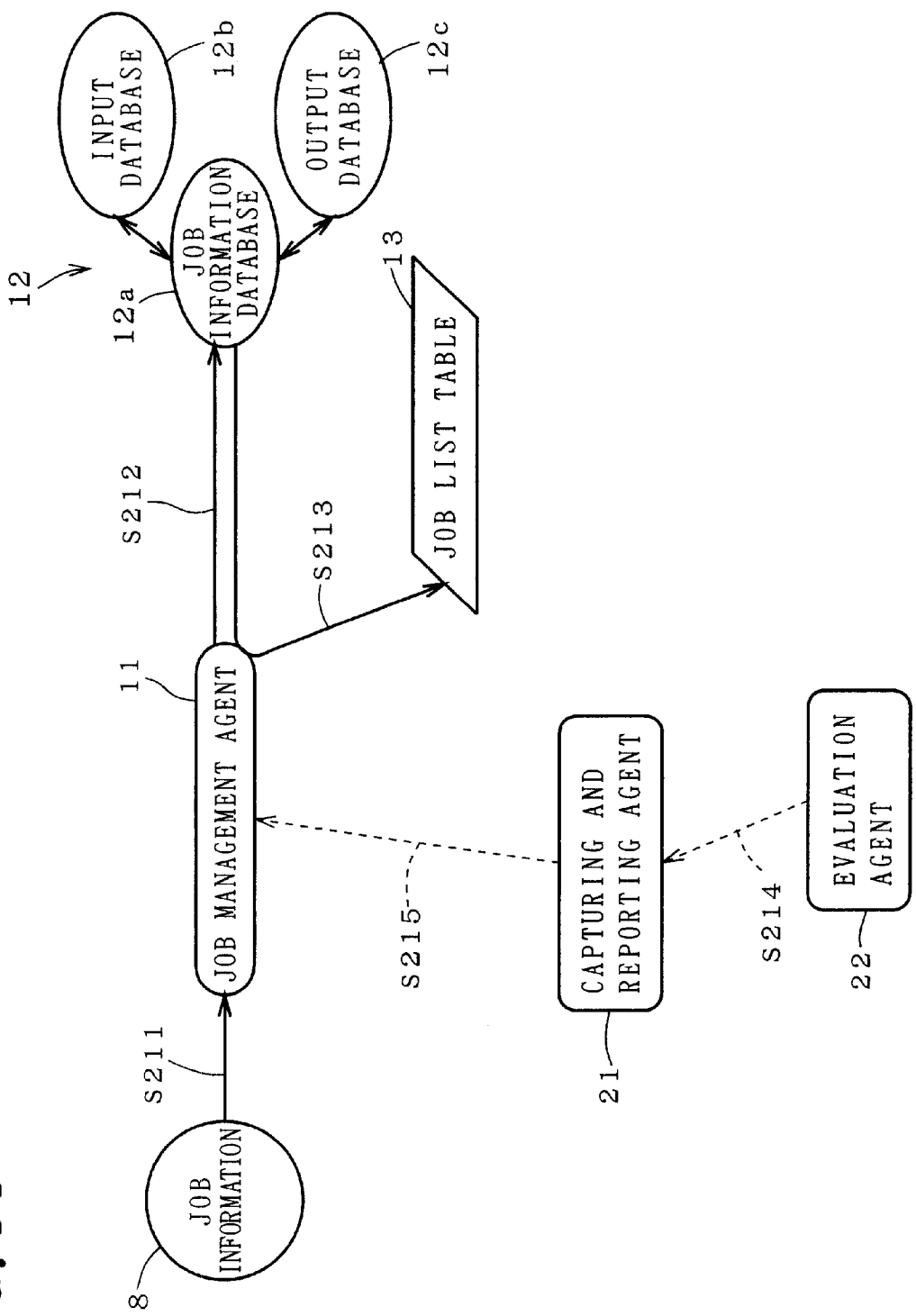
FIG. 55 shows the operation of storing the job information inputted to the input agent system into the job list table.
Figure 56:
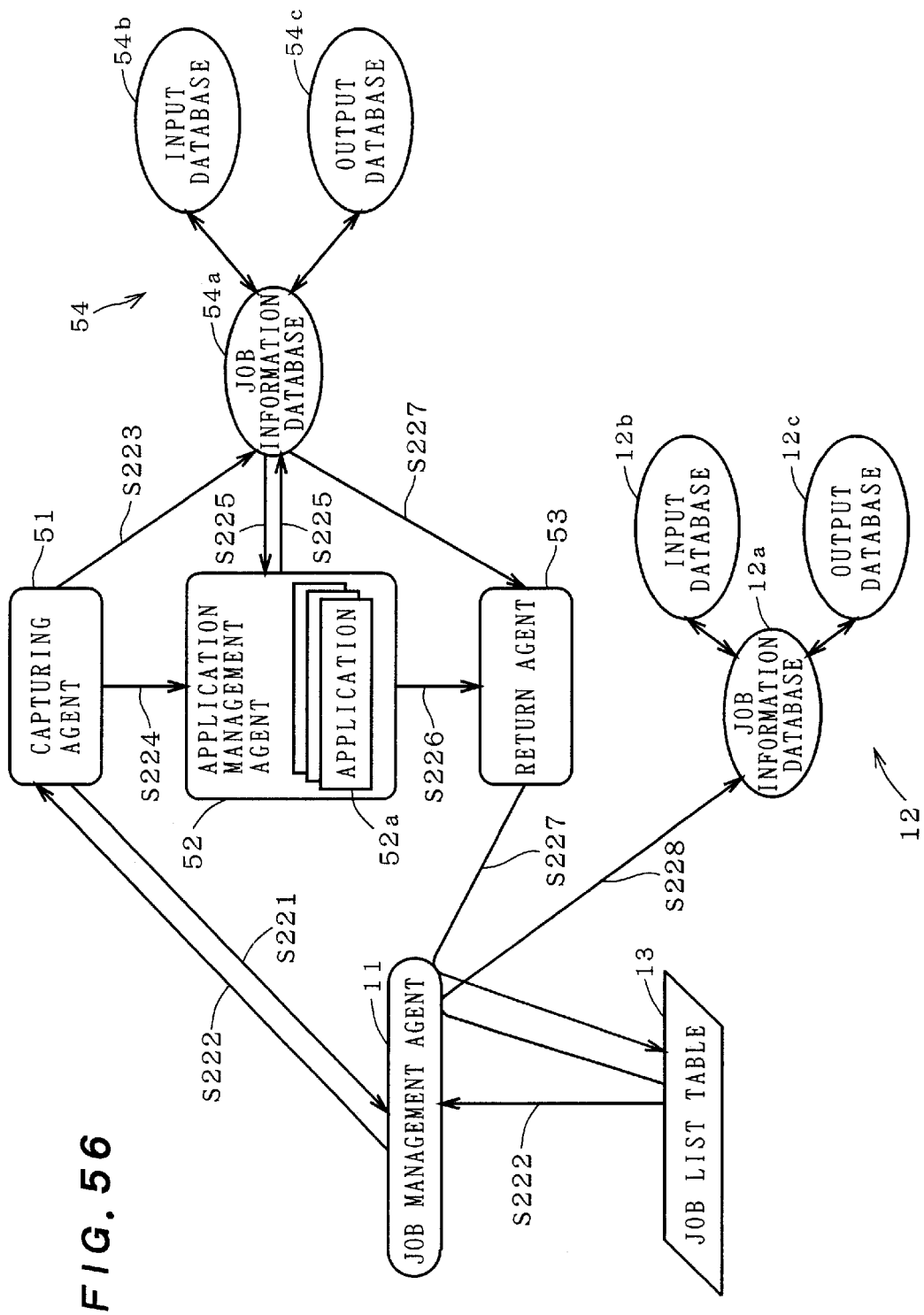
FIG. 56 shows a pre-processing operation of the design agent system.
Figure 57:
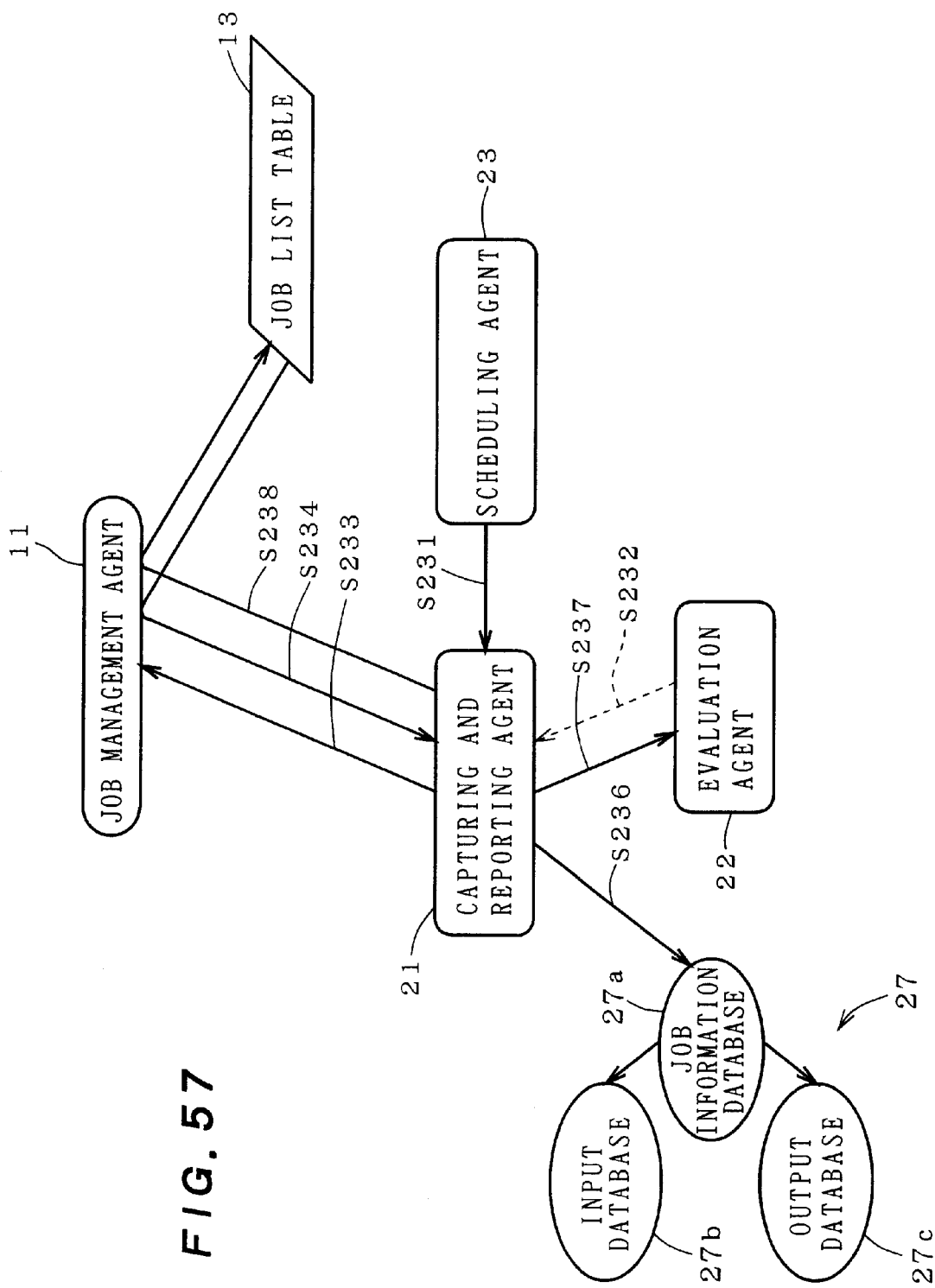
FIG. 57 shows the job information capturing operation of the evaluation agent.
Figure 58:
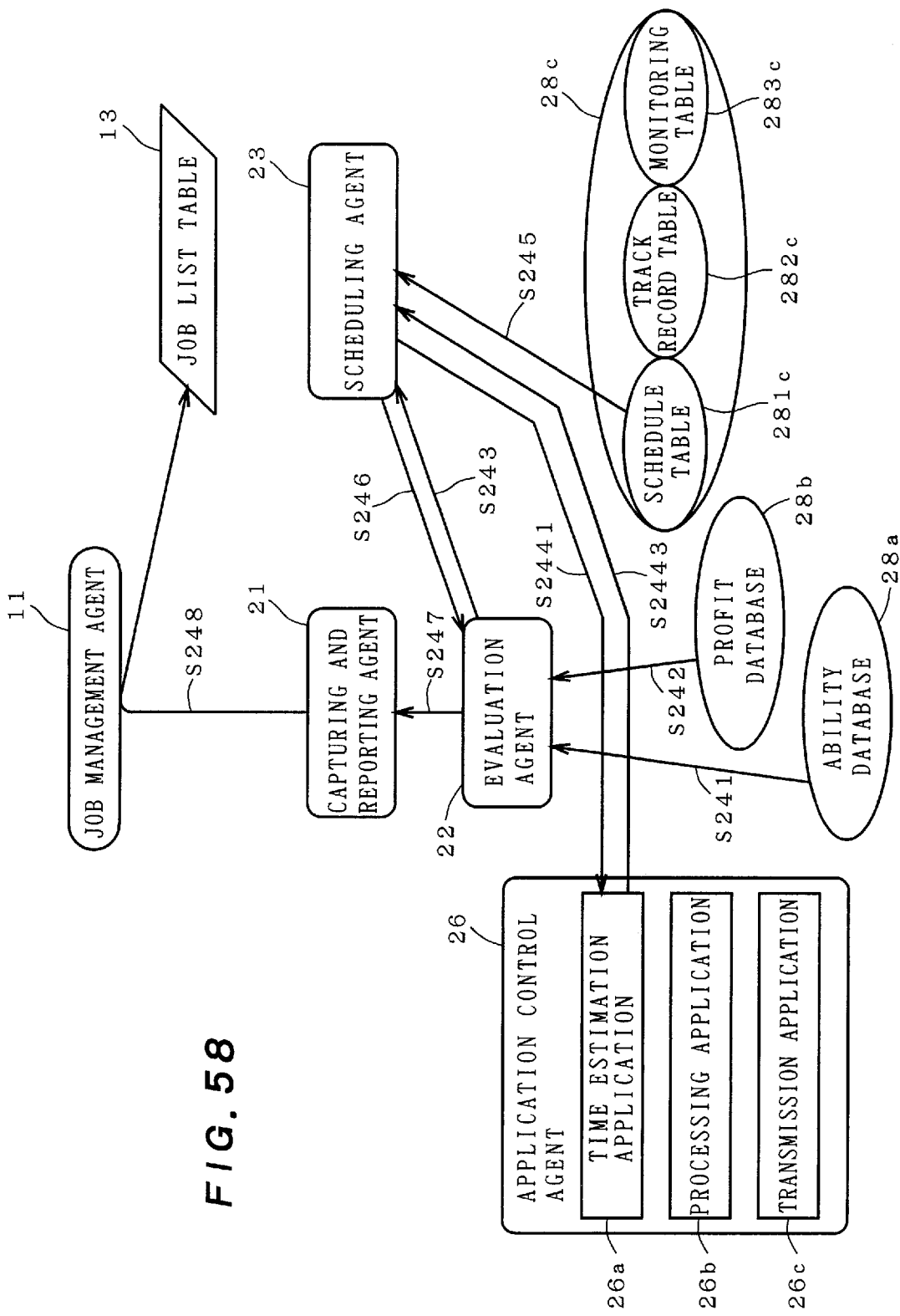
FIG. 58 shows the job information evaluating operation of the evaluation agent.
Figure 59:
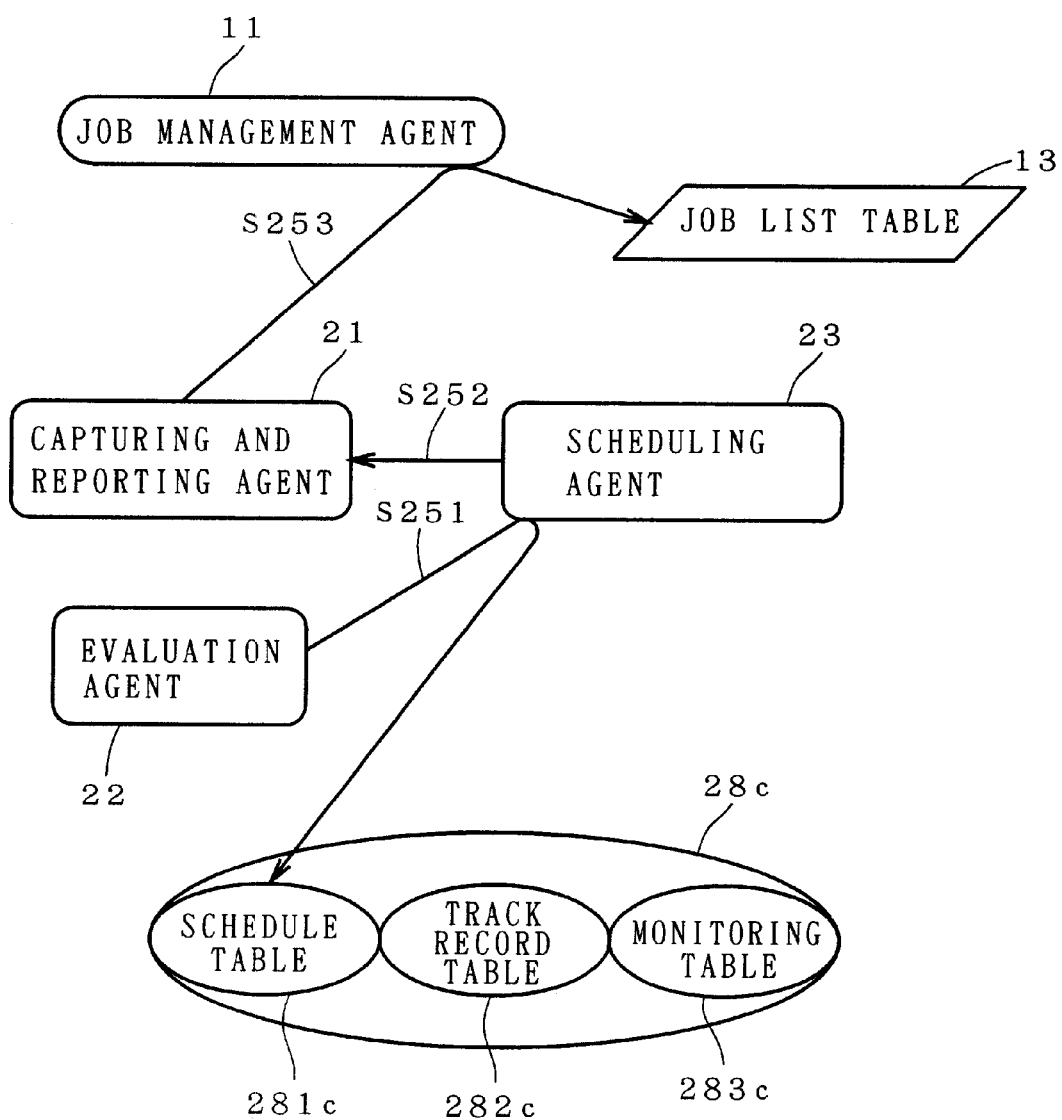
FIG. 59 shows the operation of registering the job information on the processing schedule.
Figure 60:
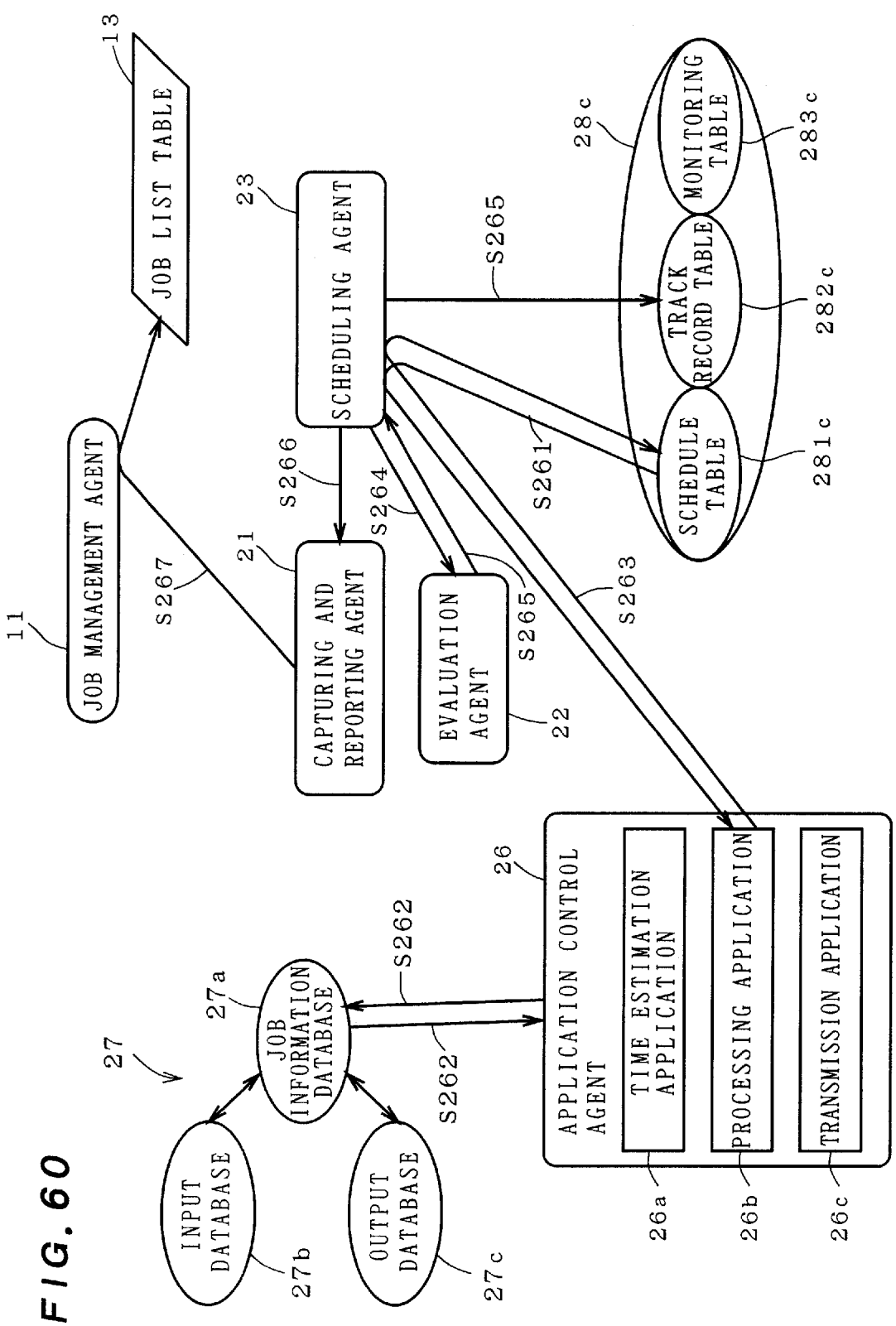
FIG. 60 shows the operation of application processing.
Figure 61:
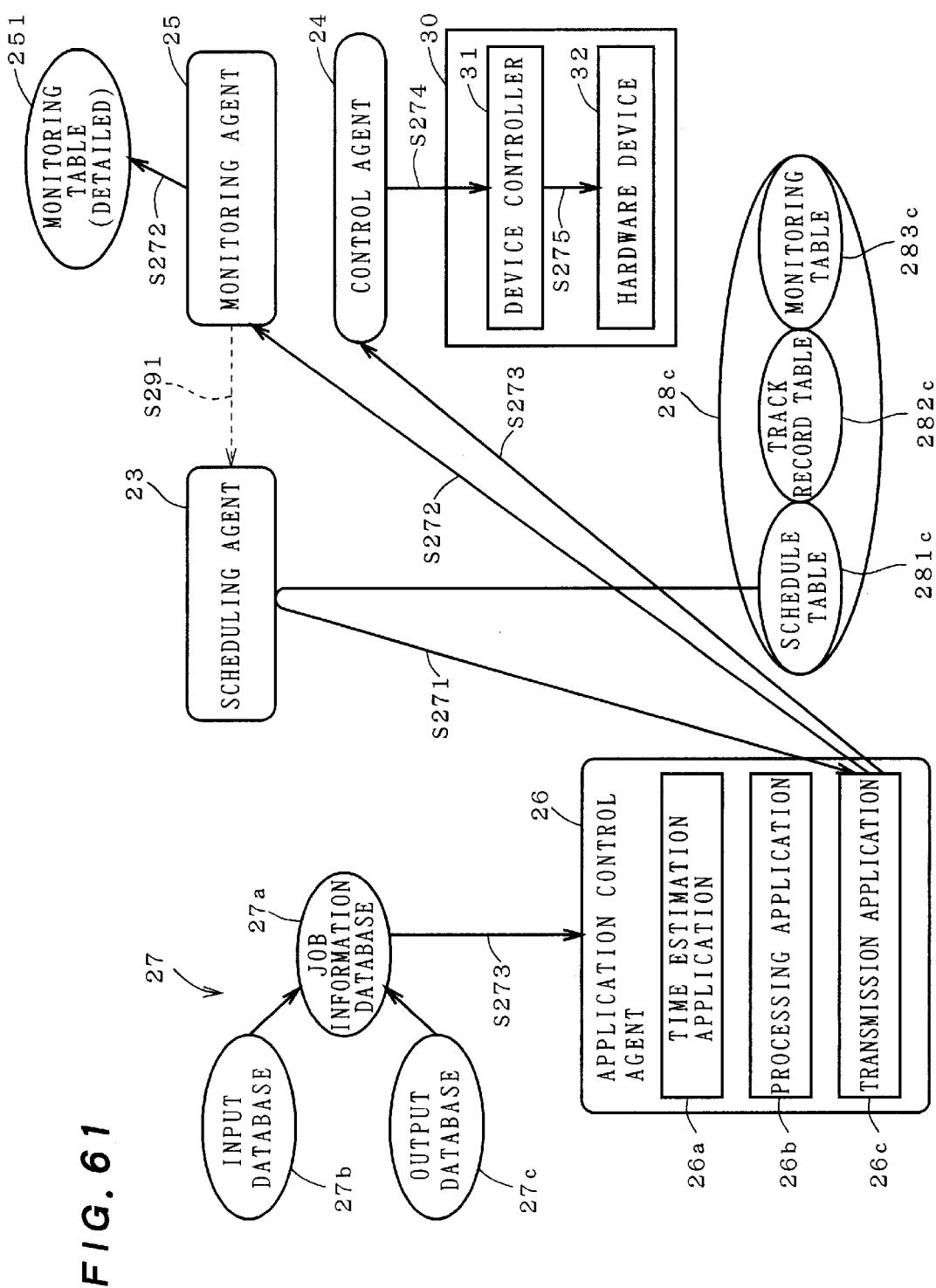
FIG. 61 shows the operation of providing output data to the apparatus.
Figure 62:
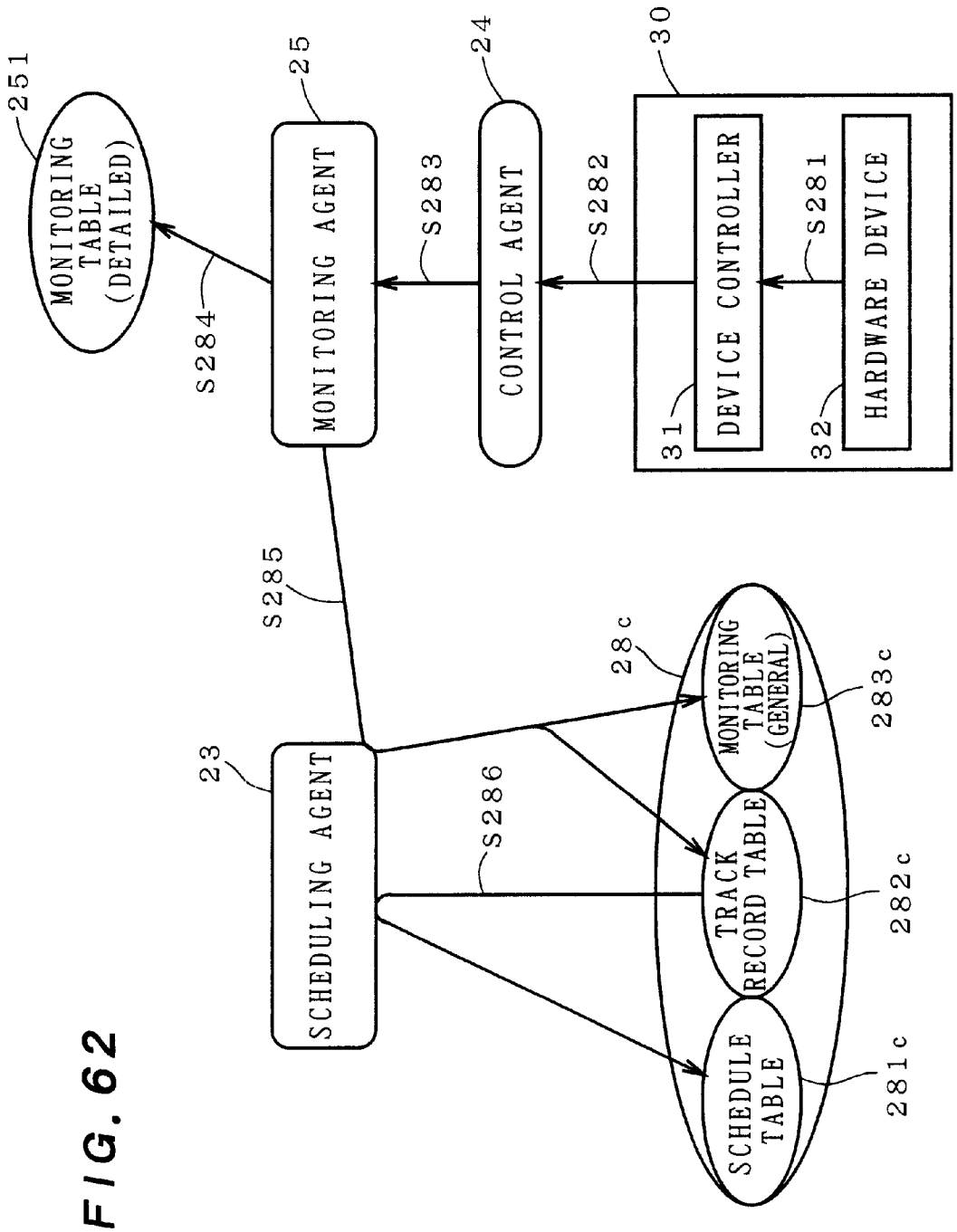
FIG. 62 shows the operation of monitoring the processing state of the apparatus.
Figure 63:
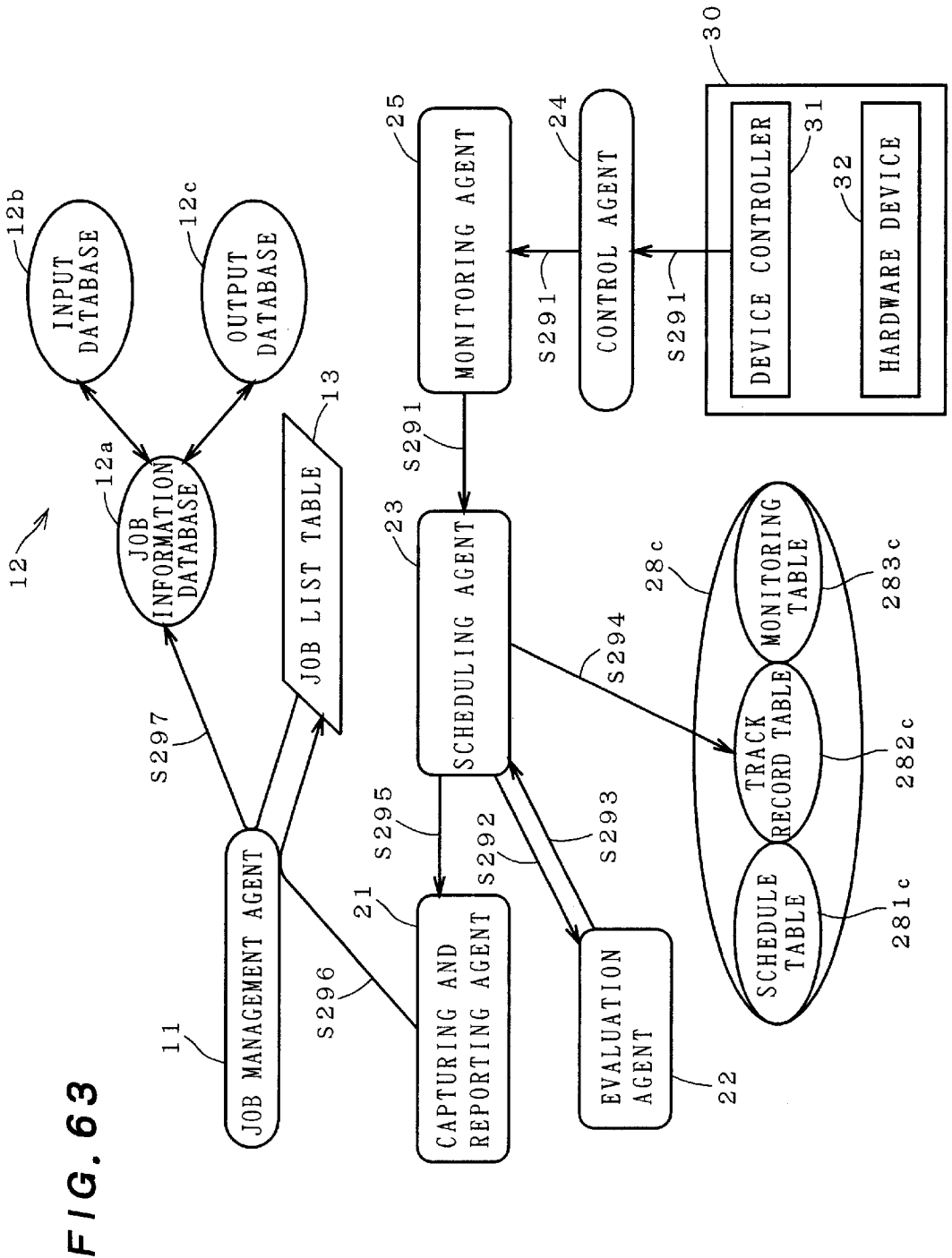
FIG. 63 shows the operation when job processing in an apparatus is completed.

FIGS. 55 through 63 illustrate the transfer of information between the respective components (agents, databases and the like). In FIGS. 55 through 63, only parts of the configuration shown in FIGS. 49 through 51 which are required for description are illustrated. FIG. 55 shows the operation performed between the instant when pieces of job information 8 are inputted to the input agent system 10 and the instant when pieces of job information 8 are stored in the job list table 13. FIG. 56 shows the operation wherein the pre-processing is performed on the digital materials based on a piece of job information 8. FIG. 57 shows the operation performed between the instant when the capturing and reporting agent 21 captures a piece of job information 8 and the instant when the capturing and reporting agent 21 passes the piece of job information 8 to the evaluation agent 22. FIG. 58 shows the operation wherein the evaluation agent 22 evaluates whether or not the captured piece of job information 8 is handleable by the job-handling agent system 20 and the apparatus 30. FIG. 59 shows the operation of registering the positively evaluated piece of job information 8 on the scheduling database 28c. FIG. 60 shows the operation of digitally processing the digital materials based on the procedure of the digital processing for plate making. FIG. 61 show the operation performed until the subsequent plate making is actually executed. FIG. 62 shows the operation of monitoring the operation of the apparatus 30. FIG. 63 shows the operation when the processing of the job in the apparatus 30 is completed.

<4.3(a) Input of Job Information to Input Agent System>

Figure 64:
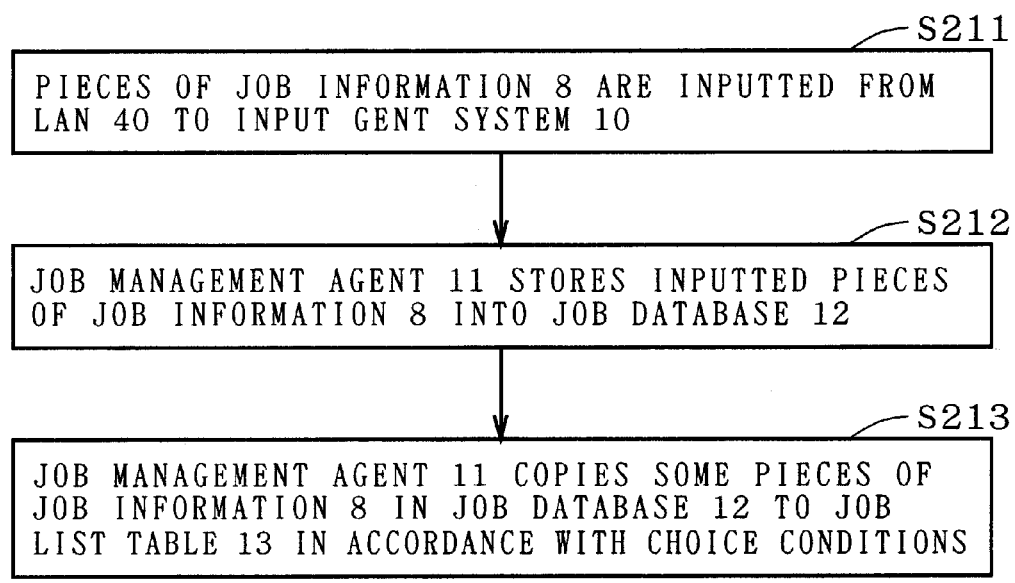
FIG. 64 is a flowchart showing the contents of the steps S211 to S213 of FIG. 55.

The steps S211 to S213 of FIG. 55 are the steps performed between the instant when pieces of job information 8 are inputted to the input agent system 10 and the instant when pieces of job information 8 are stored in the job list table 13. FIG. 64 is a flowchart showing the contents of the steps S211 to S213.

The pieces of job information 8 from the LAN 40 are stored in the job database 12 through the job management agent 11. Specifically, all pieces of job information 8 inputted to the input agent system 10 are once stored in the job database 12 (steps S211 and S212). In the steps S211 and S212, the job management agent 11 may simply check the inputted pieces of job information 8 for formats. FIGS. 65 through 67 show examples of the contents of the pieces of job information 8 stored in the job information database 12a, the input database 12b and the output database 12c of the job database 12.

Referring to FIG. 65, the job information database 12a includes the contents indicative of the attributes of the jobs, for example, specifications, delivery dates, and desired costs. The job information database 12a further includes important items that the operator is desired to refer to for pre-processing. The input database 12b includes information such as the file names and file formats of the digital materials to be provided, or the unprocessed digital materials.

The output database 12c includes the file names of a procedure file of the processing performed on the provided digital materials and a file of output data after the digital processing. In principle, however, since the processing procedure is unfixed and no digital processing is performed at the time when the pieces of job information 8 are inputted, these files are empty.

The procedure of the digital processing may be already determined and the file of the output data after the digital processing may be already produced at the time when the pieces of job information 8 are inputted. The job having a job name "Job-456" (Job ID 0001) is illustrated as a job having been digitally processed.

A strict distinction is not made between the contents of the input database 12b and the contents of the output database 12c, and the formats of these databases may be suitably changed depending on convenience. Additionally, a strict distinction is not made also between the job information 8 and the digital materials.

Next, the job management agent 11 copies and stores some pieces of job information 8 which satisfy the predetermined conditions among the pieces of job information 8 stored in the job database 12 into the job list table 13 (step S213). This allows the design agent system 50 and the job-handling agent system 20 to capture a piece of job information 8 stored in the job list table 13 and to add information to the pieces of job information 8 stored in the job list table 13. Although the single job list table 13 is illustrated in the following description, a job list table from which the design agent system 50 captures a piece of job information 8 and a job list table from which the job-handling agent system 20 captures a piece of job information 8 may be separately provided.

The choice and copying of the pieces of job information 8 by the job management agent 11 previously reduce the number of pieces of job information 8 to be handled to provide more rapid management of the job information 8 in the input agent system 10 and more rapid capture of the job information 8 in the job-handling agent system 20, achieving efficient management of the job information.

FIGS. 68 and 69 show examples of the lists of the pieces of job information 8 stored in the job list table 13. FIG. 68 shows parts of the job list table 13 corresponding to the job information database 12a. Parts of the job information 8 corresponding to the input database 12b and the output database 12c are not shown. A piece of job information with a job ID 0002 among the pieces of job information 8 stored in the job database 12 is shown in FIG. 68 as not copied to the job list table 13 since the system 400 is designed to handle four or more colors for printing and the input agent systems 10 judges that the job ID 0002 for two-color printing is not to be handled. FIG. 69 shows parts of the job list table 13 which contain management information transmitted from the job-handling agent system 20. By referring to the management information, the input agent system 10 may seize the reservation and completion of job processing. The details are described later.

The conditions under which the job management agent 11 chooses the pieces of job information 8 to be entered in the job list table 13 are previously provided from the LAN 40 through the evaluation agent 22 and the capturing and reporting agent 21 of the job-handling agent system 20 to the job management agent 11 (steps S214 and S215). FIG. 70 illustrates specification conditions about the ability of the apparatus 30 such as an exposure speed and a processing accuracy exhibitable by the apparatus 30 which are previously provided to the input agent system 10. FIG. 71 illustrates specification conditions about the file format and file capacity handleable by the applications in the job-handling agent system 20 which are previously provided to the input agent system 10. Using these specification conditions as the choice conditions, the input agent system 10 chooses and stores pieces of job information 8 into the job list table 13. The choice conditions may be conditions of cost calculation and processing time and should be sufficient to preclude excessive burdens on the job management agent 11. Since such choice conditions are provided from all job-handling agent systems 20 connected to the LAN 40 to the job management agent 11, the job management agent 11 may readily choose the pieces of job information 8 handleable by any job-handling agent system 20 or apparatus 30 managed by the input agent system 10.

<4.3(b) Pre-Processing in Design Agent System>

Figure 72:
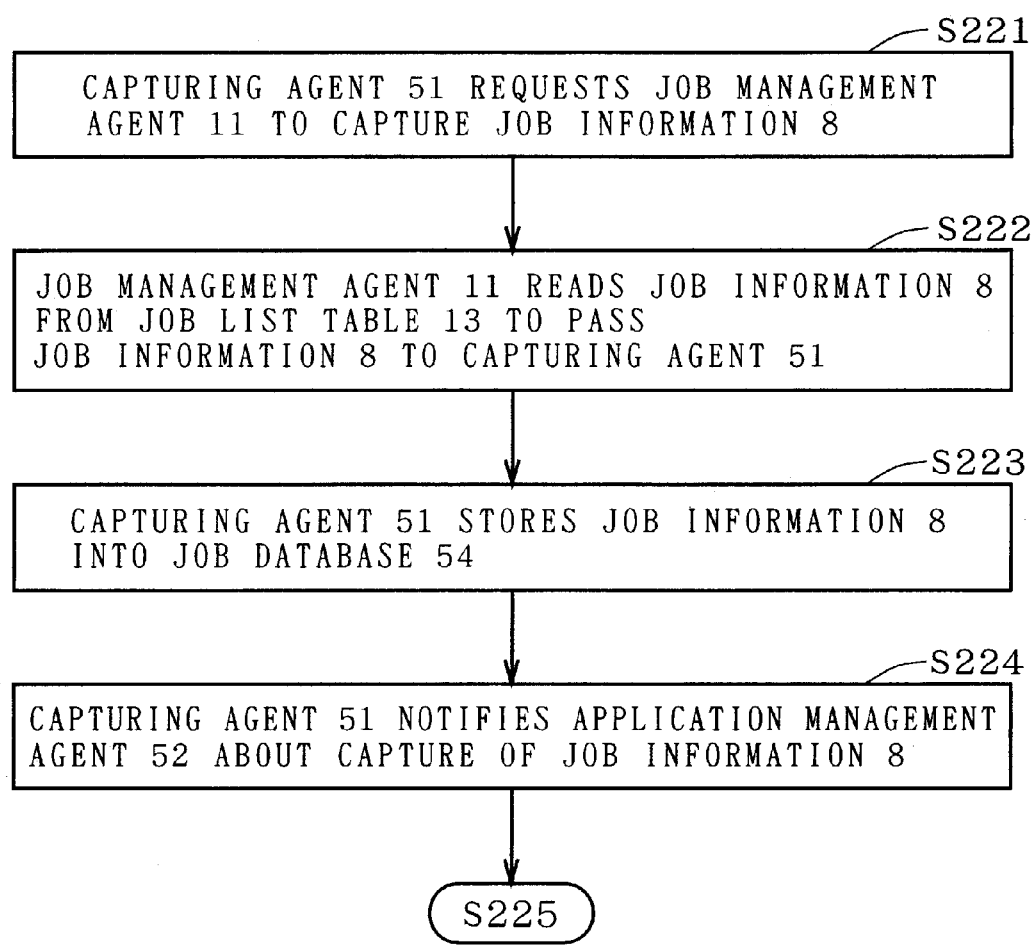
FIG. 72 is a flowchart showing the contents of the steps S221 to S224 of FIG. 56.
Figure 73:
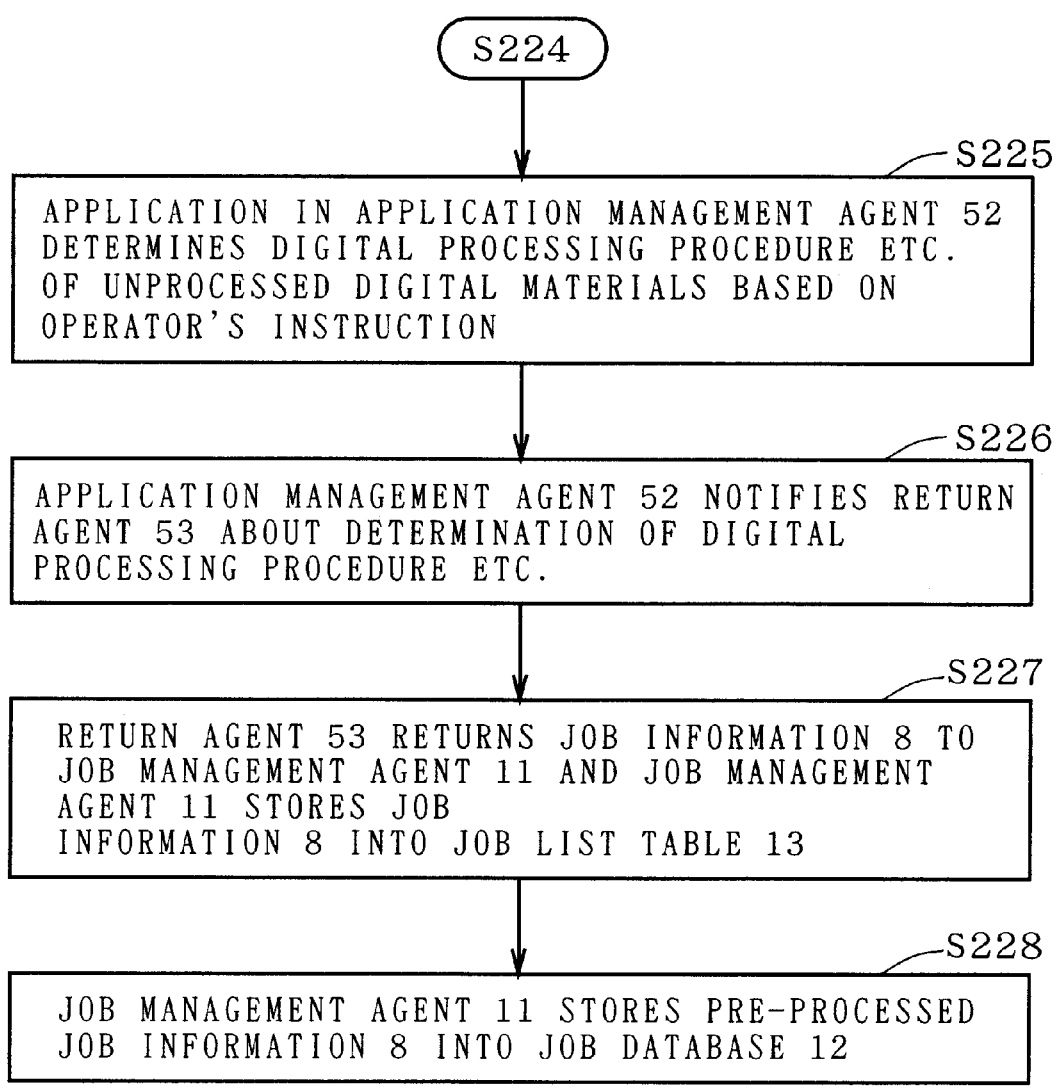
FIG. 73 is a flowchart showing the contents of the steps S225 to S228 of FIG. 56.

The steps S221 to S228 of FIG. 56 illustrate the operation of the design agent system 50 in pre-processing. FIGS. 72 and 73 are flowcharts showing the contents of the steps S221 to S228.

The pre-processing determines the procedure of processing of unprocessed digital materials in the job-handling agent system 20 for plate making in the apparatus 30. That is, the procedure of the digital processing is determined in the pre-processing in principle, and the processed output data are generated in the job-handling agent system 20.

In the pre-processing, the capturing agent 51 initially requests the job management agent 11 to capture a piece of job information 8 (step S221). In response to the request, the job management agent 11 passes any piece of job information 8 on the job list table 13 to the capturing agent 51 (step S222).

Upon receipt of the piece of job information 8, the capturing agent 51 simply checks the piece of job information 8 for data errors and the like, and then stores the piece of job information 8 into the job database 54 in the design agent system 50 (step S223). The capturing agent 51 notifies the application management agent 52 about the capture of the piece of job information 8 (step S224).

The application management agent 52 reads a piece of job information 8 from the job database 54, and an application determines the procedure of the digital processing of the unprocessed digital materials in accordance with an instruction from the operator. The application management agent 52 stores the updated piece of job information 8 again into the job database 54 (step S225) and stores the contents of the procedure of the processing into the fixed disk device 60.

FIGS. 74 through 76 show examples of the contents of the job information database 54a, the input database 54b, and the output database 54c of the job database 54. As illustrated in FIG. 74, the piece of job information 8 with the job ID 0001 is not passed to the design agent system 50 and not registered on the job database 54 since the job with the job ID 0001 has been processed as described and requires no pre-processing. Further, the pre-processing determines the procedure of the processing of the unprocessed digital materials, whereby a processing procedure file capacity is entered as shown in FIG. 76.

Figure 77:
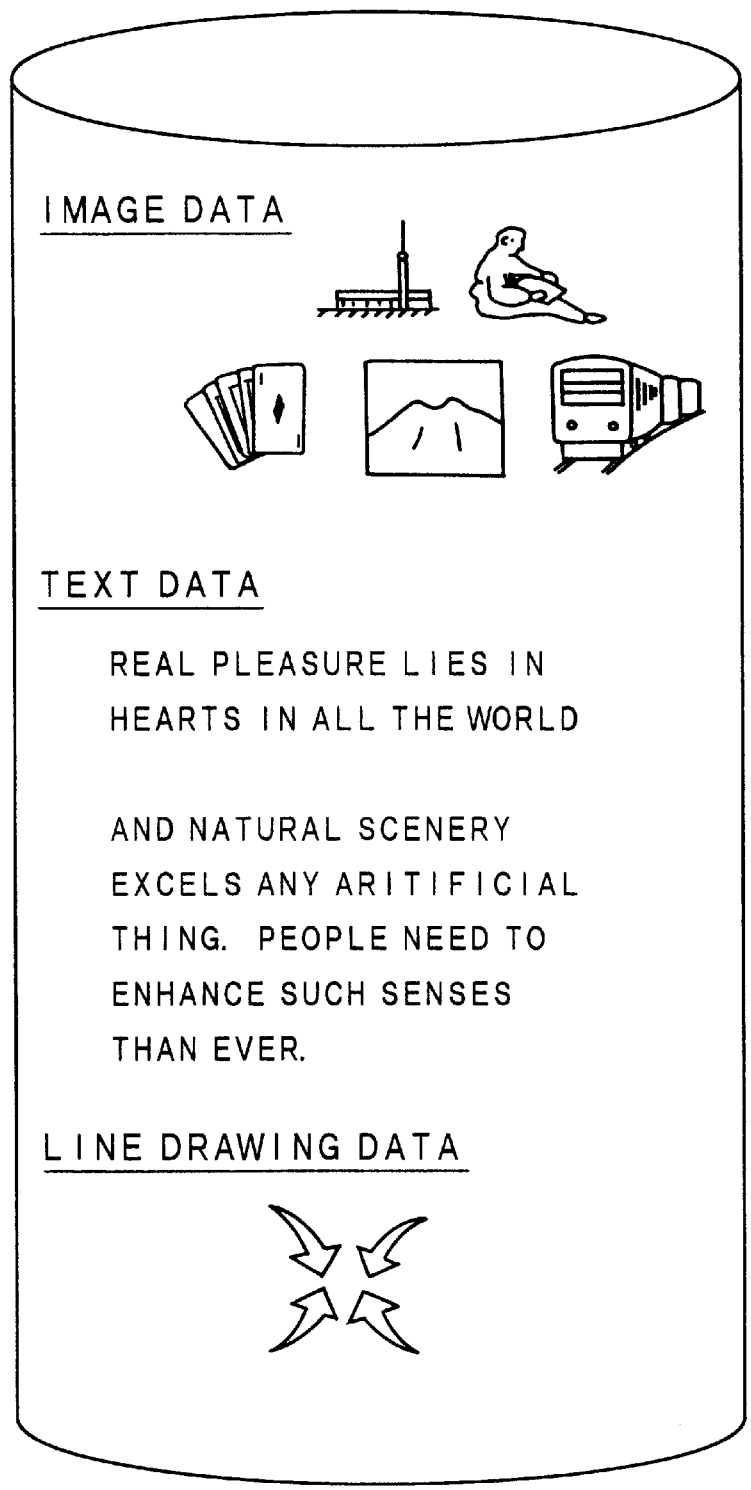
FIG. 77 shows a particular example of digital materials.
Figure 78:
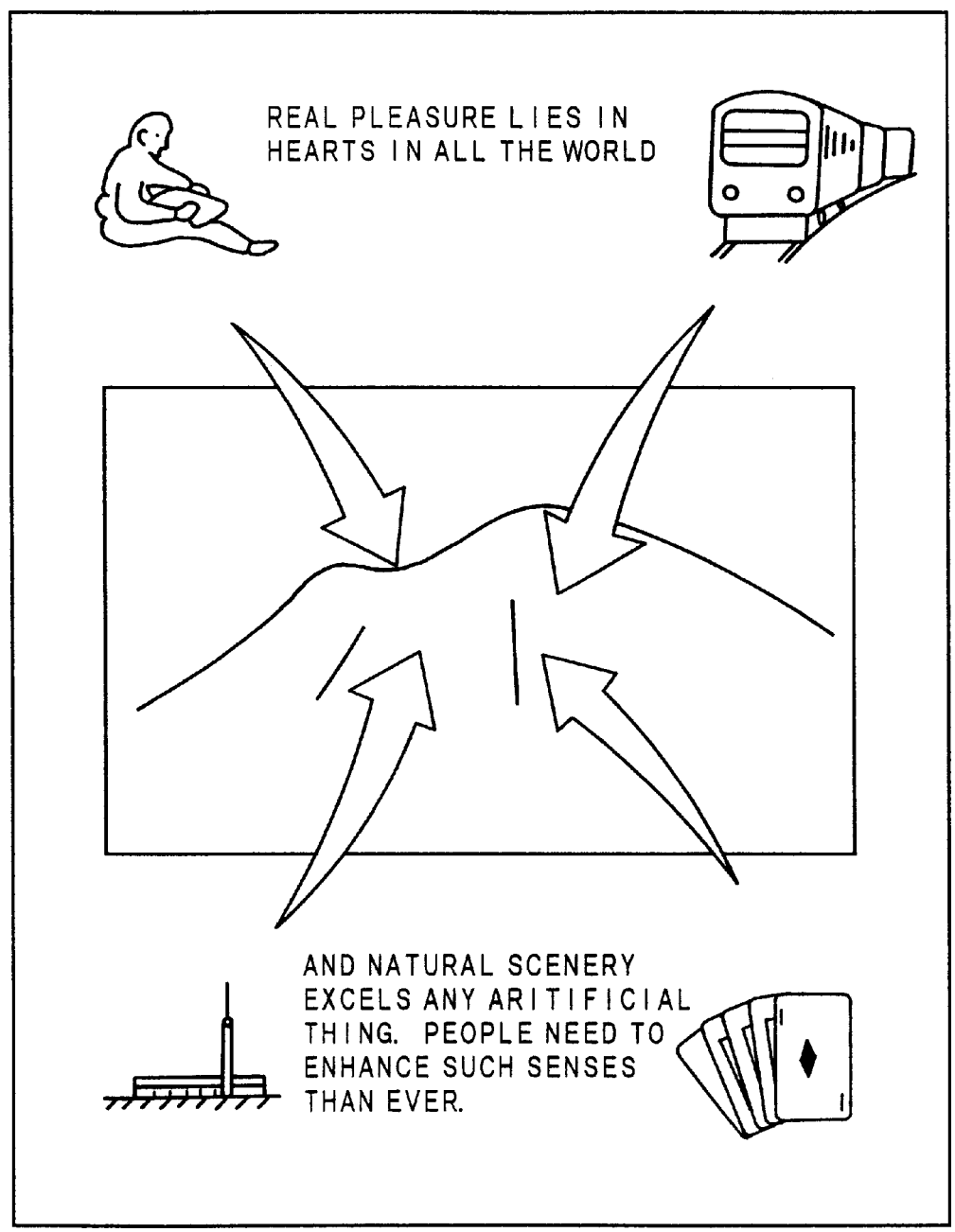
FIG. 78 shows a particular example of a layout.

FIGS. 77 and 78 illustrate operator's determination of the procedure of the digital processing such as layout and tints of the digital materials through the application. FIG. 77 conceptually illustrates various digital materials including image data in a bitmap format, text data in a text format and line drawing data in a vector format which are stored in the fixed disk device 60. The operator causes these digital materials to be displayed on the CRT 503 of the computer constituting the design agent system 50 to determine the position, size and tint of these digital materials on printing paper. FIG. 78 shows an example of an assembled image (print image on printing paper) determined by the pre-processing.

Upon completion of the pre-processing, the application management agent 52 notifies the return agent 53 about the completion of the pre-processing (step S226). In response to the notification, the return agent 53 reads the pre-processed piece of job information 8 from the job database 54 to pass the pre-processed piece of job information 8 to the job management agent 11. The job management agent 11 stores the received piece of job information 8 into the job list table 13 (step S227). If the pre-processing is not properly executed, the return agent 53 so notifies the job management agent 11.

The job management agent 11 stores the pre-processed piece of job information 8 as required into the job database 12 of the input agent system 10 (step S228).

<4.3(c) Capture of Job Information in Evaluation Agent>

Figure 79:
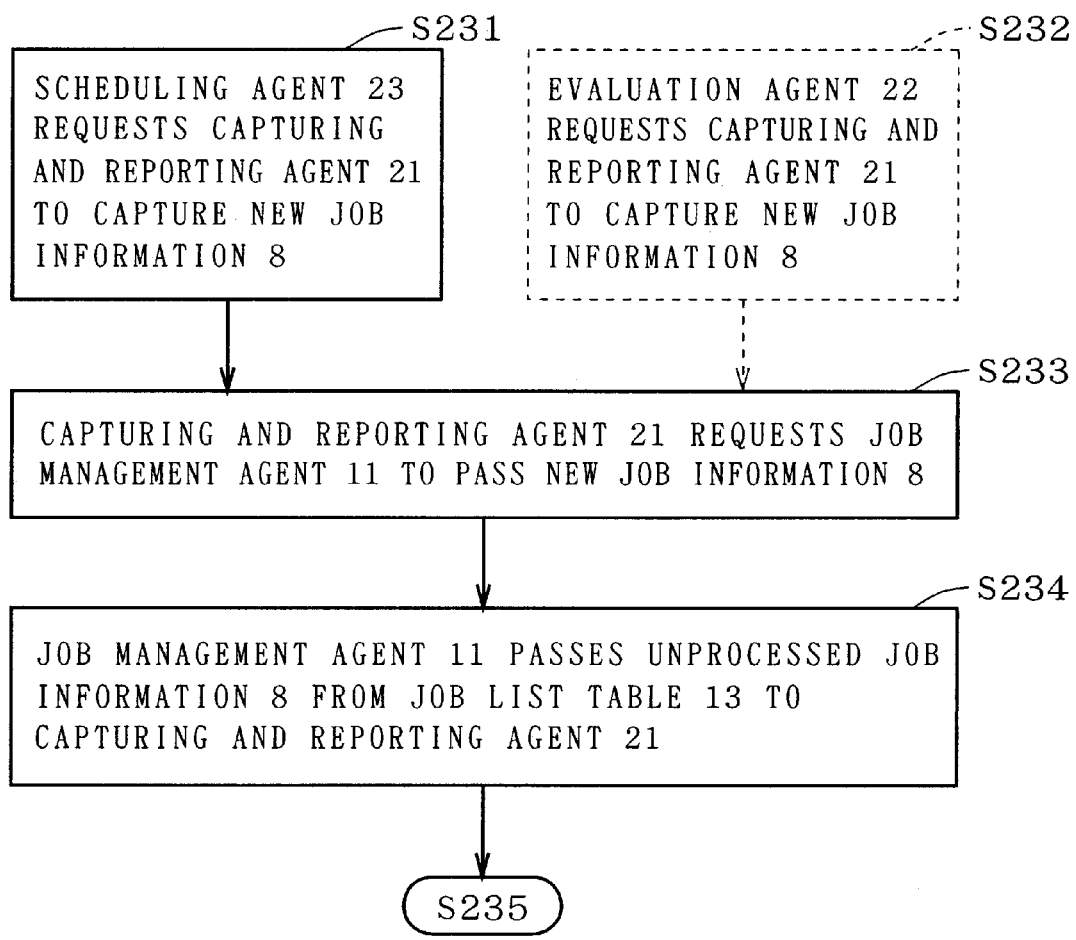
FIG. 79 is a flowchart showing the contents of the steps S231 to S234 of FIG. 57.
Figure 80:
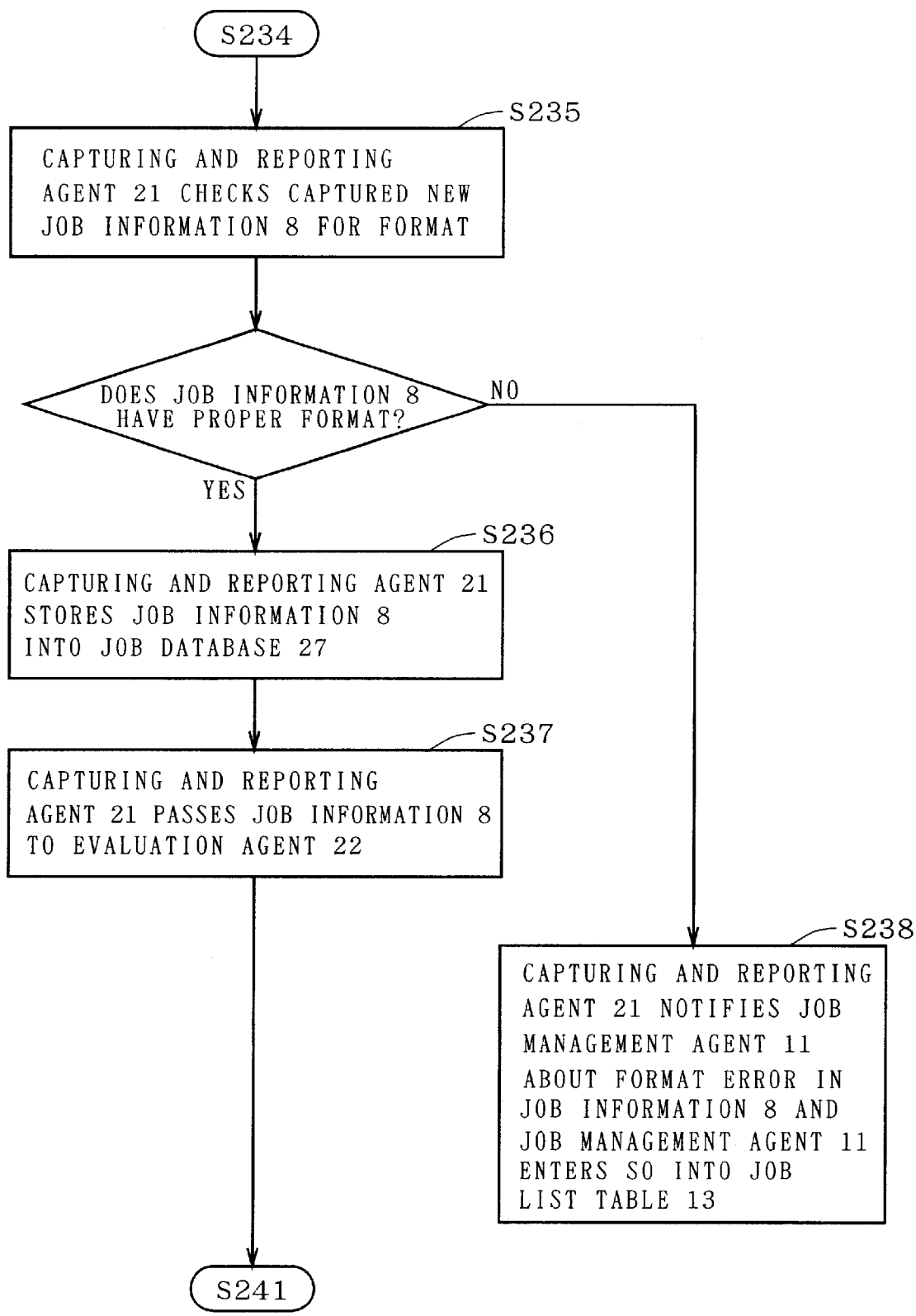
FIG. 80 is a flowchart showing the contents of the steps S235 to S238 of FIG. 57.

The steps S231 to S238 of FIG. 57 show the operation wherein the evaluation agent 22 captures a new piece of job information 8 through the capturing and reporting agent 21. FIGS. 79 and 80 are flowcharts showing the contents of the steps S231 to S238.

As a precondition that the job-handling agent system 20 captures the new piece of job information 8 from the input agent system 10, the scheduling agent 23 initially judges that a new piece of job information 8 is to be registered on the processing schedule while referring to the scheduling information to request the capturing and reporting agent 21 to capture a piece of job information 8 (step S231). In response to the request, the capturing and reporting agent 21 requests the job management agent 11 via the LAN 40 to pass an unprocessed one of the pieces of job information 8 stored in the job list table 13 (a piece of job information 8 which is pre-processed but has not been subjected to the plate making processing; on the assumption that the job management agent 11 previously stores pre-processed pieces of job information 8 from the job database 12 in the job list table 13) (step S233).

The agent which makes a first request for the capturing of the new piece of job information 8 is not limited to the scheduling agent 23. For example, if the function of providing operating directions to other agents is desired to be concentrated possibly on the evaluation agent 22, the evaluation agent 22 may send a simple inquiry about the vacancy of the schedule to the scheduling agent 23 and thereafter request the capturing and reporting agent 12 to capture the new piece of job information 8 (step S232).

The job management agent 11 passes any one of the unprocessed pieces of job information 8 stored in the job list table 13 (more properly, a piece of job information which has not yet been captured by the capturing and reporting agent 21) to the capturing and reporting agent 21 in response to the request from the capturing and reporting agent 21 (step S234). Then, the capturing and reporting agent 21 checks the captured piece of job information 8 for formats (e.g., checks for a data format error, excess and deficiency of data contents and the like) (step S235). If there are no anomalies in the captured piece of job information 8, the capturing and reporting agent 21 stores the captured piece of job information 8 into the job database 27 (step S236). Thereafter, the capturing and reporting agent 21 passes the captured piece of job information 8 also to the evaluation agent 22 (step S237).

FIGS. 81 through 83 show examples of the contents of the job information database 27a, the input database 27b and the output database 27c of the job database 27. The pieces of job information 8 with other than the job ID 0002 are shown in FIGS. 81 through 83 as stored in the job database 27. The piece of job information 8 with the job ID 0001 is stored without passing through the design agent system 50, and other pieces of job information 8 have been pre-processed. If a piece of job information 8 which has been pre-processed but whose output file has not yet been produced is inputted into the input agent system 10, the job-handling agent system 20 captures the piece of job information 8 without pre-processing and performs the digital processing on the piece of job information 8.

If there is a format error in the captured piece of job information 8, the capturing and reporting agent 21 so notifies the job management agent 11. Upon receipt of the notification, the job management agent 11 adds the contents of the notification to the job list table 13 (step S238). More specifically, "9" (indicative of "reservation inhibited") is entered into the reservation status information of the job list table 13 shown in FIG. 69, and "1" (indicative of "processing rejected") is entered into the processing rejection status information thereof. This inhibits any job-handling agent system 20 from subsequently capturing this piece of job information 8. Of course, the job management agent 11 may make such format check of the piece of job information 8.

<4.3(d) Evaluation of Job Information>

Figure 84:
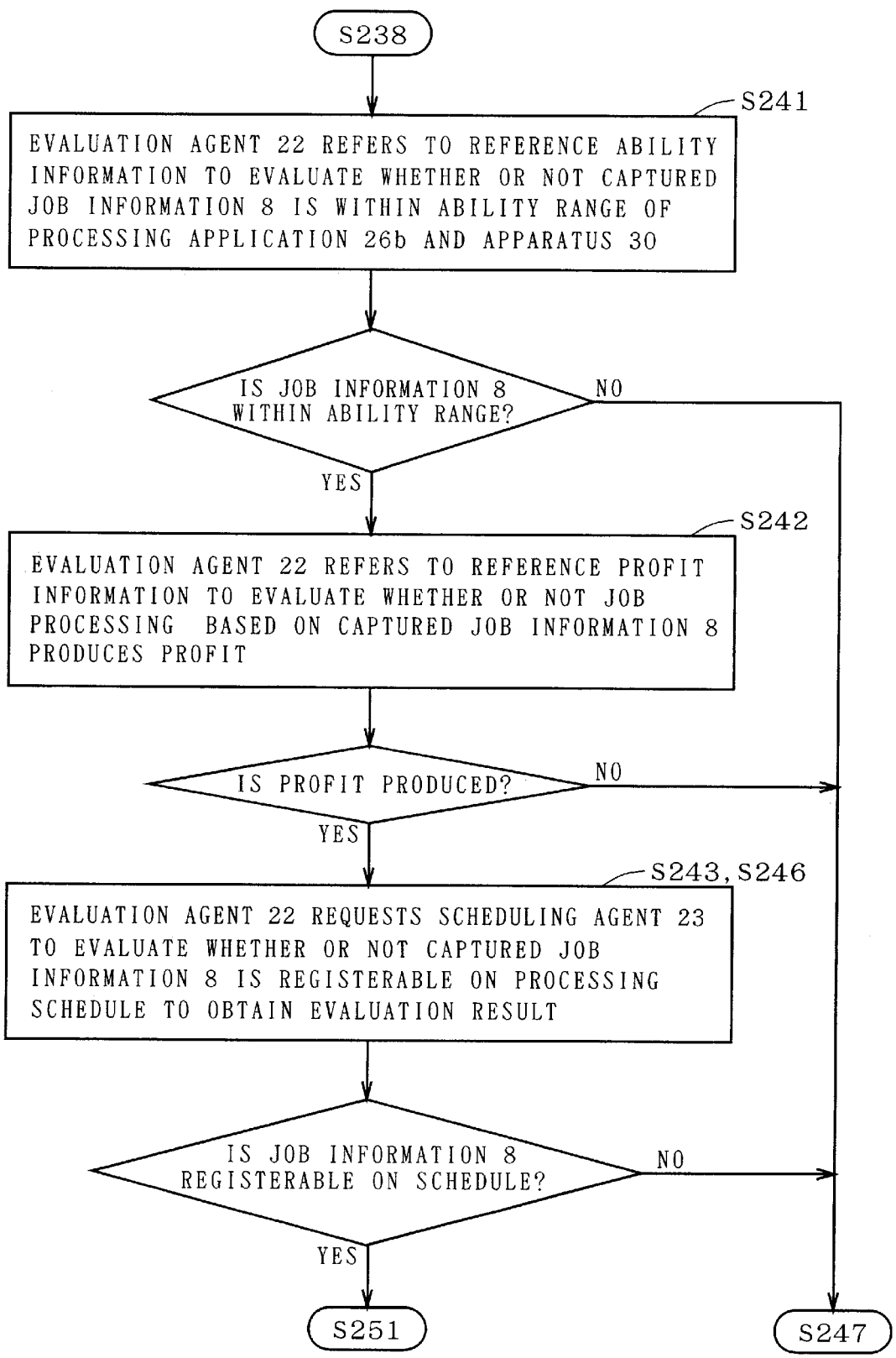
FIG. 84 is a flowchart showing the contents of the steps S241 to S246 of FIG. 58.
Figure 85:
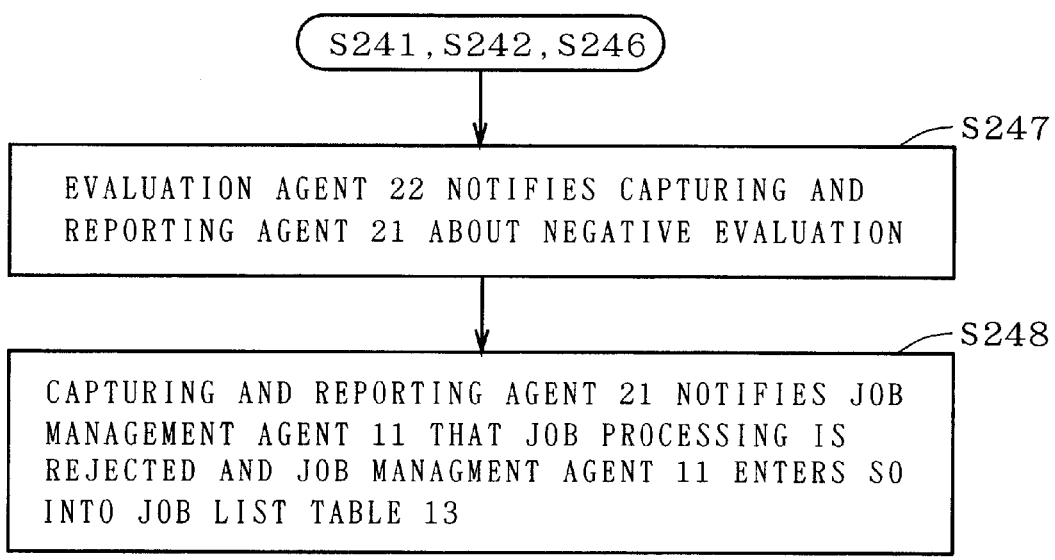
FIG. 85 is a flowchart showing the contents of the steps S247 and S248 of FIG. 58.

In the steps S241 to S248 of FIG. 58, the job-handling agent system 20 evaluates whether or not the captured new piece of job information 8 is processable by the job-handling agent system 20 and the apparatus 30. As the result of this operation, the job-handling agent system 20 selects and captures a piece of job information 8 stored in the job list table 13. FIGS. 84 and 85 are flowcharts showing the contents of the steps S241 to S248.

The evaluation of the new piece of job information 8 is divided into sequential three stages: the evaluation of whether or not the new piece of job information 8 is within the ability range of the application control agent 26 and the apparatus 30, the evaluation of whether or not the new piece of job information 8 produces a profit, and the evaluation of whether or not the new piece of job information 8 is processable by the delivery date.

For the evaluation of whether or not the new piece of job information 8 is within the ability range of the application control agent 26 and the apparatus 30, the evaluation agent 22 initially takes out production specification contents of the piece of job information 8, and then reads reference ability information from the ability database 28a (step S241). FIG. 86 shows an example of parts of the contents of the ability database 28a which are related to the time estimation application 26a and the processing application 26b. FIG. 87 shows an example of parts of the ability database 28a which are related to the apparatus 30. These pieces of information are read as the reference ability information.

The evaluation agent 22 judges whether or not the production specification contents and the like are within the range of the allowable values of the respective items determined by the reference ability information. If the production specification contents and the like are within the range of the allowable values (or conform to conditions), a positive evaluation such that the job is processable by the application control agent 26 and the apparatus 30 is made. If the production specification contents and the like are out of the range of the allowable values (or do not conform to the condition), a negative evaluation that rejects the processing is made.

If it is evaluated that the piece of job information 8 is within the range of the processing ability, the evaluation agent 22 then evaluates whether or not the processing of the job in accordance with the piece of job information 8 produces a profit. For this evaluation, the evaluation agent 22 takes out cost specification information (desired processing cost) from the piece of job information 8 and then reads reference profit information related to the cost required for the job processing from the profit database 28b (step S242). FIG. 88 shows an example of parts of the contents of the profit database 28b which are related to the application control agent 26. FIG. 89 shows an example of parts of the contents of the profit database 28b which are related to the apparatus 30. Only required ones of the pieces of information shown in FIGS. 88 and 89 are read as the reference profit information.

Then, the evaluation agent 22 judges whether or not the cost specification information is within the range of the allowable values of the respective items determined by the reference profit information. If the cost specification information is within the range of the allowable values, a positive evaluation such that the job is handleable by the job-handling agent system 20 is made. If the cost specification information is out of the range of the allowable values, a negative evaluation that rejects the processing is made.

If it is judged in the step S242 that the piece of job information 8 produces a profit, then the evaluation agent 22 requests the scheduling agent 23 to evaluate whether or not the piece of job information 8 is registerable on the processing schedule (step S243). At this time, the evaluation agent 22 passes only predetermined pieces of information required for the evaluation (the delivery date, and the like) to the scheduling agent 23.

The scheduling agent 23 refers to the processing schedule stored in the schedule table 281*c* in the scheduling database 28*c* to evaluate whether or not the piece of information received from the evaluation agent 22 is registerable on the processing schedule, that is, to judge whether or not the job is processable in open or unfixed parts of the processing schedule.

For the judgement about whether or not the piece of information is registerable on the processing schedule, the scheduling agent 23 initially requests the application control agent 26 to estimate the time required for an application to perform the processing. For instance, the plate making of the digital materials including page-description language data and vector data using a predetermined layout requires the generation of output data in the bitmap format for the whole printing paper. The scheduling agent 23 requests the application control agent 26 to estimate the time required for the processing application 26*b* to generate the data (step S2441).

On the other hand, the application control agent 26 provides necessary information to the time estimation application 26*a* to cause the processing application 26*b* to estimate the time required for the processing (step S2442). Upon determination of the estimated time, the application control gent 26 reports the estimated time to the scheduling agent 23 (step S2443). Further, the scheduling agent 23 determines the time required for the apparatus 30 to perform the plate making processing based on the size of a print area, the number of print pages, and a resolution (step S2444).

After the estimation of the processing time of the application and the processing time of the apparatus 30, the scheduling agent 23 refers to the processing schedule related to the application and the processing schedule related to the apparatus 30 in the schedule table 281*c* to judge whether or not the piece of job information 8 is registerable on the schedule (step S245). The scheduling agent 23 then passes the result of evaluation to the evaluation agent 22 (step S246).

If the results of the above described three stages of evaluation are all positive, the piece of job information 8 is sent from the evaluation agent 22 to the scheduling agent 23 and then registered on the processing schedule (step S251 and the like), as will be described later. If at least one of the results of the three stages of evaluation is negative, the evaluation agent 22 notifies the capturing and reporting agent 21 that the processing is to be rejected in the job-handling agent system 20 (step S247). The capturing and reporting agent 21 notifies the job management agent 11 about the rejection of the processing, and the job management agent 11 enters the rejection of the processing into the job list table 13 (step S248). This allows the input agent system 10 to seize the results of the processing rejection in the respective job-handling agent systems 20. More specifically, "1" (indicative of "processing rejected") is entered into the processing rejection status information of the job list table 13 shown in FIG. 69, and the number (identification number previously given to each job-handling agent system) of the job-handling agent system 20 corresponding the job-handling agent system 20 which has rejected the processing is additionally entered. Thereafter, the rejected piece of job information 8 is not passed to the job-handling agent system 20 corresponding to the additionally entered number so that one job-handling agent system 20 is prevented from evaluating the single piece of job information 8 twice or more.

<4.3(e) Registration of Job Information>

Figure 90:
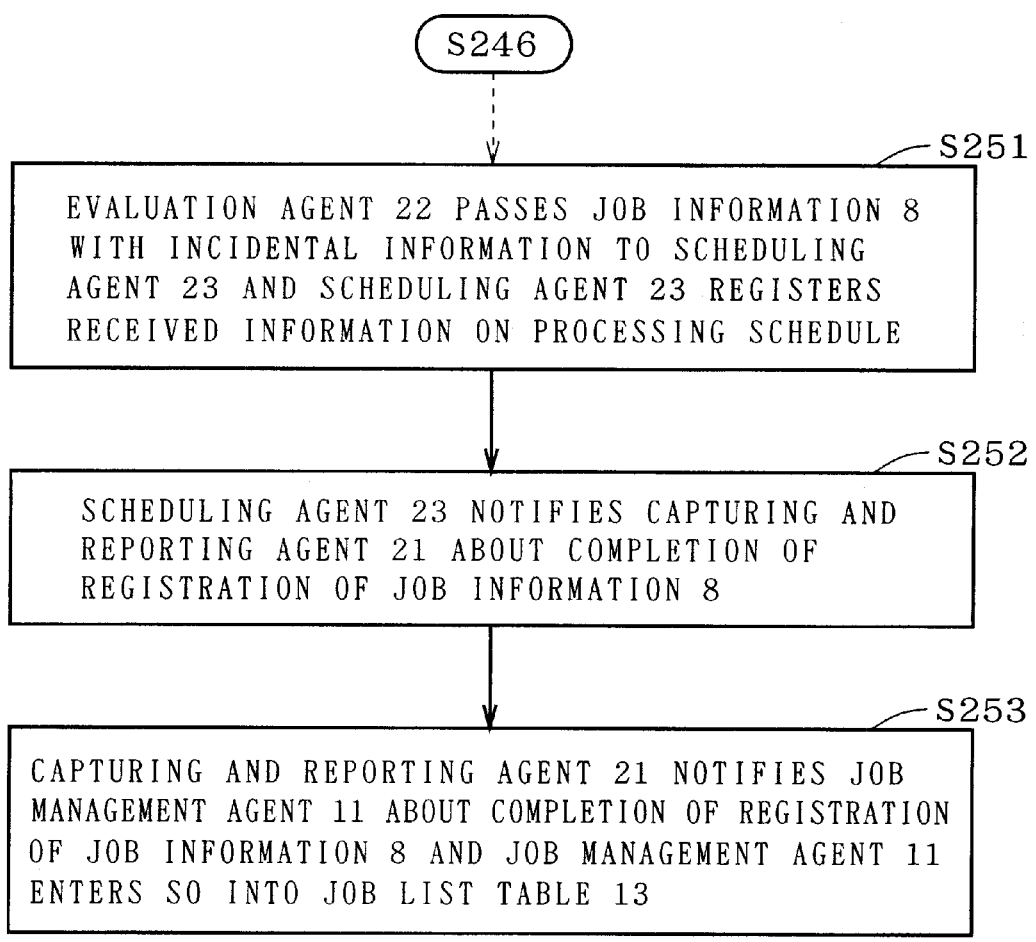
FIG. 90 is a flowchart showing the contents of the steps S251 to S253 of FIG. 59.

In the steps S251 to S253 of FIG. 59, the positively evaluated piece of job information 8 is registered on the processing schedule. FIG. 90 is a flowchart showing the contents of the steps S251 to S253.

The positively evaluated piece of job information 8 is initially passed from the evaluation agent 22 to the scheduling agent 23 (step S251). At this time, incidental information produced in the evaluation agent 22 is also passed to the scheduling agent 23.

The incidental information includes information required for job processing such as what is to be used among the contents of the ability database 28*a* shown in FIGS. 86 and 87, for example, the software name used for application processing and the type of laser used for exposure, and an estimate of cost required for job processing.

Figure 91:
FIG. 91 shows an example of the contents of the schedule table related to the application.
Figure 92:
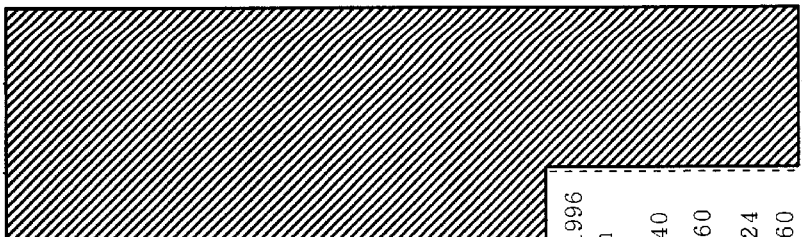
FIG. 92 shows an example of the contents of the schedule table related to the apparatus.

Upon receipt of the piece of job information 8 and the incidental information, the scheduling agent 23 registers the contents thereof on the processing schedule of the schedule table 281*c* (step S251). FIG. 91 shows the piece of job information 8 registered as the processing schedule related to the application. FIG. 92 shows the piece of job information 8 registered as the processing schedule related to the apparatus 30. FIGS. 93 and 94 show the method of calculating the amount to be claimed and a gross profit of FIGS. 91 and 92, using the contents of the profit database 28*b* shown in FIGS. 88 and 89 (type A) as an example (the cost in the upper row for use in calculation of the amount claimed and the cost in the lower row for use in calculation of the gross profit). The evaluation agent 22 calculates the amount to be claimed and the like while referring to the profit database 28*b*.

Upon completion of the registration, the scheduling agent 23 notifies the capturing and reporting agent 21 about the completion of the registration (step S252), and the capturing and reporting agent 21 then so notifies the job management agent 11. The job management agent 11 enters "1" (indicative of "to reserve") into the reservation status information of the job list table 13 shown in FIG. 69 (step S253). This completes the registration of the piece of job information 8 on the processing schedule and allows the input agent system 10 to seize the registration situation of the piece of job information 8. Other job-handling agent systems 20 are inhibited from capturing the piece of job information 8 which has been registered.

<4.3(f) Processing of Job by Means of Application>

Figure 95:
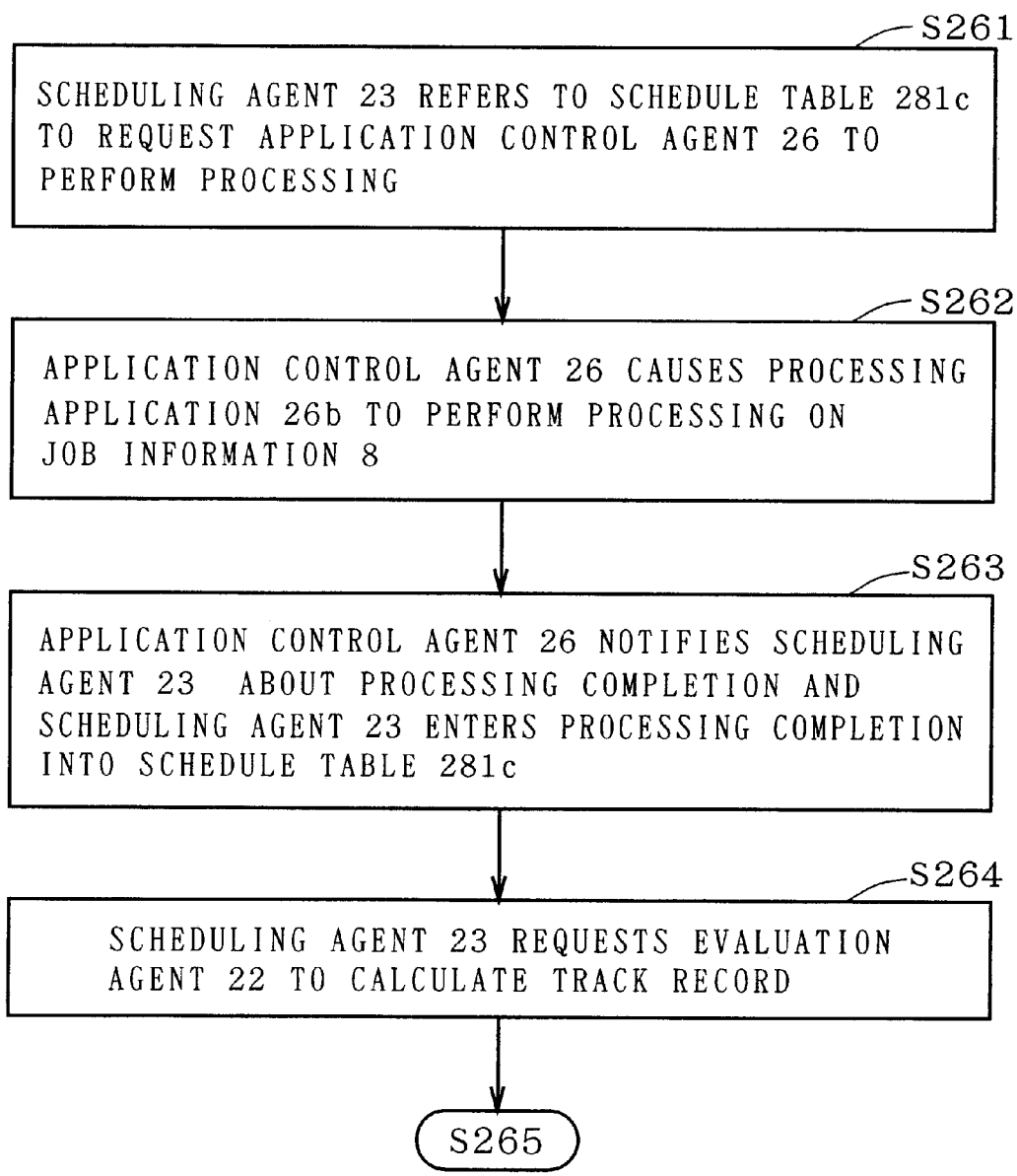
FIG. 95 is a flowchart showing the contents of the steps S261 to S264 of FIG. 60.
Figure 96:
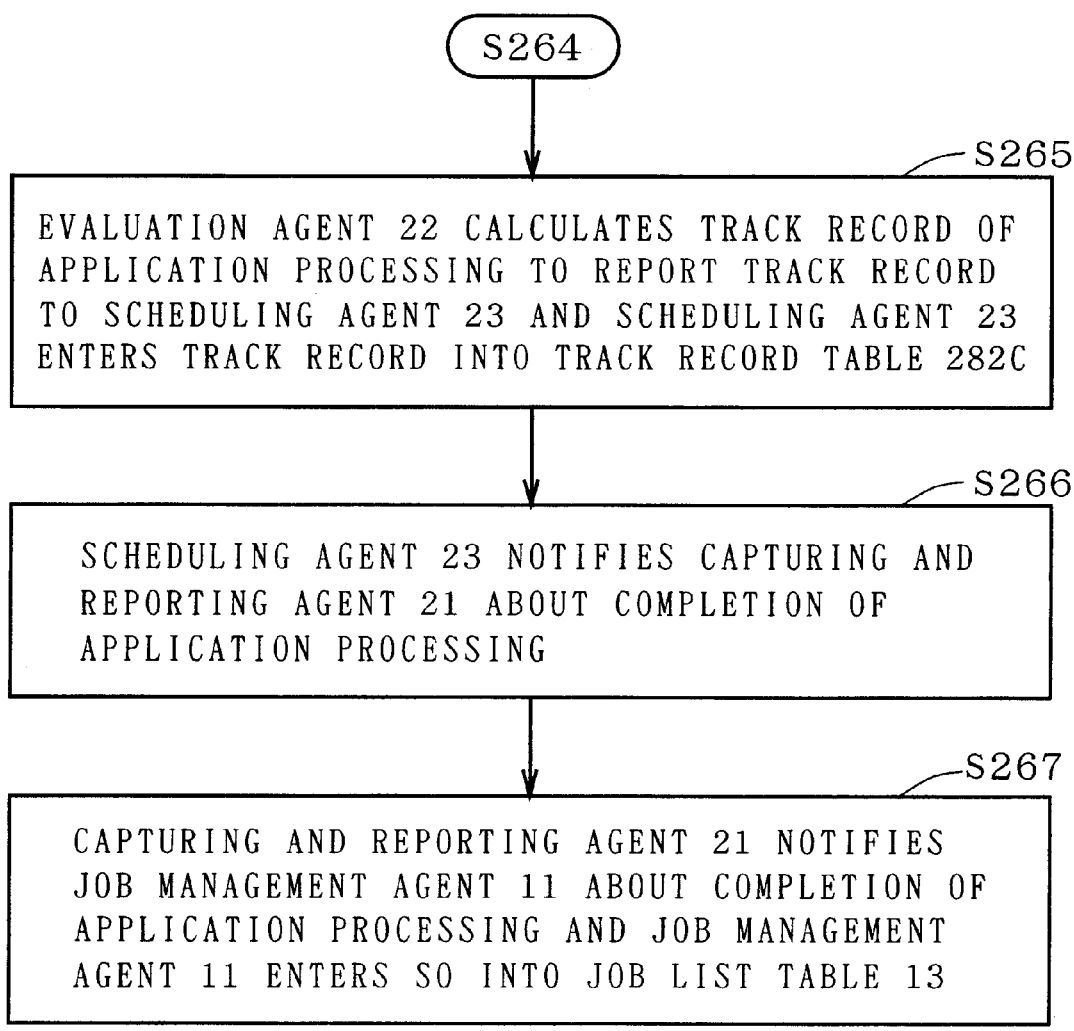
FIG. 96 is a flowchart showing the contents of the steps S265 to S267 of FIG. 60.

In the steps S261 to S267 of FIG. 60, the processing application 26*b* performs the digital processing on the digital materials in accordance with the piece of job information 8 until it produces the output data for plate making. FIGS. 95 and 96 are flowcharts showing the contents of the steps S261 to S267.

In the system 400, the digital processing of the digital materials by means of an application (referred to hereinafter as "application processing") particularly includes layout processing and RIP (Raster Image Processing) which are the preconditions of the plate making processing that is the job processing by means of the apparatus 30. Thus, the processing of the job by means of the application must precede the processing of the job by means of the apparatus 30. In the course of the processing of the job by means of the application, the output data which is the processing results may be transmitted to the apparatus 30. In this preferred embodiment, however, after the previous processing of the whole plate making contents by means of the application, the output data is stored in the fixed disk device 60, and thereafter the output data is transmitted to the apparatus 30 as required during plate making.

In the application processing, the application control agent 26 initially notifies the scheduling agent 23 that the preceding processing is completed and it is currently free. The scheduling agent 23 refers to the processing schedule related to the application in the schedule table 281c to notify the application control agent 26 about the piece of job information 8 to be processed next (step S261).

Upon receipt of the notification about the start of processing, the application control agent 26 refers to the job database 27 to capture required digital materials and information on the processing procedure from the fixed disk device 60. Then, the application control agent 26 causes the processing application 26b to execute necessary processing to provide output data, and then stores the output data as an output file in the fixed disk device 60 as well as additionally enters information on the output file into the output database 27c for the job information 8 (step S262; See FIG. 83).

Upon completion of the application processing, the application control agent 26 notifies the scheduling agent 23 about the completion of the application processing, and the scheduling agent 23 so enters into the schedule table 281c (step S263). This allows the scheduling agent 23 to identify the piece of job information 8 having been subjected to the application processing as a piece of job information 8 which is processable by the apparatus 30. At this time, if the schedule is required to change, the schedule table 281c is updated.

Figure 98:
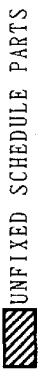
FIG. 98 shows an example of the contents of the track record table related to the application.

Further, the scheduling agent 23 requests the evaluation agent 22 to calculate the track record such as the costs required for the application processing (step S264). In response to the request, the evaluation agent 22 refers to the profit database 28b to calculate the track record such as the total amount claimed and the gross profit, and then reports the track record to the scheduling agent 23. The scheduling agent 23 enters the track record into processing track record information related to the application in the track record table 282c (step S265). FIG. 97 (a left-hand side) shows the method of calculating the track record in the evaluation agent 22. FIG. 98 shows parts of the track record table 282c which are related to the application processing.

Upon completion of the entry of the track record, the scheduling agent 23 notifies the capturing and reporting agent 21 about the completion of the application processing (step S266). Then, the capturing and reporting agent 21 also notifies the job management agent 11 about the completion of the application processing, and the job management agent 11 additionally enters the completion of the application processing into the job list table 13 (step S267). More specifically, the processing result is entered into a section of the processing result report in the job list table 13 shown in FIG. 69 which is related to the application.

If the processing of the job by means of the application is not properly terminated, the processing of the job must be suspended. Thus, the suspension of the job processing is entered into the schedule table 281c and track record table 282c related to the application, and is transmitted from the scheduling agent 23 through the capturing and reporting agent 21 and the job management agent 11 and entered into the job list table 13. That is, the schedule table 281c and track record table 282c related to the application also function as tables for monitoring the termination state of the operation of the application.

<4.3(g) Processing of Job by Means of Apparatus>

Figure 99:
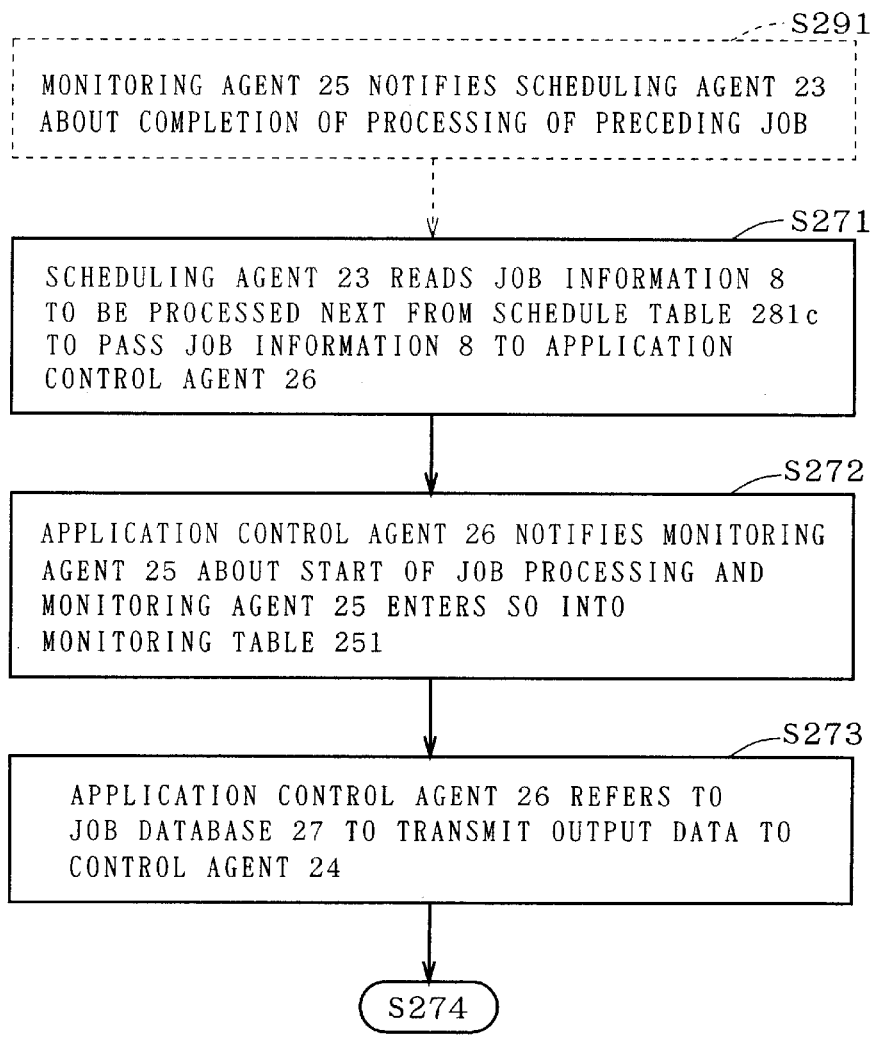
FIG. 99 is a flowchart showing the contents of the steps S271 to S273 of FIG. 61.
Figure 100:
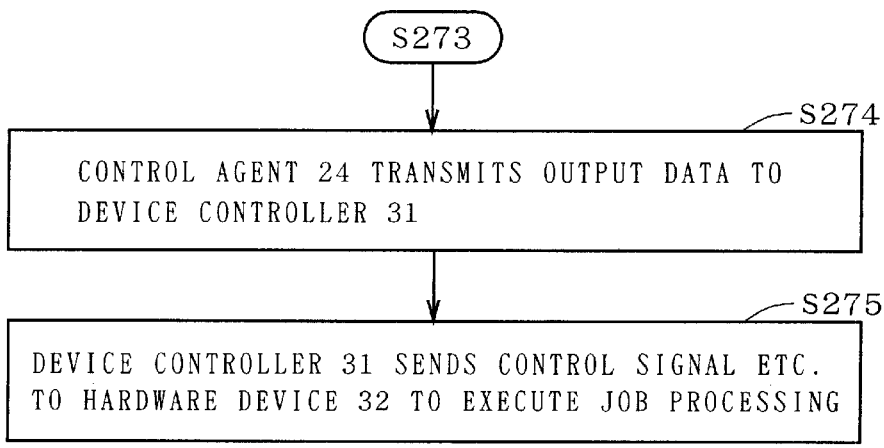
FIG. 100 is a flowchart showing the contents of the steps S274 and S275 of FIG. 61.

The steps S271 to S275 of FIG. 61 are steps executed until the apparatus 30 is placed in operation based on the piece of job information 8. FIGS. 99 and 100 are flowcharts showing the contents of the steps S271 to S275.

As a precondition for the start of the processing of a new job, when the processing of the preceding job is completed, the monitoring agent 25 notifies the scheduling agent 23 about the completion of the job processing (step S291).

Upon receipt of the notification about the completion of the processing of the preceding job, the scheduling agent 23 reads a piece of information on the job to be processed next from the processing schedule related to the apparatus 30 in the schedule table 281c to notify the application control agent 26 about the piece of information on the job to be processed next (step S271).

Upon receipt of the notification about the start of processing, the application control agent 26 previously notifies the monitoring agent 25 about the start of processing. The monitoring agent 25 enters the start of processing into the monitoring table 251 which monitors the processing state in detail (step S272).

Next, the application control agent 26 refers to the job database 27 to read output data desired for the transmission application 26c from the fixed disk device 60, and then transmits the output data to the control agent 24 (step S273).

The control agent 24 further sends the received output data to the apparatus 30 to cause the apparatus 30 to execute the processing of the job (step S274).

In the apparatus 30, the device controller 31 receives the output data from the control agent 24 (step S274) to send a control signal to the hardware device 32 in response to the output data and the incidental information, whereby the processing of the job is executed (step S275).

<4.3(h) Monitoring of Job Processing>

Figure 101:
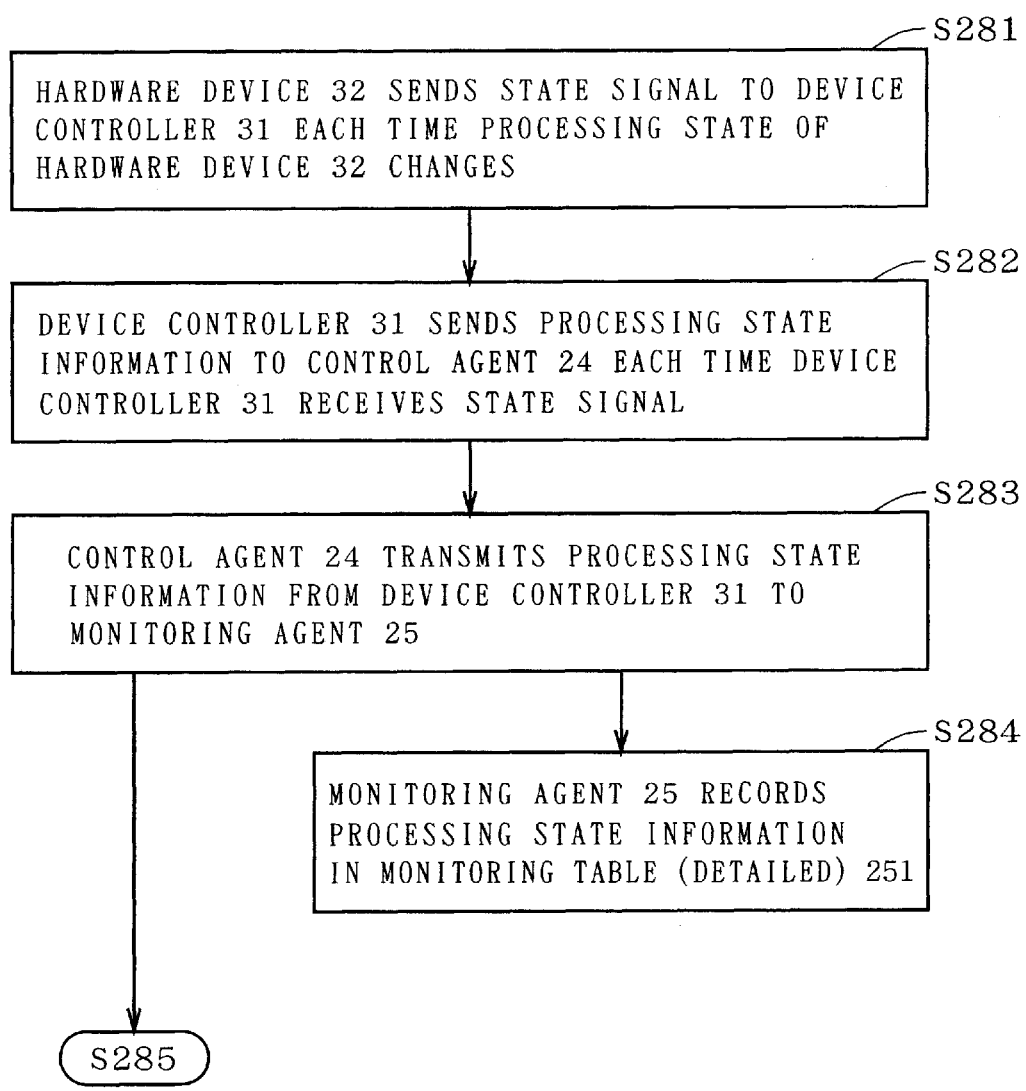
FIG. 101 is a flowchart showing the contents of the steps S281 to S284 of FIG. 62.
Figure 102:
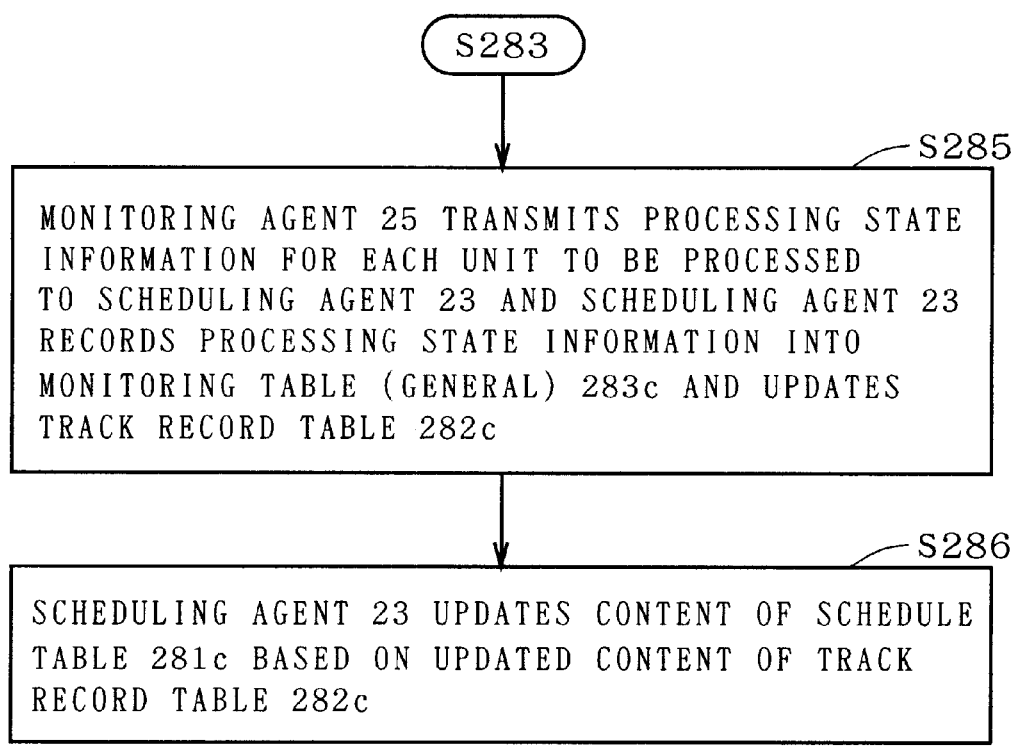
FIG. 102 is a flowchart showing the contents of the steps S285 and S286 of FIG. 62.

The job-handling agent system 20 monitors the job processing during the time the apparatus 30 executes the job processing. The steps S281 to S286 of FIG. 62 are the steps of the monitoring. FIGS. 101 and 102 are flowcharts showing the contents of the steps S281 to S286.

The information for monitoring is initially sent from the hardware device 32 to the device controller 31 in the apparatus 30. This information is sent as a state signal each time the processing state of the hardware device 32 is changed (step S281).

Each time the device controller 31 receives the state signal, the device controller 31 sends information on the processing state of the apparatus 30 to the control agent 24 of the job-handling agent system 20 (step S282). The control agent 24 transmits the received processing state information to the monitoring agent 25 (step S283).

The monitoring agent 25 has the dedicated monitoring table 251 in which all detailed pieces of processing state information received by the monitoring agent 25 are recorded (step S284). FIG. 103 shows an example of the contents recorded in the monitoring table (detailed) 251.

The monitoring agent 25 separates the received processing state information into units to be processed each having a predetermined amount of information to sends the separated processing state information to the scheduling agent 23. The scheduling agent 23 records the processing state in the monitoring table (general) 283c provided in the scheduling database 28c and then updates the contents of the track record table 282c in the scheduling database 28c (step S285). The separation of the processing state information into the units to be processed for recording in the monitoring table (general) 283c is intended to allow the operator and the like to refer to the monitoring table 283c as required to readily seize the processing state. FIG. 104 shows an example of the contents of the monitoring table 283c.

The scheduling agent 23 also updates the contents of the schedule table 281c in accordance with the updated contents of the track record table 282c (step S286). The operating time of the apparatus 30 is updated and recorded moment by moment in the track record table 282c since the estimated time at which the processing of the next job starts and the like must be corrected if the operating time has already exceeds a predetermined operating time. This eliminates the need for the input agent system 10 to correct the schedule and the need for the input agent system 10 to take into consideration of the correction of the processing schedule when an unprocessed piece of job information 8 is passed to the job-handling agent system 20.

Although this preferred embodiment describes that the processing of the job by means of the processing application 26b is completed prior to the processing of the job by means of the apparatus 30, the output data may be transmitted to the control agent 24 at the same time that the processing application 26b produces the output data. In this case, since a trouble is assumed to occur in the processing application 26b during the operation of the apparatus 30, the processing states (e.g., processing start, processing end, suspension, and restart) of the processing application 26b are also entered into the monitoring table 251 shown in FIG. 103.

<4.3(i) Operation after Completion of Job Processing>

Figure 105:
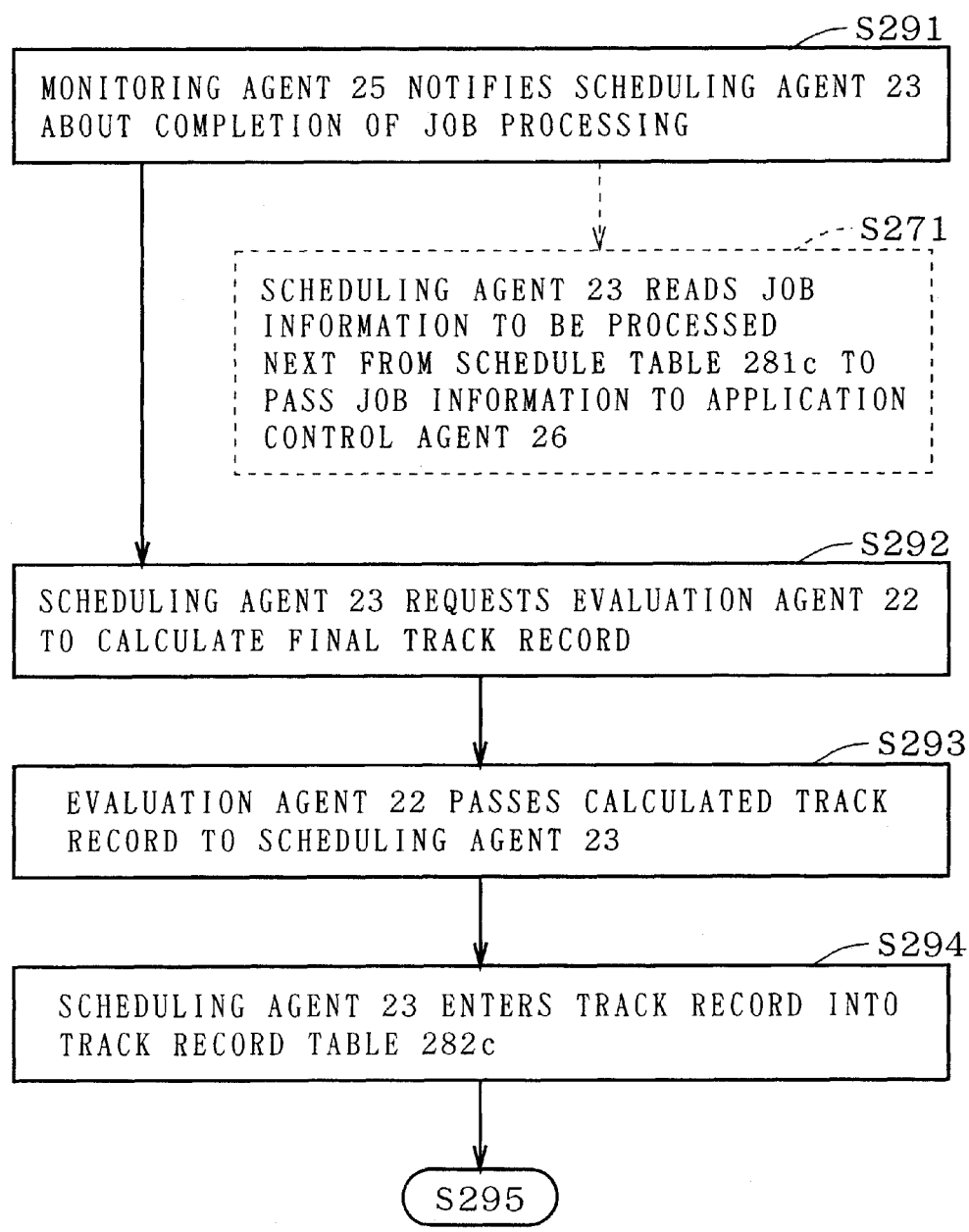
FIG. 105 is a flowchart showing the contents of the steps S291 to S294 of FIG. 63.
Figure 106:
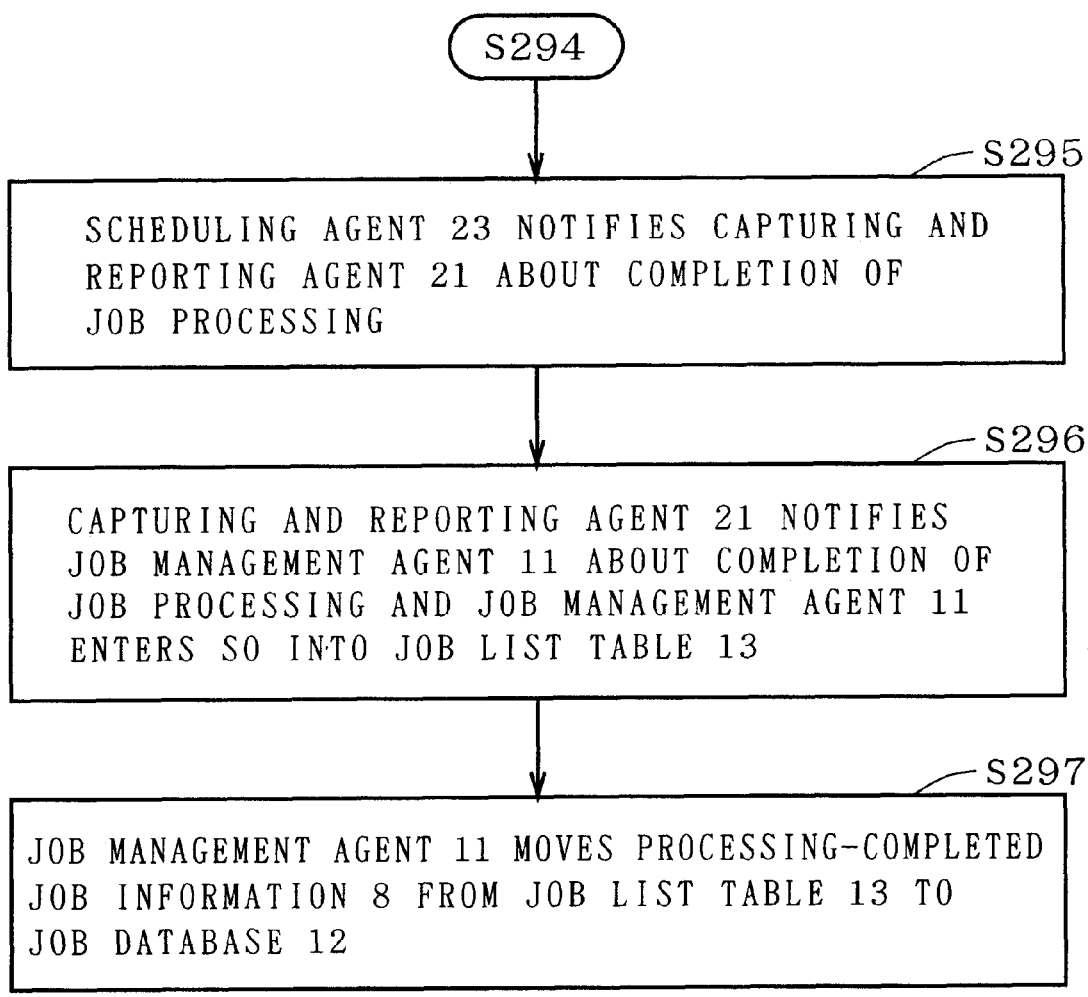
FIG. 106 is a flowchart showing the contents of the steps S295 to S297 of FIG. 63.

The steps S291 to S297 of FIG. 63 are the steps of the operation of the system 400 after the completion of the job processing in the apparatus 30. FIGS. 105 and 106 are flowcharts showing the contents of the steps S291 to S297.

When the job processing in the apparatus 30 is completed, the processing state information indicative of the completion of the processing is inputted from the apparatus 30 through the control agent 24 to the monitoring agent 25. This processing completion report is transmitted from the monitoring agent 25 to the scheduling agent 23 (step S291). In response to the processing completion report, the scheduling agent 23 directs the control agent 24 to process the next job (FIG. 61; step S271) as described above.

The scheduling agent 23 requests the evaluation agent 22 to calculate the final track record which is the cost required until the completion of the job processing (step S292). The track record calculation is similar in contents to the above described calculation of the amount to be claimed (FIG. 94) and the like. A particular example of the track record calculation is shown in FIG. 107. The track record generated by the transmission of the output data by means of the application is also calculated as shown in FIG. 97 (on the right-hand side).

When the calculation of the track record is completed, the evaluation agent 22 passes the result of calculation to the scheduling agent 23 (step S293), and the scheduling agent 23 then enters the actual amount claimed, actual processing time and the like as the final track record into the track record table 282c (step S294). This eliminates the need for the input agent system 10 to calculate the track record and allows the job-handling agent system 20 to refer to the track record table 282c to readily seize the track record. FIG. 108 shows an example of the contents of a section of the track record table 282c which is related to the apparatus 30.

The scheduling agent 23 also transmits the processing completion report to the capturing and reporting agent 21 (step S295), and the capturing and reporting agent 21 then notifies the job management agent 11 about the processing completion report. Upon receipt of the processing completion report, the job management agent 11 so enters into the job list table 13 (step S296). More specifically, the time and termination result are entered into the part of the processing result information which is related to the apparatus among the contents of the job list table 13 shown in FIG. 69. This allows the input agent system 10 to seize which piece of job information 8 is processing-completed.

The job management agent 11 moves the processing-completed piece of job information 8 from the job list table 13 to the job database 12 and deletes the processing-completed piece of job information 8 in the job list table 13 (step S297).

The above described operation completes the operation of the system 400 after the completion of the job processing in the apparatus 30.

<4.4 Operation Flow in Agents>

The entire operation of the system 400 has been described hereinabove. The system 400 operates, with the agents that are autonomous programs making contact with each other. An operation flow will be described with attention focused on the individual agents. Like reference characters are used to designate some of the steps shown in FIGS. 109 through 124 which are similar to those shown in FIGS. 55 through 63. In addition, some steps designated by the reference characters in FIGS. 55 through 63 as the single steps for purposes of simplicity are shown in FIGS. 109 through 124 as separated into sub-steps designated by the identical reference characters.

<4.4(a) Operation Flow in Job Management Agent>

Figure 109:
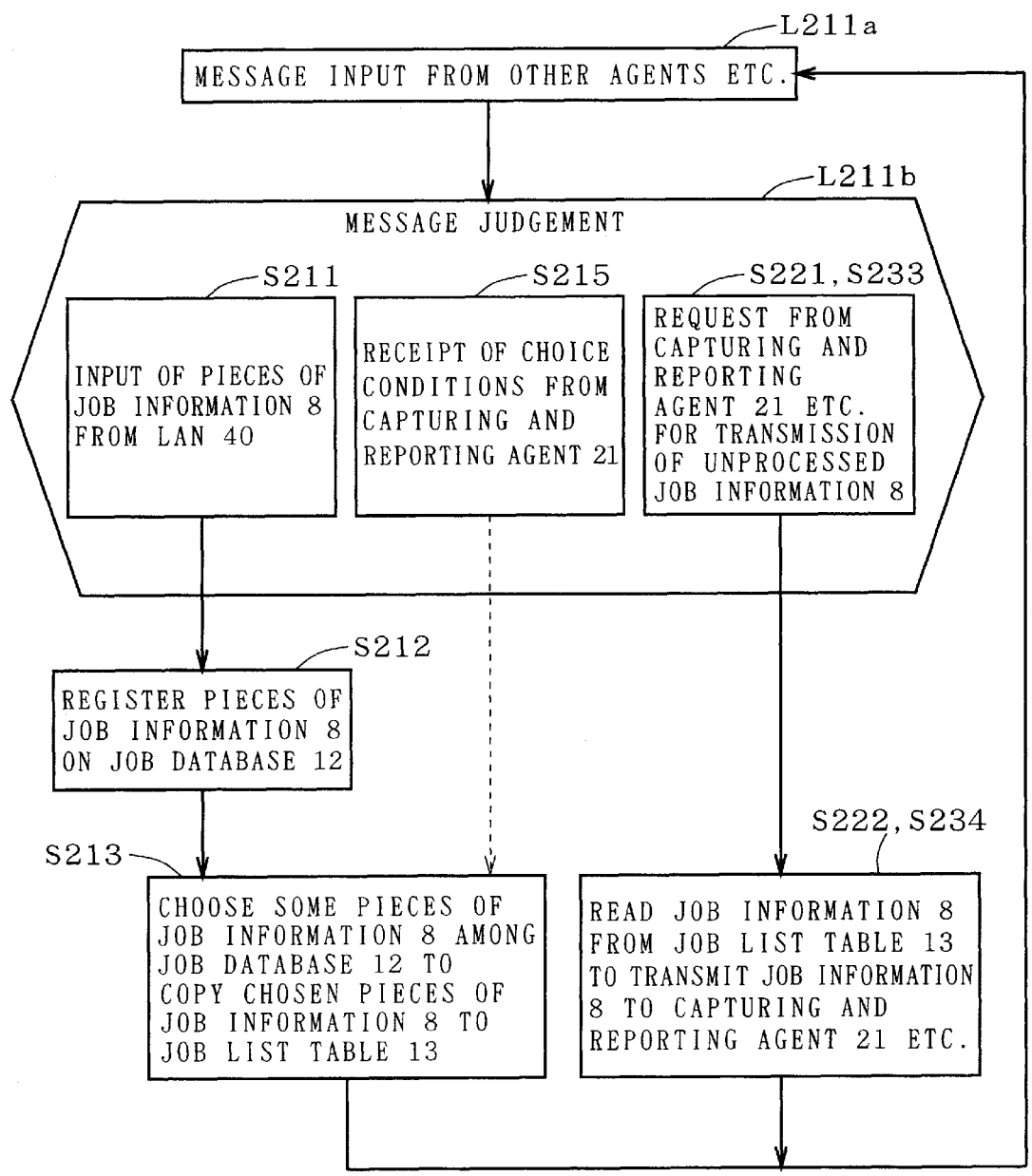
FIGS. 109 and 110 are flowcharts showing the operation of the job management agent.
Figure 110:
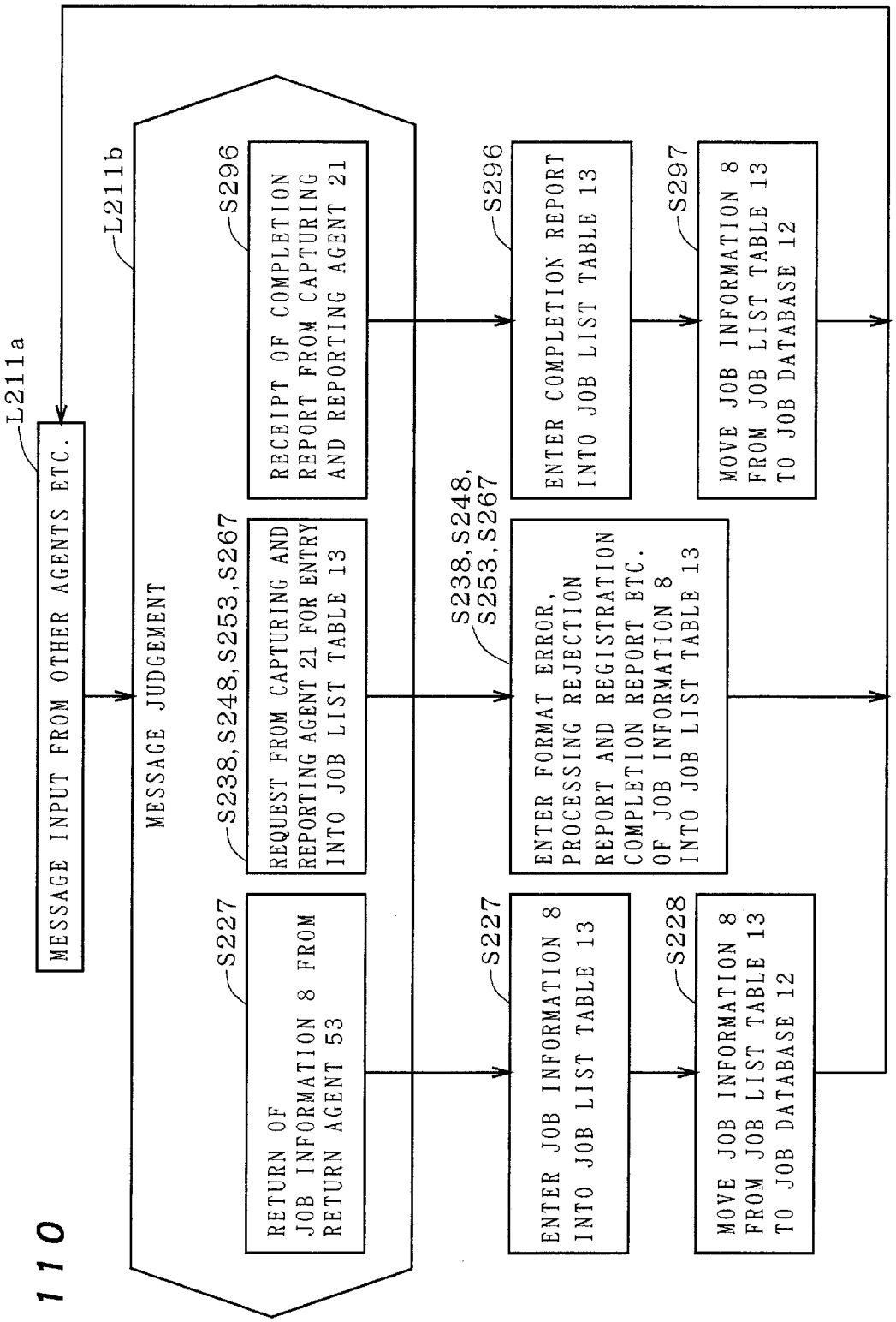

FIGS. 109 and 110 are flowcharts showing the operation of the job management agent 11.

Each of the agents is in principle adapted to operate in response to a message input (step L211a) from other agents and the like, and judges the message (step L211b) if there is a message input.

It should be noted that the steps L211a and L211b of FIG. 109 and those of FIG. 110 are the same, but are illustrated in separate figures only for purposes of convenience of representation. In the following figures, the same step related to the input and judgement of messages is illustrated as required in different figures using the same reference character.

Brief description about the messages inputted to the job management agent 11 and the responses of the job management agent 11 thereto in sequential order is as follows:

When pieces of job information 8 are inputted from the LAN 40 (step S211), the job management agent 11 registers the pieces of job information 8 onto the job database 12 (step S212). Thereafter, the job management agent 11 chooses some pieces of job information 8 among the job database 12 in accordance with the choice conditions to copy the chosen pieces of job information 8 to the job list table 13 (step S213).

Upon receipt of the choice conditions from the capturing and reporting agent 21 (step S215), the job management agent 11 uses the choice conditions to choose the pieces of job information 8 among the job database 12 (step S213).

When the capturing and reporting agent 21 or the capturing agent 51 requests the job management agent 11 to transmit an unprocessed piece of job information 8 (steps S221 and S233), the job management agent 11 reads an unprocessed piece of job information 8 from the job list table 13 to transmit the unprocessed piece of job information 8 to the capturing and reporting agent 21 or the capturing agent 51 (steps S222 and S234).

When the return agent 53 returns the pre-processed piece of job information 8, the job management agent 11 enters the piece of job information 8 into the job list table 13 (step S227), and moves the piece of job information 8 from the job list table 13 to the job database 12 (step S228).

When the capturing and reporting agent 21 requests the job management agent 11 to enter management information which is additional information into the job list table 13 (steps S238, S248, S253 and S267), the job management agent 11 adds the format error (step S238), the processing rejection report (step S248), the registration completion report (step S253) and the application processing completion report (step S267) of the piece of job information 8 to the job list table 13.

Upon receipt of the job processing completion report from the capturing and reporting agent 21 (step S296), the job management agent 11 enters the completion report into the job list table 13 (step S296), and moves the piece of job information 8 for the completed job from the job list table 13 to the job database 12 (step S297).

The input of the message from other agents (step L211a), the judgement of the message (step L211b), and the response to the message are performed in a cyclic manner in the job management agent 11.

<4.4(b) Operation Flow in Capturing and Reporting Agent>

Figure 111:
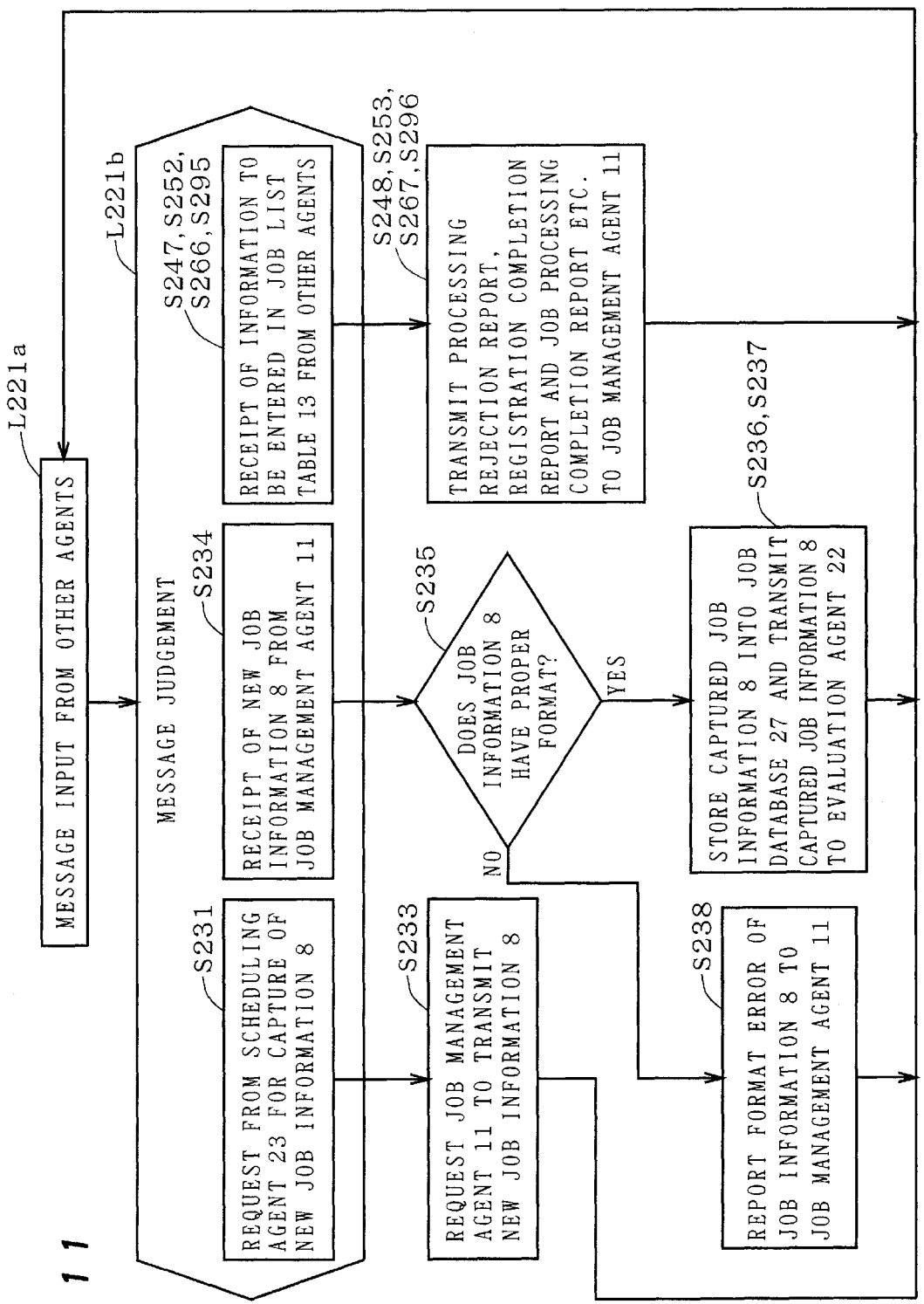
FIG. 111 is a flowchart showing the operation of the capturing and reporting agent.

FIG. 111 is a flowchart showing the operation of the capturing and reporting agent 21. In the capturing and reporting agent 21, the judgement of the message (step L221b) in response to the message input from other agents (step L221a) and the response to the message are performed in a cyclic manner, as will be described below.

When the scheduling agent 23 directs the capturing and reporting agent 21 to capture a new piece of job information 8 (step S231), the capturing and reporting agent 21 requests the job management agent 11 to transmit a new piece of job information 8 (step S233).

Upon receipt of the new piece of job information 8 from the job management agent 11 (step S234), the capturing and reporting agent 21 judges whether or not the captured piece of job information 8 has a proper format (step S235). If no format error is detected, the capturing and reporting agent 21 stores the captured piece of job information 8 into the job database 27 and transmits the captured piece of job information 8 to the evaluation agent 22 (steps S236 and S237). If a format error is detected, the capturing and reporting agent 21 reports so to the job management agent 11 (step S238).

Upon receipt of the processing rejection report from the evaluation agent 22 (step S247), the registration completion report from the scheduling agent 23 (step S252), the application processing completion report (step S266), or the completion report of the job processing by means of the apparatus 30 (step S295), the capturing and reporting agent 21 transmits these reports to the job management agent 11 (steps S248, S253, S267 and S296).

In other operations, upon receipt of the choice conditions from the evaluation agent 22 (step S214), the capturing and reporting agent 21 transmits the choice conditions to the job management agent 11 (step S215).

<4.4(c) Operation Flow in Evaluation Agent>

Figure 112:
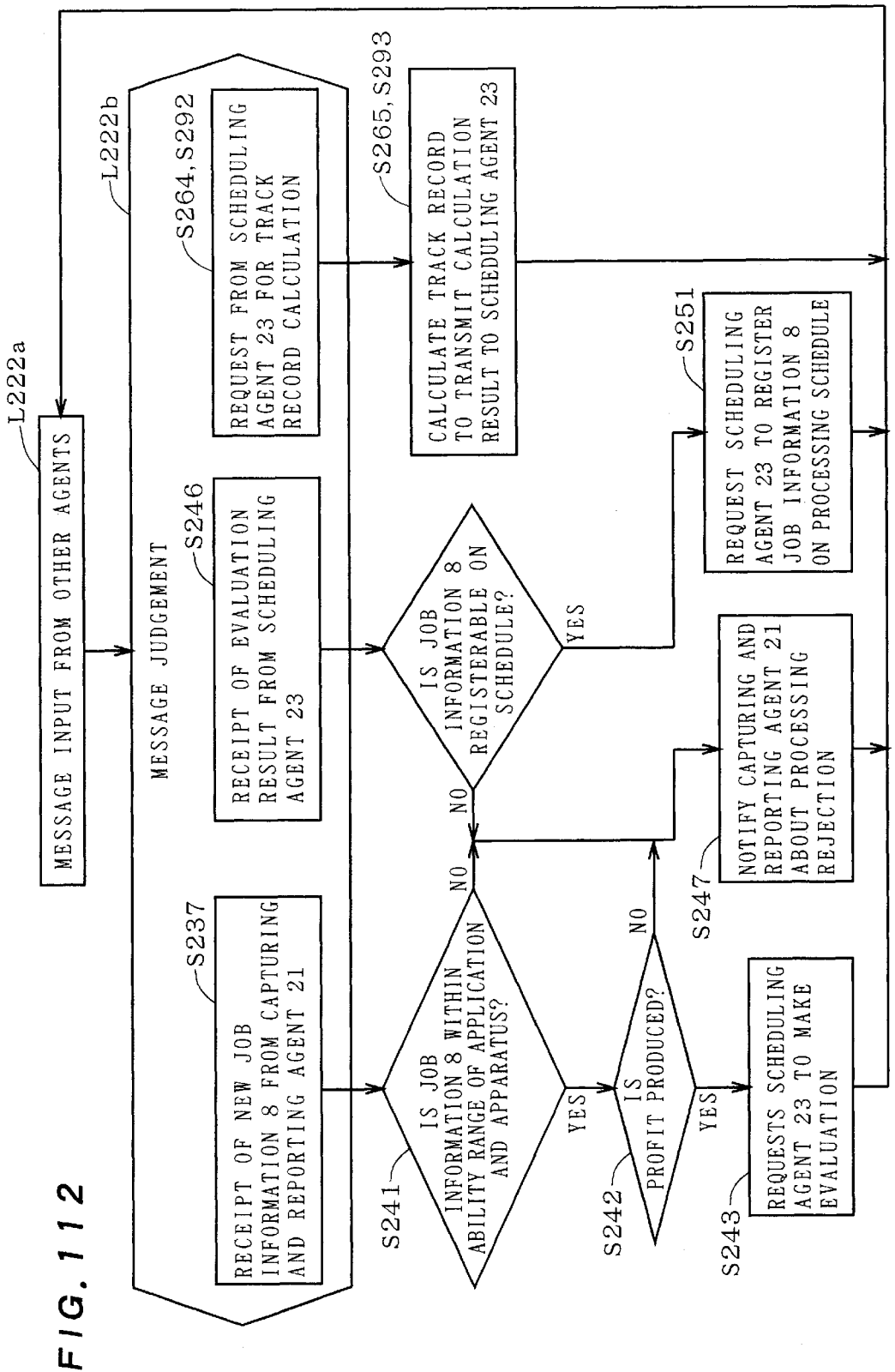
FIG. 112 is a flowchart showing the operation of the evaluation agent.

FIG. 112 is a flowchart showing the operation of the evaluation agent 22. In the evaluation agent 22, the judgement of the message (step L222b) in response to the message input from other agents (step L222a) and the response to the message are performed in a cyclic manner, as will be described below.

Upon receipt of the new piece of job information 8 from the capturing and reporting agent 21 (step S237), the evaluation agent 22 evaluates whether or not the contents of the piece of job information 8 are within the ability range of the job-handling agent system 20 and the apparatus 30 (step S241). If the contents of the piece of job information 8 are within the ability range of the job-handling agent system 20 and the apparatus 30, the evaluation agent 22 then evaluates whether or not the processing of the job produces a profit (step S242). If the piece of job information 8 is to produce a profit, the evaluation agent 22 requests the scheduling agent 23 to evaluate whether or not the piece of job information 8 is registerable on the schedule (step S243). If at least one of the first- and second-stage evaluations in the steps S241 and S242 provides a negative result, the evaluation agent 22 notifies the capturing and reporting agent 21 about the processing rejection report (step S247).

Upon receipt of the third-stage evaluation about the registrability on the processing schedule from the scheduling agent 23 (step S246), the evaluation agent 22 requests the scheduling agent 23 to register the piece of job information 8 on the processing schedule (step S251) if the third-stage evaluation provides a positive result, and notifies the capturing and reporting agent 21 about the processing rejection report (step S247) if the third-stage evaluation provides a negative result.

When the scheduling agent 23 requests the evaluation agent 22 to calculate the track record of the job which has been subjected to the processing (application processing or the processing by means of the apparatus 30) (steps S264 and S292), the evaluation agent 22 calculates the track record to transmit the result of calculation to the scheduling agent 23 (steps S265 and S293).

In other operations, the evaluation agent 22 transmits the choice conditions used by the job management agent 11 to the capturing and reporting agent 21 (step S214).

The evaluating operations of the evaluation agent 22 are described in detail hereinafter.

Figure 113:
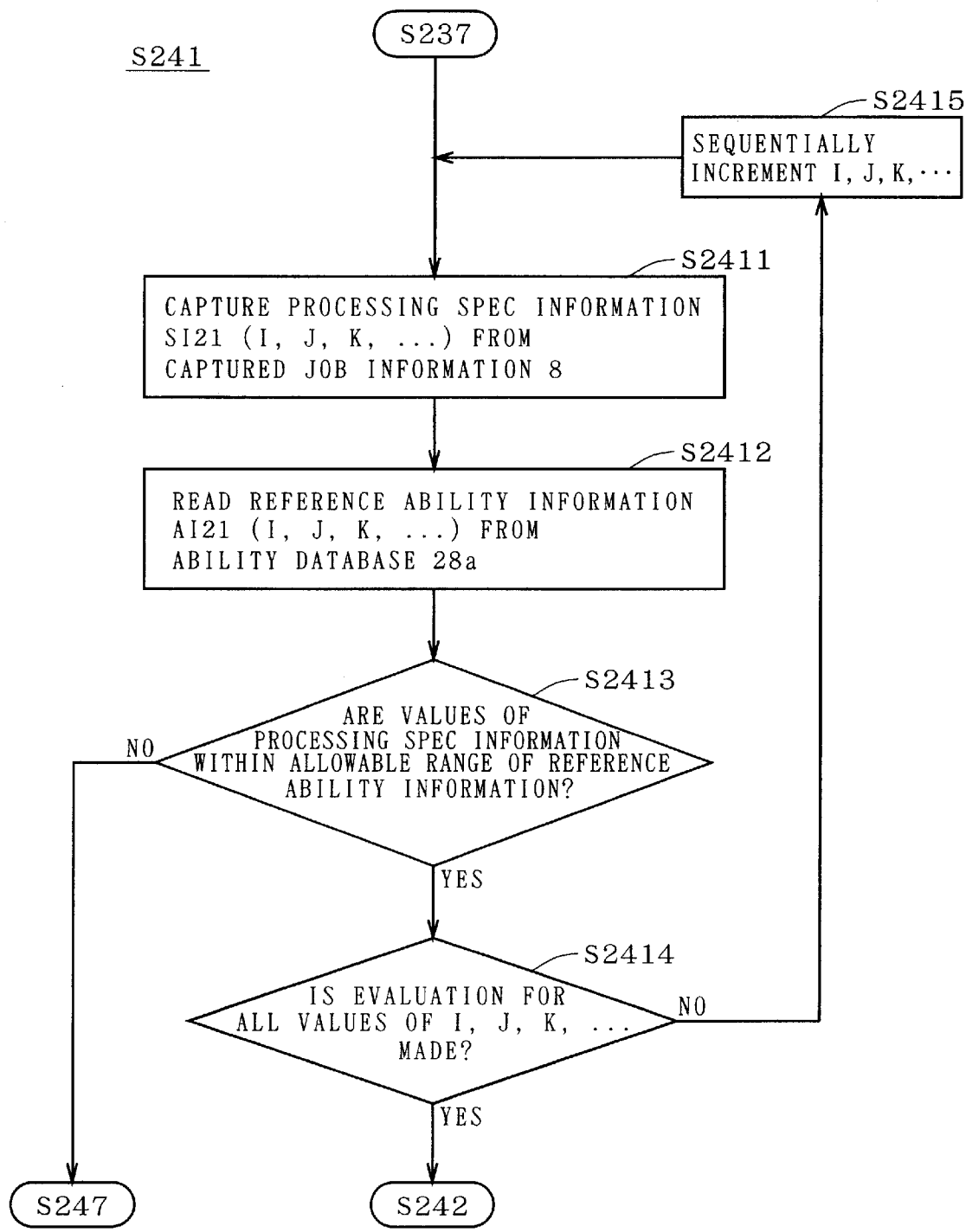
FIG. 113 is a flowchart showing the operation of the evaluation agent in the step S241.
Figure 114:
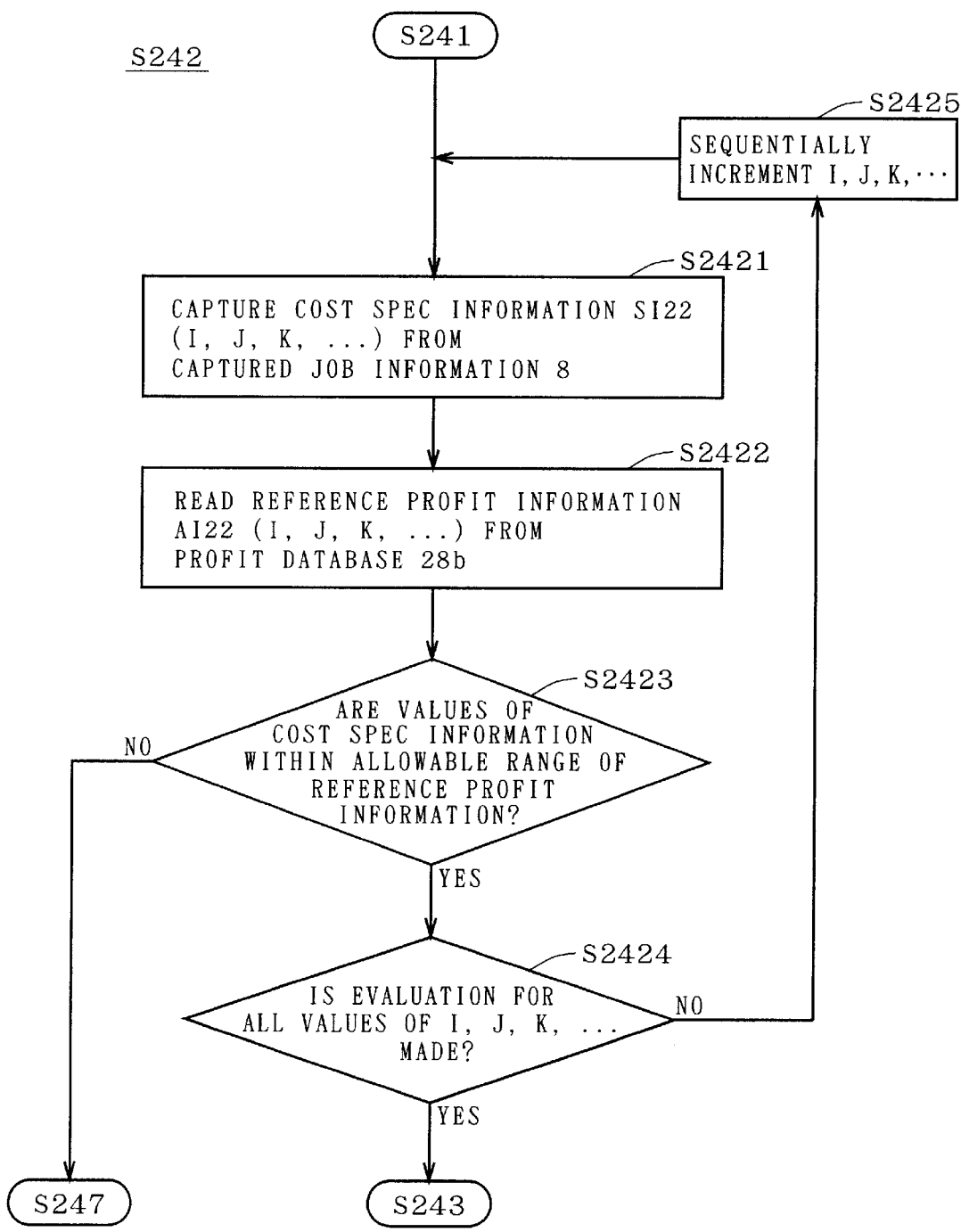
FIG. 114 is a flowchart showing the operation of the evaluation agent in the step S242.

FIGS. 113 and 114 show an operation flow of the evaluation agent 22 in the step (step S241) of evaluating whether or not the contents of the piece of job information 8 are within the ability range of the job-handling agent system 20 and the apparatus 30 and in the step (step S242) of evaluating whether or not the processing of the job in accordance with the piece of job information 8 produces a profit.

In the step (step S241) of whether or not the contents of the piece of job information 8 are within the ability range of the job-handling agent system 20 and the apparatus 30, the evaluation agent 22 initially captures the processing specification information SI21 (I, J, K, . . .) such as the production specification contents from the captured piece of job information 8 (step S2411) where I, J, K . . . are parameters of the processing specification information SI21. The values of the processing specification information SI21 of a particular type are specified for each combination of the values of the parameters I, J, K, . . .

Next, the evaluation agent 22 reads the reference ability information AI21 (I, J, K, . . .) corresponding to the processing specification information SI21 (I, J, K, . . .) from the ability database 28a (step S2412). If all values of the processing specification information SI21 (I, J, K, . . .) in respective combinations of the values of the parameters I, J, K, . . . are within the allowable range of the corresponding reference ability information AI21 (I, J, K, . . .), a positive evaluation is made. If any value of the processing specification information SI21 is out of the allowable range of the corresponding reference ability information AI21, a negative evaluation is made (steps S2413, S2414 and S2415).

The operation of the evaluation agent 22 in the step (step S242) of evaluating whether or not the processing of the job in accordance with the piece of job information 8 produces a profit is generally similar to that in the step (step S241) of evaluating the ability of the apparatus. Specifically, a comparison is made between the cost specification information SI22 (I, J, K, . . .) (step S2421) captured from the piece of job information 8 and the reference profit information AI22 (I, J, K, . . .) (step S2422) read from the profit database 28b. If all values of the cost specification information SI22 are within the allowable range of the reference profit information AM22, a positive evaluation is made. If any value of the cost specification information SI22 is out of the range of the corresponding reference profit information AI22, a negative evaluation is made (steps S2423, S2424 and S2425).

<4.4(d) Operation Flow in Scheduling Agent>

Figure 115:
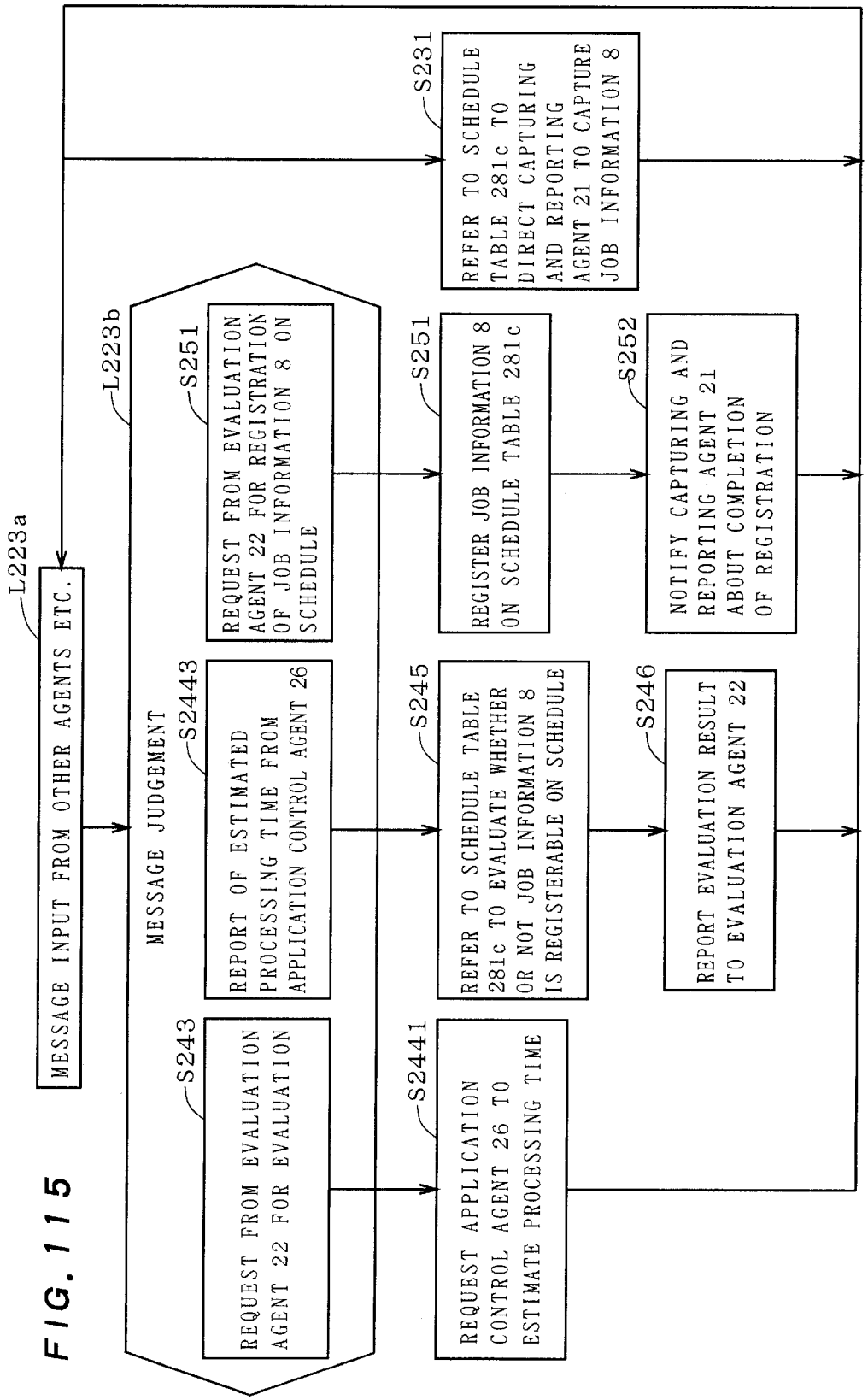
FIGS. 115 through 117 are flowcharts showing the operation of the scheduling agent.
Figure 116:
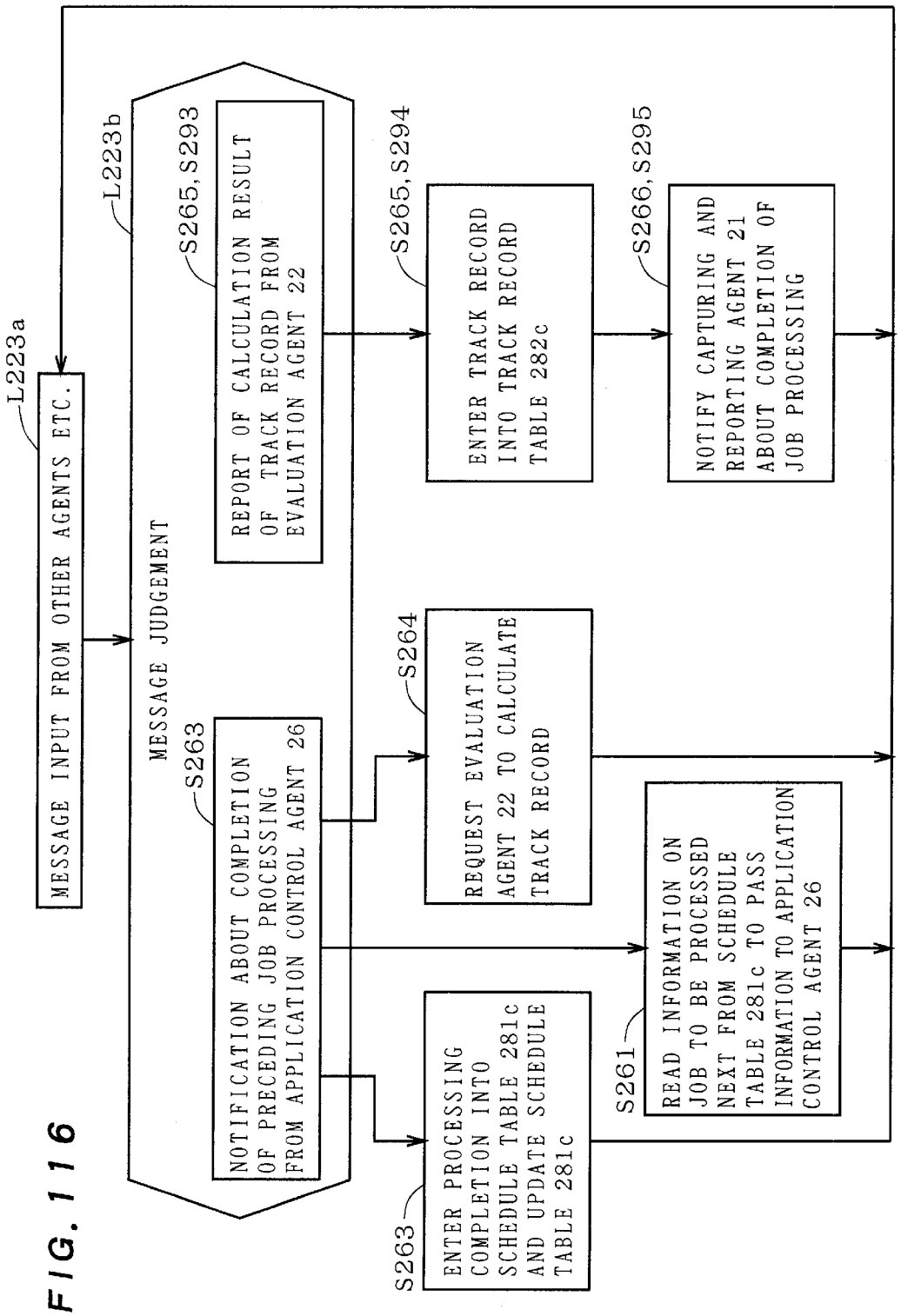
Figure 117:
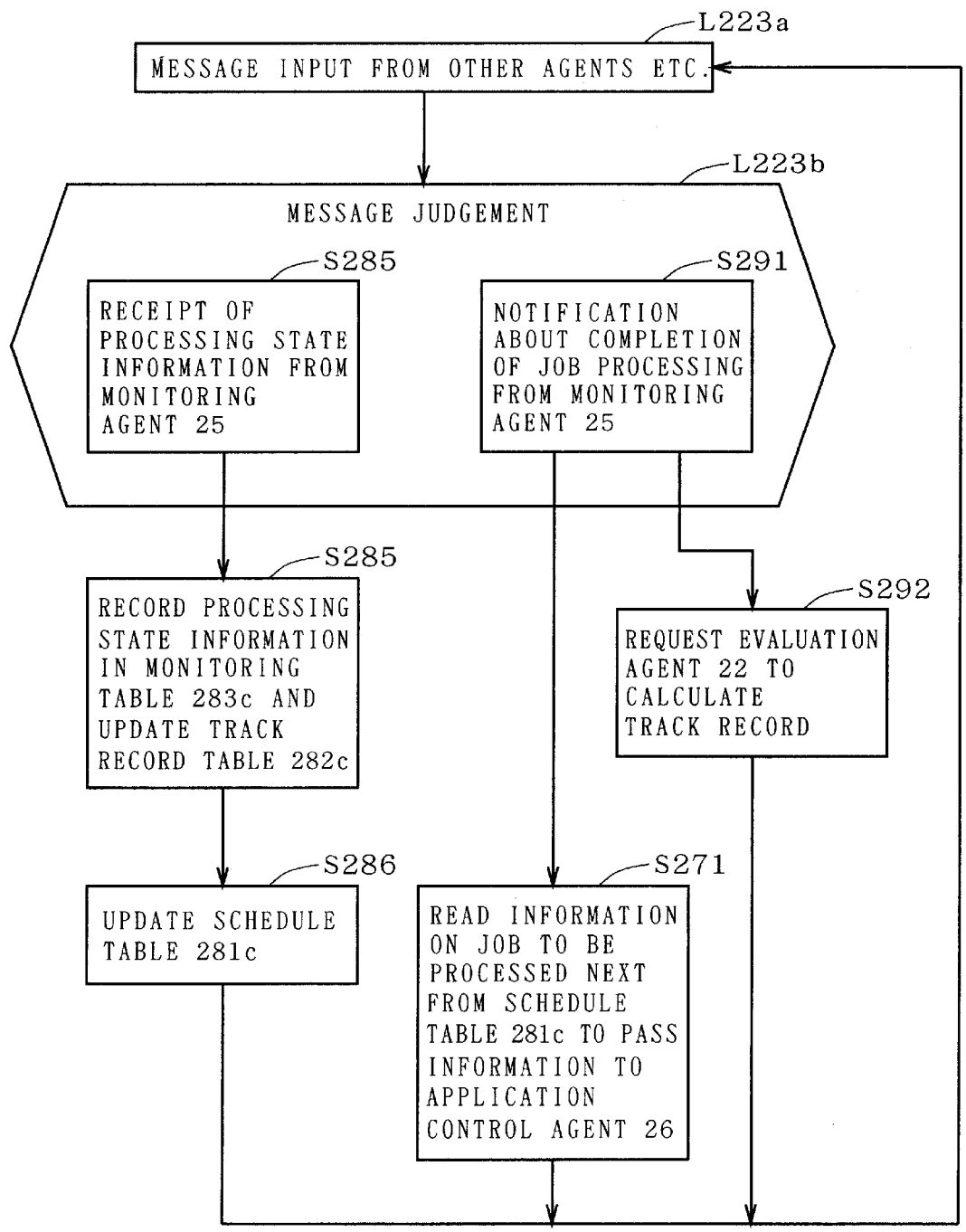

FIGS. 115 through 117 are flowcharts showing the operation of the scheduling agent 23. In the scheduling agent 23, the judgement of the message (step L223b) in response to the message input from other agents (step L223a) and the response to the message are performed in a cyclic manner, as will be described below. In this preferred embodiment, the scheduling agent 23 is adapted to direct the capturing and reporting agent 21 to capture a new piece of job information 8 while referring to the schedule table 281c (step S231). Thus, the scheduling agent 23 is adapted to provide this direction also while no message is inputted from other agents.

When the evaluation agent 22 requests the scheduling agent 23 to evaluate whether or not the piece of job information 8 is registerable on the processing schedule (step S243), the scheduling agent 23 requests the application control agent 26 to estimate the time required for the application processing (step S2441).

Upon receipt of the report of the estimated processing time from the application control agent 26 (step S2443), the scheduling agent 23 refers to the schedule table 281c to conduct the evaluation (step S245), and then reports the result of evaluation to the evaluation agent 22 (step S246).

When the evaluation agent 22 requests the scheduling agent 23 to register the piece of job information 8 on the processing schedule, the scheduling agent 23 registers 74 the piece of job information 8 on the schedule table 281c (step S251), and notifies the capturing and reporting agent 21 about the completion of the registration (step S252).

Upon receipt of the notification about the completion of the application processing from the application control agent 26 (step S263), the scheduling agent 23 so enters into the schedule table 281c and updates the schedule table 281c (step S263). Then, the scheduling agent 23 reads the piece of job information 8 to be subjected to the application processing next from the schedule table 281c to pass the read piece of job information 8 to the control agent (step S261). Further, the scheduling agent 23 requests the evaluation agent 22 to calculate the track record of the application processing (step S264).

Upon receipt of the calculation results of the track record of the application processing and the processing by means of the apparatus 30 from the evaluation agent 22 (steps S265 and S293), the scheduling agent 23 enters the track record into the track record table 282c (steps S265 and S294), and notifies the capturing and reporting agent 21 about the completion of the job processing (steps S266 and S295).

Upon receipt of the processing state information from the monitoring agent 25, the scheduling agent 23 records the processing state information in the monitoring table 283c to update the track record table 282c (step S285). The scheduling agent 23 also updates the contents of the schedule table 281c in accordance with the contents of the track record table 282c (step S286).

Upon receipt of the notification about the completion of the job processing by means of the apparatus 30 from the monitoring agent 25 (step S291), the scheduling agent 23 requests the evaluation agent 22 to calculate the track record (step S292), and also reads the information on the job to be processed next form the schedule table 281c to pass the information to the application control agent 26 (step S271).

<4.4(e) Operation Flow in Control Agent>

Figure 118:
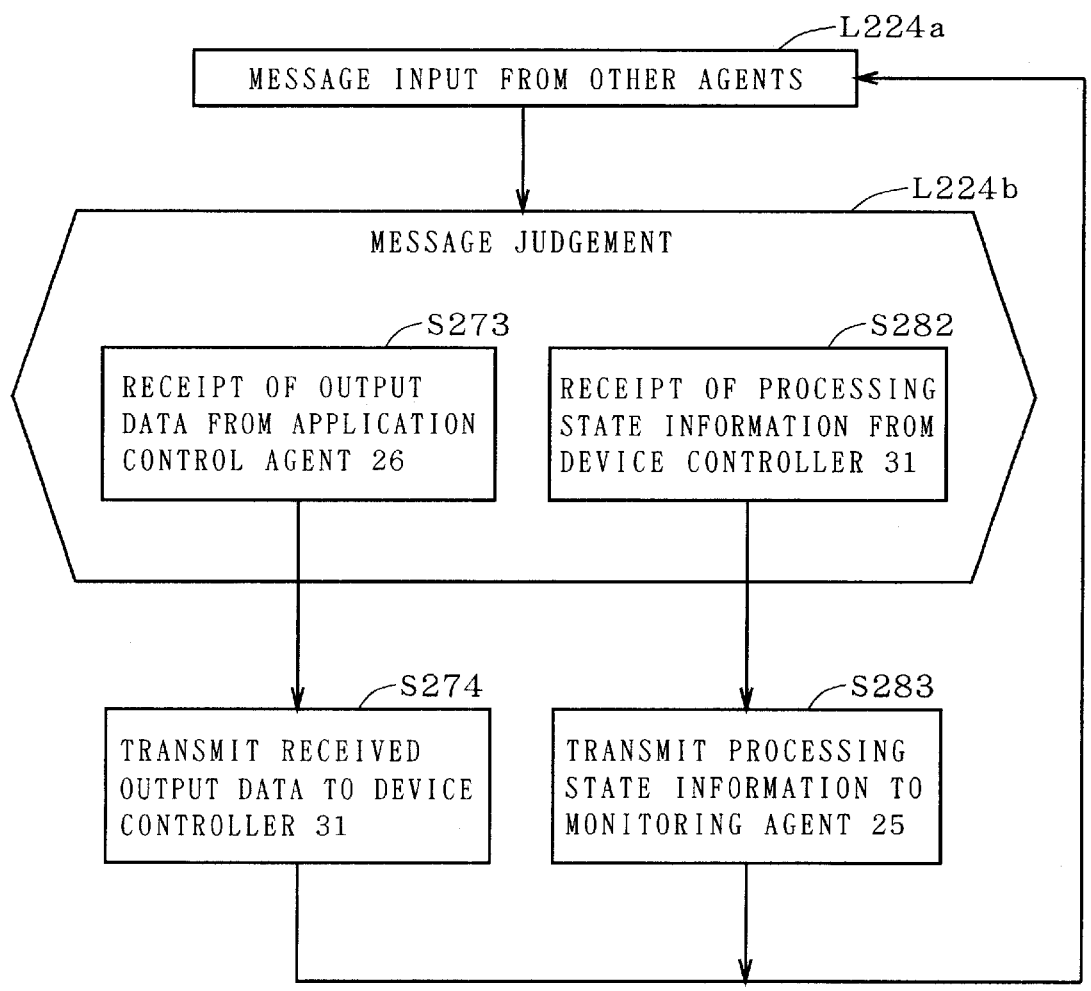
FIG. 118 is a flowchart showing the operation of the control agent.

FIG. 118 is a flowchart showing the operation of the control agent 24. In the control agent 24, the judgement of the message (step L224b) in response to the message input from other agents (step L224a) and the response to the message are performed in a cyclic manner, as will be described below.

Upon receipt of the output data from the application control agent 26 (step S273), the control agent 24 transmits the output data to the device controller 31 (step S274).

Upon receipt of the processing state information from the device controller 31 (step S282), the control agent 24 transmits the processing state information to the monitoring agent 25 (step S283).

<4.4(f) Operation Flow in Monitoring Agent>

Figure 119:
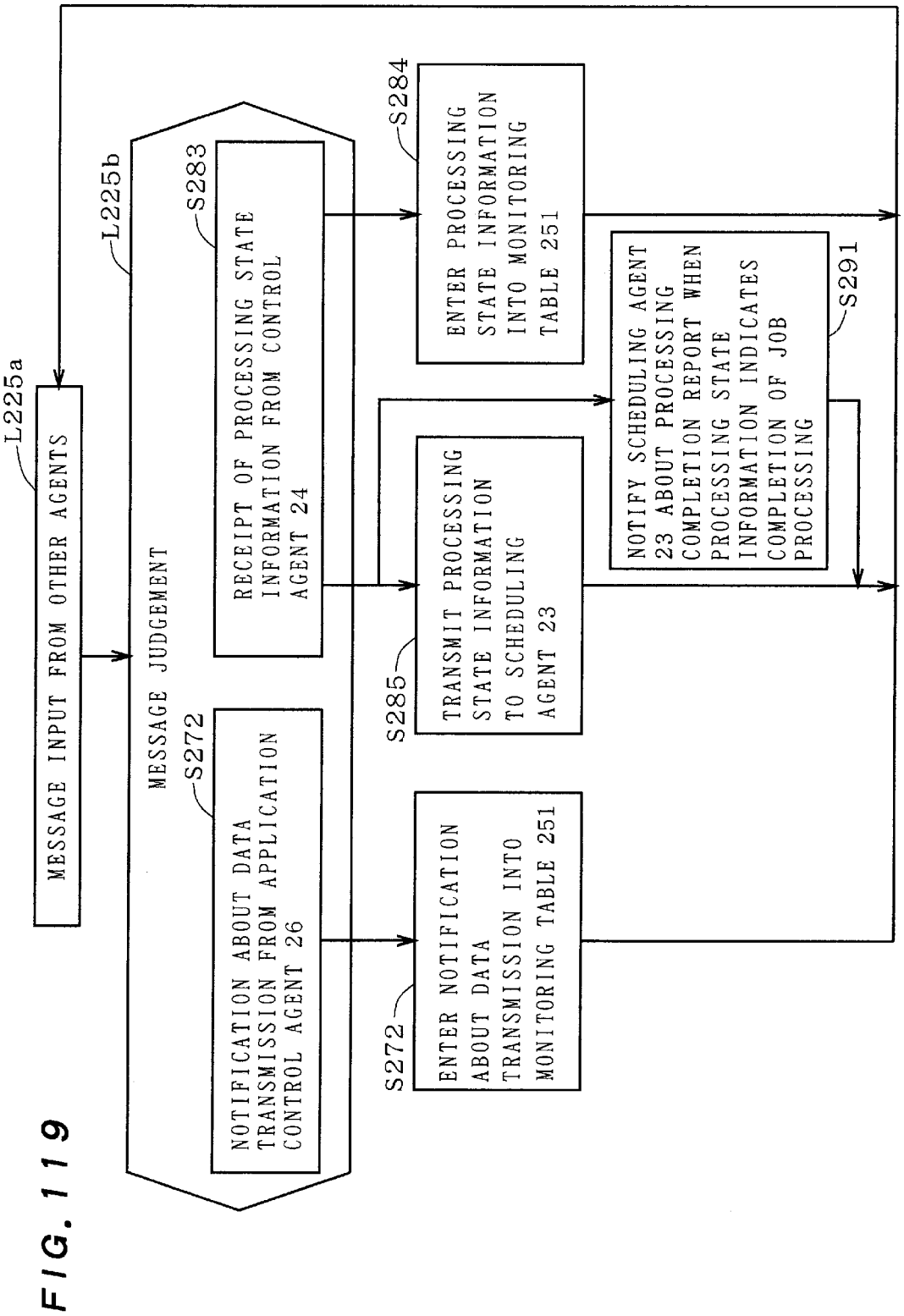
FIG. 119 is a flowchart showing the operation of the monitoring agent.

FIG. 119 is a flowchart showing the operation of the monitoring agent 25. In the monitoring agent 25, the judgement of the message (step L225b) in response to the message input from other agents (step L225a) and the response to the message are performed in a cyclic manner, as will be described below.

Upon receipt of the notification about the transmission of the output data from the application control agent 26 (step S272), the monitoring agent 25 so enters into the monitoring table (detailed) 251 (step S272).

Upon receipt of the processing state information from the control agent 24 (step S283), the monitoring agent 25 separates the processing state information into units to be processed each having a predetermined amount of information to transmit the separated processing state information to the scheduling agent 23 (step S285). If the processing state information indicates the completion of the job processing, the monitoring agent 25 notifies the scheduling agent 23 about the processing completion report (step S291).

The monitoring agent 25 sequentially enters the processing state information from the control agent 24 into the monitoring table (detailed) 251 (step S284).

<4.4(g) Operation Flow in Application Control Agent>

Figure 120:
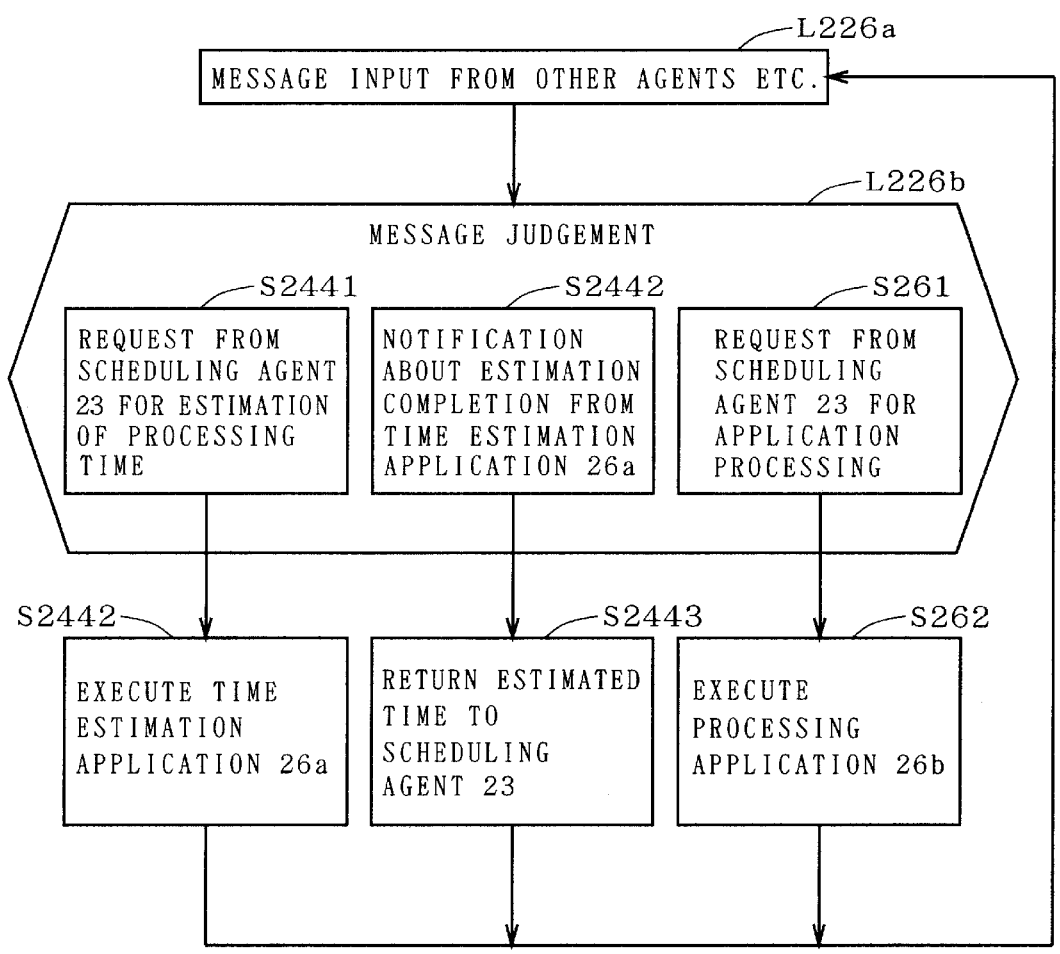
FIGS. 120 and 121 are flowcharts showing the operation of an application control agent.
Figure 121:
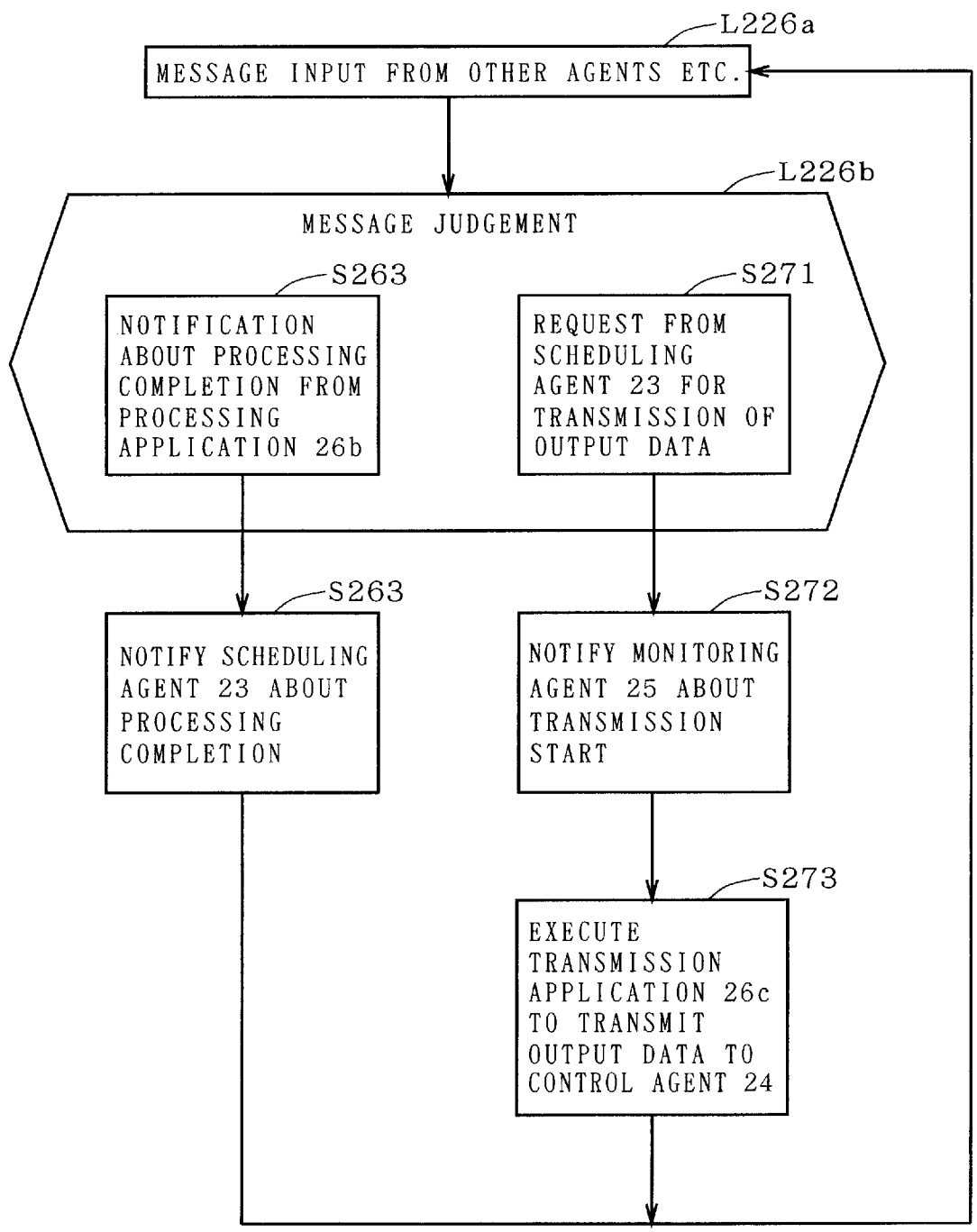

FIGS. 120 and 121 are flowcharts showing the operation of the application control agent 26. In the application control agent 26, the judgement of the message (step L226*b*) in response to the message input from other agents (step L226*a*) and the response to the message are performed in a cyclic manner, as will be described below.

When the scheduling agent 23 requests the application control agent 26 to estimate the time required for the application processing (step S2441), the application control agent 26 executes the time estimation application 26*a* in order to estimate the processing time (step S2442).

Upon completion of the execution of the time estimation application 26*a* (step S2442), the application control agent 26 returns the estimated processing time to the scheduling agent 23 (step S2443).

Upon receipt of the request from the scheduling agent 23 for the application processing (step S261), the application control agent 26 executes the processing application 26*b* in order to generate the output data (step S262).

Upon receipt of the notification about the completion of the processing of the processing application 26*b* (step S263), the application control agent 26 notifies the scheduling agent 23 about the completion of the application processing (step S263).

When the scheduling agent 23 requests the application control agent 26 to transmit the output data (step S271), the application control agent 26 notifies the monitoring agent 25 about the start of transmission (step S272), and executes the transmission application 26*c* to transmit the output data to the control agent 24 (step S273).

<4.4(h) Operation Flow in Capturing Agent>

Figure 122:
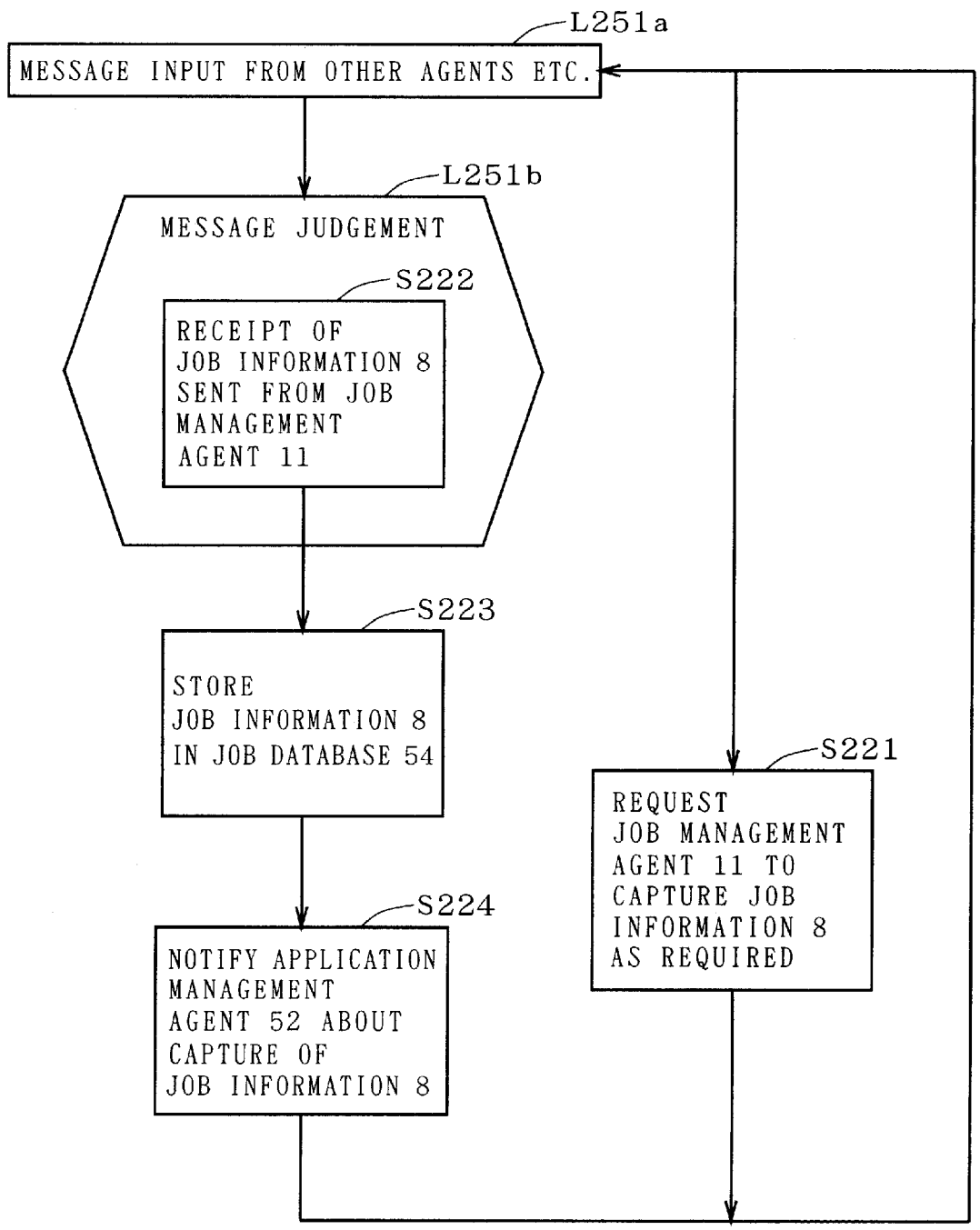
FIG. 122 is a flowchart showing the operation of a capturing agent.

FIG. 122 is a flowchart showing the operation of the capturing agent 51. In the capturing agent 51, the judgement of the message (step L251*b*) in response to the message input from other agents (step L251*a*) and the response to the message are performed in a cyclic manner, as will be described below. The capturing agent 51 sends to the job management agent 11 a request message of the piece of job information 8 to be captured as required in addition to the response to the message input from other agents (step S221).

Upon receipt of the piece of job information 8 sent from the job management agent 11 (step S222), the capturing agent 51 once stores the piece of job information 8 in the job database 54 (step S223), and notifies the application management agent 52 about the capture of the piece of job information 8 (step S224).

<4.4(i) Operation Flow in Application Management Agent>

Figure 123:
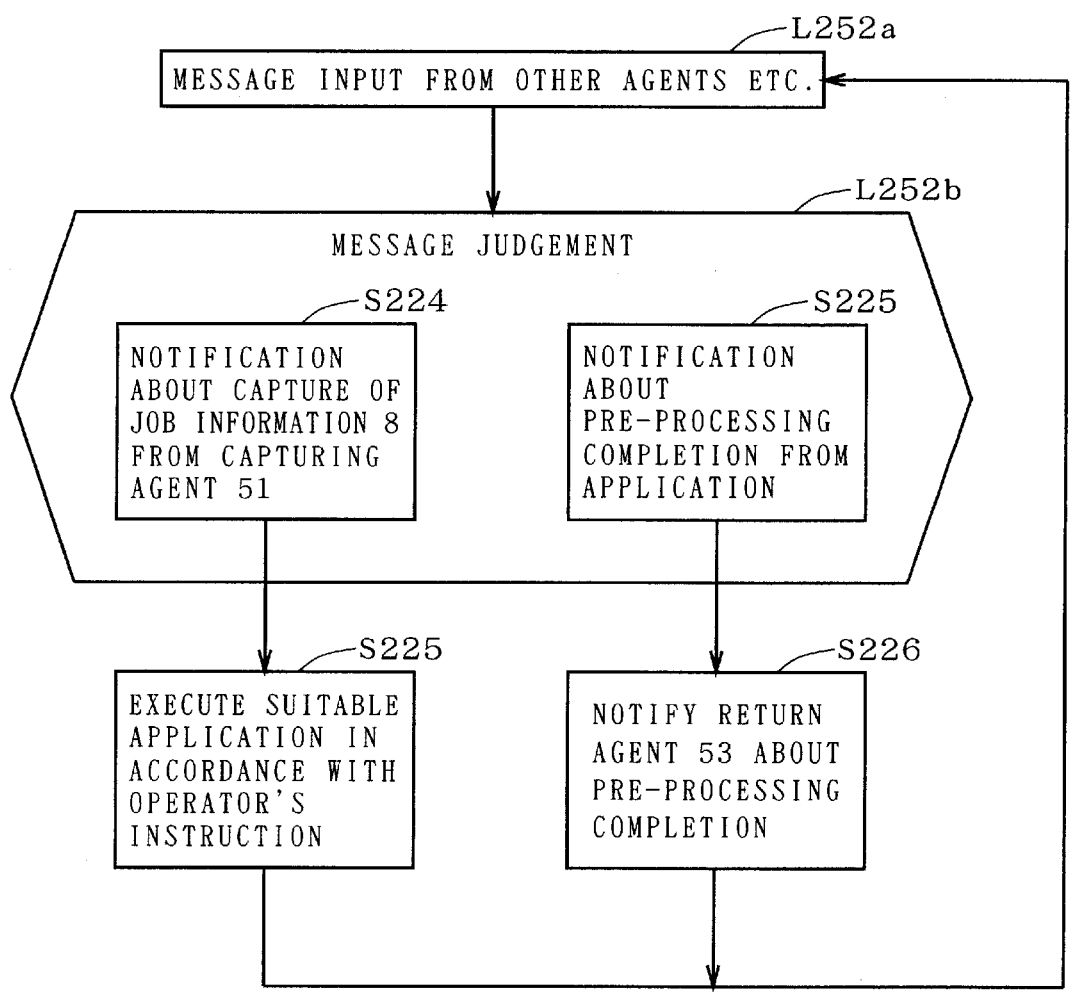
FIG. 123 is a flowchart showing the operation of an application management agent.

FIG. 123 is a flowchart showing the operation of the application management agent 52. In the application management agent 52, the judgement of the message (step L252*b*) in response to the message input from other agents (step L252*a*) and the response to the message are performed in a cyclic manner, as will be described below.

Upon receipt of the notification about the capture of the piece of job information 8 from the capturing agent 51 (step S224), the application management agent 52 executes the application in accordance with the instruction from the operator to perform the pre-processing of the job (step S225).

Upon receipt of the notification about the completion of the pre-processing from the application (step S225), the application management agent 52 so notifies the return agent 53 (step S226).

<4.4(j) Operation Flow in Return Agent>

Figure 124:
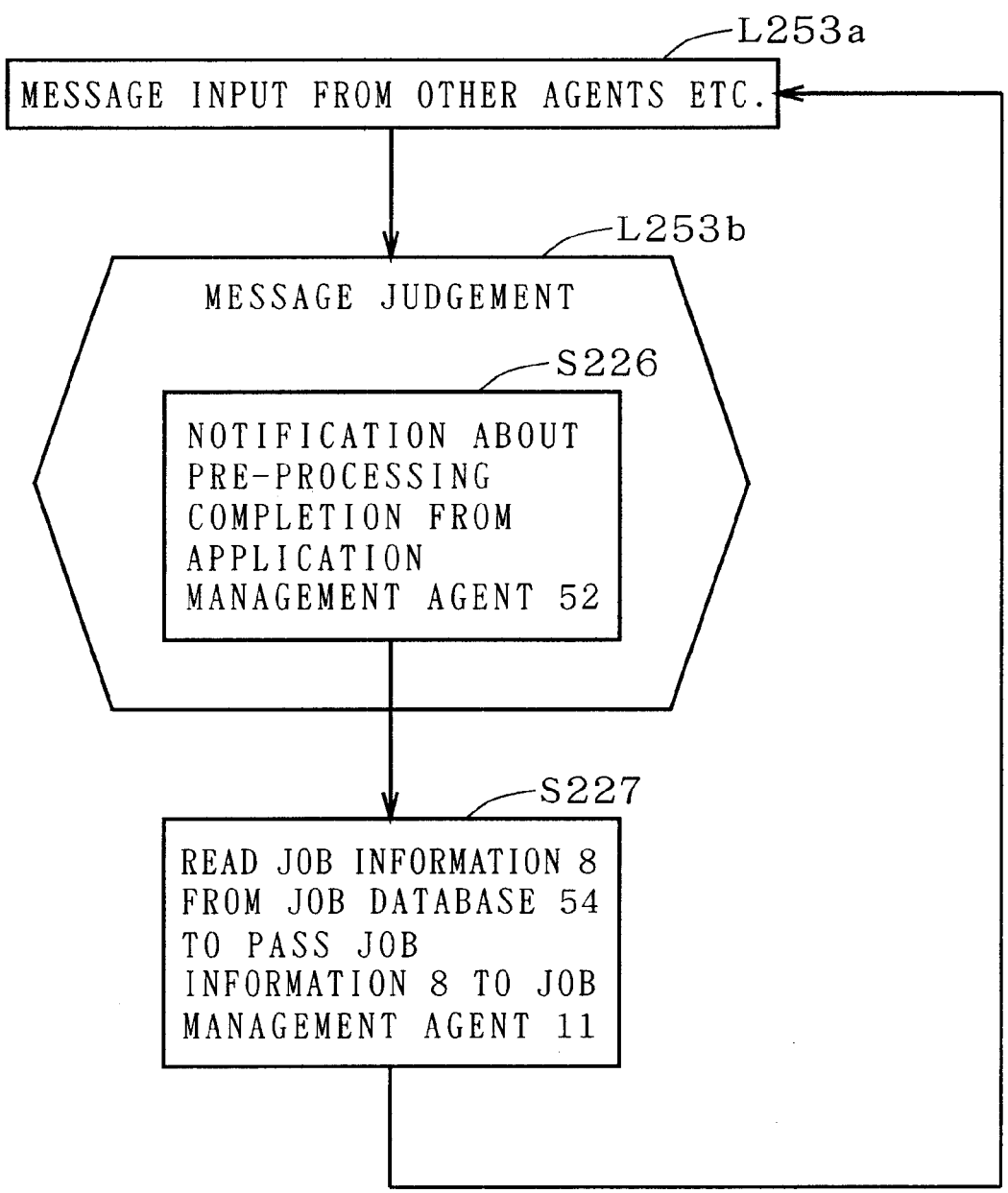
FIG. 124 is a flowchart showing the operation of a return agent.

FIG. 124 is a flowchart showing the operation of the return agent 53. In the return agent 53, the judgement of the message (step L253*b*) in response to the message input from other agents (step L253*a*) and the response to the message are performed in a cyclic manner, as will be described below.

Upon receipt of the notification about the completion of the pre-processing from the application management agent 52 (step S226), the return agent 53 reads the piece of job information 8 from the job database 54 to pass the piece of job information 8 to the job management agent 11 (step S227).

<4.5 Summary>

The system 400 which has been described hereinabove is constructed such that at least one job-handling agent system 20 is connected through the LAN 40 to the single input agent system 10, with the or each job-handling agent system 20 corresponding to the single apparatus 30.

The input agent system 10 and the job-handling agent system 20 operate using the agents which are autonomous programs as main elements. The input agent system 10 and the job-handling agent system 20 themselves also autonomously operate.

In this system 400, the input agent system 10 does not bear the burden of all operations for managing the applications (the job-handling agent system 20) and the apparatus 30, but the job-handling agent system 20 is adapted to execute many parts of the operations. Specifically, the or each individual job-handling agent system 20 autonomously judges on which piece of job information 8 the processing of the application and the apparatus 30 may be based, which piece of job information 8 is payable, and whether or not the piece of job information 8 is registerable on the subsequent processing schedule.

Therefore, the input agent system 10 is required neither to seize the characteristics and schedules of the apparatuses 30 nor to execute a huge amount of complicated computation. This prevents the input agent system 10 from becoming incapable of calculation and incapable of best distributing jobs if more applications and more apparatuses 30 are to be managed. As a result, production efficiency is enhanced.

For making the most of the autonomous properties of the job-handling agent system 20, if trouble occurs in the input agent system 10, the job-handling agent system 20 may only stop providing communication with the input agent system 10 but autonomously continue directing the application to perform the processing and directing the apparatus 30 to process the jobs. Such operations enable the construction of the system 400 which is less susceptible to the influences of the stop of the input agent system 10.

In the system 400, only some pieces of job information 8 which satisfy the predetermined choice conditions among the pieces of job information 8 inputted to the input agent system 10 are stored in the job list table 13. This provides the previous reduction in the number of pieces of job information 8 to be handled, to reduce the burdens on the input agent system 10 and the job-handling agent system 20, thereby achieving efficient management of the job information 8. Further, since the choice conditions are previously transmitted from the job-handling agent systems 20 to the input agent system 10, the input agent system 10 may appropriately choose the pieces of job information 8 suitable for any one of the job-handling agent systems 20 and apparatuses 30.

The system 400 has been described hereinabove. The application and the apparatus 30 to be managed by the system 400 are not limited to the plate making processing. Additionally, various modifications, addition and elimination may be made to the detailed parts of the functions of the agents and the contents of the databases in accordance with the operating modes of the applications and apparatus 30 and the formats of the job information 8.

For example, the system 400 is applicable to a system for processing digital information for simulation and a system for processing in addition to simulation. Additionally, the system 400 may be employed in various systems in various industries such as chemical processing, fabrication, assembly, check, and transport. The same is true for subsequent preferred embodiments.

5. Fifth Preferred Embodiment

A system 500 according to a fifth preferred embodiment of the present invention may be constructed such that a plurality of input agent systems 10 each provided in the system 400 of the fourth preferred embodiment are connected to the LAN 40 as shown in FIG. 45.

Thus, in the system 500 according to the present invention, the plurality of input agent systems 10 can efficiently manage a great amount of job information 8, and each of the job-handling agent systems 20 autonomously evaluates and selects a piece of job information 8 to register the piece of job information 8 on the processing schedule, significantly reducing the burdens on the input agent systems 10. Consequently, the efficiency of the job processing may be sufficiently enhanced.

Further, since the system 500 comprises the plurality of input agent systems 10, a trouble, if any, in any input agent system 10 has little effect on the operations of the job-handling agent systems 20 having the autonomous properties. That is, the job-handling agent systems 20 may communicate with a normally functioning input agent system 10 to continue their operations.

6. Sixth Preferred Embodiment

Figure 125:
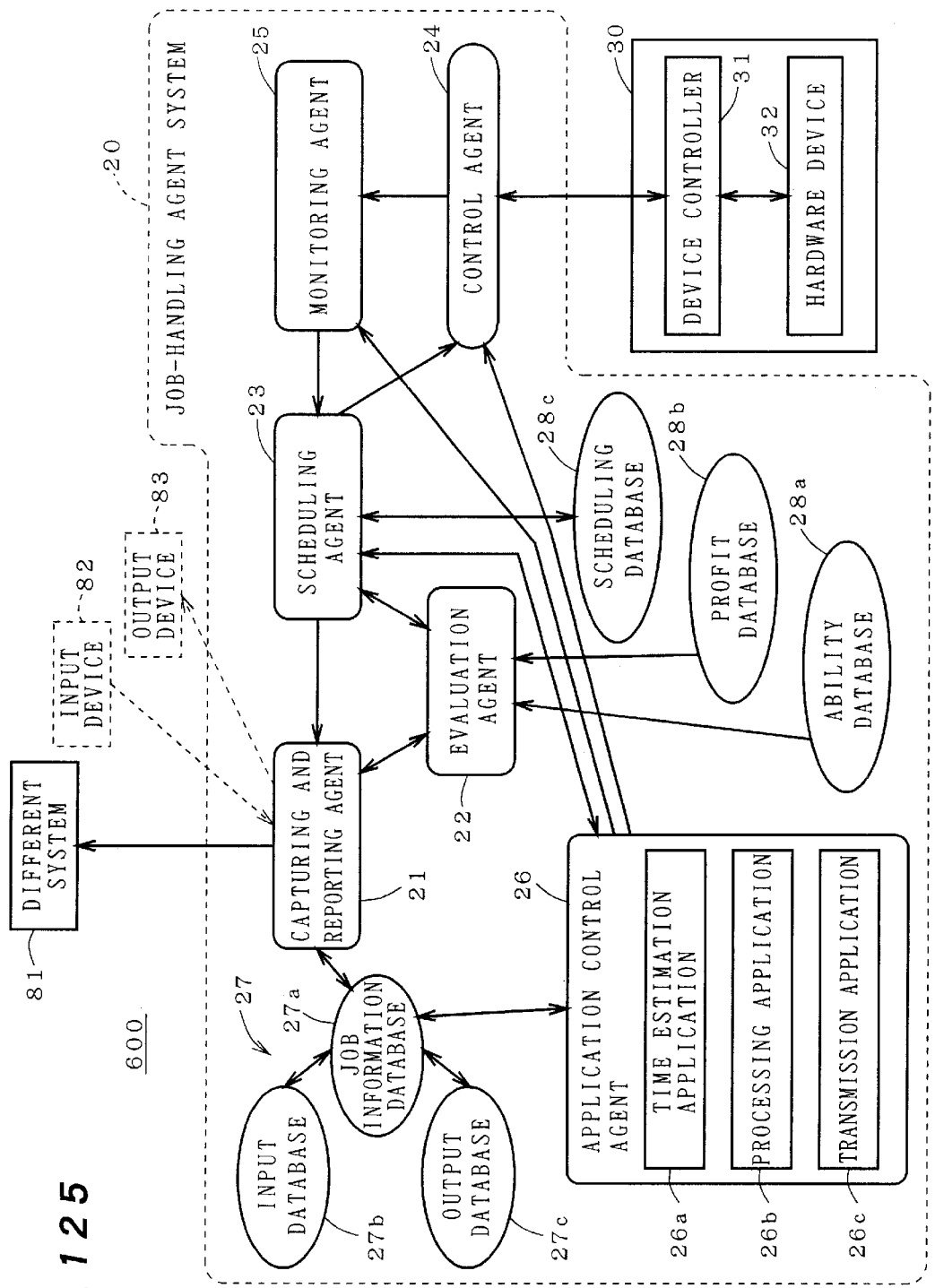
FIG. 125 shows the configuration of the system according to a sixth preferred embodiment of the present invention.

FIG. 125 shows the configuration of a system 600 according to a sixth preferred embodiment of the present invention. As shown in FIG. 125, the system 600 is intended to use the autonomous job-handling agent system 20 of the fourth preferred embodiment by itself for processing and management of the jobs, and is generally similar in configuration to the job-handling agent system 20 of the fourth preferred embodiment. Like reference characters and names are used to designate agents and the like which are generally similar in function to those of the fourth preferred embodiment.

The system 600 autonomously evaluates a piece of job information 8 inputted from the exterior to register the piece of job information 8 on the processing schedule. Of course, a different system 81 or an operator who manages job information 8 may input the piece of job information 8 to the system 600.

For the input of the piece of job information 8 from the different system 81 to the system 600, the capturing and reporting agent 21 requests the different system 81 to capture the job and reports the processing state to the different system 81 as in the fourth preferred embodiment. Therefore, the operations of the system 600 are completely identical with those of the job-handling agent system 20 of the fourth preferred embodiment.

For the input of the piece of job information 8 to the system 600 by the operator using an input device 82 such as a keyboard, the capturing and reporting agent 21 outputs the processing state of the job to an output device 83 such as a display to report the processing state to the operator. Although the capturing and reporting agent 21 of the fourth preferred embodiment requests the job management agent 11 to enter various reports into the job list table 13, the system 600 of the sixth preferred embodiment outputs these reports to the output device 83.

The system 600 conducts the above described three-stage evaluation upon the piece of job information 8 inputted thereto. If the evaluation provides a positive result, the system 600 autonomously registers the piece of job information 8 on the processing schedule. If the evaluation provides a negative result, the system 600 notifies the different system 81 or the output device 83 about the rejection of the processing. Therefore, the different system 81 and the operator need not to seize the ability of the apparatus, the costs required for the job processing, and the processing schedule, but can rapidly input the piece of job information 8 to the system 600 and also cause suitable job processing.

Furthermore, the registration of the piece of job information 8 on the processing schedule, the update of the processing schedule based on the job processing state, the monitoring of the job processing, and the calculation of the track record of the job processing are executed autonomously and hence are not required to be carried out in a centralized manner. Consequently, the different system 81 and the operator need not consider the correction of the processing schedule during the input of the piece of job information. The burdens of the monitoring of the job processing are also reduced.

As described hereinabove, the use of the autonomous job-handling agent system 20 of the fourth preferred embodiment by itself as the system 600 reduces the burdens on the different system 81 and the operator, achieving the enhancement of the processing efficiency of the processing application 26b and the apparatus 30.

7. Seventh Preferred Embodiment

Figure 126:
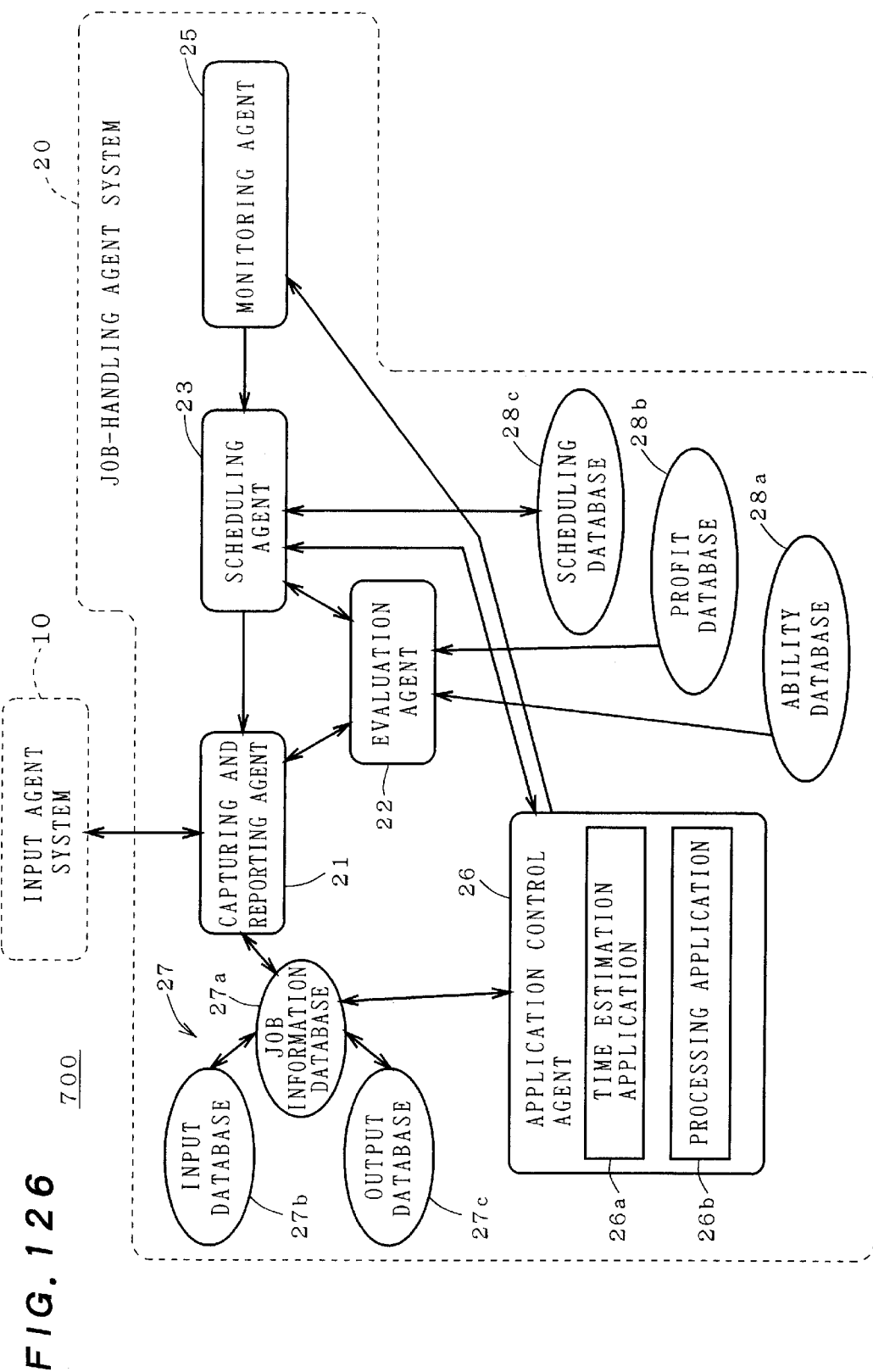
FIG. 126 shows the configuration of the system according to a seventh preferred embodiment of the present invention.

FIG. 126 shows the configuration of a system 700 according to a seventh preferred embodiment of the present invention. Only parts corresponding to the job-handling agent system 20 of the fourth preferred embodiment are shown in FIG. 126, and other parts of the seventh preferred embodiment are similar in construction to those of the first preferred embodiment.

Although the system 400 of the fourth preferred embodiment performs the processing by means of the application for generating the output data in the form of the plate making processing and the processing by means of the apparatus 30 for exposing the printing plates, the system 700 is designed for only digital processing by means of an application except mechanical and chemical processing such as exposure.

Then, only the processing related to the application shown in FIGS. 55 through 60 is performed in the system 700. Thus, a system which handles only digital calculation processing as jobs may be constructed according to the present invention.

While the fourth preferred embodiment is adapted to monitor the application processing by means of the processing application 26b and to enter only the completion of the processing into the schedule table 281c, the application processing may be monitored in a manner similar to the processing of the apparatus 30. Specifically, the monitoring agent 25 may enter the progress of the processing by means of the processing application 26b into the monitoring table 251 and the monitoring table 283c, and the schedule in the schedule table 281c may be changed depending on the entries in the monitoring table 283c.

Additionally, a system for performing only digital processing on the digital materials which are digital information such as the system 700 may be constructed also in the fifth and sixth preferred embodiments.

While the invention has been described in detail, the foregoing description is in all aspects illustrative and not restrictive. It is understood that numerous other modifications and variations can be devised without departing from the scope of the invention.

I claim:

1. A system for managing pieces of job information, comprising:
   a first sub-system comprising an input management part for inputting and storing a first group of pieces of job information; and
   a second sub-system coupled to said first sub-system through a network connection and comprising a job-handling management part for handling a second group of pieces of job information, wherein
   said job-handling management part comprises:
      select means for selecting said second group of pieces of job information among said first group of pieces of job information; and
      an application controller for controlling execution of application processing, to thereby process digital data in accordance with said second group of pieces of job information, and
   said input management part comprises:
      means for inputting original pieces of job information;
      a first memory for storing said original pieces of job information;
      choosing means for choosing objective pieces of job information suitable for said application processing among said original pieces of job information; and
      a second memory for storing said objective pieces of job information to thereby obtain said first group of pieces of job information.

2. The system of claim 1, wherein
said second sub-system comprises a plurality of job-handling management parts.

3. The system of claim 2, wherein
said first sub-system comprises a plurality of input management parts.

4. The system of claim 1, wherein
said select means comprises:
   capturing means for capturing an objective piece of job information representing an objective job which has not been handled among said first group of pieces of job information; and
   evaluation means for checking whether said application processing can be executed in accordance with said objective piece of job information or not.

5. The system of claim 4, wherein
said job-handling management part further comprises:
   scheduling table memory means on which a schedule of said application processing is stored in the form of a scheduling table; and
   registering means for registering said objective piece of job information on said scheduling table if said application processing can be executed in accordance with said objective piece of job information, to thereby obtain said second group of pieces of job information.

6. The system of claim 5, wherein
said evaluation means comprises
   ability database means for storing ability conditions required to execute said application processing,
   wherein said evaluation means compares said objective piece of job information with said ability conditions to determine whether said objective job satisfies said ability conditions or not.

7. The system of claim 5, wherein
said evaluation means comprises
   profit database means for storing profit data representing profits, each of which is expected to be generated when application processing is executed,
   wherein said evaluation means refers to said profit data to estimate a profit which is expected to be generated when said application processing is executed, whereby an estimated profit is obtained, and compares said estimated profit with profit information included in said objective piece of job information.

8. The system of claim 5, wherein
said evaluation means checks whether said application processing can be completed in accordance with said objective piece of job information within free time found on said scheduling table.

9. The system of claim 1, wherein
said job-handling management part further comprises
   reporting means for reporting completion of said application processing to said input management part.

10. The system of claim 1, wherein
said job-handling management part further comprises
   a controller for controlling an external apparatus using digital data processed by said application processing in accordance with said second group of pieces of job information, said external apparatus being provided out of said second sub-system.

11. The system of claim 10, wherein
said select means comprises:
   capturing means for capturing an objective piece of job information representing an objective job which has not been handled among said first group of pieces of job information; and
   evaluation means for checking whether or not said application processing is executed and said external apparatus is operable in accordance with said objective piece of job information.

12. The system of claim 11, wherein
said job-handling management part further comprises:
   first scheduling table memory means on which a schedule of said application processing is stored in the form of a first scheduling table;
   second scheduling table memory means on which an operation schedule of said external apparatus is stored in the form of a second scheduling table; and
   registering means for registering said objective piece of job information on said first and second scheduling tables when it is concluded that said application processing can be executed and said external apparatus is operable in accordance with said objective piece of job information, to thereby obtain said second group of pieces of job information.

13. A system for managing pieces of job information, comprising:
   means for inputting original pieces of job information;
   a first memory for storing said original pieces of job information;
   choosing means for choosing objective pieces of job information suitable for application processing among said original pieces of job information;
   a second memory for storing said objective pieces of job information;
   scheduling table memory means for storing a scheduling table defining a schedule for handling pieces of job information;
   capturing means for capturing an objective piece of job information among said objective pieces of job information in the second memory;
   evaluation means for evaluating whether or not said captured objective piece of job information can be handled by available job-handling resources; and
   registering means for registering said captured objective piece of job information on said scheduling table when it is concluded that said captured objective piece of job information can be handled by said available job-handling resources.

14. The system of claim 13, further comprising
   an application controller for controlling said application processing to process digital data in accordance with said captured objective piece of job information, wherein
      said evaluation means evaluates whether said application processing can be executed in accordance with said captured objective piece of job information or not.

15. The system of claim 14, further comprising
   a controller for controlling an external apparatus using digital data processed by said application processing, said external apparatus being provided out of said system, wherein
      said evaluation means checks whether said external apparatus is operable in accordance with said captured objective piece of job information or not.

16. A method of managing pieces of job information in an industrial job-operation system comprising first and second sub-systems connected to each other through a network connection, said method comprising the steps of:
   a) inputting and storing a first group of pieces of job information in an input management part provided in said first sub-system, the step a) comprising the steps of
      a-1) inputting original pieces of job information,
      a-2) storing said original pieces of job information into a first memory,
      a-3) choosing objective pieces of job information suitable for application processing among said original pieces of job information, and
      a-4) storing said objective pieces of job information into a second memory to thereby obtain said first group of pieces of job information; and
   b) handling a second group of pieces of job information, said second group of pieces of job information being handled by a job-handling management part provided in said second sub-system, the step b) comprising the step of
      b-1) selecting at least part of said first group of pieces of job information to obtain said second group of pieces of job information.

17. The method of claim 16, wherein
   the step b) further comprises the step of
      b-2) executing said application processing to process digital data in accordance with said second group of pieces of job information.

18. The method of claim 17, wherein
   the step b-1) comprises the steps of:
      capturing an objective piece of job information representing an objective job which has not been handled among said first group of pieces of job information in said second memory; and
      checking whether said application processing can be executed in accordance with said objective piece of job information or not.

19. The method of claim 18, wherein
   the step of b-1) further comprises the step of
      registering said objective piece of job information on a scheduling table when it is concluded that said application processing can be executed in accordance with said objective piece of job information, to thereby obtain said second group of pieces of job information on said schedule table.

20. The method of claim 17, wherein
   the step b) further comprises the step of
      b-3) controlling an external apparatus in accordance with said second group of pieces of job information, said external apparatus being provided out of said second sub-system.

21. The method of claim 20, wherein
   the step b-1) comprises the steps of:
      capturing an objective piece of job information representing an objective job which has not been handled among said first group of pieces of job information in said second memory; and
      checking whether or not said application processing can be executed and said external apparatus is operable in accordance with said objective piece of job information.

22. The method of claim 21, wherein
   the step of b-1) further comprises the step of
      registering said objective piece of job information on first and second scheduling tables when it is concluded that said application processing can be executed and said external apparatus is operable in accordance with said objective piece of job information, to thereby obtain said second group of pieces of job information.

23. A method of managing pieces of job information in an industrial job-operation system, said method comprising the steps of:
   a) inputting original pieces of job information;
   b) storing said original pieces of job information into a first memory;
   c) choosing objective pieces of job information suitable for application processing among said original pieces of job information;
   d) storing said objective pieces of job information into a second memory;
   e) capturing an objective piece of job information among a plurality of objective pieces of job information in the second memory;
   f) evaluating whether or not said captured objective piece of job information can be handled by available job-handling resources; and g) registering said captured objective piece of job information on a scheduling table when it is concluded that said captured objective piece of job information can be handled by said available job-handling resources.

24. The method of claim 23, further comprising the step of
h) controlling said application processing to process digital data in accordance with a piece of job information, wherein
the step f) comprises the step of
checking whether said application processing can be executed in accordance with said captured objective piece of job information or not.

25. The method of claim 24, further comprising the step of
i) controlling an external apparatus using digital data processed by said application processing, said external apparatus being provided out of said system, wherein
the step f) further comprising the step of
checking whether said external apparatus is operable in accordance with said captured objective piece of job information or not.

26. Computer readable media carrying programs for managing pieces of job information, wherein execution of said programs by first and second computer systems connected to each other through a network connection, causes said first and second computer systems to perform a process comprising the steps of:
a) storing first group of pieces of job information in an input management part provided in said first computer system, the storing step comprising the steps of
a-1) inputting original pieces of job information,
a-2) storing said original pieces of job information into a first memory,
a-3) choosing objective pieces of job information suitable for application processing among said original pieces of job information, and
a-4) storing said objective pieces of job information into a second memory to thereby obtain said first group of pieces of job information; and
b) handling a second group of pieces of job information, comprising the step of
b-1) selecting at least part of said first group of pieces of job information to obtain said second group of pieces of job information in a job-handling management part provided in said second computer system.

27. The computer readable media of claim 26, wherein the step b) further comprises the step of
b-2) controlling said application processing to process digital data in accordance with said second group of pieces of job information.

28. The computer readable media of claim 27, wherein the step b-1) comprises the steps of:
capturing an objective piece of job information representing an objective job which has not been handled among said first group of pieces of job information in said second memory; and
checking whether said application processing can be executed in accordance with said objective piece of job information or not.

29. The computer readable media of claim 28, wherein the step of b-1) further comprises the step of
registering said objective piece of job information on a scheduling table when it is concluded that said application processing can be executed in accordance with said objective piece of job information, to thereby obtain said second group of pieces of job information.

30. The computer readable media of claim 27, wherein the step b) further comprises the step of
b-3) controlling an external apparatus in accordance with said second group of pieces of job information, said external apparatus being provided out of said second computer system.

31. The computer readable media of claim 30, wherein the step b-1) further comprises the steps of:
capturing an objective piece of job information representing an objective job which has not been handled among said first group of pieces of job information in said second memory; and
checking whether or not said application processing can be executed and said external apparatus is operable in accordance with said objective piece of job information.

32. The computer readable media of claim 31, wherein the step of b-1) further comprises the step of
registering said objective piece of job information on first and second scheduling tables when it is concluded that said application processing can be executed and said external apparatus is operable in accordance with said objective piece of job information, to thereby obtain said second group of piece of job information.

33. Computer readable media carrying programs for managing pieces of job information, wherein execution of said programs by a computer system causes said computer system to perform a process comprising the steps of:
a) inputting original pieces of job information;
b) storing said original pieces of job information into a first memory;
c) choosing objective pieces of job information suitable for application processing among said original pieces of job information;
d) storing said objective pieces of job information into a second memory;
e) capturing an objective piece of job information among a plurality of objective pieces of job information in the second memory;
f) evaluating whether or not said captured objective piece of job information can be handled by available job-handling resources; and
g) registering said captured objective piece of job information on a scheduling table when it is concluded that said captured objective piece of job information can be handled by said available job-handling resources.

34. The computer readable media of claim 33, wherein the process further comprises the step of
h) controlling said application processing to process digital data in accordance with a piece of job information, and
the step f) comprises the step of
checking whether said application processing can be executed in accordance with said captured objective piece of job information or not.

35. The computer readable media of claim 34, wherein the process further comprises the step of
i) controlling an external apparatus using digital data processed by said application processing, said external apparatus being provided out of said computer system, and
the step f) comprises the step of
checking whether said external apparatus is operable in accordance with said captured objective piece of job information or not.

* * * * *